(12) United States Patent
Nashiki et al.

(10) Patent No.: US 8,922,153 B2
(45) Date of Patent: Dec. 30, 2014

(54) FULL-PITCH WINDINGS SWITCHED RELUCTANCE MOTOR

(75) Inventors: Masayuki Nashiki, Komaki (JP); Tomokazu Ishikawa, Nagoya (JP)

(73) Assignee: Denso Corporation, Kariya (JP)

( * ) Notice: Subject to any disclaimer, the term of this patent is extended or adjusted under 35 U.S.C. 154(b) by 364 days.

(21) Appl. No.: 13/299,911

(22) Filed: Nov. 18, 2011

(65) Prior Publication Data
US 2012/0169267 A1    Jul. 5, 2012

(30) Foreign Application Priority Data
Nov. 19, 2010 (JP) .................................. 2010-259197

(51) Int. Cl.
  *H02P 25/08* (2006.01)
  *H02K 19/10* (2006.01)
(52) U.S. Cl.
  CPC ............ *H02P 25/085* (2013.01); *H02K 19/103* (2013.01); *H02P 25/081* (2013.01); *H02P 25/086* (2013.01)
  USPC ....................................... 318/701; 318/254.1
(58) Field of Classification Search
  USPC .............................................. 318/254.1, 701
  See application file for complete search history.

(56) References Cited

U.S. PATENT DOCUMENTS

| | | | |
|---|---|---|---|
| 4,883,999 A * | 11/1989 | Hendershot | 310/216.071 |
| 4,995,159 A * | 2/1991 | Hancock et al. | 29/596 |
| 5,545,938 A | 8/1996 | Mecrow et al. | |
| 6,252,325 B1 * | 6/2001 | Nashiki | 310/168 |
| 2008/0197739 A1* | 8/2008 | Nashiki | 310/156.55 |
| 2010/0123426 A1* | 5/2010 | Nashiki et al. | 318/701 |

FOREIGN PATENT DOCUMENTS

| | | |
|---|---|---|
| JP | H08-126273 | 5/1996 |
| JP | P3157162 | 2/2001 |
| JP | 2010-119263 | 5/2010 |

OTHER PUBLICATIONS

Japanese Official Action dated Sep. 18, 2012 issued in corresponding Japanese Application No. 2010-259197, with English translation.

\* cited by examiner

*Primary Examiner* — Bentsu Ro
(74) *Attorney, Agent, or Firm* — Nixon & Vanderhye P.C.

(57) ABSTRACT

A full-pitch winding switched reluctance motor is provided. In this motor, one set of current components are estimated, which electromagnetically act on only one set of stator poles for one phase. Based on the estimated one set of current components, current components for respective three phases are controlled, resulting in accurate current control with no electromagnetic interactions with other phases. This current control allows a control circuit to be made compact, and a motor with effective field means can be provided.

16 Claims, 56 Drawing Sheets

FIG.18

| TYPE OF TORQUE \ PHASE | AC PHASE<br>$\theta\,\text{off} = 15°$ | BA PHASE<br>$\theta\,\text{off} = 45°$ | CB PHASE<br>$\theta\,\text{off} = 75°$ |
|---|---|---|---|
| CCW TORQUE | 15 ~ 45°<br>FORMULAS (42), (90) | 45 ~ 75°<br>FORMULAS (54), (96) | 75 ~ 105°<br>FORMULAS (61), (102) |
| CW TORQUE | 45 ~ 75°<br>FORMULAS (68), (108) | 75 ~ 105°<br>FORMULAS (75), (114) | 105 ~ 135°<br>FORMULAS (82), (120) |
| ZERO TORQUE | 75 ~ 105°<br>FORMULAS (42), (90) | 105 ~ 135°<br>FORMULAS (42), (90) | 135 ~ 165°<br>FORMULAS (42), (90) |

FIG.52
(a) 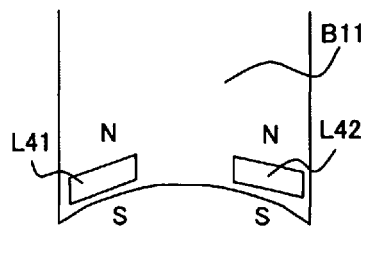
(b) 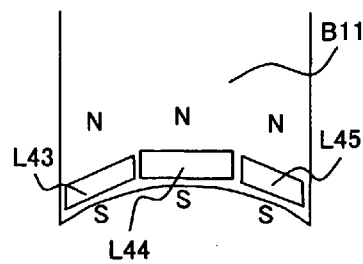
(c) 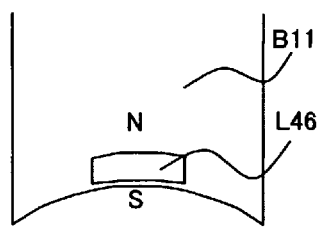
(d) 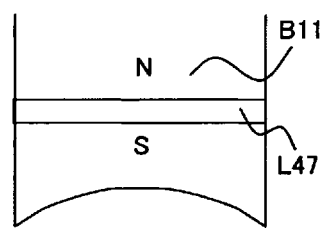
(e) 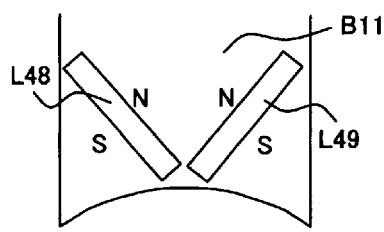
(f) 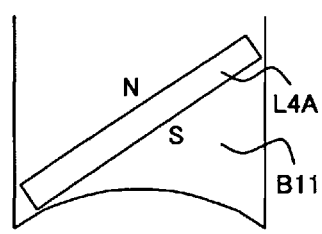

FIG.58

| θr<br>I | $\theta_1$ | $\theta_2$ | ... $\theta_m$ ... | $\theta_{A-1}$ | $\theta_A$ |
|---|---|---|---|---|---|
| $I_1$ | $\Psi_{11}$ | $\Psi_{21}$ | ... $\Psi_{m1}$ ... | $\Psi_{(A-1)1}$ | $\Psi_{A1}$ |
| $I_2$ | $\Psi_{12}$ | $\Psi_{22}$ | ... $\Psi_{m2}$ ... | $\Psi_{(A-1)}$ | $\Psi_{A2}$ |
| ⋮<br>$I_n$<br>⋮ | ⋮<br>$\Psi_{1n}$<br>⋮ | ⋮<br>$\Psi_{2n}$<br>⋮ | ⋮<br>... $\Psi_{mn}$ ...<br>⋮ | ⋮<br>$\Psi_{(A-1)n}$<br>⋮ | ⋮<br>$\Psi_{An}$<br>⋮ |
| $I_{C-1}$ | $\Psi_{1(C-1)}$ | $\Psi_{2(C-1)}$ | ... $\Psi_{m(C-1)}$ ... | $\Psi_{(A-1)(C-1)}$ | $\Psi_{A(C-1)}$ |
| $I_C$ | $\Psi_{1C}$ | $\Psi_{2C}$ | ... $\Psi_{mC}$ ... | $\Psi_{(A-1)C}$ | $\Psi_{AC}$ |

FIG.59

| θr<br>Tc | $\theta_1$ | $\theta_2$ | ... $\theta_m$ ... | $\theta_{A-1}$ | $\theta_A$ |
|---|---|---|---|---|---|
| $T_1$ | $P_{11}$ | $P_{21}$ | ... $P_{m1}$ ... | $P_{(A-1)1}$ | $P_{A1}$ |
| $T_2$ | $P_{12}$ | $P_{22}$ | ... $P_{m2}$ ... | $P_{(A-1)}$ | $P_{A2}$ |
| ⋮<br>$T_n$<br>⋮ | ⋮<br>$P_{1n}$<br>⋮ | ⋮<br>$P_{2n}$<br>⋮ | ⋮<br>... $P_{mn}$ ...<br>⋮ | ⋮<br>$P_{(A-1)n}$<br>⋮ | ⋮<br>$P_{An}$<br>⋮ |
| $T_{B-1}$ | $P_{1(B-1)}$ | $P_{2(B-1)}$ | ... $P_{m(B-1)}$ ... | $P_{(A-1)(B-1)}$ | $P_{A(B-1)}$ |
| $T_B$ | $P_{1B}$ | $P_{2B}$ | ... $P_{mB}$ ... | $P_{(A-1)B}$ | $P_{AB}$ |

(a) (b)

FULL-PITCH WINDINGS SWITCHED RELUCTANCE MOTOR

CROSS REFERENCE TO RELATED APPLICATIONS

This application is based on and claims the benefit of priority from earlier Japanese Patent Application No. 2010-259197 filed Nov. 19, 2010, the description of which is incorporated herein by reference.

BACKGROUND OF THE INVENTION

1. Technical Field

The present invention relates to motors mounted in a variety of types of devices such as vehicles including cars and trucks, industrial devices, and electrical home appliances, and in particular, to full-pitch winding switched reluctance motors.

2. Related Art

Various types of switched reluctance motors are known as shown by Japanese Patent Laid-open Publication No. 8-126273 and Japanese patent No. 3157162.

FIG. 85 pictorially shows a section of a switched reluctance motor according to an example shown in such disclosures. The motor shown in FIG. 85 includes a stator 86K having six stator poles which are teeth 861, 862, 863, 864, 865 and 866 and a rotor having four salient poles. These elements are made of soft magnetic materials.

The U-phase stator pole 861 is wound by a U-phase winding which is a concentrated winding US1, which is shown by references 867 and 868 and a dashed line 86N. A reference 864 also shows a U-phase stator pole, which is wound by a concentrated winding US2 shown by references 86D and 86E and a dashed line 86P. Both windings US1 and US2 are electrically connected in series to each other, and, when being supplied with current, generate a magnetic flux φu shown by a reference 86M. This excitation will cause an attraction force at rotor salient poles 86L and 86Q, thus generating torque in the counterclockwise direction (CCW) illustrated by an arrow.

A reference 863 shows a V-phase stator pole, which is wound by a concentrated winding VS1 shown by V-phase windings 86B and 86C and a dashed line. A reference 866 also shows a V-phase stator pole, which is wound by a concentrated winding VS2 shown by V-phase windings 86H and 86J and a dashed line. Both windings VS1 and VS2 are electrically connected in series to each other, and, when being supplied with current, generate a magnetic flux φv at rotor salient poles located nearby, thus generating torque responsively to attraction forces thereat.

A reference 865 shows a W-phase stator pole, which is wound by a concentrated winding WS1 shown by W-phase windings 86F and 86G and a dashed line. A reference 862 also shows a W-phase stator pole, which is wound by a concentrated winding WS2 shown by V-phase windings 869 and 86A and a dashed line. Both windings WS1 and WS2 are electrically connected in series to each other, and, when being supplied with current, generates a magnetic flux φw at rotor salient poles located nearby, thus generating torque responsively to attraction forces thereat.

In the switched reluctance motor shown in FIG. 85, the torque for rotation can be generated continuously by sequentially exciting the U-, V- and W-phases in order to rotate the rotor. This motor has various features. Practically the motor is lower in production cost due to using no permanent magnets, and is simpler in structure because the stator windings are the concentrated windings. In addition, magnetic fluxes acting between the stator salient poles and the rotor salient poles act at saturation flux densities of magnetic steel sheets, so that the torque can be obtained on electromagnetic actions at higher magnetic flux densities. Furthermore, the rotor is robust, and the rotor can be rotated at higher speeds.

However, the switched reluctance motor shown in FIG. 85 has drawbacks. As the rotor rotates, positions at each of which a radial force acts between the stator and the rotor change 90 degrees in the circumferential direction. In addition, drive currents are given in a switched manner. For these reasons, in particular, the deformation of the stator in the radial direction thereof is relatively larger, causing vibration and noise to be larger. The use efficiency of the windings has also a drawback. Currents to generate the torque are supplied to four windings among the 12 windings shown in FIG. 85, so that the use efficiency of the windings is $4/12=1/3$, which is lower. As a result of this, loss due to Joule heat, which is emitted from the windings, becomes larger.

A lateral section of another conventional motor is shown in FIG. 86. This is a switched reluctance motor with phase windings wound in a full pitch. References M11 and M14 show an A-phase winding wound in a full pitch. References M13 and M16 show a B-phase winding wound in a full pitch, and references M15 and M12 show a C-phase winding wound in a full pitch.

When a magnetic flux shown by a reference 86M is generated to pass through stator poles 861 and 864, currents are supplied to the two pairs of windings consisting of the A-phase windings M11 and M14 and the C-phase windings M15 and M12. For generating a magnetic flux passing through sartor poles 863 and 866, currents are supplied to the two pairs of windings consisting of the B-phase windings M13 and M16 and the A-phase windings M11 and M14. Similarly, for generating a magnetic flux passing through stator poles 865 and 862, currents are supplied to the two pairs of windings consisting of the C-phase windings M15 and M12 and the A-phase windings M11 and M14.

In comparison with the motor shown in FIG. 85, the switched reluctance motor shown in FIG. 86 has a feature that the winding resistance in each slot becomes smaller, approximately ½, because each of the windings is used to magnetically excite the stator poles located adjacent to each winding in the circumferential direction. Further, in the lower speed rotation, as explained above, rotor poles are sequentially excited by stator poles in order to generate the torque for the rotation. However, when the rotation is shifted from lower speeds to higher speeds, the magnetic flux interlinks with plural windings as stated, providing the magnetic flux with complex behaviors thereof. In consideration of this fact, supplying the currents to the windings in an exact manner becomes difficult, thus making it possible to correctly generate the torque in speed ranges other than a lower speed range.

Moreover, in the switched reluctance motor shown in FIG. 86, the full-pitch windings have long coil end portions. This results in a drawback that the rotor of the motor has a longer axial length. There is also a drawback that the resistance of the windings is larger, because the length of winding portions located outside the slots becomes longer. Further, the drawbacks of the switched reluctance motor shown in FIG. 85, which have been explained, are also true of the switched reluctance motor shown in FIG. 86.

SUMMARY

In light of the foregoing drawbacks, there is proposed a motor technique that is able to overcome the various drawbacks with which devices such as the conventional switched reluctance motor are confronted. There are also proposed various configurations of a motor and a generator, and a motor system that controls the motor and the generator in a unique manner closely related to those configurations.

According to a first mode of the present motor system, there is provided a full-pitch winding switched reluctance motor, characterized in that the motor comprising: "4×NN1+1" pieces of stator poles arranged in a range of an electrical angle of 360 degrees; a back yoke magnetically connecting the stator poles; full-pitch windings for respective phases of the motor, each of the full-pitch windings being arranged between two of the stator poles; an even number of rotor salient poles arranged in the range of an electrical angle of 360 degrees, the even number being equal to or larger than 2; and a power converter PA1 that supplies one-way currents to the respective full-pitch windings, wherein commands IFo are obtained for control the windings, the commands commanding two current components to be supplied to two full-pitch windings positioned adjacently to each of the stator poles from both sides thereof in a circumferential direction of the motor. The NN1 is an integer equal to or larger than 1.

According this configuration, complex electromagnetic phenomena and relationships between respective-phase currents and torque in the motor can be controlled by simple relationships, whereby the motor can be controlled precisely in its operations.

According to a second mode of the present motor system, there is provided a full-pitch winding switched reluctance motor, characterized in that the motor includes: "8×NN2" pieces of stator poles arranged in a range of an electrical angle of 360 degrees, wherein the NN2 is an integer equal to or larger than 1; a back yoke magnetically connecting the stator poles; full-pitch windings for respective phases of the motor, each of the full-pitch windings being arranged between two of the stator poles; two or more rotor salient poles arranged in the range of an electrical angle of 360 degrees; a power converter PA2 that supplies positive and negative bidirectional currents to at least one of the full-pitch windings; and a power converter PA3 that supplies one-way currents to other full-pitch windings other than the one full-pitch winding among all the full-pitch windings, wherein commands IFo are obtained for controlling current supply to the windings, the commands commanding two current components to be supplied to two full-pitch windings positioned adjacently to each of the stator poles from both sides thereof in a circumferential direction of the motor.

According to this configuration, complex electromagnetic phenomena and relationships between respective-phase currents and torque in the motor can be controlled by simple relationships, whereby the motor can be controlled precisely in its operations.

A third mode is provided such that, in the first and second modes, the motor includes current component commanding means IFO for producing the commands IFo for the respective phases; current detecting means IS for detecting currents of the respective phases; current component detecting means IFS for producing current component detected values IFs for the respective stator poles from current detected values Is which are outputs of the current detecting means IS for the respective phases; and voltage component combining means VRO for producing a voltage command Vo from the commands IFo and the current component detected values IFs in the respective phases. In this case, the current components for the respective phases can controlled with precision, proving the motor with higher control performance.

A fourth mode is provided such that, in the first and second modes, the motor includes current component commanding means IFO for producing the commands IFo for the respective phases; current component combining means IRO for producing current commands Io for the respective phases by combining the respective-phase commands IFo; current detecting means IS for detecting current detected values Is of the respective phases; and voltage commanding means VO producing a voltage command Vo from the current commands Io and the current detected values Is in the respective phases. In this case, the current components for the respective phases can controlled with precision, proving the motor with higher control performance.

A fifth mode is provided such that, in the first and second modes, the motor includes current component commanding means IFO for producing the commands IFo for the respective phases; current detecting means IS for detecting currents of the respective phases; current component detecting means IFS for producing current component detected values IFs for the respective stator poles from current detected values Is outputted by the current detecting means IS for the respective phases; voltage commanding means V1O for producing a voltage command V1o from the current component commands IFo and the current component detected values IFs in the respective phases; current component combining means IRO for producing current commands Io by combining the respective-phase commands IFo in the respective phases; voltage commanding means V2O for producing a voltage command V2o from the current commands Io and the current detected values Is in the respective phases; and combined voltage commanding means for producing a combined voltage command V12o by combing the voltage command V1o and the voltage command V2o in the respective phases. In this case, both of the current components for the respective phases and the phases can be controlled, so that features originating from both control techniques can be provided.

A sixth mode is provided such that, in the first and second modes, the motor includes torque detecting means TS for producing a torque detected value Ts of the motor from current detected values Is in the respective phases and a rotational position θr of a rotor of the motor; and a torque correcting means TCO for producing a torque correcting command TCo from a torque command To and a torque signal Ts. It is thus possible to provide a motor whose torque can be controlled with precision.

Another mode is provided such that, in the first and second modes, the motor is configured such that, when each of the stator poles has a circumferential width Ht defined by an electrical angle, each of the rotor poles has a circumferential width Hm defined by the electrical angle, and one of the angles Ht and Hm which is smaller than the other is expressed by Hn, an angular width of current supplied to each of the windings of the respective phases as a rotor of the motor rotates is larger than "2×Hn" in the electrical angle. In this case, prior to generation of torque at the respective stator poles, current passing through a corresponding winding starts to increase. Hence, the motor can provide a sufficient amount of torque in its high-speed rotation range.

Another mode is provided such that, in the first and second modes, the motor includes two windings WW7, WW8 for the same phase of the motor, which are wound at through the same slot; a power supply VS7 that supplies power; a power supply VS8 connected in series to the power supply VS7; a transistor TR7 having one end connected to a negative terminal of the power supply VS7 and a further end connected to the winding WW7; a winding WW8 having one end connected to a connecting point connecting the transistor TR7 and the winding WW7; and a diode DD7 having an anode connected to the other end of the winding WW8 and cathode connected to a positive terminal of the power supply VS8, wherein the same configuration as the above is applied to other phase windings for control voltage and current in each of the phases.

According to this configuration, one transistor is able to control supply of the currents for the respective phases, thus making the control circuit simpler in its construction. In addition, regardless of a fact that relationships of magnetic fluxes interlining the winding of a motor are very complicated, it is possible to supply currents to the windings to enable the motor to generate a desired amount of torque, without being limited by regeneration of magnetic energy, that is, reactive current components.

Another mode is provided such that, in the first and second modes, the motor includes two windings WW11, WW12 for the same phase of the motor, which are wound at through the same slot; a power supply VS11 that supplies power; a transistor TR11 having one end connected to a negative terminal of the power supply VS11 and a further end connected to the winding WW11; and a diode DD11 connected in series to the winding WW12 between a positive terminal and the negative terminal of the power supply VS11, wherein the same configuration as the above is applied to other phase windings for control voltage and current in each of the phases.

In this configuration, though the constructions of the windings for the respective phases become complex a little, the currents to the respective phases can be supplied using one transistor. This makes the control circuit simpler in its construction.

In the motor according to the above mode, the winding WW11 can be larger in the number of windings than the winding WW12. In this case, independently of a fact that relationships of magnetic fluxes interlinking the windings of the motor are complex, it is possible to supply currents to the windings to enable the motor to generate a desired amount of torque, without being limited by regeneration of magnetic energy, that is, reactive current components.

Another mode is provided such that, in the first and second modes, the motor includes "2×NN4" pieces of stator poles arranged in a range of an electrical angle of 360 degrees, wherein the NN4 is an integer equal to or larger than 2; a back yoke magnetically connecting the respective stator poles; concentrated windings for respective phases of the motor, each of the concentrated windings being arranged at each of the stator poles; two or more rotor salient poles arranged in the range of an electrical angle of 360 degrees; a power converter PA9 that supplies one-way currents to the respective concentrated windings; and field windings through which field current components for the respective stator poles pass, the field current components being controlled, wherein the field windings are all connected in series to each other.

According to this configuration, the short-pitch concentrated windings for the respective phases and the field windings are wound in the motor, so that the motor can have a higher power factor.

The foregoing power converter PA9 may be a rectifying device and a rotary electric machine with this configuration functions as a generator. In this case, it is unnecessary to have slip rings which are given in the conventional synchronous generator. The rotor is robust, so that the generator can also be driven at higher rotation speeds. The generator can be given simpler circuitry as well as higher reliability, higher output and lower production cost.

Another mode is provided such that, in the first and second modes, the motor includes "2×NN4" pieces of stator poles arranged in a range of an electrical angle of 360 degrees, wherein the NN4 is an integer equal to or larger than 2; a back yoke magnetically connecting the respective stator poles; concentrated windings for respective phases of the motor, each of the concentrated windings being arranged at each of the stator poles; two or more rotor salient poles arranged in the range of an electrical angle of 360 degrees; a power converter PA9 that supplies one-way currents to the respective concentrated windings; and permanent magnets arranged at the stator poles. In this configuration, the concentrated windings can be wound at the stator poles respectively and the permanent magnets can also be added thereat, providing the motor with higher power factors.

In the above mode, the power converter PA9 may be a rectifying device and a rotary electric machine with this configuration functions as a generator. In this case, it is unnecessary to have slip rings which are given in the conventional synchronous generator. The rotor is robust, so that the generator can also be driven at higher rotation speeds. The generator can be given simpler circuitry as well as higher reliability, higher output and lower production cost.

Another mode is provided such that, in the first and second modes, the control is performed using torque information To and magnetic flux information φda indicating magnetic flux interlinking the respective phase windings and corresponding to rotor rotational position information θs. In this case, without using non-linear inductance, the magnetic flux information can be used to control the operations of the motor for higher accurate operations.

In the above mode, the control is performed using maximum torque information Tmax changing depending on each rotor rotation speed ωr. In this case, in a control region which requires larger amounts of torque to the motor, the motor can control its torque reliably up to its maximum value.

Another mode is provided such that, in the first and second modes, the motor includes two windings WW11, WW12 for the same phase of the motor, which are wound at through the same slot; a power supply VS11 that supplies power; a transistor TR11 having one end connected to a negative output terminal of the power supply VS11 and a further end connected the winding WW11; a diode 12 connected parallely with the transistor TR11 having a positive output terminal connected to one end of the winding WW12; and a transistor TR12 arranged between the other end of the winding WW12 and the negative output terminal of the power supply VS11; a diode 11 connected parallely with the transistor TR12, wherein the same configuration as the above is applied to other phase windings for control voltage and current in each of the phases.

In this case, it is possible to supply current components in the negative direction in each slot, whereby the field can be weakened, the torque can be improved, and the permanent magnets are variable.

Another mode is provided such that, in the first and second modes, the motor includes field windings that supply field current components to the respective stator poles, wherein the power converter PA1, or, both of the power converter PA2 and the power converter PA3 is composed of a rectifying device, and the rotary electric machine functions as a generator. In this case, it is unnecessary to have slip rings which are given in the conventional synchronous generator. The rotor is robust, so that the generator can be driven at higher rotation speeds. The generator can be given simpler circuitry as well as higher reliability, higher output and lower production cost.

A variation is provided such that, in the first and second modes, the motor includes a power converter PA10 that supplies a current in a direction which is opposite to the one-way currents from the power converter PA1 or the power converter PA3, and the motor functions as a generator. In this case, it is possible to supply current components in the negative direction in each slot, whereby the field can be weakened, the torque can be improved, and the permanent magnets are variable.

Another mode is provided such that, in the first and second modes, the motor includes permanent magnets arranged at the stator poles, wherein the power converter PA1, or, both of the power converter PA2 and the power converter PA3 is a rectifying device, and the rotary electric machine functions as a generator. In this case, it is unnecessary to have slip rings which are given in the conventional synchronous generator. The rotor is robust, so that the generator can be driven at higher rotation speeds. The generator can be given simpler circuitry as well as higher reliability, higher output and lower production cost.

BRIEF DESCRIPTION OF THE DRAWINGS

In the accompanying drawings:

FIG. 18 is a table showing both rotational ranges of torque generated at each stator pole and formulas providing the torque;

FIG. 52 exemplifies various arrangements of the magnets;

FIG. 58 is a table showing information including the number of interlinkage magnetic fluxes obtained from a rotational angle position Or of the rotor and current values of the respective phases;

FIG. 59 is a table showing data produced by interchanging the torque information and the current information among the data shown in FIG. 58;

DETAILED DESCRIPTION OF PREFERRED EMBODIMENTS

Figure 1:
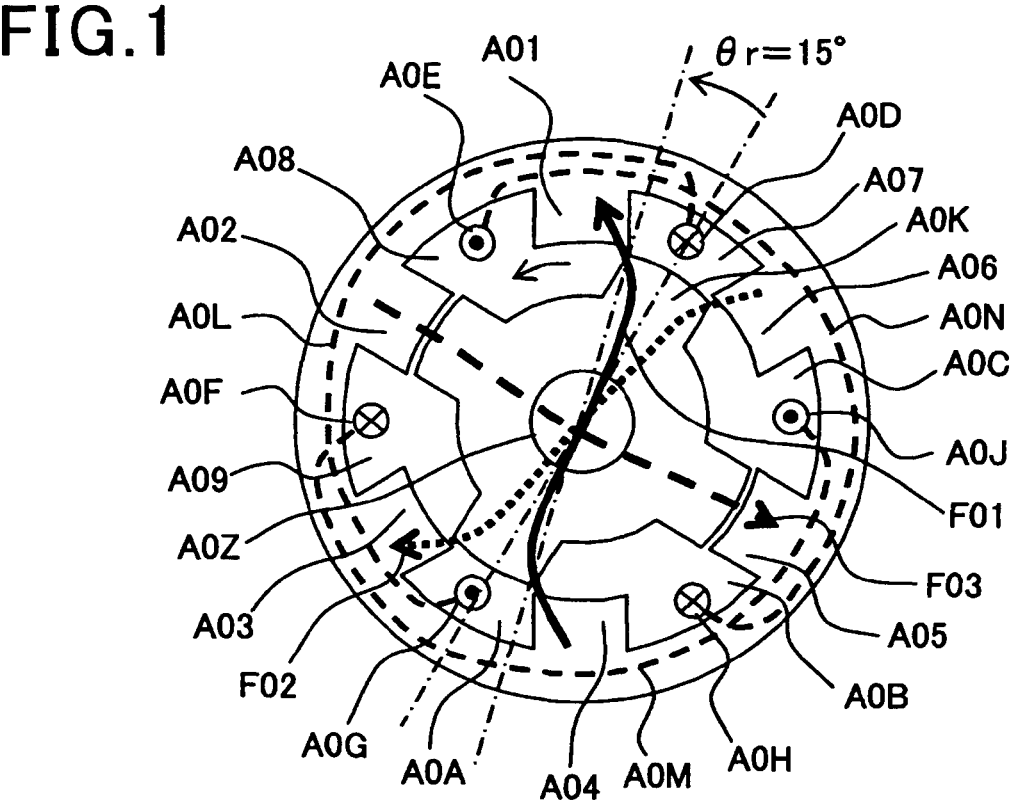
FIG. 1 is a view showing a lateral section of a three-phase, full-pitch winding, concentrated winding, and one-way current type of motor according to an embodiment of the present invention, the view being shown at a rotational angle position of θr=15 degrees and exemplifying magnetic fluxes.

First of all, the basic principle and structure of a full-pitch winding reluctance motor according embodiments of the present invention will now be described.

In the following embodiments, this full-pitch winding reluctance motor is provided as a system that includes a control circuit to control the rotation of the motor. Additionally, components which are used in common or equivalently in the embodiments are given the same reference numerals for the sake of a simplified and omitted description.

FIG. 1 is a lateral cross section of a main body of the full-pitch winding reluctance motor that has the basic structure.

This motor is structured as a switched reluctance motor that has phase windings which are full-pitched wound (hereinafter referred to as a "SRM"). References A0D and A0G show full-pitch windings connected by a coil end A0L shown by a dashed line and show an A-phase winding Wa. References A0F and A0J show full-pitch windings connected by a coil end A0M shown by a dashed line and show a B-phase winding Wb. References A0H and A0E show full-pitch windings connected by a coil end A0N shown by a dashed line and show a C-phase winding Wc. One-way currents are supplied to the A-phase, B-phase, and C-phase windings Wa, Wb and Wc. As shown by winding symbols in FIG. 1, a "X" marking shows a winding direction in which the current flows through the drawing paper from its front to its rear and a black dot marking shows the opposite winding direction in which the current flows through the drawing paper from its rear to its front.

References A01 and A04 show AC-phase stator poles each sandwiched by the A-phase and C-phase windings. References A03 and A06 show BA-phase stator poles each sandwiched by the A-phase and C-phase windings. References A05 and A02 show CB-phase stator poles each sandwiched by the C-phase and B-phase windings.

The rotor has four rotor salient poles arranged at circumferential intervals of 90 degrees. The rotor can be produced by stacking on one to another magnetic steel sheets made of soft-magnetic material. A reference A0Z is a rotor shaft. The rotational position of the rotor is indicated by an edge of a rotor salient pole and measured from, as a reference, the circumferential angle of the A-phase winding, in which the edge of the rotor is a lead edge in the counterclockwise rotational direction CCW. The rotational position is represented by θr shown in FIG. 1. In the case of FIG. 1, θr=15 degrees. In FIG. 1, such elements as a motor housing and bearings are omitted.

Incidentally, a minimum configuration of the full-pitch winding SRM shown in FIG. 1 includes 6 stator poles and 4 rotor salient poles. In the present embodiment, a mechanical angle of 360 degrees in FIG. 1 is represented as an electrical angle of 360 degrees. Though it is a little confusing because of the four rotor salient poles, it is defined in the embodiment that the motor configuration shown in FIG. 1 is expressed as "two-pole full-pitch winding SRM." Of course, depending on the sizes and applications of motors, a practical motor, which is actually used, can have a pole configuration multiplied, for example, four times or thereabouts from the motor shown in FIG. 1, which is 8 poles for example.

The circumferential width of each stator pole is expressed by a circumferential angle of an air gap space at which each stator pole and each rotor pole are faced to each other, and this circumferential angle is exemplified as an electrical angle of 30 degrees. The circumferential width of each of the slots A07, A08, A09, A0A, A0B and A0C, at which each which winding is arranged, is also formed to have an electrical angle of 30 degrees. The circumferential width of each rotor pole is also exemplified as having an electrical angle of 30 degrees. By making these circumferential widths small or large, the motor characteristics can be changed, so that these circumferential widths can be set to various amounts depending on specifications required by a motor.

Figure 8:
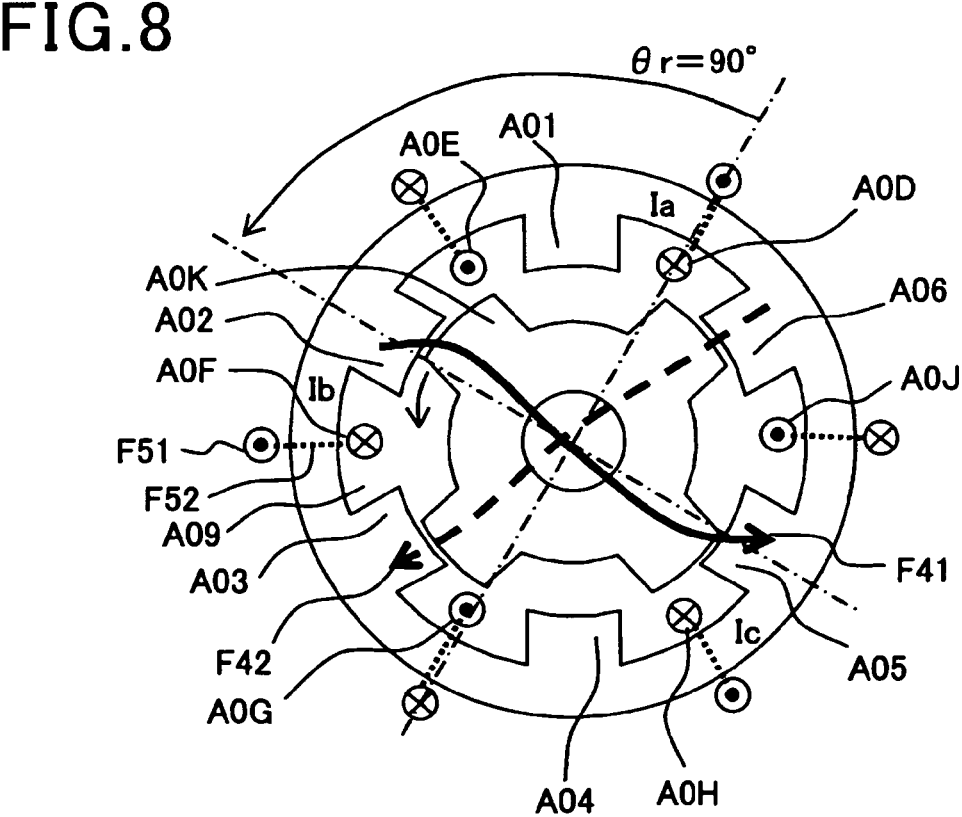
FIG. 8 is a view shown by changing the rotational angle position in FIG. 1 to θr=90 degrees.

The A-phase, B-phase and C-phase full-pitch windings can be produced by using various winding methods which are electromagnetically equivalent to drum-shaped, waveformed and annular windings. FIG. 8 exemplifies annular full-pitch windings. The B-phase winding A0F is wound to extend radially outwardly from the slot A09 to depict an annular form, as illustrated by a dashed line F52 and a winding F51. Connecting the annular winding A0F and an annular winding A0J in series to each other produces the same electromagnetic effects as those of the full-pitch windings A0F and A0J shown in FIG. 1. This is true of annular full-pitch windings for the other phases shown in FIG. 8.

Figure 9:
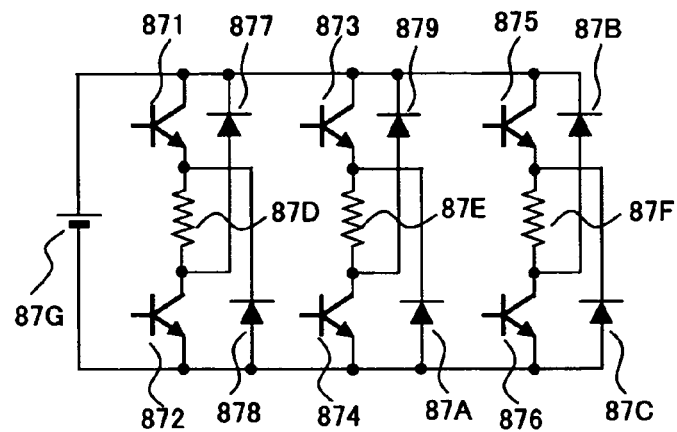
FIG. 9 is a circuit diagram exemplifying supply of one-way currents to respective windings in FIG. 1.

FIG. 9 exemplifies a circuit to supply currents to the motor shown in FIG. 1. A reference 87G shows a power supply. A reference 87D shows the A-phase winding, a reference 87E shows the B-phase winding, and a reference 87F shows the C-phase winding. References 871 and 872 show transistors, and switching on both the transistors allows the power supply 87G to apply voltage, increasing a A-phase current Ia passing through the A-phase winding 87D. In response to switching off both transistors, the A-phase current Ia passes via diodes 877 and 878, thus decreasing the A-phase current Ia and causing magnetic energy in the A-phase winding 87D to be regenerated to the power supply. When only one of the transistors 871 and 872 is switched on, a flywheel current can flow therethrough. That is, when the transistor 871 is switched on alone, the A-phase current Ia can be circulated through the transistor 871, the winding 87D, and the diode 877, thus being separated from the power supply 87G. Hence, for controlling an increase or a decrease in the A-phase current Ia, a current supply mode can be selected from three current supply modes consisting of power running, flywheel, and regeneration.

A reference 87E shows the B-phase winding, and a B-phase current Ib is controlled by using transistors 873 and 874 in the same way as the A phase. References 879 and 87A show diodes for the regeneration. A reference 87F shows the C-phase winding, and a C-phase current Ic is controlled by using transistors 875 and 876 in the same way as the A phase. References 87B and 87C show diodes for the regeneration. In addition, the current-supplying transistors sated above can be ones selected from a variety of types of semiconductors. For example, such transistors can be IGBTs, power MOSFETs, thyristors, GTOs, or transistors produced with SiC.

Figure 10:
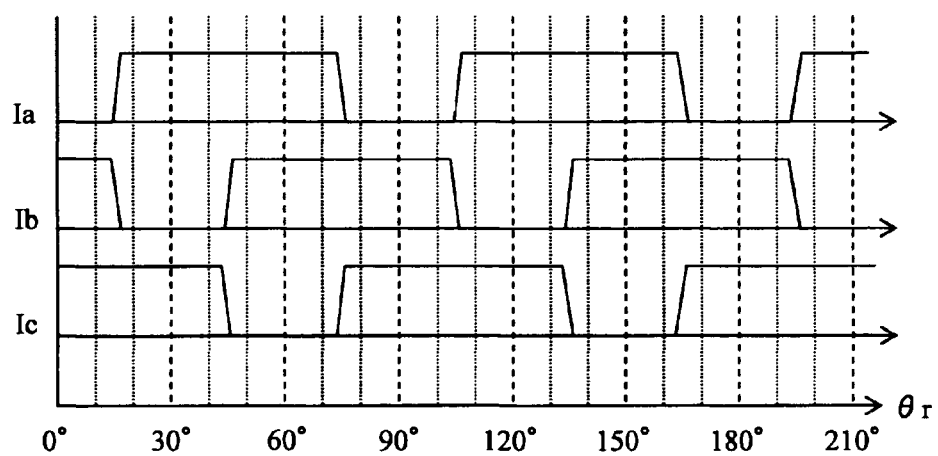
FIG. 10 is a timing chart exemplifying supplied currents when the motor shown in FIG. 1 is rotated at lower speeds.

Generation of torque at each rotational position θr of the motor shown in FIG. 1 will now be described in terms of its static torque characteristics. Simply, as shown in FIG. 10, if the A-phase, B-phase and C-phase currents Ia, Ib and Ic can be supplied to the windings, torque can be generated at each rotational position θr. This will now be explained in turn.

Figure 2:
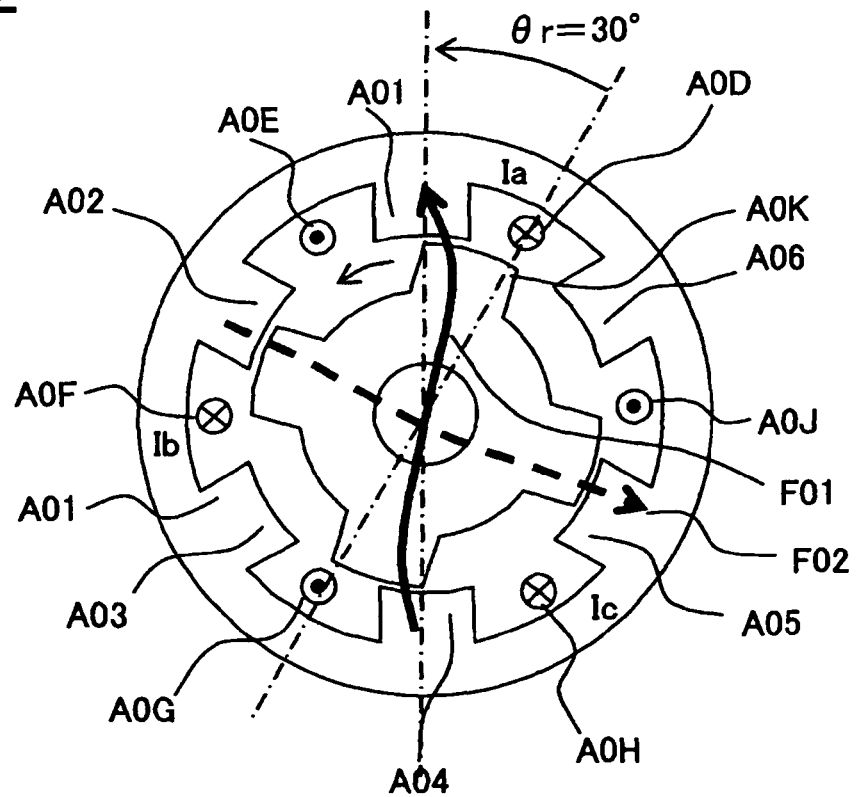
FIG. 2 is a view shown by changing the rotational angle position in FIG. 1 to θr=30 degrees.

FIG. 1 shows a rotational position θr=15 degrees, where the A-phase current Ia is supplied through the windings A0D and A0G and, in parallel, the C-phase current Ic having the same amplitude as that of the A-phase current Ia is supplied through the windings A0H and A0E. In this state, the B-phase current Ib is set to zero. Hence, both currents Ia and Ic induce a magnetic flux φac shown by a reference F01, thus generating an attraction force which generates torque in the counterclockwise CCW direction shown by an arrow. A magnetic flux φcb generated in a direction shown by a dashed line F03 becomes zero, because the A-phase current Ia and the C-phase current Ic are the same in amplitude with each other and interlinks with each other in the mutually opposite directions. The reason is that a sum of the mutually interlinking currents Ia and Ic becomes zero according to Ampere's law defining "a sum obtained by circulate integral of strength of a magnetic field along a closed path through which the magnetic field passes equals to a sum of currents interlinking with the closed path." The same relationship is established in the magnetic flux φba directed from the BA-phase stator poles A03 to A06 and thus the sum becomes zero. FIG. 2 shows a rotational position θr=30 degrees, where the operation of FIG. 1 continues.

Figure 3:
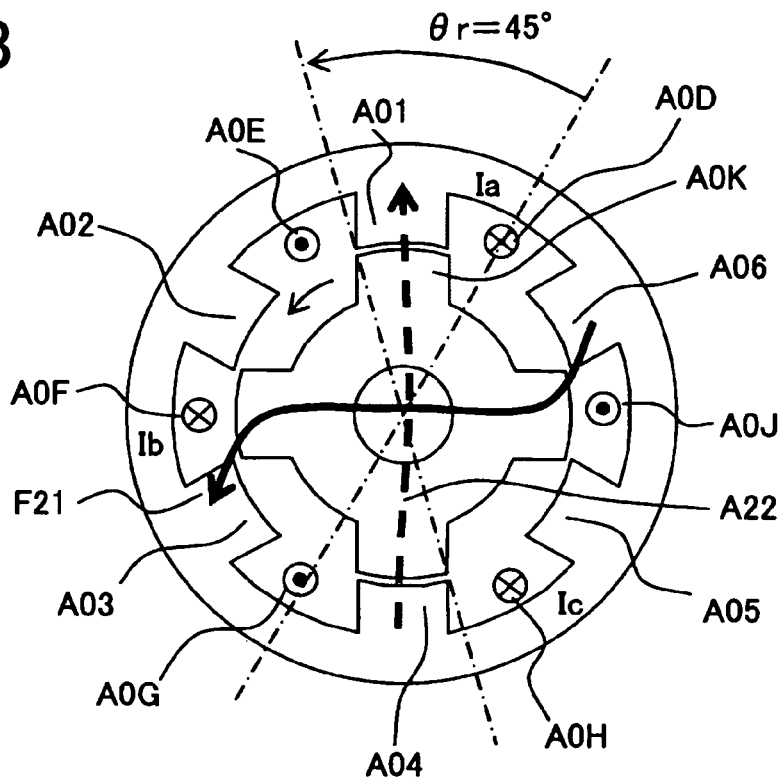
FIG. 3 is a view shown by changing the rotational angle position in FIG. 1 to θr=45 degrees.
Figure 4:
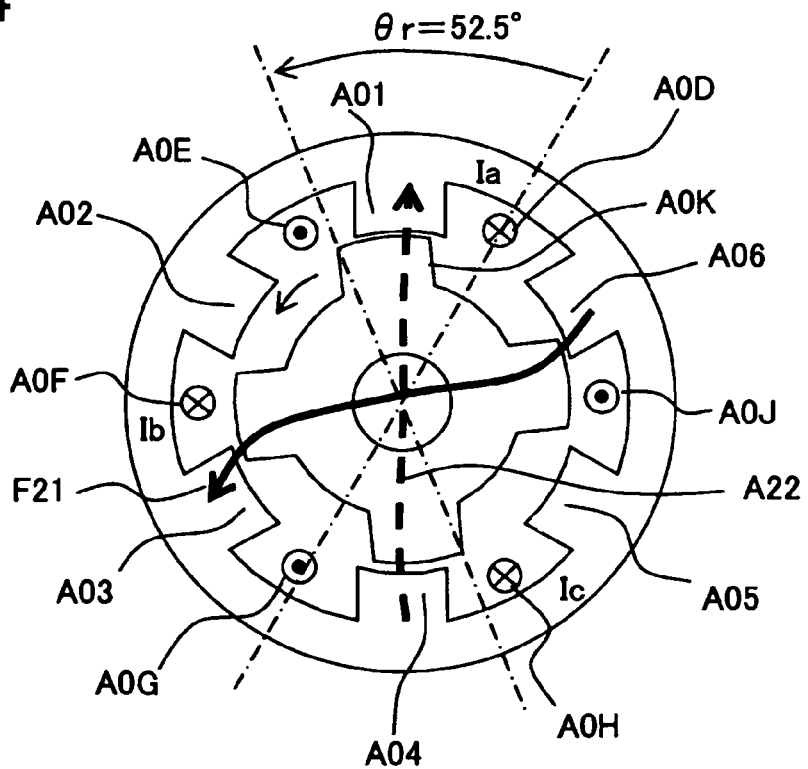
FIG. 4 is a view shown by changing the rotational angle position in FIG. 1 to θr=52.5 degrees.
Figure 5:
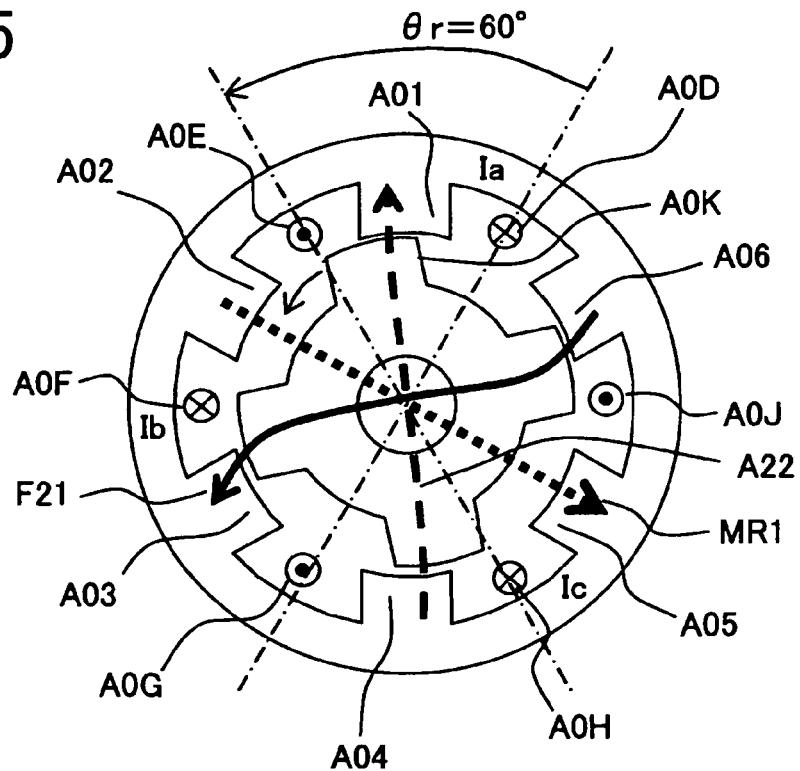
FIG. 5 is a view shown by changing the rotational angle position in FIG. 1 to θr=60 degrees.
Figure 6:
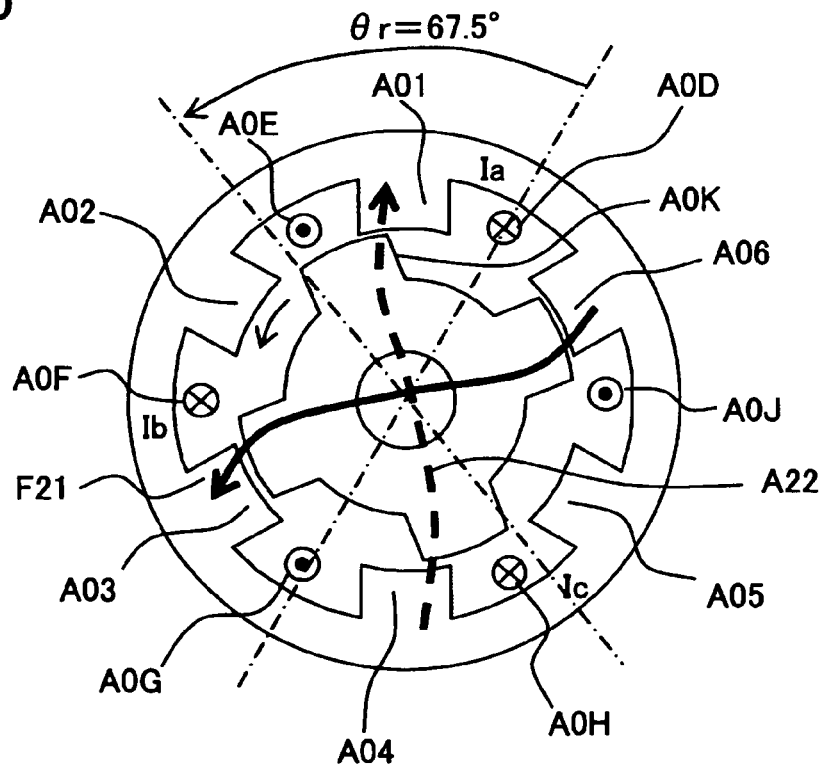
FIG. 6 is a view shown by changing the rotational angle position in FIG. 1 to θr=67.5 degrees.

FIG. 3 shows a rotational position θr=45 degrees. At this rotational position, the AC-phase stator poles A01 and A04 are not able to generate torque. In this state, both currents Ia and Ic are set to zero. At the same time, current of the same value is imparted to the B-phase current Ib and A-phase current Ia. In this case, the A-phase current Ia is continued to be supplied after all. Currents Ib and Ia induce magnetic flux φac, as indicated by F21, to the BA-phase stator poles A03 and A06. This generates an attraction force which generates torque in the counterclockwise direction CCW as indicated by an arrow. No magnetic flux is generated in the directions of other AC-phase and CB-phase stator poles according to Ampere's law. FIG. 4 shows a rotational position θr=52.5 degrees, where the operation of FIG. 3 continues. FIG. 5 shows a rotational position θr=60 degrees, where the operation of FIG. 4 continues. FIG. 6 shows a rotational position θr=67.5 degrees, where the operation of FIG. 5 continues.

Figure 7:
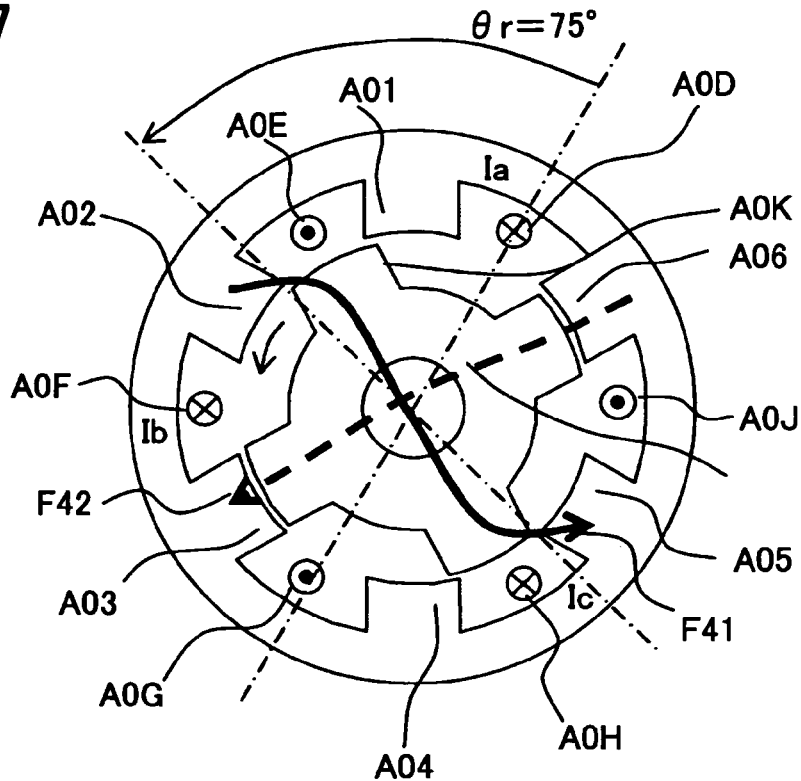
FIG. 7 is a view shown by changing the rotational angle position in FIG. 1 to θr=75 degrees.

FIG. 7 shows a rotational position θr=75 degrees. At this rotational position, the BA-phase stator poles A03 and A06 are not able to generate torque. In this state, currents Ib and Ia are set to zero. At the same time, current of the same value is imparted to the C-phase current Ic and B-phase current Ib. In this case, the B-phase current Ib is continued to be supplied after all. Currents Ic and Ib induce magnetic flux φbc, as indicated by F41, to the CB-phase stator poles A05 and A02. This generates an attraction force which generates torque in the counterclockwise direction CCW as indicated by an arrow. No magnetic flux is generated in the directions of other BA-phase and AC-phase stator poles according to Ampere's law. FIG. 8 shows a rotational position θr=90 degrees, where the operation of FIG. 7 continues. When the rotation advances by 15 degrees in the counterclockwise direction CCW from the rotational position θr=90 degrees of FIG. 8, the rotational position θr=105 degrees is reached. This state is completely the same as the state of the rotational position θr=15 degrees of FIG. 1.

In this way, one current-supply cycle of the motor is completed. When the current-supply cycle of FIGS. 1 to 8 is repeated, torque in the counterclockwise direction CCW is continuously generated. However, the A-phase winding Wa, the B-phase winding Wc and the C-phase winding Wc are in a mutually complicated magnetic connection relationship. Therefore, the method described above raises a problem of not being able to supply current to increase with which rotational speed. The detailed results of analysis and solutions will be described later.

Hereinafter is discussed the features of full-pitch winding SRMs. SRMs have the following common features. Specifically, production cost is low because the motor can be composed without using permanent magnets. High-speed rotation is realized because the rotor is robust. A full-pitch winding SMR has a winding cross-sectional area in a slot which is larger than that of a concentrated winding SRM shown in FIG. 85, by a factor of two, and thus the winding resistance of the former is reduced to about ½. Accordingly, the loss due to Joule heat is reduced to thereby reduce the size and the cost of the motor.

Further, as shown in FIG. 1, two of the A-phase winding Wa, B-phase winding Wb and C-phase winding Wc of the motor are supplied with current to generate torque. In this case, as in the circuit shown in FIG. 9, current is parallelly supplied from the two windings and the circuit if the three windings and the circuit are independent of each other. This means that the current capacity of a transistor can be reduced to ½, compared to the concentrated winding SRM shown in FIG. 85. Thus, the size of the control circuit can be reduced to ½. A full-pitch winding SMR may be compared with the case where a brushless motor is configured by providing a star connection to supply three-phase AC current using six transistors. In this case as well, the size of the control circuit can be reduced to ½ for the same reasons. In short, when the motor shown in FIG. 1 is effectively controlled using the circuit shown in FIG. 9, for example, the size and the cost of the motor and the control circuit can be reduced. The description including a method of control as well as a specific motor structure will be provided later.

Figure 11:
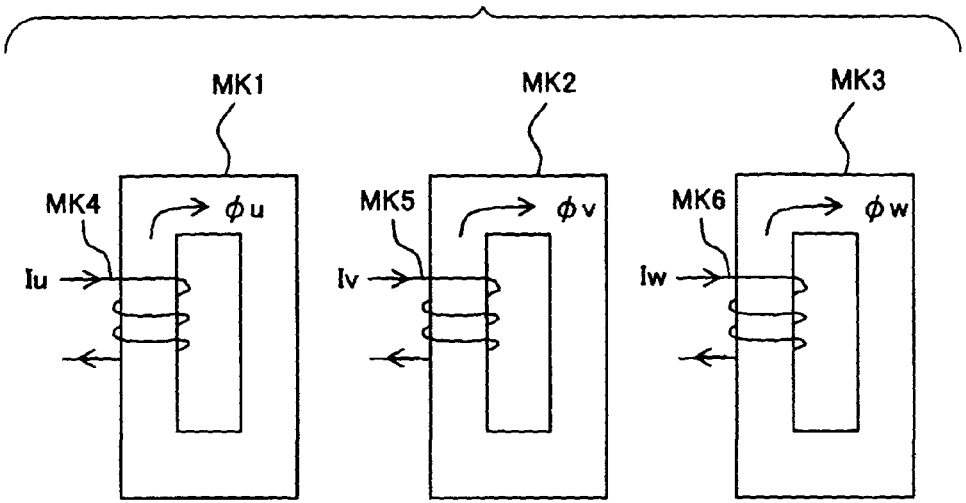
FIG. 11 is a view explaining electromagnetic actions of the motor shown in FIG. 85.

Hereinafter, problems of full-pitch winding SRMs and their analyses are again discussed. The first problem is ascribed to the magnetic flux interlinking the windings of the phases in a complicated manner. In the concentrated winding SRM of the conventional art shown in FIG. 85 has the U-phase magnetic flux φu, V-phase magnetic flux φv and W-phase magnetic flux φw, which are independent of each other and thus will not interfere with each other. Specifically, the magnetic flux of one phase will not interlink the winding of a different phase. This magnetic relationship may be qualitatively expressed as shown in FIG. 11. Reference MK1 shows a U-phase magnetic circuit which is based on a magnetically closed circuit composed of the stator poles 861 and 864, the back yoke of the stator, and the rotor salient poles 86L and 86Q. The magnetic flux 86M of FIG. 85 corresponds to the U-phase magnetic flux φu of FIG. 11. Reference MK4 shows a U-phase winding which corresponds to the winding of FIG. 85 composed of a serial connection of the windings 867 and 868 with the windings 86E and 86D.

Reference MK2 shows a V-phase magnetic circuit which is based on a magnetically closed circuit composed of the stator poles 863 and 866, the back yoke of the stator, and the rotor salient poles opposed to the V-phase stator poles. The same relationship of U-phase applies to the V-phase magnetic flux φv. Reference MK5 shows a V-phase winding which corresponds to the winding of FIG. 85 composed of a serial connection of the windings 86B and 86C with the windings 86J and 86H.

Reference MK3 shows a W-phase magnetic circuit which is based on a magnetically closed circuit composed of the stator poles 865 and 862, the back yoke of the stator, and the rotor salient poles opposed to the W-phase stator poles. The same relationship of U-phase applies to the W-phase magnetic flux φw. Reference MK6 shows a W-phase winding which corresponds to the winding of FIG. 85 composed of a serial connection of the windings 86F and 86G with the windings 86A and 869.

The magnetic relationship shown in FIG. 11 hardly raises problems regarding control because the current, magnetic flux and voltage of the phases are correlated but independent between the phases. The inductance of each winding is self-inductance.

Figure 85:
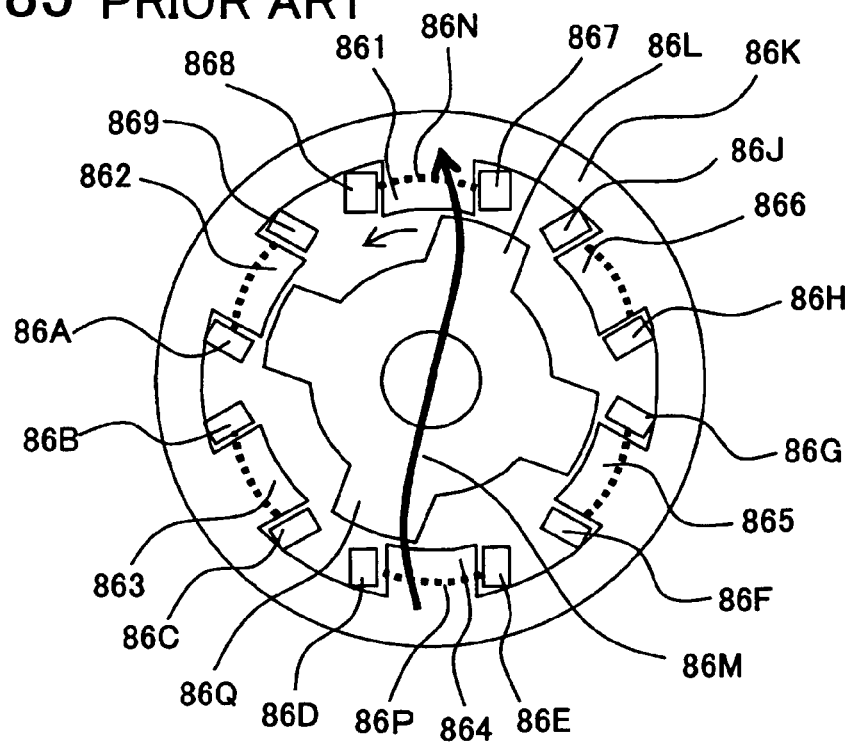
FIG. 85 is a lateral sectional view exemplifying the configuration of a switched reluctance motor provided with conventional concentrated windings.
Figure 86:
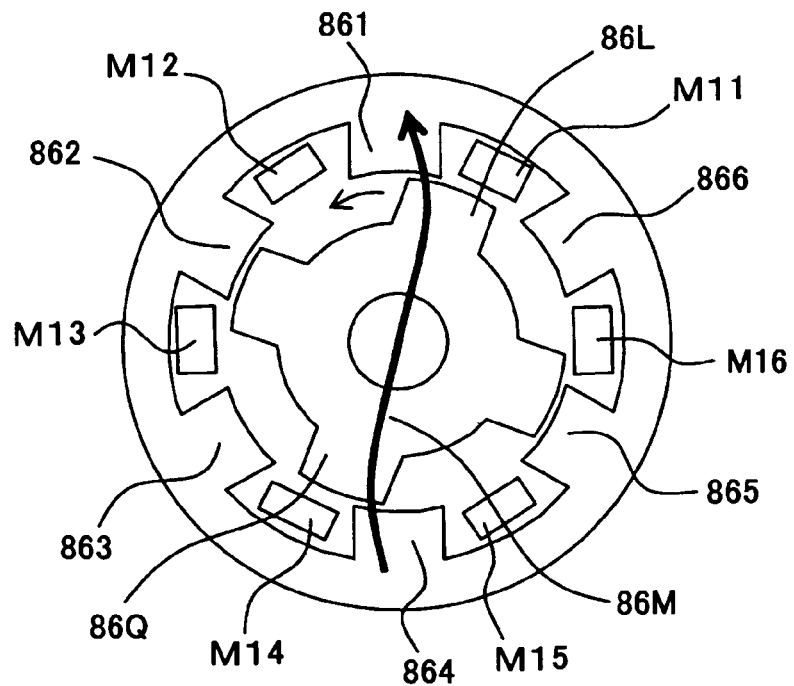
FIG. 86 is a lateral sectional view exemplifying the configuration of a switched reluctance motor provided with conventional full-pitch windings.

Contrary to the concentrated winding SRM of FIG. 85, the full-pitch winding SRM shown in FIG. 1 has a complicated magnetic connection relationship. As explained above, the AC-phase magnetic flux φac shown by reference F01 is excited by the A-phase current Ia of the A-phase winding Wa as shown by A0D and A0G and the C-phase current Ic of the C-phase winding Wc as shown by A0H and A0E. However, the magnetic flux φac also interlinks the B-phase winding Wb shown by references A0F and A0J and thus is influenced by the B-phase current Ib. To the contrary, being interlinked with the windings of the individual phases, the AC-phase magnetic flux φac influences the A-phase voltage Va of the A-phase winding Wa, the B-phase voltage Vb of the B-phase winding Wb and the C-phase voltage Vc of the C-phase winding Wc. The same relationship applies to the BA-phase magnetic flux φba shown by reference F02 and the CB-phase magnetic flux φcb shown by reference F03. Thus, a complicated mutual interlinkage relationship is established with the phase windings. Three-phase three-line mutual inductance configuration is provided.

Figure 12:
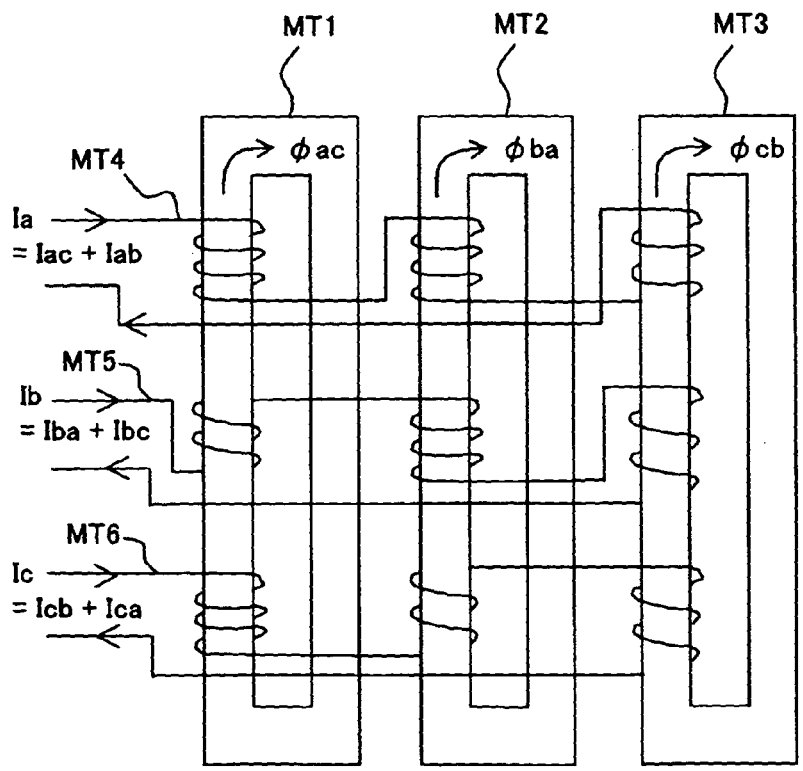
FIG. 12 is a view explaining electromagnetic actions of the motor shown in FIG. 1.

FIG. 12 shows an electromagnetic model of a full-pitch winding SRM, which corresponds to the electromagnetic model of a concentrated winding SRM shown in FIG. 11.

Reference MT1 shows an AC-phase magnetic circuit which is based on a magnetic closed circuit composed of the AC-phase stator poles A01 and A04, the back yoke of the stator, and the rotor salient poles opposed to the AC-phase stator poles. The magnetic flux F01 of FIG. 1 is the AC-phase magnetic flux φac of FIG. 12.

Reference MT2 shows a BA-phase magnetic circuit which is based on a magnetic closed circuit composed of the BA-phase stator poles A03 and A06, the back yoke of the stator, and the rotor salient poles opposed to the BA-phase stator poles. The magnetic flux F02 of FIG. 1 is the BA-phase magnetic flux φba of FIG. 12.

Reference MT3 shows a CB-phase magnetic circuit which is based on a magnetic closed circuit composed of the CB-phase stator poles A05 and A02, the back yoke of the stator, and the rotor salient poles opposed to the CB-phase stator poles. The magnetic flux F03 of FIG. 1 is the CB-phase magnetic flux φcb of FIG. 12.

Reference MT4 shows the A-phase winding corresponding to the A-phase full-pitch winding Wa that includes the windings A0D and A0G of FIG. 1. Reference MT5 shows the B-phase winding corresponding to the B-phase full-pitch winding Wb that includes the windings A0F and A0J of FIG. 1. Reference MT6 shows the C-phase winding corresponding to the C-phase full-pitch winding Wc that includes the windings A0H and A0E of FIG. 1. The winding direction is different between the individual phase windings.

As shown in FIG. 12, three phase windings are wound about the magnetic circuits MT1, MT2 and MT3. In this configuration, the currents Ia, Ib and Ic of the three windings influence the magnetic fluxes φac, φbc and φcb. Three mutual inductances of the three windings are combined. To the contrary, three magnetic fluxes φac, φbc and φcb interlink the respective three windings to influence the voltages of the three windings. For example, the voltage (Nwxdφpac/dt) generated by the AC magnetic flux φac and having the same magnitude is generated in the three windings, although the negative/positive sign is different.

The description referring to FIG. 12 has been given, rendering the magnetic flux leakage and the winding resistance as being zero, or neglecting them. Further, in FIG. 1, the magnetic flux components directed from the stator pole A06 to the stator pole A01 may be treated and expressed, separating into the AC-phase magnetic flux φac shown by reference F01 and the BA-phase magnetic flux φba shown by reference F02.

It is well understood from FIG. 12, which shows an electromagnetic model of a full-pitch winding SRM, that the mutual relationship between the phases is complicated compared to the electromagnetic model of a concentrated winding SRM shown in FIG. 11. These motors, which may seem to be analogous at first glance, are found to have absolutely different electromagnetic characteristics. With the configuration as shown in FIG. 12, the three magnetic fluxes φac, φbc and φcb can be freely controlled by the three currents Ia, Ib and Ic. In addition, when the three currents Ia, Ib and Ic can be freely controlled in light of the convenience of the control circuit and the power supply voltage of the three windings, a motor system can be realized, taking advantages of the features of the motor shown in FIG. 1.

The second problem of the full-pitch winding SRMs lies in the technical method of treating the characteristics of the magnetically non-linear region of soft-magnetic materials as a voltage equation, and the mathematization of the characteristics of the full-pitch winding SRMs.

Figure 14:
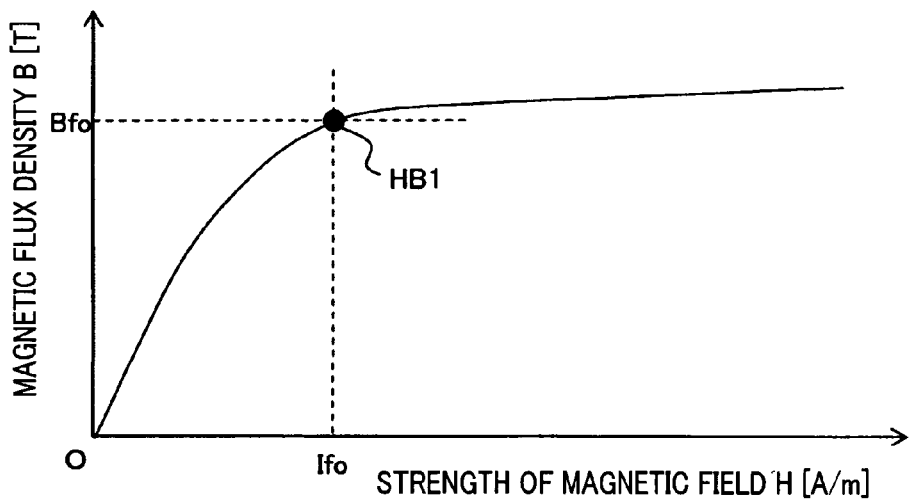
FIG. 14 is a graph showing a magnetic characteristic of a soft magnetic member.

FIG. 14 shows an example of the characteristics of a soft-magnetic material. The horizontal axis represents magnetic field magnitude and the vertical axis represents magnetic flux density. An operating point HB1 acquired from the magnetic field magnitude H=Ifo and the magnetic flux density Bfo is referred to as magnetic saturation. In magnetically designing transformers, for example, the magnetic saturation is set to about 70-80%. However, as reduction is sought in the size, weight and cost, the magnetic design is often provided based on a magnetic saturation exceeding the point HB1. In particular, reluctance motors generate power based on the difference in magnetic resistances, and thus very often rely on the use of the magnetic saturation region. However, if the motor is small, no magnetic saturation is achieved even when a maximum current is supplied.

As mentioned above, it is unreasonable to discuss motor characteristics on the basis of the use of an inductance L that is the proportional constant of current and magnetic flux or a mutual inductance M, in the characteristic formula of a motor which is configured to operate in the magnetic saturation region of the soft-magnetic material. Discussing motor characteristics in this way is tricky when expressing the case where two or more windings are interlinked with magnetic flux. It is difficult to grasp the characteristics of a motor from the characteristic formula which uses the non-linear inductance L or the mutual inductance M. Further, in planning an improvement, it is difficult to make its adequacy evaluation.

The third problem of the full-pitch winding SRMs lies in the restrictions on the control circuit practically used for current, under the condition where the voltages of the windings are mutually influenced due to the mutual inductance. For example, a restrictive relationship is established, in which, when current is reduced in one winding, current cannot be increased in the windings of other phases. This requires improvement of motors, improvement of power converters, or improvement of the current control algorithm.

The fourth problem of the full-pitch winding SRMs lies in the magnetic flux leakage and the magnetic saturation caused in some parts of the peripheries of the phase windings. In lots of motor usages, peak torque, which is several times larger than the continuous output torque, is very often needed.

Figure 15:
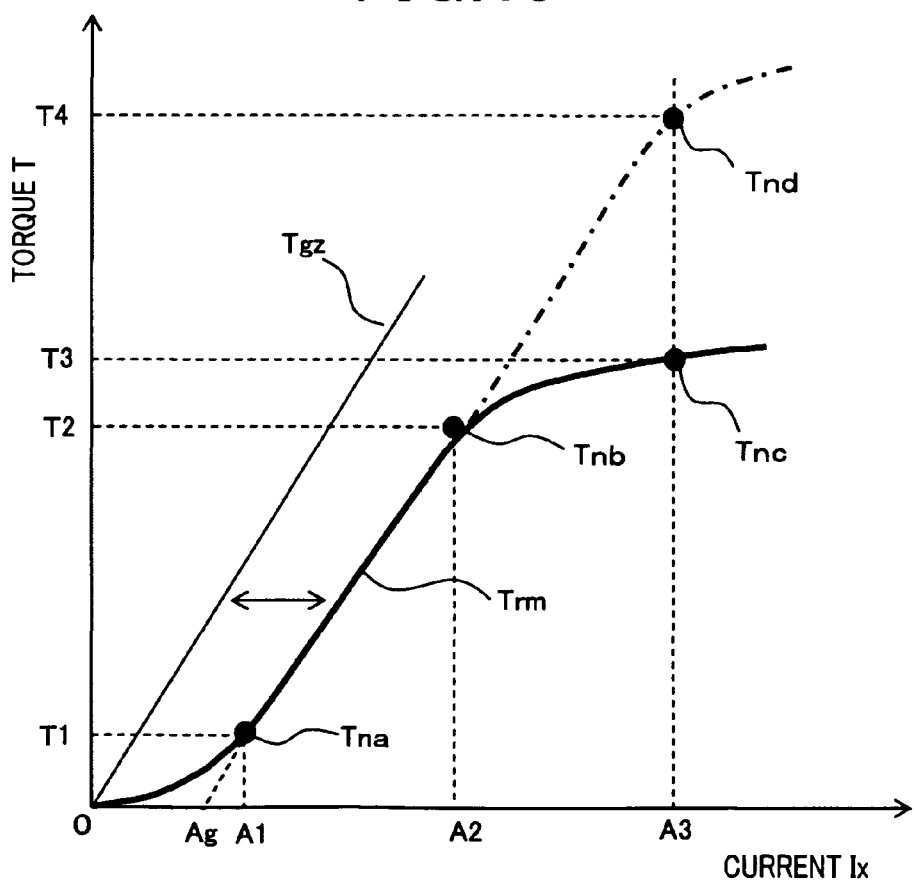
FIG. 15 is a graph exemplifying a relationship between a current and torque of the motor according to the present invention.

FIG. 15 shows an example of the features of motor torque. The horizontal axis represents Current Ix of the motor and the vertical axis represents torque T. A feature Trm indicated by a solid line is an example of the features of a motor. The features show that the torque T substantially increases in proportion to the increase of the current Ix, in a range of from a region where the current Ix is small to an operating point Tnb at Ix=A2. Torque increase is small with respect to the increase of the current Ix in a range of from the operating point Tnb to an operating point Tnc, achieving what is called torque saturation. In the features, torque T2 at the operating point Tnb is the peak torque of this motor. If peak torque can be increased, the size and cost of the motor can be reduced, creating important features of the motor.

When current is passed through the windings in the slots of the full-pitch winding SRM shown in FIG. 1, magnetic flux is leaked in the vicinities of the openings of the slots. For example, when the C-phase current Ic is passed through the C-phase winding as shown by A0H, magnetic flux φyy is induced in the vicinity of the opening of the slot A0B, covering from near the tip end of the stator pole A04 to the stator pole A05, in addition to the AC-phase magnetic flux φac as shown by F01, for example. The magnetic flux φyy corresponds to leaked magnetic flux which accelerates the stator poles A04 and A05 and lowers the peak torque T2 shown in FIG. 15. According to the present inventors' fining element analysis and evaluation of an experimental motor, as well, magnetic flux leakage has been one of the problems of the full-pitch winding SRMs.

The fifth problem of the full-pitch winding SRMs lies in the resistance of the phase windings. The winding cross-sectional area Sff in a slot of a full-pitch winding SRM can be made larger by a factor of two than the winding cross-sectional area Sss in a slot of a concentrated winding SRM, and thus the winding resistance of the former can be reduced to about ½. Accordingly, the loss due to Joule heat is reduced to thereby reduce the size and the cost of the motor. However, this increases the length of the coil end portions, raising a problem of increasing the size of the motor in the direction of the rotor shaft, as well as a problem of increasing the winding resistance due to the increase of the length of the windings located outside the slots.

The sixth problem of the full-pitch winding SRMs lies in the air gap length between the stator poles and the rotor salient poles, and the load caused by the excitation current that induces magnetic flux. As shown in FIG. 15, torque is small in a small-current region, such as the region where the current Ix is not more than A1. As the air gap length is increased, the values of A1 and Ag tend to become larger. When the air gap length is decreased, the mechanical precision is required to be enhanced, creating another problem of increasing the outer diameter due to the expansion which is ascribed to the centrifugal force of the rotor. It should be appreciated that a feature Tgz shown in FIG. 15 represents a theoretical ideal curve of torque in the case where there is no air gap between the stator poles and the rotor salient poles. In particular, torque is small in the small-current region and thus, over the range up to near an operating point Tna, the motor exhibits a feature that the torque is a square of the current. The reference Ag shows a difference in the current between the theoretical ideal curve and the torque feature Trm.

Various problems of the full-pitch winding SRMs have been discussed so far. As discussed, the full-pitch winding SRMs have an aspect different from the motors of the conventional art. The motor of the present invention is suggested in order to solve the various problems. To this end, the motor of the present invention is provided as a motor system having a configuration in which close correlation is established between the structure of the motor, the circuit that supplies current for the motor, and the algorithm of controlling the voltage and current.

Hereinafter is discussed a method of solving the problems of the full-pitch winding SRMs. First, the problem of interaction between the phase windings and the magnetic flux shown in FIGS. 1 and 12 will be discussed. In realizing the method of control, current is expressed by being separated into a plurality of incoherent current components that cause no correlated interaction. When the plurality of incoherent current components are composed, i.e. when the current components are reversely converted, the A-phase current Ia, B-phase current Ib and C-phase current Ic are obtained. Further, a method of forward conversion of the current components will be clarified. A voltage equation for the plurality of incoherent current components will be clarified. The features of the current and voltage in each phase will be clarified as a general formula. The torque and power of the motor is clarified. On the understanding that inductance is magnetically non-linear, the expression of non-linear inductance L or non-linear mutual inductance M will not be used. Instead, a magnetic flux φ or the number of interlinkage magnetic fluxes ψ will be used to clarify the features of a magnetically non-linear region. These days, the finite element method or the like is very often used for analyzing the features of a motor. Using such a method, magnetic flux data in each phase current value can be easily obtained at each rotational position of the rotor.

Accordingly, it is comparatively easy to provide a table of magnetic flux data in the combinations of various variables of a motor. As a result, expressions and controls faithful to the physical law are realized, thereby obtaining expressions and controls having a less number of errors.

Figure 16:
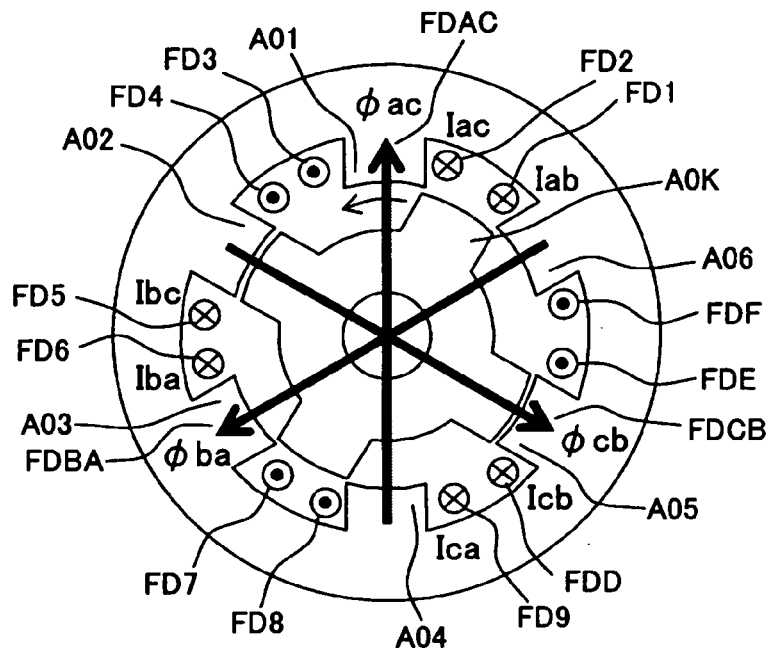
FIG. 16 is a sectional view showing the current components at respective stator poles and the configurations of the stator poles.

FIG. 16 shows an example of specific incoherent current components. References FD2 and FD8 show a full-pitch winding current component Iac, and references FD9 and FD3 show a full-pitch winding current component Ica. The components Iac and Ica have the same current value. References FD6 and FDF show a full-pitch winding current component Iba, and references FD1 and FD7 show a full-pitch winding current component Iab. The components Iba and Lab have the same current value. References FDD and FD4 show a full-pitch winding current component Icb, and references FD5 and FDE show a full-pitch winding current component Ibc. The components Icb and Ibc have the same current value.

$$Iac = Ica \quad (1)$$

$$Iba = Iab \quad (2)$$

$$Icb = Ibc \quad (3)$$

The A-phase current Ia, the B-phase current Ib and the C-phase current Ic each equal to a sum of currents of the slots.

Thus, the following formula of reverse conversion of the current components is established:

$$Ia = Iac + Iab \quad (4)$$

$$Ib = Iba + Ibc \quad (5)$$

$$Ic = Icb + Ica \quad (6)$$

Referring to FIG. 16 and Formula (1), the electromagnetic features derived from Formula (6) are described. Having the same current value, the current components Iac and Ica generates, according to Ampere's law, a magnetomotive force HACac that excites the AC-phase magnetic flux $\phi ac$ shown by FDAC which is directed from the stator poles A04 to A01.

$$HACac = Nw \times (Iac + Ica) = 2 \times Nw \times Iac \quad (7)$$

On the other hand, the current components Iac and Ica excite the BA-phase magnetic flux $\phi ba$ shown by FDBA to generate a magnetomotive force HBAac. The current interlinking the path of the magnetomotive force HBAac becomes zero according to Ampere's law. Further, the current components Iac and Ica excite the CB-phase magnetic flux $\phi cb$ shown by FDCB to generate a magnetomotive force HCBac. The current interlinking the path of the magnetomotive force HCBac also becomes zero according to Ampere's law.

$$HBAac = Nw \times (Iac - Ica) = 0 \quad (8)$$

$$HCBac = Nw \times (Ica - Iac) = 0 \quad (9)$$

Accordingly, in a feature, the current components Iac and Ica excite the AC-phase magnetic flux $\phi ac$, but does not electromagnetically influence other BA-phase magnetic flux $\phi ba$ and the CB-phase magnetic flux $\phi cb$. FIG. 16 shows the magnetic fluxes $\phi ac$, $\phi ba$ and $\phi cb$, as well as the current components Iac, Iab, Iba, Ibc, Icb and Ica in an easy-to-understand manner.

Having the same current value, the current components Iba and Iab also generate, according to Ampere's law, a magnetomotive force HBAba that excites the BA-phase magnetic flux $\phi ba$ shown by FDBA which is directed from the stator poles A06 to A03. The current components Iba and Iab excite the AC-phase magnetic flux $\phi ac$ and the CB-phase magnetic flux $\phi cb$ to generate a magnetomotive force HACba and a magnetomotive force HCBba, respectively. The current interlinking the paths of the magnetomotive forces HACba and HCBba becomes zero according to Ampere's law.

$$HBAba = Nw \times (Iba + Iab) = 2 \times Nw \times Iba \quad (10)$$

$$HACba = Nw \times (Iab - Iba) = 0 \quad (11)$$

$$HCBba = Nw \times (Iba \times Iab) = 0 \quad (12)$$

Having the same current value, the current components Icb and Ibc also generate, according to Ampere's law, a magnetomotive force HCBcb that excites the BA-phase magnetic flux $\phi cb$ shown by FDCB which is directed from the stator poles A02 to A05. The current components Icb and Ibc excite the AC-phase magnetic flux $\phi ac$ and the BA-phase magnetic flux $\phi ba$ to generate a magnetomotive force HACba and a magnetomotive force HBAcb, respectively. The current interlinking the paths of the magnetomotive forces HACba and HBAcb becomes zero according to Ampere's law.

$$HCBcb = Nw \times (Icb + Ibc) = 2 \times Nw \times Icb \quad (13)$$

$$HACcb = Nw \times (Icb - Ibc) = 0 \quad (14)$$

$$HBAcb = Nw \times (Ibc - Icb) = 0 \quad (15)$$

Summing up Formulas (7), (11) and (14), the magnetomotive force that excites the magnetic flux $\phi ac$ is as follows:

$$HACac + HACba + HACcb = 2 \times Nw \times Iac \quad (16)$$

Similarly, summing up Formulas (8), (10) and (14), the magnetomotive force that excites the magnetic flux $\phi ac$ is as follows:

$$HBAac + HBAba + HBAcb = 2 \times Nw \times Iba \quad (17)$$

Similarly, summing up Formulas (9), (12) and (13), the magnetomotive force that excites the magnetic flux $\phi cb$ is as follows:

$$HCBac + HCBba + HCBcb = 2 \times Nw \times Icb \quad (18)$$

Thus, it will be understood from Formulas (16), (17) and (18) that the magnetic fluxes $\phi ac$, $\phi ba$ and $\phi cb$ can be independently controlled by the current components Iac, Iba and Icb, respectively. This also means that the complicated interaction of the phase currents Ia, Ib and Ic shown in FIG. 12 can be resolved. Further, in FIG. 12, the magnetic fluxes $\phi ac$, $\phi ba$ and $\phi cb$ can be concurrently and freely controlled. Accordingly, the magnitude of the magnetic fluxes F01, F02 and F03 of FIG. 2 can be concurrently and freely controlled. Thus, the motor can be driven based on the difference between the torque in the counterclockwise direction CCW and the torque in the clockwise direction CW. In this way, the three phases can be easily controlled not only in an alternate manner but also in a concurrent and continuous manner.

The phase currents Ia, Ib and Ic can be converted to the current components Iac, Iba and Icb, respectively, using the following method. Specifically, as the method, Formulas (1) to (3) and reverse conversion formulas of Formulas (4) to (6) may be used, followed by using the following forward conversion formulas for the phase currents:

$$Iac = (Ia - Ib + Ic)/2 \quad (19)$$

$$Iba = (Ia + Ib - Ic)/2 \quad (20)$$

$$Icb = (-Ia + Ib + Ic)/2 \quad (21)$$

Accordingly, mutual conversion from the phase currents Ia, Ib and Ic to the current components Iac, Iba and Icb, or vice versa, can be easily performed using the reverse conversion formulas of Formulas (4), (5) and (6) and the forward conversion formulas of Formulas (19), (20) and (21).

Figure 13:
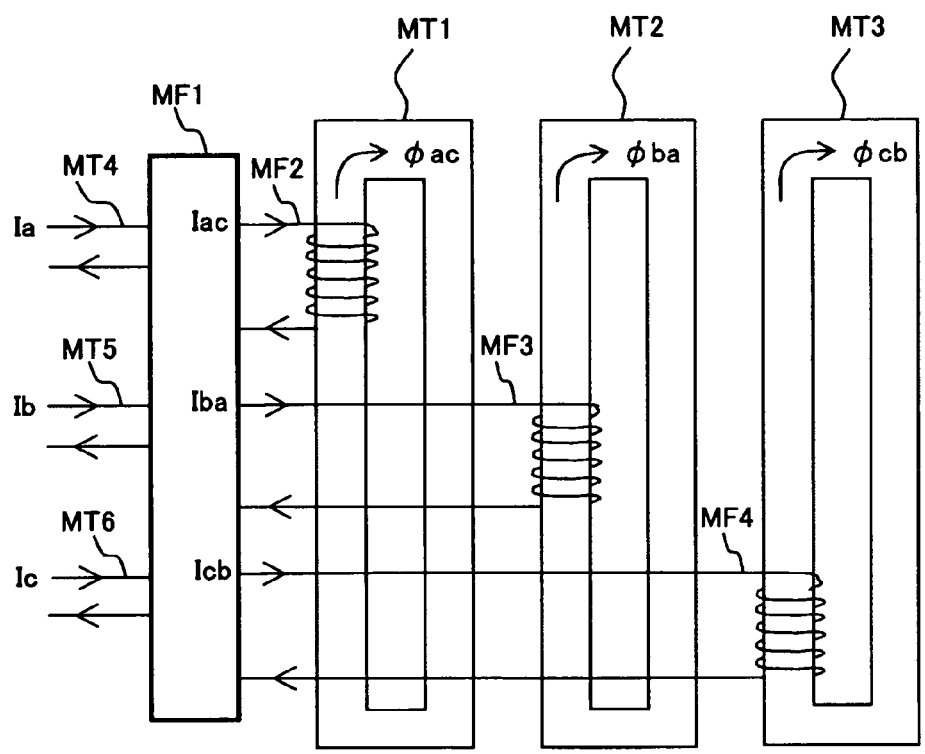
FIG. 13 is a view explaining electromagnetic actions for a forward conversion between phase currents and currents components.

The relationship of FIG. 1 with FIG. 16, the reverse conversion formulas and the forward conversion formulas may be expressed by replacing the complicated electromagnetic relationship shown in FIG. 12 with a simplified relationship shown in FIG. 13. A reference MF1 shows a current coordinate converter that converts current coordinate. The current coordinate converter has specific functions of performing reverse conversion for the current values shown by Formulas (4), (5) and (6) and performing forward conversion for the current values shown by Formulas (19), (20) and (21). A reference MF2 shows a winding that is a serial connection of virtual windings Wac and Wca for supplying the current Iac. A reference MF3 shows a winding that is a serial connection of virtual windings Wba and Wab for supplying the current Iba. A reference MF4 shows a winding that is a serial connection of virtual windings Wcb and Wbc for supplying the current Icb. The magnetic fluxes $\phi ac$, $\phi ba$ and $\phi cb$ of the individual phases can be concurrently and freely controlled. The current components Iac, Iba and Icb are calculated, being defined as current values that enable the configuration shown in FIG. 13.

Figure 87:
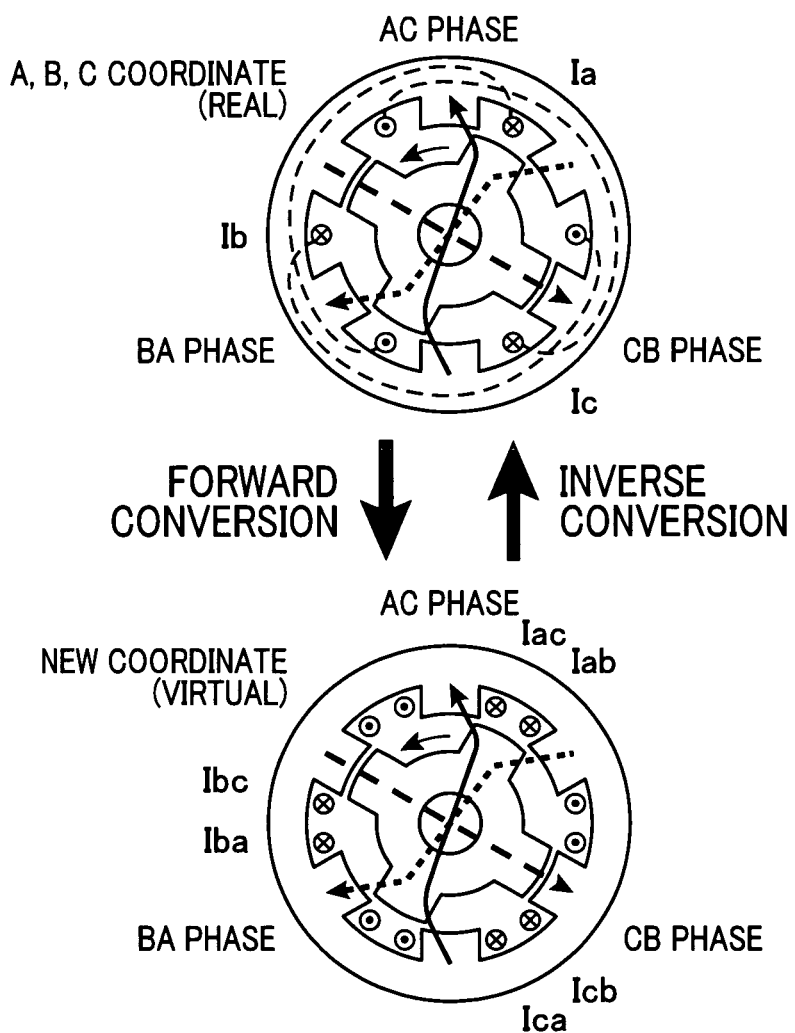
FIG. 87 is a view explaining, from a view point of winding structure, a forward conversion and an inverse conversion.

FIG. 87 illustrates the forward conversion and the reverse conversion from the viewpoint of winding structure.

Hereinafter is described the current components Iac, Ica, Iba, Iab, Icb and Ibc, and voltages Vac, Vca, Vba, Vab, Vcb and Vbc when windings for passing these respective currents are provided. Assuming that the winding Wac for passing the current component Iac and the winding Wca for passing the current component Ica are present, the voltages are referred to as voltages Vac and Vca, respectively. The voltage Vac is obtained by providing full-pitch winding to the windings FD2 and FD8 in FIG. 16. The voltage Vac interlinks the magnetic fluxes φac, φba and φcb and provides complexity. The voltage Vca is obtained by providing full-pitch winding to the windings FD9 and FD3 in FIG. 16. The voltage Vca interlinks the magnetic fluxes φac, φba and φcb and also provides complicated values. However, when these two full-pitch windings Wac and Wca are connected in series, the magnetic fluxes φba and φcb are cancelled to thereby eliminate the interlinkage.

When these two full-pitch windings are connected in series and the voltage across the serial connection is V2ac, the voltage V2ac interlinking the magnetic flux φac is expressed by the following formula:

$$V2ac = Vac + Vca \quad (22)$$
$$= 2 \times (Nw \times d\phi ac/dt + Iac \times Rac)$$

where a reference Rac shows the resistance of the virtual full-pitch windings.

The similar relationship applies to the BA-phase and CB-phase and thus the following formulas are obtained:

$$V2ba = Vba + Vab \quad (23)$$
$$= 2 \times (Nw \times d\phi ba/dt + Iba \times Rba)$$

$$V2cb = Vcb + Vbc \quad (24)$$
$$= 2 \times (Nw \times d\phi cb/dt + Icb \times Rcb)$$

where references Rba and Rcb show the resistances of the respective virtual full-pitch windings.

An input power Pin is a product sum of three-phase voltage and current and is expressed by the following formula:

$$Pin = V2ac \times Iac + V2ba \times Iba + V2cb \times Icb \quad (25)$$
$$= 2 \times (Nw \times Iac \times d\phi ac/dt + Iac2 \times Rac)$$
$$+ 2 \times (Nw \times Iba \times d\phi ba/dt + Iba2 \times Rba) \quad (26)$$
$$+ 2 \times (Nw \times Icb \times d\phi cb/dt + Icb2 \times Rcb)$$

The magnetic fluxes φac, φba and φcb will be shown later.

The torque T can be obtained by dividing the power of the motor with a rotational angular speed ωr and thus is expressed by the following formula:

$$T = Pin/\omega r \quad (27)$$

However, winding resistance, iron loss and mechanical loss are neglected here. The magnetic energy in the motor is also neglected, assuming that each winding current passes over a sufficiently wide range. To be precise, a relationship as expressed by the following formula is established:

$$[\text{Input power Pin}] = \quad (28)$$
$$T \times \omega r + [\text{Time variation of magnetic energy inside motor}] +$$
$$[\text{Loss due to Joule heat}] + [\text{Iron loss}] + [\text{Other mechanical loss}]$$

Here, a qualitative relationship is shown, and thus such errors ascribed to magnetic flux leakage in a gap or non-linearity of a soft-magnetic material may occur. For example, as will be described later, more precise control may be realized by obtaining, as database, magnetic flux data or the like in various current conditions which are easily available through the analysis of the motor using the finite element method or the like, and by applying the magnetic flux data to individual formulas.

Hereinafter, specific values are calculated for the AC-phase magnetic flux φac, an inductance Lac of the virtual winding that is a serial connection of the two AC-phase full-pitch windings Wac and Wca, a voltage V2ac of the virtual winding, an AC-phase power Pac and an AC-phase torque Tac.

A motor model is obtained by converting the motor shown in FIG. 1 into the current components shown in FIG. 16. Motor parameters include an air gap length Lgap between stator poles and the opposed rotor salient poles, a length tc of the stator and the rotor in the direction of the rotor shaft, a rotor radius R, and a space permeability μo=4π×10$^{-7}$. It is assumed that of the soft-magnetic material portions, such as the back yoke of the motor, stator poles and rotor salient poles, is sufficiently high, and that the magnetic resistance is zero.

First, under the current magnitude conditions that the current values of the phases are small and that the magnetic flux densities of the soft-magnetic material are comparatively small, the individual values are calculated as to an operation region where the soft-magnetic material is substantially magnetically linear. A magnitude Hac of the magnetic field of the AC-phase air gap portion, a magnetic flux density Bac and the magnetic flux φac are calculated by the following formulas:

$$2 \times Lgap \times Hac = Nw \times (Iac + Ica) = 2 \times Nw \times Iac \quad (29)$$

$$Bac = \nu o \times Hac = \mu o \times Nw \times Iac/Lgap \quad (30)$$

$$\phi ac = Bac \times Sac = \mu o \times Nw \times tc \times R/Lgap \times Iac \times (\theta r - \text{off}) \quad (31)$$

The reference Sac shows an area in the portion where the AC-phase stator poles face the rotor salient poles. The reference (θr−θoff) shows a circumferential range of rotational angle, in the portion where the AC-phase stator poles face the rotor salient poles. A reference θoff shows an offset of the rotational position specific to the AC-phase, the offset being θoff=15 degrees in FIG. 1. Formula (31) is established when (θr−θoff) ranges from 0 degree to 30 degrees. In other words, when θr ranges from 15 degrees to 45 degrees, torque in the counterclockwise direction CCW can be generated.

Then, the number of AC-phase interlinkage magnetic fluxes ψac is calculating using Formula (31) in order to calculate the inductance Lac of the virtual winding that is the serial connection of the two AC-phase full-pitch windings Wac and Wca.

$$Lac \times Iac = 2 \times Nw \times \phi ac = \varphi ac \quad (32)$$

$$Lac = 2 \times Nw \times \phi ac/Iac \quad (33)$$

$$= 2 \times \mu o \times Nw^2 \times tc \times R/Lgap \times (\theta t - \theta \text{off}) \quad (34)$$

The inductance Lac drastically changes relying on the rotational position θr of the rotor. Thus, it is desirable that the parameters of current control are appropriately varied according to the rotational position θr. The inductance Lac renders the current Iac to be small and thus the formula is established in a region where the soft-magnetic material does not magnetically saturate.

Then, a serial-connection voltage V2ac=Vac+Vca of the windings Wac and Wca of the AC-phase stator poles is expressed by the following formulas using Formula (31):

$$V2ac = 2 \times Nw \times d\phi ac/dt \quad (35)$$

$$= 2 \times Nw \times d\{\mu o \times Nw \times tc \times R/Lgap \times Iac \times (\theta t - \theta \text{off})\}/dt \quad (36)$$

$$= 2 \times \mu o \times Nw^2 \times R \times tc/Lgap \times d\{Iac \times (\theta r - \theta \text{off})\}/dt \quad (37)$$

$$= 2 \times \mu o \times Nw^2 \times R \times tc/Lgap \times \quad (38)$$
$$\{(dIac/dt \times (\theta r - \theta \text{off})) + Iac \times d(\theta r - \theta \text{off})/dt\}$$

In Formula (38), if the first term of the differential becomes zero during the period when the current component Iac of the AC-phase stator poles is constant, the voltage Vac is simplified and proportional to the rotational angular speed ωr as expressed by the following formulas. Voltage components are reduced.

$$V2ac = 2 \times \mu o \times Nw^2 \times R \times tc/Lgap \times Iac \times d(\theta t - \theta \text{off})/dt \quad (39)$$

$$= 2 \times \mu o \times Nw^2 \times R \times tc/Lgap \times Iac \times \omega r \quad (40)$$

Then, the AC-phase power input Pac and the AC-phase torque Tac are calculated.

The following formulas are established in a region where the soft-magnetic material is magnetically linear and the rotational position θr falls in a rage of from 15 degrees to 45 degrees.

$$Pac = V2ac \times Iac \quad (41)$$
$$= 2 \times \mu o \times Nw^2 \times R \times tc/Lgap \times$$
$$Iac \left\{ \begin{array}{l} (dIac/dt \times (\theta r - \theta \text{off})) + \\ Iac \times d(\theta r - \theta \text{off})/dt \end{array} \right\}$$

$$Tac = Pac/\omega r \quad (42)$$
$$= 2 \times \mu o \times Nw^2 \times R \times tc/Lgap \times$$
$$Iac \left\{ \begin{array}{l} (dIac/dt \times (\theta r - \theta \text{off})) + \\ Iac \times \times d(\theta r - \theta \text{off})/dt \end{array} \right\}/\omega r$$

Here, losses or the like are neglected. To be precise, the relationship as expressed by Formula (28) is established.

Thus, specific values have been calculated for the magnetic flux density Bac, the magnetic flux φac, the voltage V2ac of the virtual winding, the power Pac and the torque Tac in a range of the AC-phase θr of from 15 degrees to 45 degrees. In this range, the AC-phase stator poles are able to generate torque in the counterclockwise direction CCW.

Hereinafter, similar to the AC-phase, for the BA-phase as well, values are calculated for a magnetic field magnitude Hba, a magnetic flux density Bba, a magnetic flux φba, an inductance Lba, a virtual winding voltage V2ba, a power Pba and a torque Tba. A motor model based on the motor shown in FIGS. 1 and 16 is used. An offset specific to the BA-phase is θoff=45 degrees. The values are calculated with respect to a range of the rotational position θr of the rotor of from 45 degrees to 75 degrees. The BA-phase stator poles are able to generate torque in the counterclockwise direction CCW in this rotational range. The values are calculated for an operation region where, as the current magnitude conditions, the current values are small and the soft-magnetic material is substantially magnetically linear.

$$2 \times Lgap \times Hba = Nw \times (Iba + Iab) = 2 \times Nw \times Iba \quad (48)$$

$$Bba = \mu o \times Nw \times Iba/Lgap \quad (49)$$

$$\phi ba = \mu o \times Nw \times tc \times R/Lgap \times Iba \times (\theta r - \theta \text{off}) \quad (50)$$

$$Lba = 2 \times \mu o \times Nw^2 \times tc \times R/Lgap \times (\theta r - \theta \text{off}) \quad (51)$$

$$V2ba = 2 \times \mu o \times Nw^2 \times R \times tc/Lgap \times \quad (52)$$
$$\{(dIba/dt \times (\theta r - \theta \text{off})) + Iba \times d(\theta r - \theta \text{off})/dt\}$$

$$Pba = 2 \times \mu o \times Nw^2 \times R \times tc/Lgap \times Iba \times \quad (53)$$
$$\{(dIba/dt \times (\theta r - \theta \text{off})) + Iba \times d(\theta r - \theta \text{off})/dt\}$$

$$Tba = 2 \times \mu o \times Nw^2 \times R \times tc/Lgap \times Iba \times \quad (54)$$
$$\{(dIba/dt \times (\theta r - \theta \text{off})) + Iba \times d(\theta r - \theta \text{off})/dt\}/\omega r$$

Then, similarly, for the CB-phase, values are calculated for a magnetic field magnitude Hcb, a magnetic flux density Bcb, a magnetic flux φcb, an inductance Lcb, a virtual winding voltage V2cb, a power Pcb and a torque Tcb. A motor model based on the motor shown in FIGS. 1 and 16 is used. An offset specific to the CB-phase is θoff=75 degrees. The values are calculated with respect to a range of the rotational position θr of the rotor of from 75 degrees to 105 degrees. The CB-phase stator poles are able to generate torque in the counterclockwise direction CCW in this rotational range. The values are calculated for an operation region where, as the current magnitude conditions, the current values are small and the soft-magnetic material is substantially magnetically linear.

$$2 \times Lgap \times Hcb = Nw \times (Icb + Ibc) = 2 \times Nw \times Icb \quad (55)$$

$$Bcb = \mu o \times Nw \times Icb/Lgap \quad (56)$$

$$\phi cb = \mu o \times Nw \times tc \times R/Lgap \times Icb \times (\theta r - \theta \text{off}) \quad (57)$$

$$Lcb = 2 \times \mu o \times Nw^2 \times tc \times R/Lgap \times (\theta r - \theta \text{off}) \quad (58)$$

$$V2cb = 2 \times \mu o \times Nw^2 \times R \times tc/Lgap \times \quad (59)$$
$$\{(dIcb/dt \times (\theta r - \theta \text{off})) + Icb \times d(\theta r - \theta \text{off})/dt\}$$

$$Pcb = 2 \times \mu o \times Nw^2 \times R \times tc/Lgap \times Icb \times \quad (60)$$
$$\{(dIcb/dt \times (\theta t - \theta \text{off})) + Icb \times d(\theta r - \theta \text{off})/dt\}$$

$$Tcb = 2 \times \mu o \times Nw^2 \times R \times tc/Lgap \times Icb \times \quad (61)$$
$$\{(dIcb/dt \times (\theta r - \theta \text{off})) + Icb \times d(\theta r - \theta \text{off})/dt\}/\omega r$$

Then, features are shown regarding the AC-phase of a region of the rotational position θr of the rotor, where torque in the clockwise direction CW is generated. Values are calculated for a magnetic field magnitude Hac, a magnetic flux density Bac, a magnetic flux φac, an inductance Lac, a virtual winding voltage V2ac, a power Pac and a torque Tac. A motor model based on the motor shown in FIGS. 1 and 16 is used. An offset specific to the AC-phase is θoff=15 degrees. The values are calculated with respect to a range of the rotational position θr of the rotor of from 45 degrees to 75 degrees. The AC-phase stator poles are able to generate torque in the clockwise direction CW in this rotational range. The values are calculated for an operation region where, as the current magnitude conditions, the current values are small and the soft-magnetic material is substantially magnetically linear.

$$2 \times Lgap \times Hac - Nw \times (Iac + Ica) = 2 \times Nw \times Iac \quad (62)$$

$$Bac = \mu o \times Nw \times Iac / Lgap \quad (63)$$

$$\phi ac = \mu o \times Nw \times tc \times R / Lgap \times Iac \times (90° - \theta r - \theta \text{off}) \quad (64)$$

$$Lac = 2 \times \mu o \times Nw^2 \times tc \times R / Lgap \times (90° - \theta t - \theta \text{off}) \quad (65)$$

$$V2ac = 2 \times \mu o \times Nw^2 \times R \times tc / Lgap \times \quad (66)$$
$$\{(dIac/dt \times (90° - \theta r - \theta \text{off}) + Iac \times d(90° - \theta r - \theta \text{off})/dt\}$$

$$Pac = 2 \times \mu o \times Nw^2 \times R \times tc / Lgap \times Iac \times \quad (67)$$
$$\{(dIac/dt \times (90° - \theta r - \theta \text{off}) + Iac \times d(90° - \theta r - \theta \text{off})/dt\}$$

$$Tac = 2 \times \mu o \times Nw^2 \times R \times tc / Lgap \times Iac \times \quad (68)$$
$$\{(dIac/dt \times (90° - \theta r - \theta \text{off}) + Iac \times d(90° - \theta r - \theta \text{off})/dt\}/\omega r$$

Then, features are shown regarding the BA-phase of a region of the rotational position θr of the rotor, where torque in the clockwise direction CW is generated. Values are calculated for a magnetic field magnitude Hac, a magnetic flux density Bba, a magnetic flux φba, an inductance Lba, a virtual winding voltage V2ba, a power Pab and a torque Tba. A motor model based on the motor shown in FIGS. 1 and 16 is used. An offset specific to the BA-phase is θoff=45 degrees. The values are calculated with respect to a range of the rotational position θr of the rotor of from 75 degrees to 105 degrees. The BA-phase stator poles are able to generate torque in the clockwise direction CW in this rotational range. The values are calculated for an operation region where, as the current magnitude conditions, the current values are small and the soft-magnetic material is substantially magnetically linear.

$$2 \times Lgap \times Hba = Nw \times (Iba + Iab) = 2 \times Nw \times Iba \quad (69)$$

$$Bba = \mu o \times NwIba / Lgap \quad (70)$$

$$\phi ba = \mu o \times Nw \times tc \times R / Lgap \times Iba \times (90° - \theta r - \theta \text{off}) \quad (71)$$

$$Lba = 2 \times \mu o \times Nw^2 \times tc \times R / Lgap \times (90° - \theta r - \theta \text{off}) \quad (72)$$

$$V2ba = 2 \times \mu o \times Nw^2 \times R \times tc / Lgap \times \quad (73)$$
$$\{(dIba/dt \times (90° - \theta r - \theta \text{off}) + Iba \times d(90° - \theta r - \theta \text{off})/dt\}$$

$$Pba = 2 \times \mu o \times Nw^2 \times R \times tc / Lgap \times Iba \times \quad (74)$$
$$\{(dIba/dt \times (90° - \theta r - \theta \text{off}) + Iba \times d(90° - \theta r - \theta \text{off})/dt\}$$

$$Tba = 2 \times \mu o \times Nw^2 \times R \times tc / Lgap \times Iba \times \quad (75)$$
$$\{(dIba/dt \times (90° - \theta r - \theta \text{off}) + Iba \times d(90° - \theta r - \theta \text{off})/dt\}/\omega r$$

Then, features are shown regarding the CB-phase of a region of the rotational position θr of the rotor, where torque in the clockwise direction CW is generated. Values are calculated for a magnetic field magnitude Hcb, a magnetic flux density Bcb, a magnetic flux φcb, an inductance Lcb, a virtual winding voltage V2cb, a power Pcb and a torque Tcb. A motor model based on the motor shown in FIGS. 1 and 16 is used. An offset specific to the CB-phase is θoff=75 degrees. The values are calculated with respect to a range of the rotational position θr of the rotor of from 105 degrees to 135 degrees. The CB-phase stator poles are able to generate torque in the clockwise direction CW in this rotational range. The values are calculated for an operation region where, as the current magnitude conditions, the current values are small and the soft-magnetic material is substantially magnetically linear.

$$2 \times Lgap \times Hba = Nw \times (Icb + Ibc) = 2 \times Nw \times Icb \quad (76)$$

$$Bba = \mu o \times Nw \times Icb / Lgap \quad (77)$$

$$\phi cb = \mu o \times Nw \times tc \times R.Lgap \times Icb \times (90° - \theta r - \theta \text{off}) \quad (78)$$

$$Lcb = 2 \times \mu o \times Nw^2 \times tc \times R / Lgap \times (90° - \theta r - \theta \text{off}) \quad (79)$$

$$V2cb = 2 \times \mu o \times Nw^2 \times R \times tc / Lgap \times \quad (80)$$
$$\{(dIcb/dt \times (90° - \theta r - \theta \text{off}) + Icb \times d(90° - \theta r - \theta \text{off})/dt\}$$

$$Pcb = 2 \times \mu o \times Nw^2 \times R \times tc / Lgap \times Icb \times \quad (81)$$
$$\{(dIcb/dt \times (90° - \theta r - \theta \text{off}) + Icb \times d(90° - \theta r - \theta \text{off})/dt\}$$

$$Tcb = 2 \times \mu o \times Nw^2 \times R \times tc / Lgap \times Icb \times \quad (82)$$
$$\{(dIcb/dt \times (90° - \theta r - \theta \text{off}) + Icb \times d(90° - \theta r - \theta \text{off})/dt\}/\omega r$$

Then, values are calculated for an operation region where, as the current magnitude conditions, the individual phases have large current values, high magnetic flux density is exhibited to an extent of saturating each soft-magnetic material, and the soft-magnetic material is magnetically non-linear. For example, this corresponds to an operating point of the soft-magnetic material, in FIG. 14, which is positioned on the right side of HB1. However, magnetic saturation is caused only at the tip ends of the stator poles and the tip ends of the rotor salient poles. Accordingly, the relative permeability of the soft-magnetic material portions is sufficiently high such as in the back yoke, the magnetic path of the stator poles and the magnetic path of the rotor salient poles, and thus magnetic resistance is assumed to be zero. The values are calculated as approximations.

For the AC-phase, values are calculated for a magnetic flux density Bac, magnetic flux φac, average inductance Lac, virtual winding voltage V2ac, power Pac and torque Tac. A motor model based on the motor shown in FIGS. 1 and 16 is used. An offset specific to the AC-phase is θoff=15 degrees. The values are calculated with respect to a range of the rotational position θr of the rotor of from 15 degrees to 45 degrees. The AC-phase stator poles are able to generate torque in the clockwise direction CW in this rotational range.

When a maximum magnetic flux density of the soft-magnetic material is Bmax, the AC-phase magnetic flux φac is expressed by the following, formulas:

$$Bac = Bmax \quad (83)$$

$$\phi ac = Bac \times Sac = Bmax \times R \times (\theta r - \theta \text{off}) \times tc \quad (84)$$

The inductance Lac is expressed by the following formula:

$$Lac = Nw \times Bmax \times R \times (\theta r - \theta \text{off}) \times tc / Iac \quad (85)$$

However, the inductance Lac is an average inductance and thus (slight magnetic flux increase/slight current increase) is very close to zero. Accordingly, the inductance in a very small range of the operating point is zero.

A serial connection voltage V2ac=Vac+Vca of the virtual windings Wac and Wca of the AC-phase stator poles is expressed by the following formula:

$$V2ac = 2 \times Nw \times d\phi ac/dt \quad (86)$$
$$= 2 \times Nw \times d(B\max \times R \times (\theta r - \theta\text{off}) \times tc)/dt$$
$$= 2 \times Nw \times d(B\max \times R \times (\theta r - \theta\text{off}) \times tc)/d\theta r \times d\theta r/dt$$
$$= 2 \times Nw \times B\max \times R \times tc \times \omega r \quad (87)$$

When the current component Iac is supplied to the AC-phase stator poles, its input power Pin and the torque Tac are expressed by the following formulas:

$$Pin = V2ac \times Iac \quad (88)$$
$$Tac = Pin/\omega r \quad (89)$$
$$= V2ac \times Iac/\omega r$$
$$= 2 \times Nw \times B\max \times R \times tc \times Iac$$

Here, the winding resistance, iron loss, mechanical loss and the like are neglected.

In Formula (89), the current Iac is assumed to be large and thus the magnetic resistance between the stator poles and the rotor salient poles is neglected. However, as shown by the current value Ag in FIG. 15, the value cannot be neglected in a reluctance motor in particular. The reference Ag, as far as the current value Ag of FIG. 15 is concerned, corresponds to excitation current that excites the magnetic flux in the air gap portion. The value of the reference Ag, which corresponds to a magnetomotive force that excites the magnetic flux in an air gap having a length Lgap, is roughly expressed by the following formula:

$$H \times L\text{gap} = Nw \times Ag$$
$$B\max = \mu o \times H = \mu o \times Nw \times Ag/L\text{gap}$$
$$Ag = B\max \times L\text{gap}/(\mu o \times Nw) \quad (90)$$

To be precise, in Formula (89) expressing torque, the reference Iac is required to be replaced by (Iac−Ag). The same applies to the torque formulas with respect to a non-linear region, provided hereinafter.

Similar to the AC-phase, for the BA-phase, values are calculated for a magnetic flux density Bba, magnetic flux φba, average inductance Lab, virtual winding voltage V2ba, power Pba and torque Tba. A motor model based on the motor shown in FIGS. 1 and 16 is used. An offset specific to the BA-phase is θoff=45 degrees. The values are calculated with respect to a range of the rotational position θr of the rotor of from 45 degrees to 75 degrees. The BA-phase stator poles are able to generate torque in the counterclockwise direction CCW in this rotational range. The values are calculated for an operation region where, as the current magnitude conditions, the current value Iba is large and the soft-magnetic material is magnetically non-linear.

$$Bba = B\max \quad (91)$$
$$\phi ba = B\max \times R \times (\theta r - \theta\text{off}) \times tc \quad (92)$$
$$Lba = Nw \times B\max \times R \times (\theta r - \theta\text{off}) \times tc/Iba \quad (93)$$
$$V2ba = 2 \times Nw \times B\max \times R \times tc \times \omega r \quad (94)$$
$$Pin = V2ba \times Iba \quad (95)$$
$$Tba = 2 \times Nw \times B\max \times R \times tc \times Iba \quad (96)$$

Similarly, for the CB-phase, values are calculated for a magnetic flux density Bcb, magnetic flux φcb, average inductance Lcb, virtual winding voltage V2cb, power Pcb and torque Tcb. The values are calculated with respect to a range of the rotational position θr of the rotor of from 75 degrees to 105 degrees.

$$Bcb = B\max \quad (97)$$
$$\phi cb = B\max \times R \times (\theta r - \theta\text{off}) \times tc \quad (98)$$
$$Lcb = Nw \times B\max \times R \times (\theta\theta r - \theta\text{off}) \times tc/Icb \quad (99)$$
$$V2cb = 2 \times Nw \times B\max \times R \times tc \times \omega r \quad (100)$$
$$Pin = V2cb \times Icb \quad (101)$$
$$Tcb = 2 \times Nw \times B\max \times R \times tc \times Icb \quad (102)$$

Then, features are shown regarding a region of the rotational position θr of the rotor, where torque in the clockwise direction CW is generated. For the AC-phase, values are calculated for a magnetic field magnitude Hac, magnetic flux density Bac, magnetic flux φac, inductance Lac, virtual winding voltage V2ac, power Pac and torque Tac. A motor model based on the motor shown in FIGS. 1 and 16 is used. An offset specific to the AC-phase is θoff=15 degrees. The values are calculated with respect to a range of the rotational position θr of the rotor of from 45 degrees to 75 degrees. The AC-phase stator poles are able to generate torque in the clockwise direction CW in this rotational range. The values are calculated for an operation region where, as the current magnitude conditions, the current value Iba is large and the soft-magnetic material is magnetically non-linear.

$$Bac = B\max \quad (103)$$
$$\phi ac = B\max \times R \times (90° - \theta r - \theta\text{off}) \times tc \quad (104)$$
$$Lac = Nw \times B\max \times R \times (90° - \theta r - \theta\text{off}) \times tc/Iac \quad (105)$$
$$V2ac = -2 \times Nw \times B\max \times R \times tc \times \omega r \quad (106)$$
$$Pin = -V2ac \times Iac \quad (107)$$
$$Tac = -2 \times Nw \times B\max \times R \times tc \times Iac \quad (108)$$

Similarly, the following formulas are obtained for the Phase-BA. An offset specific to the BA-phase is θoff=45 degrees. The values are calculated with respect to a range of the rotational position θr of the rotor of from 75 degrees to 105 degrees. The BA-phase stator poles are able to generate torque in the clockwise direction CW in this rotational range.

$$Bba = B\max \quad (109)$$
$$\phi ba = B\max \times R \times (90° - \theta r - \theta\text{off}) \times tc \quad (110)$$
$$Lba = Nw \times B\max \times R \times (90° - \theta r - \theta\text{off}) \times tc/Iba \quad (111)$$
$$V2ba = -2 \times Nw \times B\max \times R \times tc \times \omega r \quad (112)$$
$$Pin = -V2ba \times Iba \quad (113)$$
$$Tba = -2 \times Nw \times B\max \times R \times tc \times Iba \quad (114)$$

Similarly, the following formulas are obtained for the Phase-CB. An offset specific to the CB-phase is θoff=45 degrees. The values are calculated with respect to a range of the rotational position θr of the rotor of from 105 degrees to 135 degrees. The CB-phase stator poles are able to generate torque in the clockwise direction CW in this rotational range.

$$Bcb = B\text{max} \tag{115}$$

$$\phi cb = B\text{max} \times R \times (90° - \theta r - \theta \text{off}) \times tc \tag{116}$$

$$Lcb = Nw \times B\text{max} \times R \times (90° - \theta r - \theta \text{off}) \times tc / Icb \tag{117}$$

$$V2cb = -2 \times Nw \times B\text{max} \times R \times tc \times \omega r \tag{118}$$

$$Pin = -V2ba \times Icb \tag{119}$$

$$Tcb = -2 \times Nw \times B\text{max} \times R \times tc \times Icb \tag{120}$$

So far, the features of torque generated in the stator poles of the individual phases of the motor shown in FIGS. 1 and 16 have been described. The description can be summarized as shown in FIG. 18. FIG. 18 shows torque generated by the stator poles, controllable rotational angle range for the torque, and available torque formulas. Each cell shows two formulas. Of the two formulas, the left formula corresponds to a torque formula for a region where the soft-magnetic material is linear, and the right formula corresponds to a torque formula for a region where the soft-magnetic material is magnetically saturated and non-linear. For example, in the row of CCW torque, the cell corresponding to the AC-phase shows Formula (42) for a magnetically linear region, and Formula (89) for a non-linear region where magnetic flux density is high.

Figure 17:
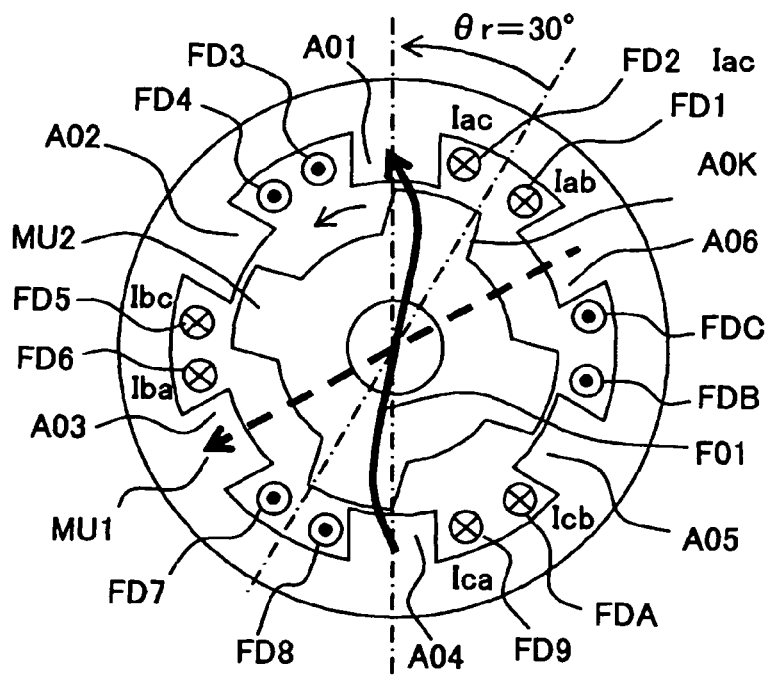
FIG. 17 is a view explaining a rotational angle position θr=30 degrees of the rotor in the motor shown in FIG. 16.

As shown by "Zero torque" in FIG. 18, there are some regions where the stator poles cannot generate torque. For example, at the rotational position θr of the rotor shown in FIG. 17, reference MU1 shows the BA-phase magnetic flux φba. At this rotational position θr, the large gap provided between the rotor salient poles and the stator poles reduces the magnetic flux density. Accordingly, in spite of the supply of the current component Iba, the BA-phase magnetic flux φba is small and thus the torque generated by the magnetic flux is substantially zero.

The formulas shown in FIG. 18 correspond to the method of controlling the current components Iac, Iba and Icb shown in the reverse conversion formulas (4), (5) and (6) and the forward conversion formulas (19), (20) and (21). As described above, the features of a motor, such as torque generated by the motor, can be well expressed by the virtual current components, and expressing the features by the virtual current components has an adequacy. The particularly important point is that the relationship is clear between the values of the current components and the motor torque.

According to the method, magnetic flux is permitted to generate as necessary in a plurality of stator poles and a plurality of torque components are permitted to generate in a concurrent manner. For example, in a state as shown in FIG. 1, the magnetic fluxes F01, F02 and F03 can be concurrently and parallelly controlled by exciting the magnetic fluxes with an optional magnetic field magnitude.

Hereinafter, values are calculated for the voltage Va of the A-phase winding, the voltage Vb of the B-phase winding and the voltage Vc for the C-phase winding.

$$Va = Nw \times (d\phi ac/dt + d\phi ba/dt - d\phi cb/dt) \tag{121}$$

$$= (V2ac + V2ba - V2cb)/2 \tag{122}$$

$$Vb = Nw \times (-d\phi ac/dt + d\phi ba/dt + d\phi cb/dt) \tag{123}$$

$$= (-V2ac + V2ba + V2cb)/2 \tag{124}$$

$$Vc = Nw \times (d\phi ac/dt - d\phi ba/dt + d\phi cb/dt) \tag{125}$$

$$= (V2ac + V2ba + V2cb)/2$$

Formulas (122) and (124) are reverse conversion formulas for voltage. Forward conversion formulas for voltage are as follows:

$$V2ac = Va + Vc \tag{126}$$

$$V2ba = Vb + Va \tag{127}$$

$$V2cb = Vc + Vb \tag{128}$$

Using the three-phase voltages Va, Vb and Vc and the three-phase currents Ia, Ib and Ic shown in FIG. 1, the input power Pin and the torque T can be expressed by the following formulas:

$$Pin = Va \times Ia + Vb \times Ib + Vc \times Ic \tag{129}$$

$$T = Pin/\omega r \tag{130}$$

However, the winding resistances of the phases are neglected. A relation Ra=Rb=Rc=0 is satisfied. Specific values can be calculated by assigning the formulas of variables obtained so far such as to the variables φac, φba and φcb of Formulas (121) to (130).

So far, values have been shown for current, magnetic flux, voltage, power and torque based on the current coordinates of FIGS. 1 and 16. The values of both of the current coordinates are mutually convertible and show the same physical and mathematical meaning.

(Specific Various Embodiments)

Hereinafter, are described full-pitch winding reluctance motors (hereinafter just referred to as motors) related to various embodiments. The motors are based on the basic principal and configuration described above.

(First Embodiment)

Hereinafter is specifically described a motor related to a first embodiment.

Figure 20:
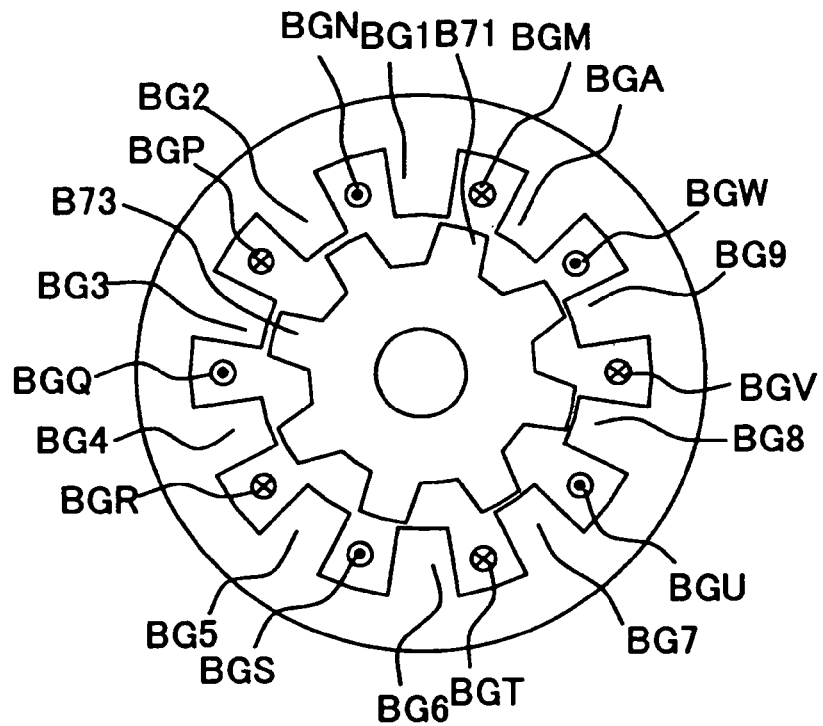
FIG. 20 is a view exemplifying a motor provided with 10 stator poles and 8 rotor salient poles in a range of an electrical angle of 360 degrees.

The configuration of the motor to be described includes a (433 NN1+2) number of stator poles. When an integer is expressed by NN1=1, the motor shown in FIG. 1 includes stator poles by a number 6. FIGS. 10 and 20 each show an example in which an integer is expressed by NN1=2 and the number of stator poles is 10. The integer NN1 may be 3 or more. The slots sandwiched between the stator poles are provided with full-pitch winding with a winding pitch equivalent to an electrical angle of 180 degrees.

In a motor configuration satisfying the above condition, the current supplied in one way to the slots between the stator poles can be directed positively and negatively in an alternate manner in the circumferential direction throughout the circumference.

At the same time, the direction of the magnetic flux of each stator pole can be directed to a direction opposite to the direction of the magnetic flux of the stator pole whose position is offset from the former in the circumferential direction by an electrical angle of 180 degrees. For example, as already explained referring to FIG. 1, the A-phase current Ia is supplied to the A-phase winding Wa, the B-phase current Ib is supplied to the B-phase winding Wb and the C-phase current Ic is supplied to the C-phase current Wc, according to the rotational position Or of the rotor. Thus, the magnetic flux of one stator pole can be passed to the stator pole in the opposite direction as shown by the magnetic fluxes F01, F02 and F13.

A rotor has two or more even number of salient poles. In the case of FIG. 1, the number of salient poles is four. The number of rotor salient poles may be varied. The features of a motor depend on the number of rotor salient poles. However, the fundamental functions of the stator, i.e. the function of generating magnetomotive force and the function of passing magnetic flux, remain the same.

Figure 42:
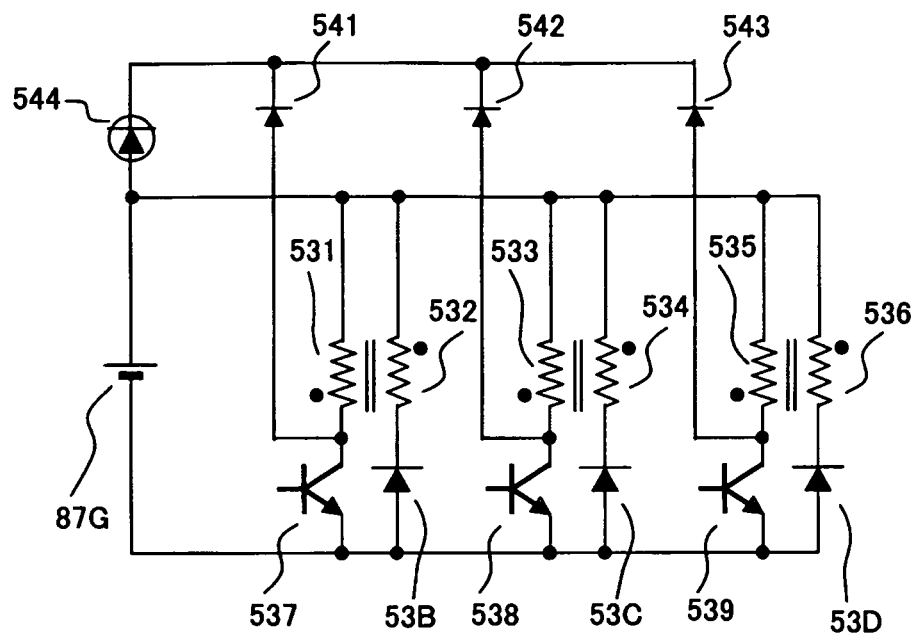
FIG. 42 is a diagram showing windings of a motor according to the present invention, where tow windings are arranged in each slot, and a control circuit to control the currents and voltages of the windings.

A power converter is necessary in order to supply one-way current to each winding. Examples of configuration of such a power converter are shown in FIGS. 9 and 42, which will be explained later. Each winding of the motor is configured so as to be commonly used by two stator poles adjacently located in the circumferential direction. Accordingly, power can be parallelly supplied from a plurality of paths shown in FIGS. 9 and 42. As a result, compared to a three-phase AC motor driven by three-phase AC voltage and current, the current capacity of the transistors shown in FIGS. 9 and 42 can be drastically reduced.

As explained referring to an equivalent model shown in FIG. 12, the voltage and current characteristics of a motor having such a configuration are very complicated and thus control is difficult, in particular, in speed ranges other than a lower speed range. However, as shown in Formulas (1) to (130), the current in each phase may be separated into positive current components and negative current components, which pass through both sides of each stator pole. In other words, the current coordinate may be converted to another current coordinate to control the current components which act on only the stator pole in question. Thus, current can be controlled in an uncomplicated manner.

Figure 19:
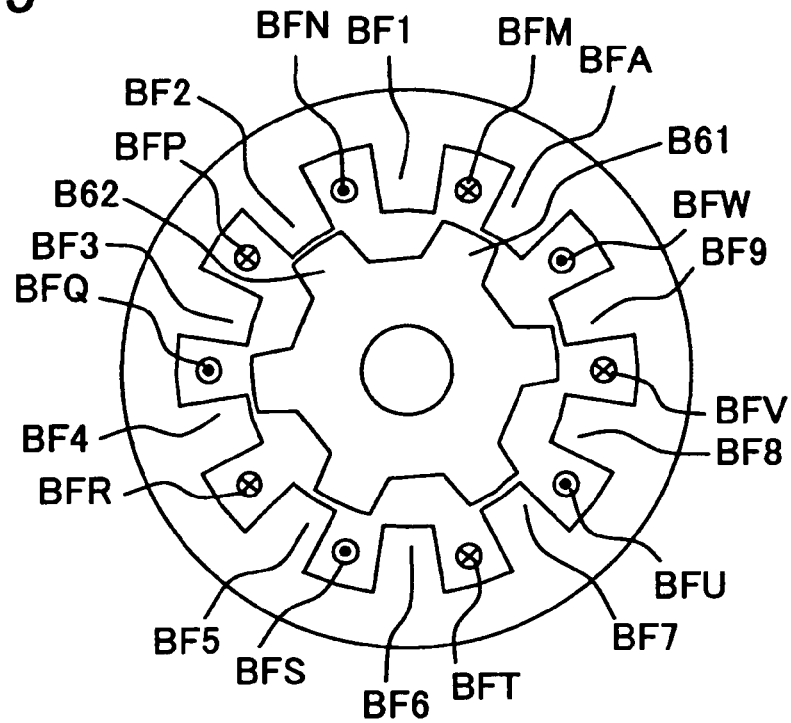
FIG. 19 is a view exemplifying a motor provided with 10 stator poles and 6 rotor salient poles in a range of an electrical angle of 360 degrees.

The three-phase full-pitch wincing SRM has been specifically explained above. FIG. 19, on the other hand, shows a five-phase motor having phases A, B, C, D and E, with the number of stator poles being ten. References BF1 and BF6 show AD-phase stator poles. References BF3 and BF8 show BE-phase stator poles. References BF5 and BFA show CA-phase stator poles. References BF7 and BF2 show DB-phase stator poles. References BF9 and BF4 show EC-phase stator poles. The slots between the stator poles are provided with A-phase full-pitch windings BFM and BFS, B-phase full-pitch windings BFP and BFU, C-phase full-pitch windings BFR and BFW, D-phase full-pitch windings BFT and BFN, and E-phase full-pitch windings BFV and BFQ. As shown by symbols in the figure, currents supplied to the phase windings are one-way currents. The number of the rotor salient poles is six as represented such as by references B61 and B62.

Using a method similar to that for the three-phase motor shown in FIG. 1, values can be calculated for the five-phase motor of FIG. 12 as well, for the current components, magnetic flux density, magnetic flux, voltage, power and torque of the stator poles. Forward conversion formulas for current and those for voltage can also be similarly obtained. The offset θoff at the rotational position in each phase depends on the number of rotor salient poles. The offset θoff is required to be determined for each of the phases, based on the rotational position θr of the rotor, which determines the positional relationship between the stator poles and the rotor salient poles of the phase.

Figure 21:
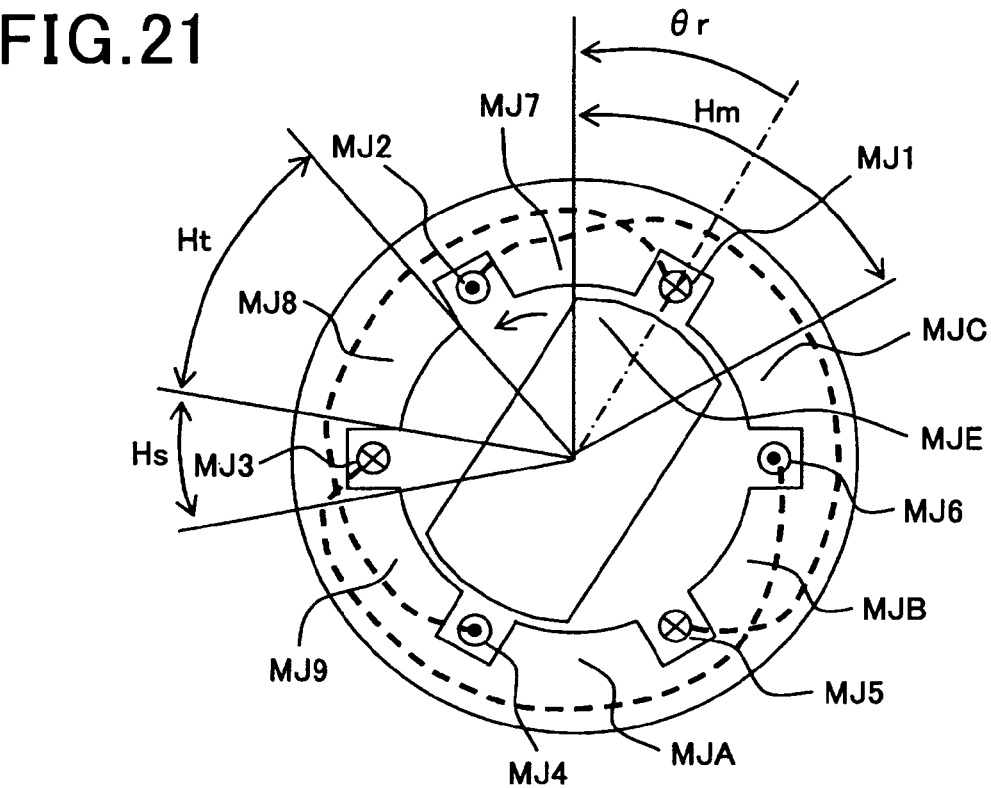
FIG. 21 is a view exemplifying a motor provided with 6 stator poles and 2 rotor salient poles in a range of an electrical angle of 360 degrees.

FIG. 20 shows an example of a motor obtained by changing the number of the rotor salient poles of FIG. 19 to eight. In FIG. 10, the rotor salient poles are represented by references B71 and B73. Similar to FIG. 19, the offset θoff at the rotational position for use in the formulas of each phase is required to be determined based on the rotational position θr of the rotor, which determines the positional relationship between the stator poles and the rotor salient poles of the phase FIG. 21 shows a motor including six stator poles and two rotor salient poles MJE. References MF7 and MFA show AC-phase stator poles through which magnetic flux φac passes. References MF9 and MFC show BA-phase stator poles through which magnetic flux φba passes. References MJB and MJ8 show CB-phase stator poles through which magnetic flux φcb passes. The slots each sandwiched between the stator poles are provided with phase windings of full-pitch winding, which are connected by coil ends as shown by broken lines. References M31 and M34 show A-phase windings for supplying the A-phase current Ia. References MJ3 and M36 show B-phase windings for supplying the B-phase current Ib. References M35 and MJ2 show C-phase windings for supplying the C-phase current Ic. The pitch of the stator poles is HM=60 degrees in circumferential angle. Reference Ht shows a circumferential width of an inner peripheral portion of a stator pole. Reference Hs shows a circumferential width of a slot opening. FIG. 21 shows an example in which H5=40 degrees and Hs=20 degrees. Since the number of the rotor salient poles is two, the width Ht of each stator pole is increased compared to FIG. 1.

Figure 23:
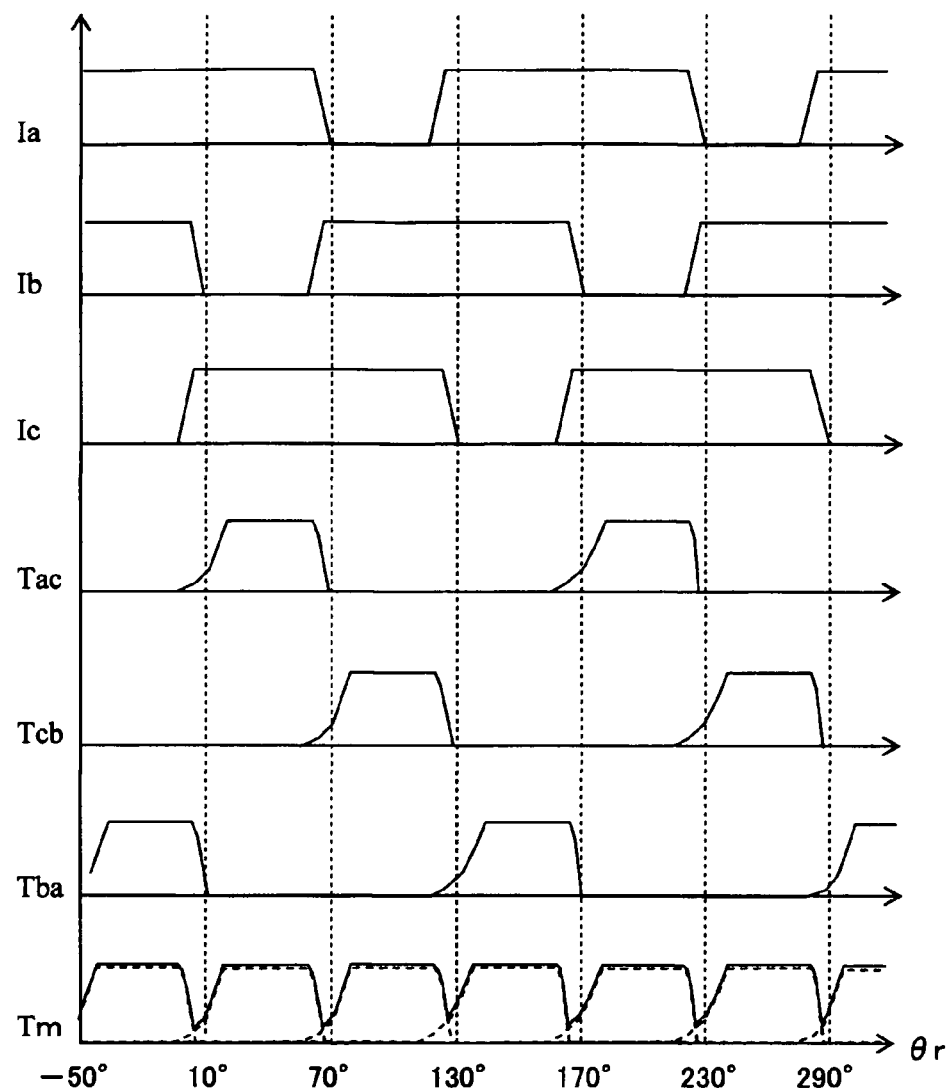
FIG. 23 is a timing chart exemplifying currents and torque of the respective phases of the motor shown in FIG. 21.

As shown in a time diagram of FIG. 23, substantially static torque is generated in a low-speed range of rotation of the motor of FIG. 21 in the counterclockwise direction CCW. Specifically, at a rotational position θr=10 degrees of the rotor, current of the same magnitude, i.e. Ia=Ic, is supplied to the A- and C-phase windings while the B-phase current is set to zero. Thus, a torque Tac in the counterclockwise direction CCW is generated. At a rotational position θr=70 degrees, current of the same magnitude, i.e. Ic=Ib, is supplied to the C- and B-phase windings while the A-phase current is set to zero. Thus, a torque Tcb in the counterclockwise direction CCW is generated. At a rotational position θr=130 degrees, current of the same magnitude, i.e. Ib=Ia, is supplied to the B- and A-phase windings while the C-phase current is set to zero. Thus, a torque Tba in the counterclockwise direction CCW is generated.

As explained above, synchronizing with the rotation of the rotor in the counterclockwise direction CCW, the stator poles in rotation in the counterclockwise direction CCW are sequentially excited. Thus, the rotor is rotated in the counterclockwise direction CCW. A sum of torque Tm is reduced because the torque at the slot openings is reduced. In this way, features including torque ripple are provided.

Similarly, when torque in the clockwise direction CW is generated, current of the same magnitude, i.e. Ib=Ia, is supplied to the B- and A-phase windings in the state of FIG. 21 and the C-phase current is set to zero. Thus, synchronizing with the rotation of the rotor in the clockwise direction, the stator poles in rotation in the clockwise direction CW are sequentially excited. Thus, the rotor is rotated in the clockwise direction CW.

In the motor shown in FIG. 21, the number of the rotor salient poles is two in the range of the electrical angle of 360 degrees. Thus, compared to the motor of FIG. 1, the method of supplying current with the rotation of the rotor is simplified. The angle width of supplying current in each phase is about 120 degrees, which is larger by a factor of about two than the motor of FIG. 1 and thus the frequency is lower by a factor of ½. There are structural differences compared to the full-pitch winding SRM of FIG. 1. In the motor of FIG. 21, the circumferential width of the rotor can be increased to an electrical angle of 60 degrees or more. The increase of the circumferential width can increase the duration in which supply current can be decreased without generating torque in a high-speed range. Thus, this creates an important feature in generating torque in a high-speed range.

Static torque in FIG. 21 can be generated as explained above. The motor of FIG. 21 has two rotor salient poles and is simple. However, the rotor salient poles face two stator poles. This means that the magnetic flux of the stator poles remain interlinking the three full-pitch windings as shown in FIG. 12.

In other words, the motor shown in FIG. 21 creates complicated electromagnetic actions, involving interlinkage of three windings.

When the pole width of the rotor exceeds 60 degrees, the three-phase magnetic fluxes φac, φba and φcb may be simultaneously generated at some rotational positions. Accordingly, more precise control is required using the method shown in Formulas (1) to (130).

Figure 22:
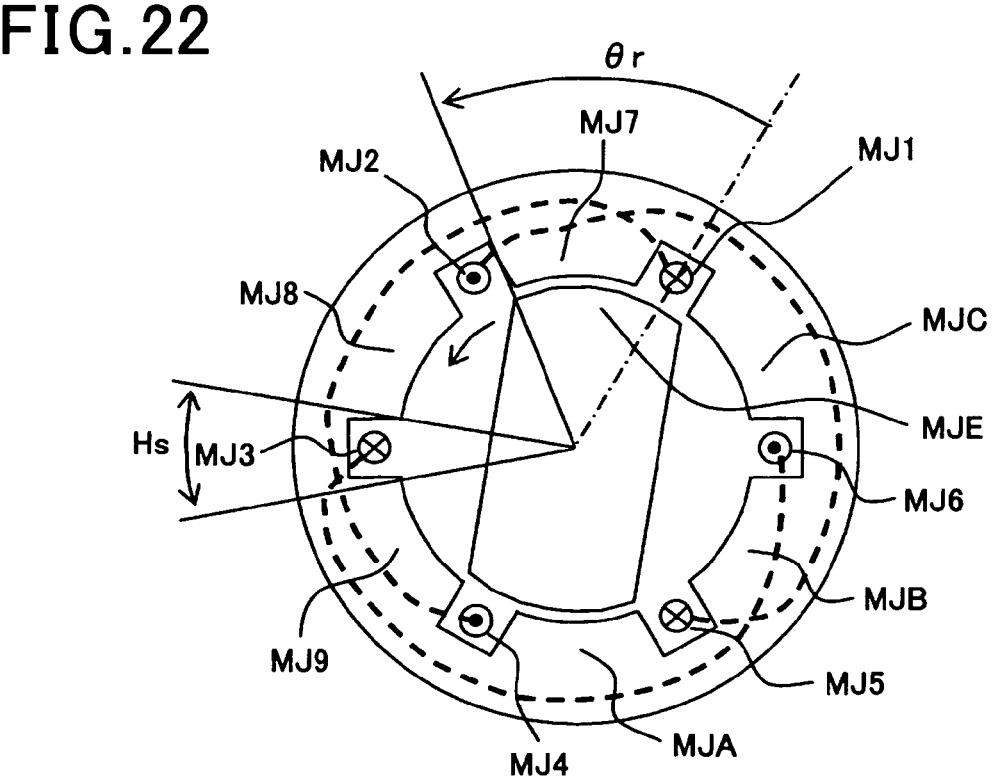
FIG. 22 is a view explaining a rotational angle position θr=50 degrees of the rotor in the motor shown in FIG. 21.

The problem of the motor shown in FIG. 21 is that torque generated in the counterclockwise direction becomes small near the rotational position θr=50 degrees of the rotor shown in FIG. 22. This provides the feature that torque ripple occurs in slot openings as shown by the sum of torque Tm in FIG. 23. In order to reduce the torque ripple, the width Hs of each slot opening may be reduced. At the same time, however, this raises a problem of increasing magnetic flux leakage at the slot openings. This problem is less notable in a low torque range. However, when current increases to saturate the stator poles, the problem becomes apparent with the drastic decrease of the peak torque of the motor. Thus, torque ripple and peak torque are in a contradicting relationship. One method of resolving the contradicting relationship will be explained later referring to FIG. 72.

The motor shown in FIG. 21 generates torque in a sequence analogous to the synchronous electric motors of three-phase AC voltage and three-phase AC current of the conventional art. However, the motor shown in FIG. 21 is apparently different from the electric motors of the conventional art in that the currents in the windings are one-way currents. For example, the current capacity of the transistors of the control circuit shown in FIG. 9 can be decreased. As will be shown in FIGS. 39 and 42 later, the control circuit can be further simplified. The magnetic flux of each stator pole is directed in one way and thus the hysteresis loss of the soft-magnetic material of the stator can be reduced to ¼.

The motors shown such as in FIGS. 1, 19, 20 and 21 may be multipolarized. When the motor shown in FIG. 1 is multipolarized by twice, the motor will have twelve stator poles and eight rotor salient poles. The motor obtained by multipolarizing the motor shown in FIG. 21 by a factor of two will have twelve stator poles and four rotor salient poles. Further, a motor may be multipolarized by a factor of three or four. Such multipolarized motors are also encompassed in the present invention.

(Second Embodiment)

Hereinafter is specifically explained a motor related to a second embodiment.

The structure of the motor to be explained has a (8×NN2) number of stator poles.

Figure 24:
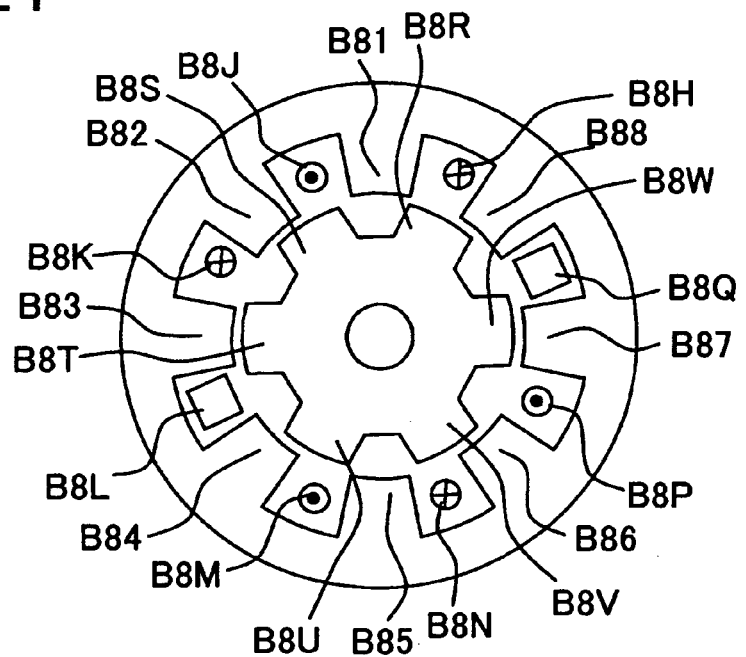
FIG. 24 is a view exemplifying a motor provided with 8 stator poles and 6 rotor salient poles in a range of an electrical angle of 360 degrees.

When an integer is expressed by NN2=1, the motor shown in FIG. 24 includes stator poles by a number 8. When an integer is expressed by NN2=2, a number 16, for example, that is a positive integer NN2, can be selected as the number of stator poles. The slots each sandwiched between the stator poles are provided with full-pitch winding with a winding pitch corresponding to an electrical angle of 180 degrees. In a motor configuration satisfying the above conditions, the current supplied in one way to the slots between the stator poles is directed positively and negatively in an alternate manner in the circumferential direction so that the stator poles generate torque. At the same time, the direction of the magnetic flux of each stator pole is directed in a direction opposite to the direction of the magnetic flux of the stator pole which is offset from the former by an electrical angle of 180 degrees in the circumferential direction. Thus, the magnetic flux is permitted pass through two rotor salient poles, for the generation of torque.

However, D-phase windings B8Q and B8L shown in FIG. 24 are required to be supplied with positive or negative current depending on the rotational position θr of the rotor.

In FIG. 24, references B8H and B8M show an A-phase winding Wa through which an A-phase current Ia that is a one-way current is passed. References B8N and B83 show a B-phase winding Wb through which a B-phase current Ib that is a one-way current is passed. References B8K and B8P show a C-phase winding Wc through which a C-phase current Ic that is a one-way current is passed. As mentioned above, the D-phase winding Wd shown by references B8L and B8Q is supplied with positive or negative current depending on the rotational position θr of the rotor.

References B81 and B85 show AB-phase stator poles that can be excited by the A-phase current Ia and the B-phase current Ib. References B86 and B82 show BC-phase stator poles that can be excited by the B-phase current Ib and the C-phase current Ic. References B83 and B87 show CD-phase stator poles that can be excited by the C-phase current Ic and the D-phase current Id. In this case, as viewed from FIG. 24, the winding B8Q is required to pass the D-phase current Id from the front to the back of the drawing sheet, while the winding B8L is required to pass the D-phase current Id from the back to the front of the drawing sheet. References B84 and B88 show DA-phase stator poles that can be excited by the D-phase current Id and the A-phase current Ia. In this case, as viewed from FIG. 24, the winding B8Q is required to pass the D-phase current Id from the back to the front of the drawing sheet, while the winding B8L is required to pass the D-phase current Id from the front to the back of the drawing sheet. Thus, between the case where the CD-phase stator poles are excited and the case where the DA-phase stator poles are excited, the D-phase current Id is required to be passed in the opposite direction.

Figure 25:
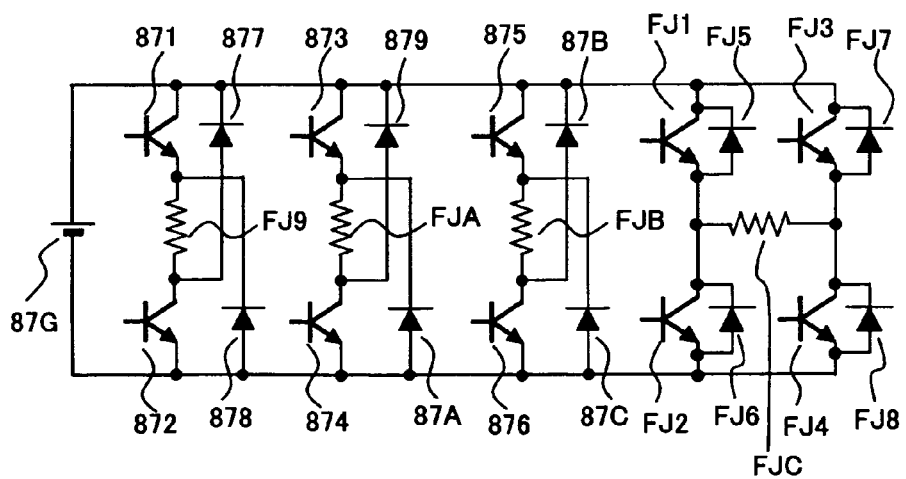
FIG. 25 is a circuit diagram exemplifying supply of currents in the motor shown in FIG. 24.

FIG. 25 shows an example of a control circuit in detail.

The configuration of the control circuit is the same as that explained referring to FIG. 9. Specifically, reference FJ9 shows an A-phase winding, reference FJA shows a B-phase winding and reference JFB shows a C-phase winding. Reference FJC shows a D-phase winding which supplies positive current to the D-phase winding when transistors FJ1 and FJ4 are turned on and supplies negative current to the D-phase winding when transistors FJ7 and FJ2 are turned on. References F35, FJ6, FJ7 and FJ8 show diodes that supply reverse currents. Thus, the D-phase current Id is ensured to be directed to either the positive or negative direction to continuously generate torque for the motor shown in FIG. 24.

The number of the rotor salient poles may be set to two or more in a variable manner. The features of a motor depend on the number of the rotor salient poles. However, the fundamental functions of the stator, i.e. the function of generating magnetomotive force and the function of passing magnetic flux, remain the same. In the circuit shown in FIG. 25 as well, power can be supplied from a plurality of paths and thus the current capacity of the transistors can be reduced. A current control circuit may have a configuration different from the one shown in FIG. 25. A larger integer NN2 and thus a larger number of stator poles can relatively reduce the burden of the circuit that controls current in both ways. However, increase of the number of elements may raise the problem of complicatedness.

The voltage and current characteristics of the motor configured as shown in FIG. 9 are also very complicated as explained referring to the equivalent model of FIG. 12, and thus control is difficult, in particular, in speed ranges other than a lower speed range. However, as shown in Formulas (1) to (130), the current in each phase may be separated into positive current components and negative current components, which pass through both sides of each stator pole. In other words, the current coordinate may be converted to another current coordinate to control the current components which act on only the stator pole in question. Thus, current can be controlled in an uncomplicated manner. However, the control of the four-phase winding currents is required to be modified.

(Third Embodiment)

Hereinafter is specifically explained a motor related to a third embodiment.

Figure 26:
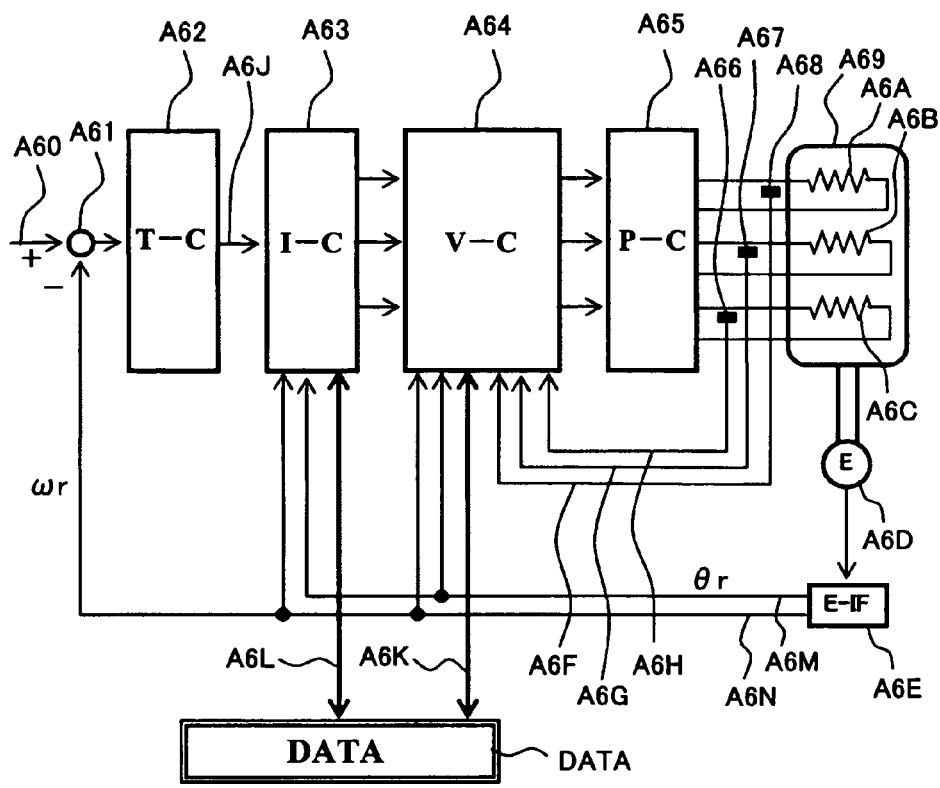
FIG. 26 is a diagram outlining the entire control of currents and voltages in the motor according to the present invention.

FIG. 26 shows a schematic configuration of a motor and a configuration of its control circuit, or shows an example of the motor shown in FIG. 1 and its control circuit. Reference A69 shows a motor. Reference A6A shows an A-phase winding, reference A68 shows a detecting means for the A-phase current Ia, and reference A6F shows a detection value Ias of the A-phase current. Reference A6B shows a B-phase winding, reference A67 shows a detecting means for the B-phase current IB, and reference A6G shows a detection value Ibs of the B-phase current. Reference A6C shows a C-phase winding, reference A66 shows a detecting means for the C-phase current Ic, and reference A6H shows a detection value Ics of the C-phase current. Reference A6D shows a position detecting means for detecting a rotational position θr of the rotor, and reference A6E shows its interface. Reference A6M shows a rotational position θr, and reference A6N shows a rotational angular speed ωr. Reference A60 shows a speed command ωo and reference A61 shows an adder for detecting a speed error Ere. Reference A62 shows a torque control means for inputting the speed error Ere and outputting information A6J regarding torque.

Reference A63 shows a current control means for inputting command information A63 regarding torque and outputting command information regarding current. The current control means A63 also inputs data information A6L of DATA regarding the rotational position θr of the rotor, the rotational angular speed ωr and the motor.

Reference A64 shows a voltage control means for inputting command information regarding current and outputting command information regarding voltage of the motor. The voltage control means A64 inputs a detection value Ias of the A-phase current, a detection value Ibs of the B-phase current and a detection value Ics of the C-phase current of the motor, as well as the rotational angular speed ωr and various pieces of motor information A6K.

Reference A65 shows a power converter for controlling three-phase voltage and current. For example, the power converter modulates pulse width using an input current to turn on/off the transistors. Specifically, the power converter carries out pulse-width modulation for the supply of an average voltage, thereby providing power to the windings of the motor using power elements, such as transistors.

In performing the modulation, various modulation formulas may be used. The power element portions are mainly composed of transistors and diodes and may have various configurations as shown such as in FIG. 9, EP, 42, 80 and 81. Features of the motor shown in FIG. 1 are indicated in Formulas (1) to (130) as examples. However, actual features of the motor may very often turn to non-linear due, for example, to magnetic non-linearity, such as magnetic flux leakage and magnetic saturation, or non-linearity of permanent magnets if they are used. In order to achieve more accurate control in this regard, basic data DATA may be prepared and the data may appropriately be applied such as to Formulas (1) to (130). The basic data DATA includes magnetic flux data obtained by analyzing the motor model using a finite element method, for example, or magnetic flux leakage data, or non-linear inductance data. Use of such a method is effective to achieve high accuracy in the control.

Figure 27:
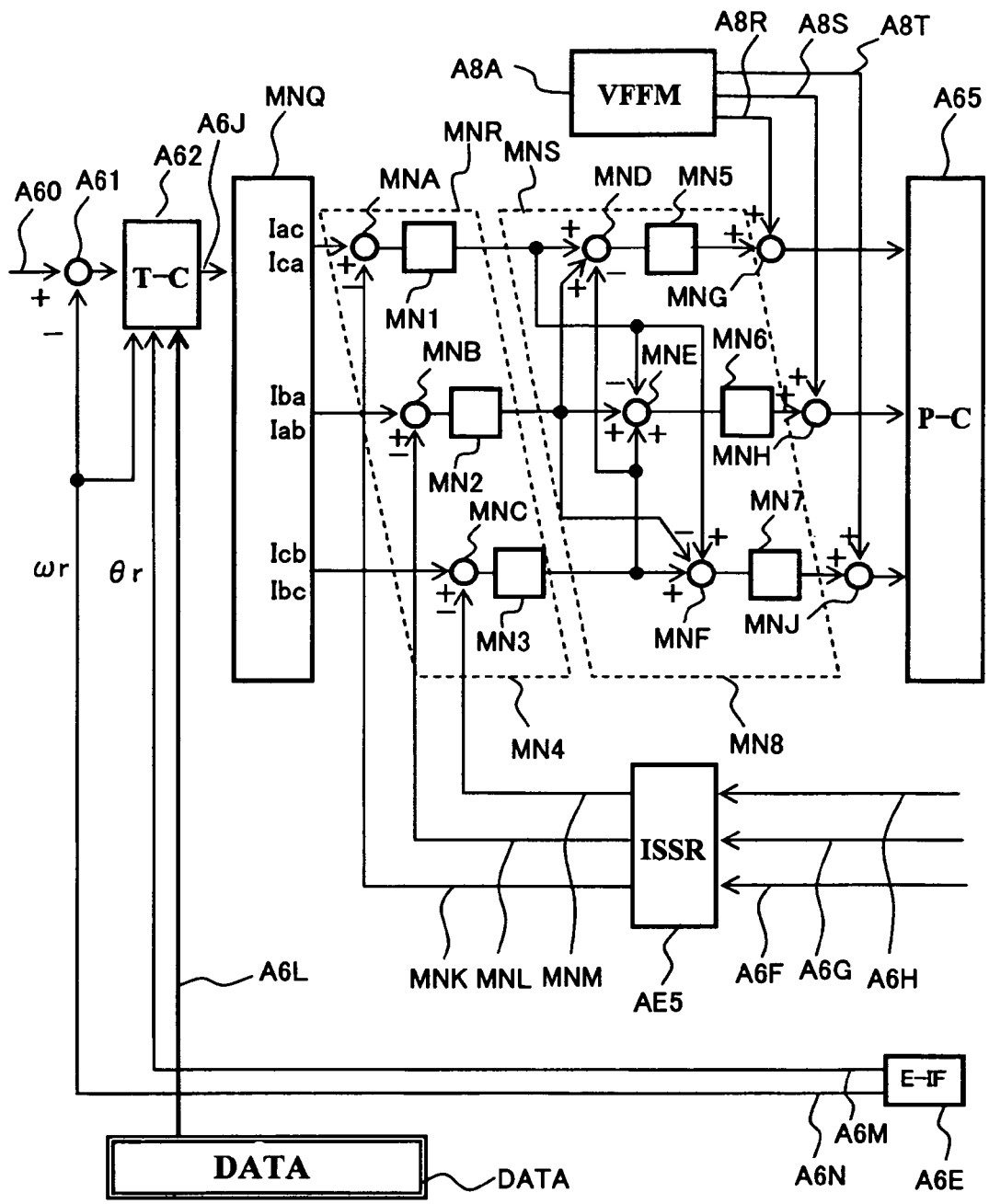
FIG. 27 is a block diagram showing the control of the currents and voltages by controlling current components for the respective phases of the motor.

FIG. 27 shows an example of a configuration embodying the current control means A63 and the voltage control means A64 of FIG. 26. An element shown by MNQ inputs the command information A63 regarding torque to calculate an AC-phase current component command Iaco, BA-phase current component command Ibao and CB-phase current component command Icbo.

Reference AE5 shows a forward conversion means for current for performing calculation using Formulas (19), (20) and (21). Its output MNK corresponds to a detection value Iacs for an AC-phase current component, its output MNL corresponds to a detection value Ibas for a BA-phase current component, and its output MNM corresponds to a detection value Icbs of a CB-phase current component.

An element shown by MNA calculates a difference between a command Iaco for the AC-phase current component and the detection value Iacs for the AC-phase current component to allow a compensator MN1 to calculate a command VFaco for an AC-phase voltage component.

An element shown by MNB calculates a difference between a command Ibao for the BA-phase current component and the detection value Ibas for the BA-phase current component to allow a compensator MN2 to calculate a command VFbao for a BA-phase voltage component.

An element shown by MNC calculates a difference between a command Icbo for the CB-phase current component and the detection value Icbs for the CB-phase current component to allow a compensator MN3 to calculate a command VFcbo for a CB-phase voltage component. A range indicated by a broken line MN4 shows a range controlled by the current components Iac, Iba and Icb.

An element shown by MND adds the command VFaco for the AC-phase voltage component to the command VFbao for the BA-phase voltage component, followed by subtracting therefrom the command VFcbo for the CB-phase voltage component to allow a compensator MN5 to calculate an A-phase voltage command Vao of the A-phase winding Wa. An element shown by MNE adds the command VFbao for the BA-phase voltage component to the command VFcbo for the CB-phase voltage component, followed by subtracting therefrom the command VFaco for the AC-phase voltage component to allow a compensator MN6 to calculate a B-phase voltage command Vbo of the B-phase winding Wb. An element shown by MNF adds the command VFcbo for the CB-phase voltage component to the command VFaco for the AC-phase voltage component, followed by subtracting therefrom the command VFbao for the BA-phase voltage component to allow a compensator MN7 to calculate a C-phase voltage command Vco of the C-phase winding Wc. These are configured based on Formulas (121), (123) and (125). A range indicated by a broken line MN8 corresponds to a control range for preparing voltage commands for the individual phases by composing the voltage components. The range may indicate reverse conversion of voltage.

The compensators are what are called PID compensators which calculate a proportional component, an integral component, a differential component or the like and carry out addition. Various modes of compensators may be used with the addition of a limiter, for example. In particular, the motor according to the present invention has a feature that the inductance is drastically changed depending on the area in which the stator poles face the rotor salient poles. Accordingly, it is effective that the parameters of the compensators are rendered to be variable according to the rotational position θr.

Since the integral effects of the compensators vary in a high-speed range where the number of rotations ωr is large, it is effective to render the parameters of the compensators to be variable according to the number of rotations ωr. For example, it is effective not to carry out integral action in a high-speed range.

Reference A8A shows a voltage feedforward means for calculating voltages of the windings. Reference A8R shows feedforward voltage of the A-phase winding. Reference A8S shows feedforward voltage of the B-phase winding. Reference A8T shows feedforward voltage of the C-phase winding.

References MNG, MNH and MNJ show adders. Each of the adders adds feedforward voltages of each phase. In particular, when the number of rotations ωr of the motor is increased, accuracy cannot be maintained in the current control based on feedback control of current and thus errors are increased in the current control. In this regard, the voltage feedforward means A8A uses formulas associated with voltage among Formulas (1) to (130) and also uses the basic data DATA to provide estimates of voltages of the phase windings as feedforward voltages, to thereby enable correct current control. Reference A65 shows the power converter that inputs voltage commands for the phase windings to amplify the voltages.

Under the control based on the configuration shown in FIG. 27, it is not that the currents Ia, Ib and Ic of the phase windings are directly controlled, but that the current components Iac, Iba and Icb of the AC-, BA- and CB-phase stator poles, respectively, are fed back for the control. Accordingly, this means that the magnetomotive force, the magnetic flux density and the magnetic flux associated with each stator pole are directly controlled. Further, under the control based on the configuration, the compensators MN1, MN2 and MN3 compensate the errors of the current components that act on the stator poles. Accordingly, the electromagnetic actions of the stator poles can be more accurately controlled. As a result, torque control and speed control can be more accurately performed for the motor. This means that the complicated electromagnetic relationship of the phase windings as shown in FIG. 12 is eliminated and that simplified control is enabled.

(Fourth Embodiment)

Hereinafter is specifically explained a motor related to a fourth embodiment.

Figure 28:
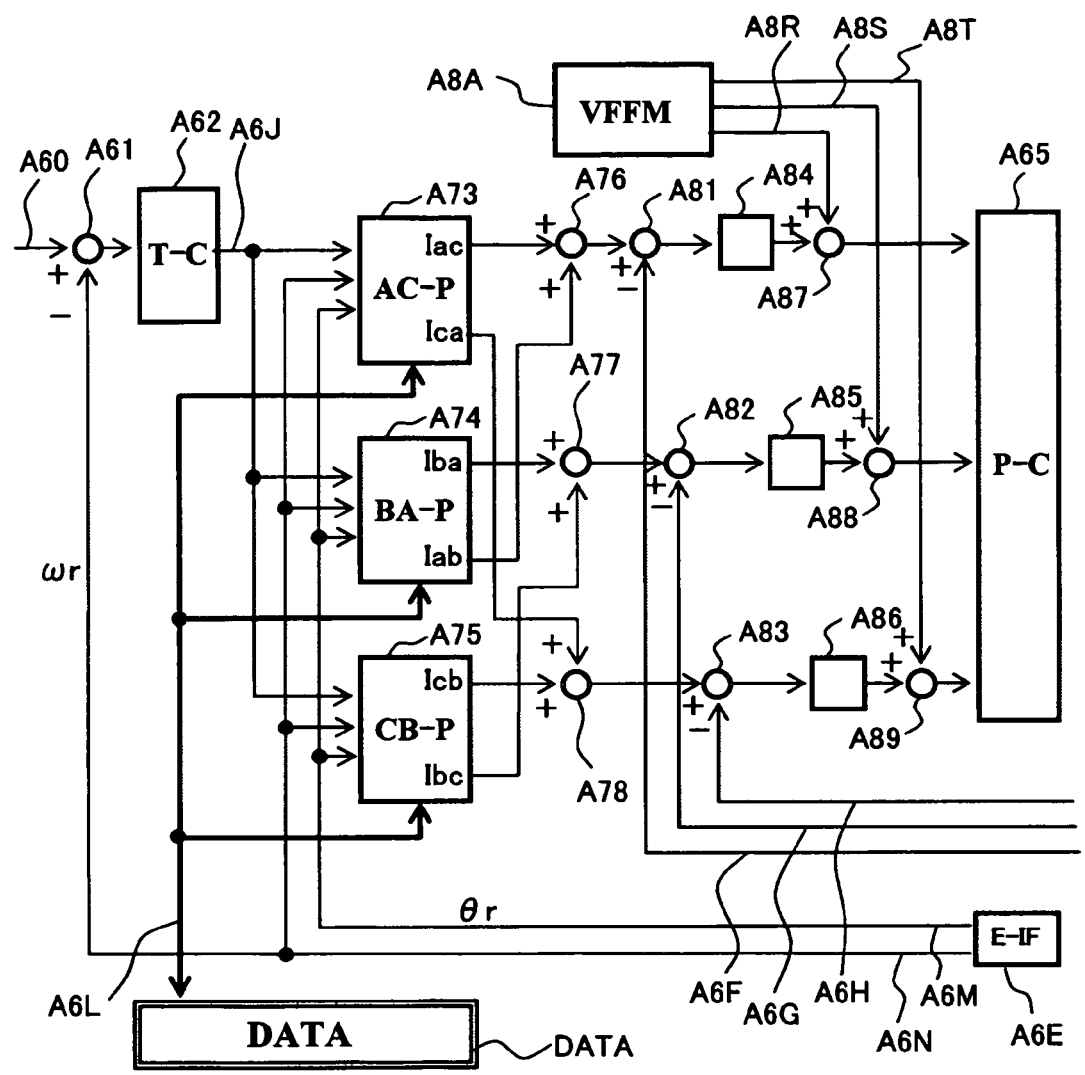
FIG. 28 is a block diagram showing the control of the currents and voltages by controlling the currents of the respective phases of the motor.

FIG. 28 shows an example of a configuration embodying the current control means A63 and the voltage control means A64 shown in FIG. 26. This configuration is different from the configuration shown in FIG. 27 in the method of controlling current.

References A73, A74 and A75 show current component commanding means for the AC-, BA- and CB-phases, respectively. In the figure, the MNQ shown in FIG. 27 is specifically illustrated but has the same functions. The current component commanding means A73 inputs command information A6J regarding torque and calculates current components Iac and Ica of the AC-phase stator poles based on a rotational position θr, as shown by A6M, of the rotor. Specifically, the current component commanding means A73 calculates current patterns and current magnitudes of the current components Iac and Ica. It should be appreciated that a relation Iac=Ica is established. As shown by A6L, these values can be more accurately calculated using the basic data DATA. The current patterns and the current magnitudes may be corrected based on the value of the number of rotations ωr, as shown by A6N, of the rotor.

Reference A74 shows a BA-phase current component commanding means having the same function as the current component commanding means A73.

Reference A75 shows a CB-phase current component commanding means having the same function as the current component commanding means A73.

Reference A76 shows a current reverse conversion function of Formula (4) for producing the A-phase current Ia by adding the AC-phase current component command Iac to the BA-phase current command Iab.

Reference A77 shows a current reverse conversion function of Formula (5) for producing the B-phase current Ib by adding the BA-phase current command Iba to the BC-phase current component command Ibc.

Reference A78 shows a current reverse conversion function of Formula (6) for producing the C-phase current Ic by adding the CB-phase current component command Icb to the AC-phase current command Ica.

An element shown by A81 subtracts the A-phase current detection value Ias from A6F for feedback to the A-phase current Ia to calculate an A-phase current error and to allow a compensator A84 to prepare an A-phase voltage command Vao.

An element shown by A82 subtracts the B-phase current detection value Ibs from A6G for feedback to the B-phase current Ib to calculate a B-phase current error and to allow a compensator A85 to prepare a B-phase voltage command Vbo.

An element shown by A83 subtracts the C-phase current detection value Ics from A6H for feedback to the C-phase current Ic to calculate a C-phase current error and to allow a compensator A86 to prepare a C-phase voltage command Vco.

Reference A87 shows an adder which adds the A-phase voltage command Vao to the A-phase feedforward voltage and outputs the resultant value to the power converter A65.

Reference A88 shows an adder which adds the B-phase voltage command Vbo to the B-phase feedforward voltage and outputs the resultant value to the power converter A65.

Reference A89 shows an adder which adds the C-phase voltage command Vco to the C-phase feedforward voltage and outputs the resultant value to the power converter A65.

Under the control based on the configuration shown in FIG. 28, the AC-, BA- and CB-phase current components Iac, Iba and Icb are calculated to obtain desired torque. Further, these current components are reversely converted to calculate the A-, B- and C-phase currents Ia, Ib and Ic. Then, the currents Ia, Ib and Ic are feedback controlled and supplied. As a result of the control in the configuration, the magnetomotive force, the magnetic flux density and the magnetic flux associated with each stator pole can be controlled. Thus, torque control and speed control can be more accurately performed for the motor. This means that the complicated electromagnetic relationship of the phase windings as shown in FIG. 12 is eliminated and that simplified control is enabled.

The control in FIG. 28 is different from the control in FIG. 27 in that whether the control is based on the feedback of the current components of the phases, or whether the control is based on the feedback of the currents of the phases. Both have the same purpose as a matter of course but have different features depending on the arrangement and the operation of the compensators. Use of motors depends on the requested specifications.

(Fifth Embodiment)

Hereinafter is specifically explained a motor related to a fifth embodiment.

Figure 29:
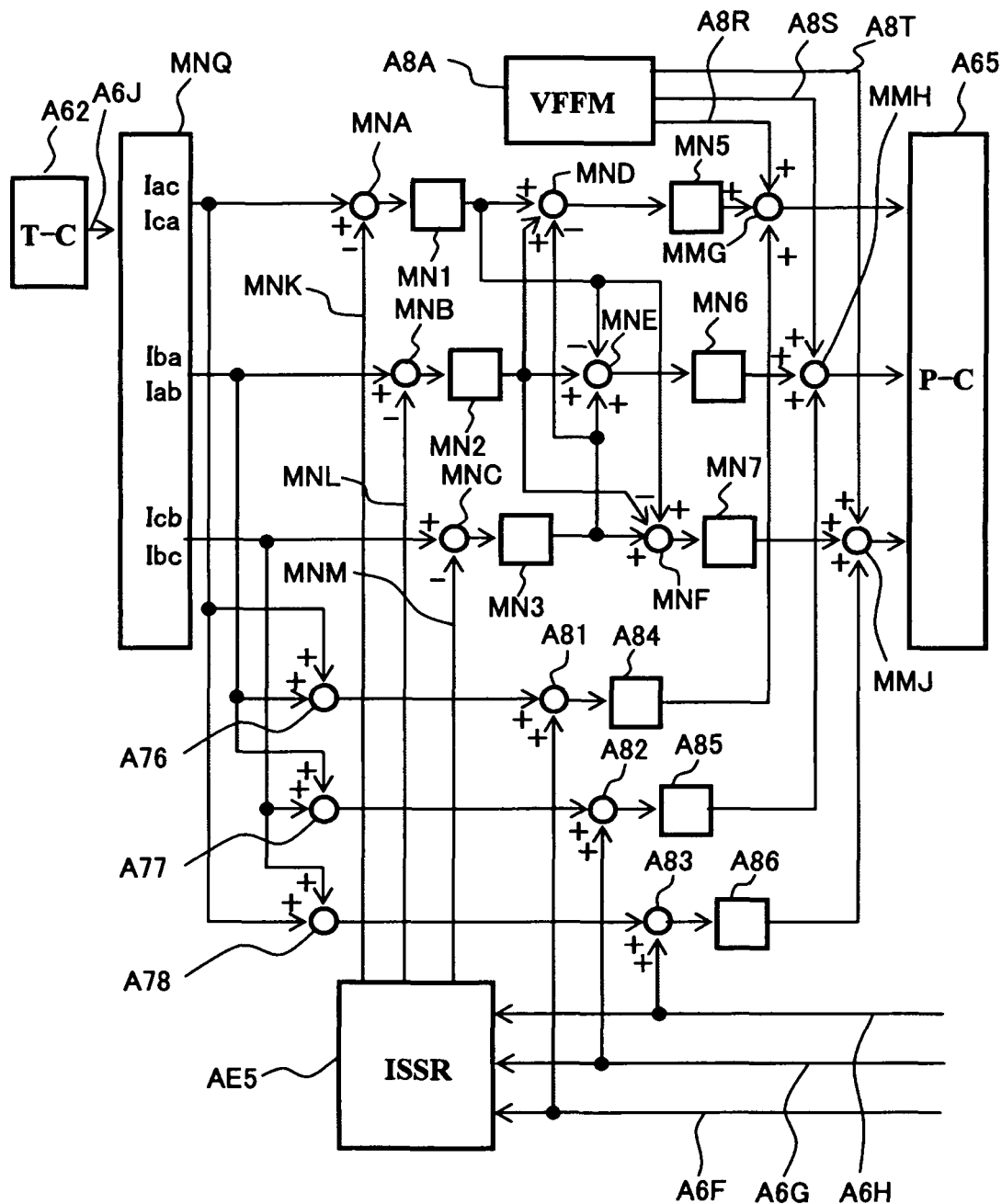
FIG. 29 is a block diagram showing the control of the currents and voltages by controlling current components for the respective phases and the currents of the respective phases of the motor.

FIG. 29 shows an example of a configuration embodying the current control means A63 and the voltage control means A64 of FIG. 26. The configuration shown in FIG. 29 is a combination of the configurations of FIGS. 27 and 28. Adders MNA, MNB, MNC, MND, MNE and MNF, and compensators MN5, MN6 and MN7 shown in FIG. 29 are arranged at the same positions and have the same functions as the adders and compensators of the same references shown in FIG. 27. Further, adders A76, A77, A78, A81, A82 and A83, and compensators A84, A85 and A86 shown in FIG. 29 are arranged at the same positions and have the same functions as the adders and compensators of the same references shown in FIG. 28.

The adder MMG of FIG. 29 adds up an A-phase voltage command Vao that is an output of the compensator MN5, an A-phase voltage command Vao that is an output of the compensator A84, and a feedforward voltage A8R of the A-phase winding, and outputs the resultant value as an A-phase voltage command Vao to the power converter A65.

The adder MMH adds up a B-phase voltage command Vbo that is an output of the compensator MN6, a B-phase voltage command Vbo that is an output of the compensator A85, and a feedforward voltage A8S of the B-phase winding, and outputs the resultant value as a B-phase voltage command Vbo to the power converter A65.

The adder MMJ adds up a C-phase voltage command Vco that is an output of the compensator MN7, a C-phase voltage command Vco that is an output of the compensator A86, and a feedforward voltage A8T of the C-phase winding, and outputs the resultant value as a C-phase voltage command Vco to the power converter A65.

Under the control based on the configuration shown in FIG. 29, features of both of the configurations of FIGS. 27 and 28 are attained because the configuration of FIG. 29 is the combination of the configurations of FIGS. 27 and 28. Depending on the setting of the parameters of the compensators, features approximate to those of the configuration shown in FIG. 27 or 28 can be attained. Features can be selected depending on the requested specification of a motor. In either of the methods, the magnetomotive force, the magnetic flux density and the magnetic flux associated with each stator pole can be controlled more easily. Further, torque control and speed control can be more accurately performed for the motor. This means that the complicated electromagnetic relationship of the phase windings as shown in FIG. 12 is eliminated and that simplified control is enabled.

In performing the control in the configurations of FIGS. 28, 27 and 29, the configurations may be extended depending on the number of the phases. Regarding Formulas (1) to (130) as well, the configurations may be extended depending on the number of the phases. For example, as in FIG. 19, when the number of stator poles is ten, the number of phases in the stator is five, and thus five-phase formulas and five-phase control configuration are required. Further, the formulas and control configuration may be modified and applied. Such modifications and applications, as far as falling in the spirit of the invention, should be encompassed in the present invention.

Figure 30:
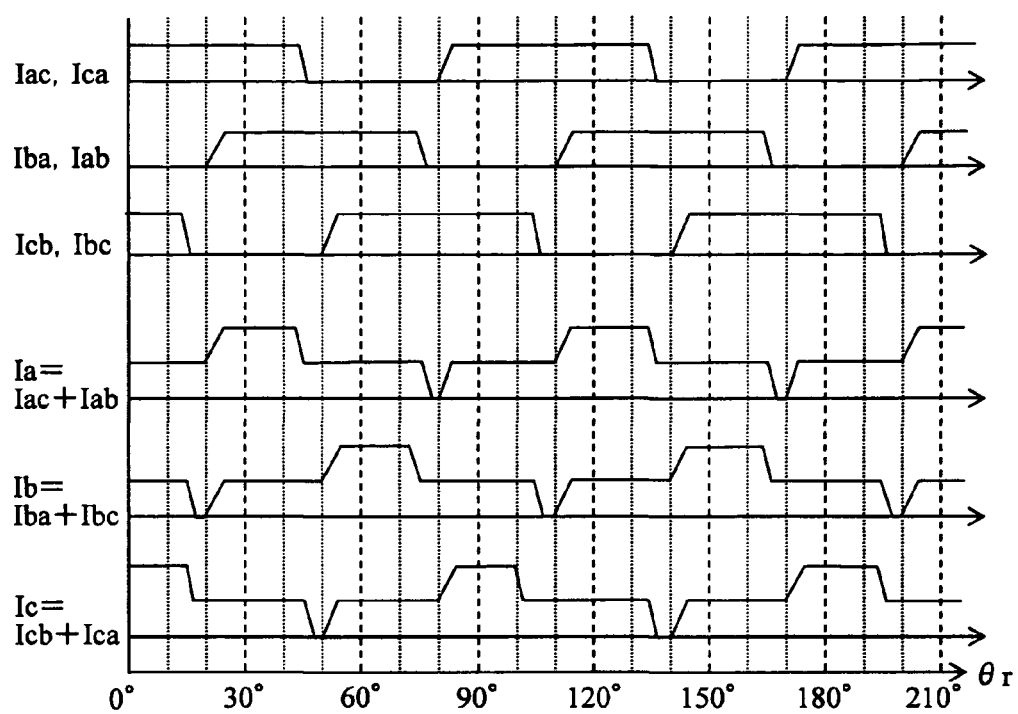
FIG. 30 is a timing chart exemplifying the currents of the motor shown in FIG. 1, which are controlled by the control circuit shown in FIG. 27.

FIG. 30 shows a specific example of currents in the controls based on the configurations shown in FIGS. 28, 27 and 29.

In FIG. 30, the horizontal axis shows rotational position $\theta r$ of the rotor and the vertical axis shows magnitude of currents. Let us discuss here the case where the current components shown in FIG. 16 reside in the motor shown in FIG. 1, and the motor is rotated with constant torque in the counterclockwise direction CCW. The relationship of the phase currents Ia, Ib and Ic shown in FIG. 1 with the current components Iac, Iba and Icb shown in FIG. 16 corresponds to the relationship shown in Formulas (1) to (6), (19), (20) and (21). Forward conversion and reverse conversion from the phase currents to the current components, or vice versa, can be easily conducted.

First, when comparatively small torque is generated between $\theta r=15$ degrees and 45 degrees shown in FIGS. 1 and 2, currents Iac and Ica are supplied for the generation of the torque of Formula (42). The magnetic flux $\omega ac$ shown by F01 is generated between the AC-phase stator pole A01 and the rotor salient pole A0K to thereby generate torque in the counterclockwise direction CCW.

Currents Iba and Iba are supplied between $\theta r=45$ degrees and 75 degrees shown in FIGS. 3, 4, 5 and 6 to generate torque of Formula (54). The magnetic flux $\omega ba$ is generated between the BA-phase stator poles and the rotor salient poles to thereby generate torque in the counterclockwise direction CCW. Even when currents Iac and Ica are supplied between about $\theta r=20$ degrees and 45 degrees shown in FIG. 2, harmful negative torque is not generated because a gap is formed in the vicinity of the BA-phase stator poles. Accordingly, assuming a high-speed rotation of some degrees, currents Iba and Iab are supplied in advance between about $\theta r=20$ degrees and 45 degrees. After all, currents Iba and Iab are supplied between $\theta r=20$ degrees and 75 degrees.

Currents Icb and Ibc are supplied between $\theta r=75$ degrees and 105 degrees shown in FIGS. 7 and 8 to generate torque of Formula (61). The magnetic flux $\omega cb$ is generated between the CB-phase stator poles and the rotor salient poles to thereby generate torque in the counterclockwise direction CCW. Even when currents Icb and Ibc are supplied between about $\theta r=50$ degrees shown in FIG. 56 and $\theta r=75$ degrees shown in FIGS. 5 and 6, harmful negative torque is not generated because a gap is formed in the vicinity of the BA-phase stator poles. Accordingly, assuming a high-speed rotation of some degrees, currents Icb and Ibc are supplied in advance between about $\theta r=50$ degrees and 75 degrees. After all, currents Iba and Iab are supplied between $\theta r=20$ degrees and 75 degrees.

Regarding the current components supplied in advance, the same applies to current Iac. Currents Iac and Ica as a leading current IFP are supplied in advance between about $\theta r=-10$ degrees and 15 degrees. After all, currents Iac and Ica are supplied between $\theta r=-10$ degrees and 45 degrees.

Similarly, regarding rotational position of $\theta r=105$ degrees onwards, current components Iac, Iba and Icb are supplied as shown in FIG. 30 to generate substantially uniform torque, thereby achieving continuous rotation in the counterclockwise direction. In this case, currents Ia, Ib and Ic supplied to the phase windings shown in FIG. 1 are expressed by Formulas (4), (5) and (6), providing values of currents Ia, Ib and Ic shown in FIG. 30. All of the currents are substantially supplied throughout the all ranges of the rotational position, although in parts of which values of currents are large.

With the currents having such waveforms, the stator poles will not generate negative torque, i.e. torque in the counterclockwise direction, throughout all ranges of the rotational position. Moreover, there is room for the increase of current in a high-speed range. For example, when torque in the counterclockwise direction CCW is generated, the AC-phase stator poles seem to generate torque components in the clockwise direction if the C-phase current Ic is supplied during the supply of the A-phase current Ia, in a range from $\theta r=55$ degrees to 67.5 degrees shown such as in FIGS. 4, 5 and 6. In this regard, as shown in FIG. 30, under the control of the present invention as explained above, both of A- and C-phase currents Ia and Ic are supplied in a range of $\theta r=55$ degrees to 67.5 degrees. However, the AC-stator poles never generate torque in the clockwise direction CW in this range.

The leading current IFP corresponding to the current components supplied in advance as explained above contributes to preventing not only the delay of rising of currents but also the overlap of two types of voltage components. For example, when the AC-phase stator poles are concerned, the voltage V2ac in Formula (38) is expressed as a sum of the first and second terms of the differential equation. The first term of the differential equation corresponds to voltage components accompanying the increase of current Iac, while the second term thereof corresponds to time rate of change of the rotational position θr of the rotor, i.e. voltage components proportional to the number of rotations ωr. If current Iac is increased starting from the position around θr=−10 degrees and becomes constant around θr=15 degrees, the voltage V2ac in Formula (38) can be decreased as shown in Formula (40) in the vicinity of θr=15 degrees.

In practice, when phase currents become large, magnetic flux leakage at slot openings between stator poles becomes too large to ignore, and thus the voltage components are added to the first term of the differential equation of Formula (38). The first term of the differential equation, i.e. the voltage components, cannot be neglected from the viewpoint of the current control. The leading current IFP is supplied before the stator poles face the salient rotor poles, and thus no torque is generated at this point. However, magnetic energy ELI shown in the following Formula (131) is efficiently used when the stator poles face the rotor salient poles later and converted to torque.

$$ELI = \text{(Leading current} \times \text{Interlinking magnetic flux such as leaked magnetic flux} \times \text{Number of turns causing interlinkage of magnetic flux)} \quad (131)$$

The leading current IFP and its voltage correspond to energy effective in generating torque and thus are not useless. Rather, in a current supply method shown in FIG. 10, the leading current IFP is supplied using the time when not used and the energy ELI is supplied from the power supply to the motor. Therefore, the energy transfer efficiency in the control circuit shown such as in FIG. 9 is regarded as being increased. For example, in a state shown from FIGS. 5 to 6, the CB-phase stator poles A05 and A02 are excited by supplying the leading current IFP to the CB-phase current components Icb and Ibc. This may mean that the CB-phase stator poles A05 and A02 are used, at the rotational position θr, as choke coils that are able to collect magnetic energy.

In the current supply method in a low-speed range, as shown in FIG. 10, the timing of the start of torque generation coincides with the timing of current increase. For example, when the AC-phase stator poles are concerned, in Formula (38) showing the voltage V2ac, the first and second terms of the differential equation indicate large values at the same timing. Accordingly, as the number of rotations ωr increased, the phase voltages Va, Vb and Vc of the phase windings Wa, Wb and Wc are increased, while torque is decreased because the increase of currents is limited.

Further, in the current supply method shown in FIG. 10, when the number of rotations is increased, current of a certain phase is required to be decreased in quite a short time, while current of a different phase is increased. This is difficult when the number of rotations exceeds a certain level. Further, when the width of a stator pole is increased to more than 30 degrees, the angular range of generating negative torque is increased, for example, adding constraints to the structure of the motor.

In the method of the present invention, only the required current components of a phase can be increased/decreased within an allowable time range. Therefore, the inconvenience regarding time explained above can be eliminated. Further, the method of the present invention is based on the premise that only the required current components of a phase are supplied at a required rotational angle. Accordingly, for example, the width of a stator pole can be increased or the width of a rotor salient pole can be increased, thereby drastically reducing the structural constraints in designing a motor. As a result, a rotational angle range for increasing current and a rotational angle range for decreasing current are both ensured. Thus, torque can be increased while the current capacity of a control device can be decreased.

Further, regarding the leading current IFP supplied in advance, it is effective to reduce the angle width when the number of rotations is small, in order that the loss in winding resistances due to Joule heat is reduced. Further, the voltage components shown in the first term of the differential equation of Formula (38) are less in an extremely low-speed range. Accordingly, the leading current IFP supplied in advance in each phase is not necessary. With the currents shown in FIG. 10, continuous torque can be generated.

Figure 31:
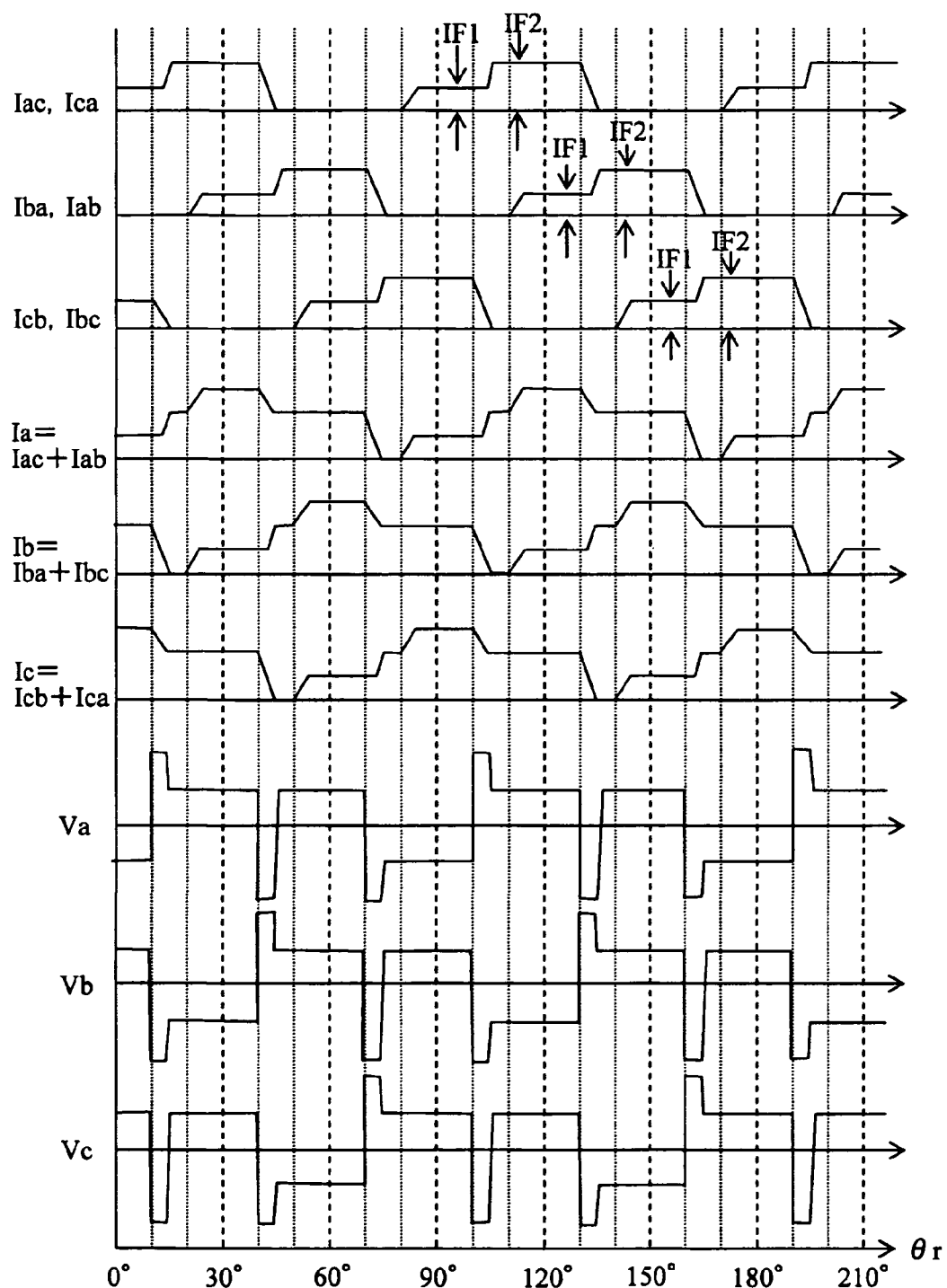
FIG. 31 is a timing chart exemplifying the currents of the motor shown in FIG. 1, which are controlled by the control circuit shown in FIG. 27.

FIG. 31 shows another example of specific currents under the control based on the configurations shown in FIGS. 28, 27 and 29. FIG. 31 shows an example of operation in a current region where torque larger than in FIG. 30 is generated and the density of magnetic flux excited by the current of each phase corresponds to a saturated magnetic flux density.

First, current components Iac and Ica of the AC-phase stator poles are discussed.

In FIG. 7, the rotational position of the rotor is θr=75 degrees. For the rotor salient pole adjacently located on the CW side of the rotor salient pole, the rotational position is θr=−15 degrees. From around θr=−10 degrees in the counterclockwise direction from the rotational position, a gap is formed in the vicinity of the AC-phase stator pole A01 and thus no harmful negative torque is generated. Accordingly, assuming high-speed rotation of some degrees, currents Iac and Ica as a leading current IFP are supplied between about θr=−10 degrees to 15 degrees. The current has a magnitude of IF1 that is a current of a level at which the magnetic flux density turns to saturated magnetic flux density when the AC-phase stator poles face the rotor salient poles. The current IF1 may be regarded as a field current.

Between θr=15 degrees and 45 degrees of FIGS. 1 and 2, the AC-phase stator poles face the rotor salient poles, and torque of Formula (89) is generated when current of magnitude IF2 is supplied as currents Iac and Ica. The magnetic flux ωac shown by F01 is generated between the AC-phase stator pole A01 and rotor salient pole A0K to thereby generate torque in the counterclockwise direction.

An operation similar to AC-phase is performed for currents Iba and Iab of the BA-phase stator poles. Thus, as shown in FIG. 31, currents Iba and Iab are delayed in phase by 30 degrees with respect to the AC-phase.

An operation similar to BA-phase is also performed for currents Icb and Ibc of the CB-phase stator poles. Thus, as shown in FIG. 31, currents Icb and Ibc are delayed in phase by 30 degrees with respect to the BA-phase. In this case, currents Ia, Ib and Ic shown in FIG. 31, which are supplied to the phase windings, are expressed by Formulas (4), (5) and (6) and have the values shown in FIG. 31. The currents are substantially supplied throughout all ranges of rotational position, although in parts of which values of currents are large.

With the currents having such waveforms, the stator poles will not generate negative torque, i.e. torque in the counterclockwise direction, throughout all ranges of the rotational position. Moreover, there is room for the increase of current in a high-speed range. The phase of starting supply of the current IF1 and the magnitude of current may be determined as appropriate based on the features unique to the motor, the magnitude of torque and the number of rotations ωr.

The voltage Va of the A-phase winging Wa is expressed by Formula (122) and will substantially be the voltage Va as shown in FIG. 31, although not simple. The voltage Vb of the B-phase winding Wb is expressed by Formula (124) and the voltage Vc of the C-phase winding We is expressed by Formula (122), the both substantially being the voltages Vb and Vc as shown in FIG. 31.

As explained above, improvement can be achieved in the first problem regarding the complicated electromagnetic relationship in a full-pitch winding SRM and the second problem regarding the magnetic non-linearity.

(Sixth Embodiment)

Hereinafter is specifically explained a motor related to a sixth embodiment.

Figure 32:
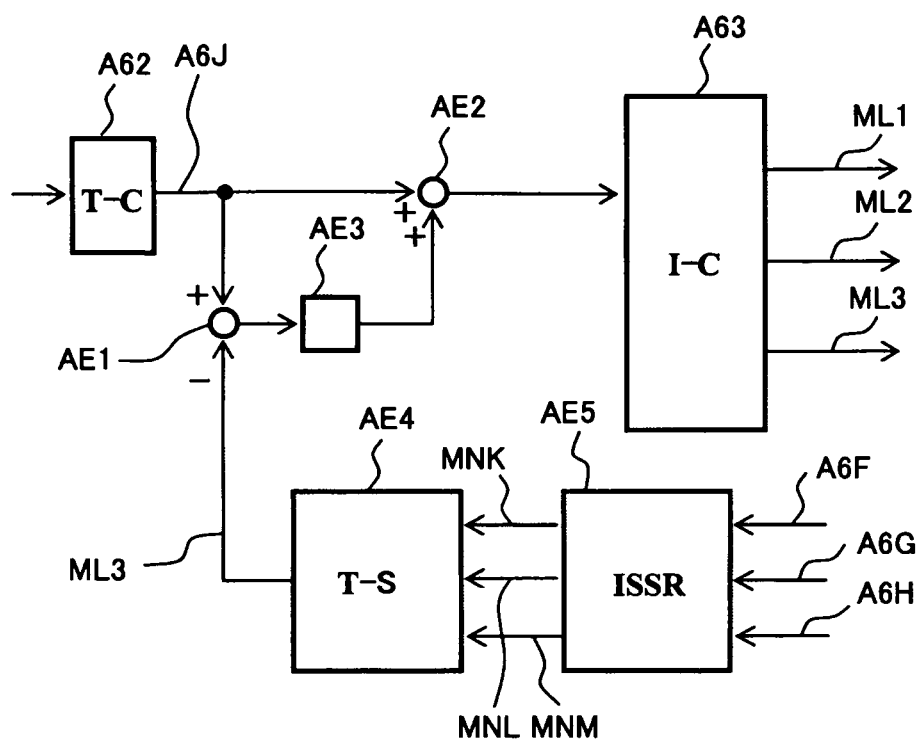
FIG. 32 is a diagram exemplifying the control of torque.
Figure 62:
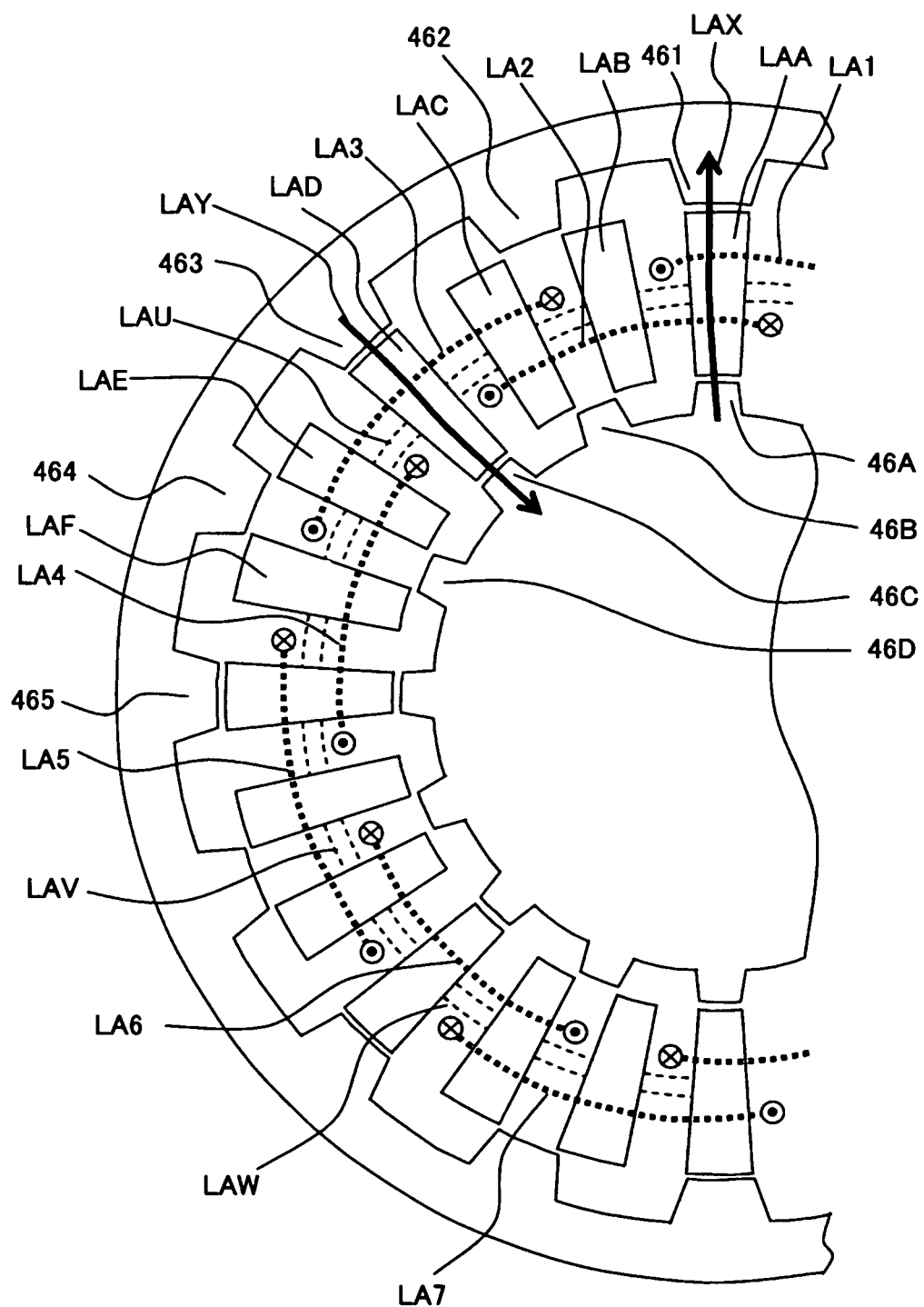
FIG. 62 is a partial lateral section showing the configuration of a motor produced similarly to that shown in FIG. 61, but a positional relationship between the motors positioned on the radially outer and inner sides differs from that shown in FIG. 61 in the phase of an electrical angle of 180 degrees in the circumferential direction.

FIG. 32 shows an example of compensated control for more accurately control a torque command To of A63 that is an output of the torque control means A62 shown in FIG. 62.

Reference AE4 shows a torque detecting means TS for calculating a torque estimate ML3 based on the AC-, BA- and CB-phase current component detection values Iacs, Ibas and Icbs and the information regarding the rotational position θr of the rotor. For example, the estimate ML3 can be calculated according to the rotational position θr, using Formulas (42), (54) and (61), or Formulas (68), (75) and (82), or Formulas (89), (96) and (102), or Formulas (108), (114) and (120). As a method of more accurately estimating motor torque, a database may be prepared in the form of a table using a finite element method, for example, regarding combinations of the rotational position θr with the phase currents or the phase current components. Then, according to the rotational position θr and the current component detection values Iacs, Ibas and Icbs of the phases, torque is calculated using interpolation method based on the values in the finite quantity database.

An element EA1 subtracts the torque estimate ML3 from the torque command information of A6J to calculate a torque error. An element AE3 calculates a torque error compensated value using a compensator. An element AE2 adds the torque error compensated value to the torque command information A6J to input a new torque command value to the current control means A63. The current control means A63 outputs three-phase current command values ML1, ML2 and ML3. Thus, control is performed by estimating a motor torque value and compensating a torque error, whereby current, voltage and torque can be controlled by compensating the non-linear characteristics. In particular, in a high-speed region, torque ripple tends to increase due to the constraints on current. Thus, the configuration for the compensated control of torque as shown in FIG. 32 is effective.

Figure 33:
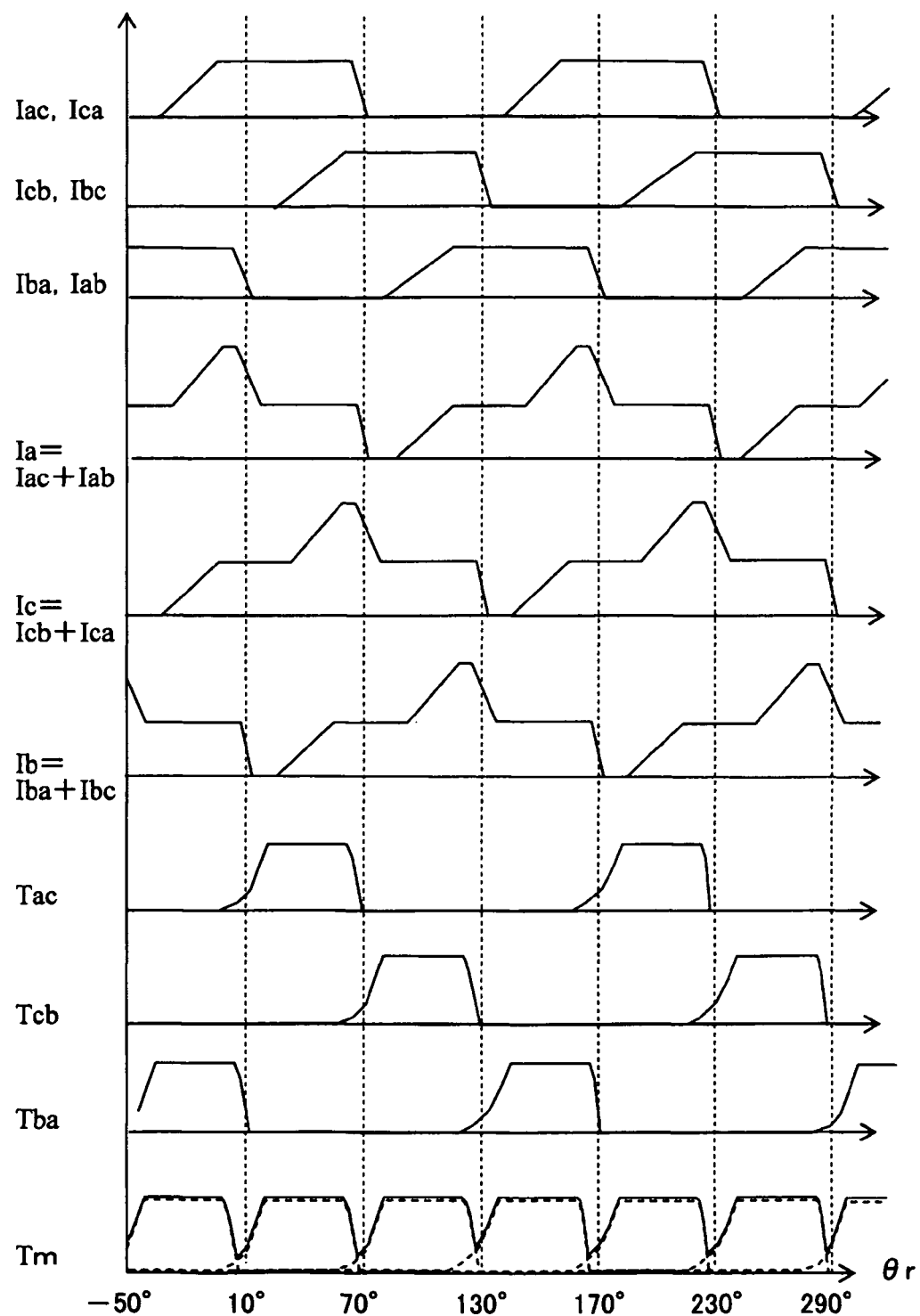
FIG. 33 is a timing chart exemplifying the currents and voltages of the motor shown in FIG. 21.

Referring to an example shown in FIG. 33, hereinafter is explained a motor configuration in which two rotor salient poles are provided in a range of 360 degrees in electrical angle. In a low-speed range, the current shown in FIG. 23 can be used for the control. However, when the number of rotations is increased, the current components Iac, Icb and Iba are rendered to be as shown in FIG. 33. For example, in FIG. 21, the AC-phase stator pole shown by MJ7 begins to face the rotor salient pole MJE at θr=10 degrees. At a timing earlier than this position by an electrical angle of 40 degrees, supply of the AC-phase current component Iac is started to reduce the rate of current increase. Current components Icb and Iba of other phases also have a phase difference of an electrical angle of 60 degrees, but are similar currents. In this case, In this case, the currents Ia, Ic and Ib are as shown in FIG. 33. If the number of rotations is increased to some extent, current can be passed naturally from the viewpoint of voltage. In the current supply method of FIG. 23, the burden imposed on voltage is increased and thus currents have to be limited.

However, the current supply method of FIG. 33 raises a problem of increasing maximum currents of the phase currents Ia, Ic and Ib. As a measure against this, a modification may be made such that the burdens of currents of the transistors are eliminated when the supplied currents approximate to maximum currents that can be supplied. For example, in a region where the maximum values of the currents Ia, Ic and Ib are increased, both of two the current components are decreased slowly, or the current phases are modified.

(Seventh Embodiment)

Hereinafter is specifically explained a motor related to a seventh embodiment.

As shown in the examples of FIGS. 30 and 31, in the full-pitch winding SRM shown such as in FIG. 1, the current supply width of the phase currents Ia, Ib and Ic is about 85 degrees in electrical angle, and the width of a range where no current is supplied is about 5 degrees. The width of the current supply angle of each phase current is larger than that based on conventional art, but the range where no current is supplied is narrow. This relationship may be expressed as follows. Specifically, let us supposed that a stator pole has a circumferential width of Ht in electrical angle, a rotor pole has a circumferential width of Hm in electrical angle, the smaller one of Ht and Hm has an angle Hn. In this case, the width of current supply angle at which current is supplied to each phase winding with the rotation of the rotor is larger than 2×Hn in electrical angle. The same applies to the current characteristics shown in FIG. 33 of the motor shown in FIG. 21. Specifically, the width of the rotor pole is about 60 degrees in electrical angle, while the current supply width of the phase currents Ia, Ib and Ic in action is about 160 degrees in electrical angle and the region where the phase currents are not in action ranges about 20 degrees in electrical angle.

Thus, while the phase currents are each controlled as oneway current torque is generated with an attraction force, in most of the ranges, the phase voltages Va, Vb and Vc and the currents Ia, Ib and Ic are effectively used to generate torque. In FIGS. 30, 31 and 33, the stator poles of each phase generate torque only in the counterclockwise direction and there is no range where torque in the clockwise direction is generated. In particular, as the speed range is shifted from an extremely low-speed range to a higher-speed range, the current supply width of the phase currents Ia, Ib and Ic may be increased for effective use.

As already explained, the leading current IFP is supplied so that the magnetic energy ELI is supplied from the power supply to the motor. Thus, the energy transfer efficiency of the control circuit shown such as in FIG. 9 may be concluded as being increased. As explained so far, it is effective to supply current components attracted to current stator poles and rotor salient poles generating torque, at a time point earlier than the timing when the stator poles begin to face the rotor salient poles. This is effective from the viewpoints that: the time for the current increase is ensured; the burden of voltage of the control circuit is mitigated by allowing the current increase components of the winding voltage not to overlap with the rotational angular speed components; and energy supply can be increased from the power supply side to the motor side. The attraction force mentioned above does not refer to the repulsive force that causes the N poles of a permanent magnet, for example, to repel each other, but refers to the attraction force that causes an N pole and an S pole to be attracted to each other.

(Eighth Embodiment)

Hereinafter is specifically explained a motor related to an eighth embodiment.

FIG. 9 shows an example of a control circuit that controls currents of a motor shown such as in FIGS. 1 and 16, in which, when an integer is expressed by NN1=1, six stator poles are arranged in an electrical angle of 360 degrees. This control circuit is structurally included in the motor.

As explained above, in the operation of the control circuit shown in FIG. 9, voltage is applied to the A-phase winding Wa as shown by 87D by turning on the transistors 871 and 872 to increase the A-phase current Ia. When only one of the transistors 871 and 872 is in an on-state, a closed circuit is formed by the A-phase winding Wa, the transistor in an on-state, and the diode to continue a current supplied state. When both of the transistors in an off-state, current is reversely supplied to a power supply 87G via diodes 877 and 878. In this case, the magnetic energy of the A-phase winding is regenerated to the power supply side to decrease the A-phase current Ia. Thus, increase/decrease of the A-phase current Ia, and supply/regeneration of energy can be conducted.

Similar control can be applied to the B- and C-phase currents Ib and Ic. Five or seven phases where NN1 is two or more can be realized by similarly increasing the number of phases of the control circuit.

The phase currents Ia, Ib and Ic correspond to the phase currents calculated by Formulas (4), (5) and (6) and are supplied as a means for supplying the current components Iac, Iba and Icb. Further, the phase currents are in a complicated electromagnetic relationship, as shown in FIG. 13 but are electrically separated as shown in FIG. 9. Accordingly, the three-phase currents can be parallelly and independently supplied. In addition, the currents supplied in the configuration shown in FIG. 9 are one-way currents. These currents act in a way different from the three-phase AC currents or voltages that are controlled by establishing a star connection, for example, in a three-phase AC motor of conventional art.

Figure 34:
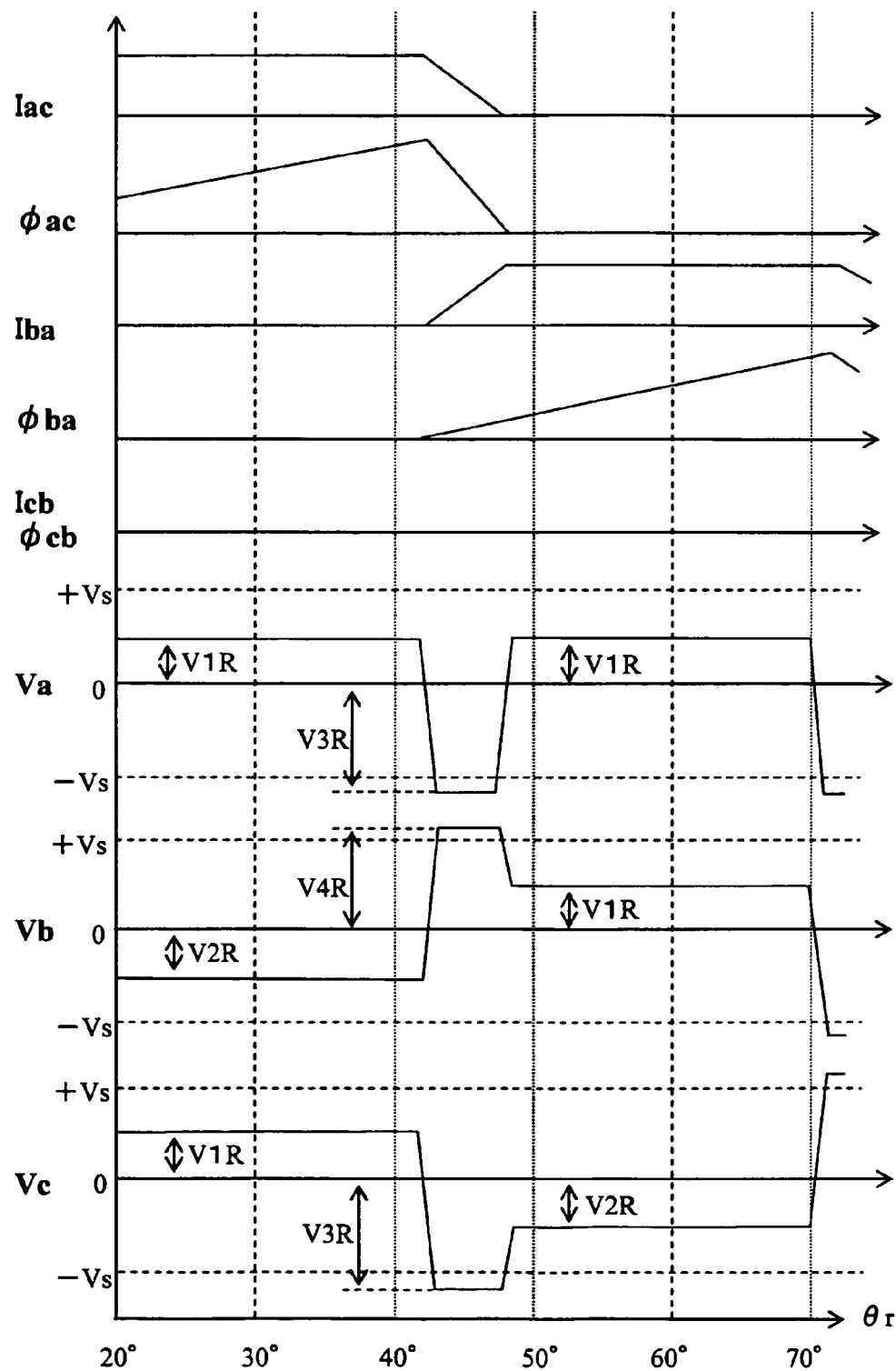
FIG. 34 is a timing chart showing a drawback about the voltages.

Referring to FIG. 34, hereinafter are explained problems caused by saturation of control voltage, which is likely to occur when using the current supply method shown in FIG. 10 such as in an extremely low-speed range. FIG. 34 shows examples of such problems. In particular, these problems tend to occur when large current is used in a high-speed region. FIG. 34 shows an enlarged view of a range from 20 degrees to 70 degrees of the rotational position θr of the rotor. FIG. 34 is provided on the premise that the motor shown in FIGS. 1 and 16 generates constant torque in the counterclockwise direction CCW, while rotating with a constant number of rotations in the counterclockwise direction. The motor model provided here allows overlap of torque between the AC-phase stator poles and the BA-phase stator poles. In each phase of the motor model, each stator pole has a circumferential width of Ht=35 degrees, and each rotor salient pole has a circumferential width of Hm=35 degrees.

When the rotational position θr falls in a range of 20 degrees to 70 degrees, the current components correspond to the current components Iac, Iba and Icb shown in FIG. 34. The component Iac decreased in a range of 42.5 degrees to 47.5 degrees. The component Iba increases in a range of 42.5 degrees to 47.5 degrees. The component Icb is zero in these ranges. In this case, the rotational positions are shown in FIG. 1, 2, 3 or 4. As shown in FIG. 34, the AC-phase magnetic flux φac as shown by F01 increases with the increase of the area where the stator pole and the rotor salient pole face with each other in a θr's range from 12.5 degrees to 42.5 degrees, and decreases substantially in proportion to the decrease of the AC-phase current Iac from 42.5 degrees. Also, as shown in FIG. 34, the BA-phase magnetic flux φba as shown by F02 increases with the increase of the area where the stator pole and the rotor salient pole face with each other in a θr's range from 42.5 degrees to 72.5 degrees, and decreases substantially in proportion to the decrease of the BA-phase current Iba from 72.5 degrees. The CB-phase magnetic flux φcb is zero in a θr's range of 20 degrees to 70 degrees in the time diagram shown in FIG. 34.

In the control circuit shown in FIG. 9, voltages and currents are supplied to the individual phase currents. Reference Vs shows a DC voltage of the power supply 87G. In the rotation operation as explained above, the voltage Va of the A-phase winding Wa shown by 87D has a waveform of Va shown in FIG. 34. The voltage Vb of the B-phase winding Wb shown by 87E has a waveform of Vb shown in FIG. 34. The voltage Vc of the C-phase winding Wc shown by 87F has a waveform of Vc shown in FIG. 34. The control circuit of FIG. 9 is applied with rectangular minute pulse voltage with its duration being controlled by turning on/off the transistors using pulse-width modulation (PWM). In FIG. 34, however, an average of the PWM voltage is shown.

When the rotational position θr falls in a range of 20 degrees to 42.5 degrees, the voltage Va shown in FIG. 34 is indicated by V1R. An induced voltage component Vra of the voltage Va is given by Formula (121). However, as shown in FIG. 34, only the AC-phase magnetic flux φac is supposed to be present in this range.

Formula (84) may be used for substitution.

$$Vra = Nw \times d\phi ac/dt \quad (132)$$
$$= Nw \times d\{Bmax \times R \times (\theta r - \theta off) \times tc\}/dt$$
$$= Nw \times Bmax \times R \times tc \times \omega r \quad (133)$$

The value of the component Vra corresponds to the induced voltage of the motor and thus in proportion to the rotational angular speed ωr.

Let us suppose that an average voltage drop of the transistors 871 and 872 and the diodes 877 and 878 is shown by VTD as an approximate value, and that winding resistance is Ra. Further, let us suppose that, including the voltage of Formula (133), the motor is operated with the duty of the transistors in an on-state being just 50%. In this case, the A-phase voltage V1R is expressed by the following formulas:

$$Vs/2 = Nw \times d\phi ac/dt + VTD + Ia \times Ra \quad (134)$$
$$Va = V1R = Nw \times d\phi ac/dt + Ia \times Ra \quad (135)$$
$$= Vs/2 - VTD$$

When the rotational position θr falls in a range of 20 degrees to 42.5 degrees, the C- and A-phase currents are the same and thus in substantially the same condition. Thus, the following formula is obtained:

$$Vc = V1R = Vs/2 - VTD \quad (136)$$

In this case, no current passes through the B-phase winding and thus the B-phase voltage Vb is expressed as follows:

$$Vb = -V2R = -Nw \times d\phi ac/dt \quad (137)$$
$$= -(Vs/2 - VTD - Ia \times Ra)$$

As explained above, when the rotational position θr falls in a range of 20 degrees to 42.5 degrees in FIG. 34, the A- and C-phase voltages Va and Vc are expressed by Formulas (135) and (136), and the B-phase voltage Vb is expressed by Formula (137). Since all of them are approximate to the power supply voltage Vs, current can be freely increased/decreased using the control circuit shown in FIG. 9. There is no problem in the controllability of current. However, it should be noted that the B-phase voltage Vb is slightly different from the voltages Va and Vc not only in the positive/negative symbol but also in the voltage amplitude.

Let us discuss similarly regarding the phase voltages when the rotational position θr falls in a range of 42.5 degrees to 47.5 degrees in FIG. 34. When a stator pole has a width of 35 degrees, the state shown in FIG. 2 corresponds to θr=47.5 degrees. The operation in this vicinity is discussed. In this range, the AC-phase current Iac is about to be drastically decreased, while, in parallel, the BA-current component Iba is about to be increased. There is no problem if the motor operates in a low-speed range and the induced voltage of the motor falls in a small range. However, when the induced voltage becomes large, the power supply voltage Vs is constrained. Therefore, the problem of saturation of the power supply voltage arises, leading to complicated voltage behavior.

For example, currents Ia and Ic are reduced to drastically reduce the AC-phase magnetic flux φac, the transistors 871 and 872 and the transistors 875 and 876 are turned off, and the magnetic fluxes φba and φcb are zero. In this state, the A-phase winding voltage Va and the C-phase voltage Vc are expressed as follows:

$$Vs = -(Nw \times d\phi ac/dt + VTD + Ia \times Ra) \quad (138)$$

$$\begin{aligned} Va &= -V3R \\ &= -(Nw \times d\phi ac/dt + Ia \times Ra) \\ &= Vs + VTD \end{aligned} \quad (139)$$

$$Vc = Vs + VTD \quad (140)$$

In this case, substituting Formula (138), the B-phase voltage Vb is expressed as follows:

$$\begin{aligned} Vb &= -V4R \\ &= -Nw \times d\phi ac/dt \\ &= Vs + VTD + Ia \times Ra \end{aligned} \quad (141)$$

As shown in Formula (141), the B-phase voltage Vb exceeds the power supply voltage Vs at the timing when the B-phase current Ib is about to be increased in the vicinity of θr=42.5 degrees. In this state, the B-phase current Ib can no longer be supplied even when the transistors 873 and 874 are turned on. In particular, the voltage saturation is problematically prominent when the supply current is large, the motor operates in a high-speed range, and the winding resistances Ra, Rb and Rc are large.

Further, in the control circuit shown in FIG. 9, at the timing when, for example, the transistors 871 and 872 are turned on and the A-phase current Ia is simply increased, the voltage Vra applied to the windings of other phases is expressed as follows:

$$Vra = Vs - VTD - Ia \times Ra \quad (142)$$

The voltage Vra will not exceed the power supply voltage. In particular, if the resistance voltage drop (Ia×Ra) is large, the influence on other phases are small accordingly. As shown by Formula (141), drastic decrease of current influences greatly on the voltage of the windings of other phases. When the current control as shown in FIG. 30, 31 or 33 is performed, it is required, for example, to vary the phase of increasing each phase current, from the phase of decreasing each phase current.

(Ninth Embodiment)

Hereinafter is specifically explained a motor related to a ninth embodiment.

Figure 35:
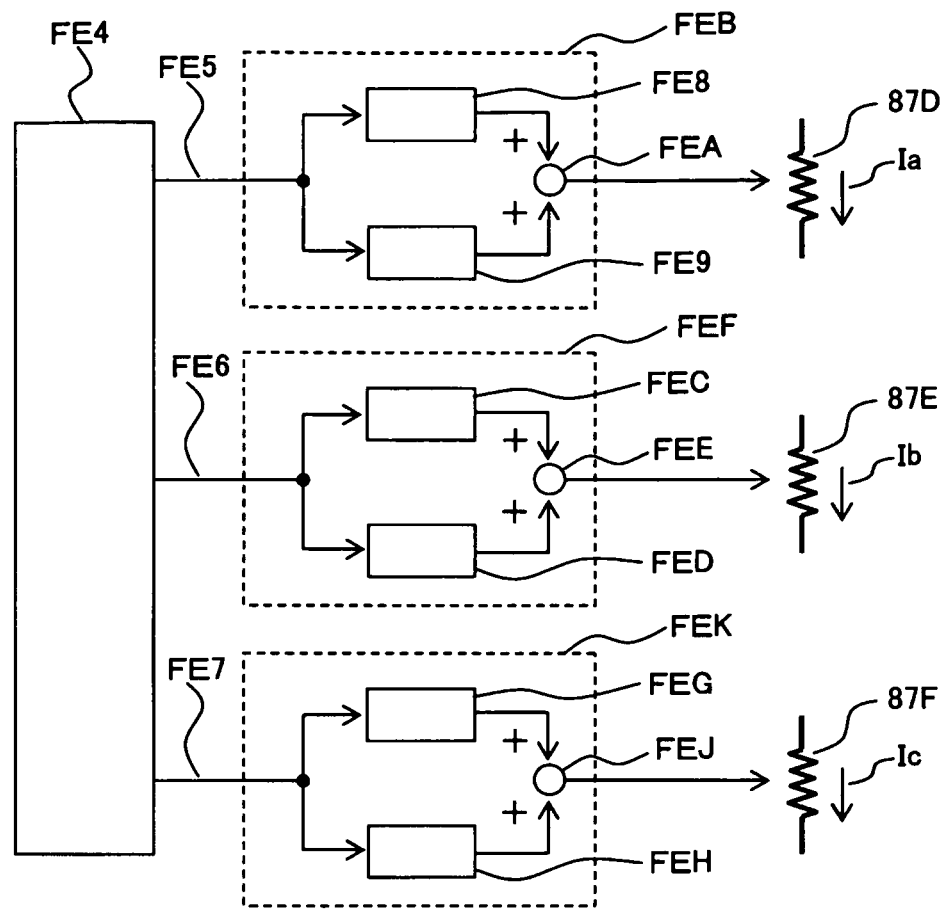
FIG. 35 is a diagram pictorially showing the control of voltages of the motor according to the present invention.

FIG. 35 shows a configuration of the power converter A65 shown in FIG. 26. Reference FE4 shows the voltage control means A64 shown in FIG. 26. Reference FE5 shows the A-phase voltage command Vao, reference FE6 shows the B-phase voltage command Vbo and reference FE7 shows the C-phase voltage command Vco. Reference 87D shows the A-phase winding Wa, reference 87E shows the B-phase winding Wb and reference 87F shows the C-phase winding Wc. Reference FE8 shows a power conversion section that produces A-phase positive voltage, and reference FE9 shows a power conversion section that produces A-phase negative voltage. The A-phase positive and negative voltages are composed by an adder FEA and the composed voltage is supplied to an A-phase winding 87D to pass the A-phase current Ia therethrough. Reference FEC shows a power conversion section that produces B-phase positive voltage, and reference FED shows a power conversion section that produces B-phase negative voltage. The B-phase positive and negative voltages are composed by an adder FEE and the composed voltage is supplied to a B-phase winding 87E to pass the B-phase current Ib therethrough. Reference FEG shows a power conversion section that produces C-phase positive voltage, and reference FEH shows a power conversion section that produces C-phase negative voltage. The C-phase positive and negative voltages are composed by an adder FEJ and the composed voltage is supplied to a C-phase winding 87F to pass the C-phase current Ic therethrough.

A portion FEB shown by a broken line is an A-phase power converter. For example, reference FEB shows the transistors 878 and 872 and the diodes 877 and 878 of FIG. 8. When a motor configuration is more closely related to the control circuit, FEB may also include a winding configuration of the motor. Similar to the A-phase, portions FEF and FEK shown by broken lines are B- and C-phase power converters.

In the configuration explained above, maximum voltages of the power conversion sections FE8, FEC and FEG that produce positive voltages are ensured to be larger than the voltage amplitudes of the power conversion sections FE9, FED and FEH that produce negative voltages. When the power conversion sections that produce positive voltages have larger voltages, the problem of voltage saturation as shown by Formula (141) is mitigated in the power converter A65.

(Tenth Embodiment)

Hereinafter is specifically described a motor related to a tenth embodiment.

Figure 36:
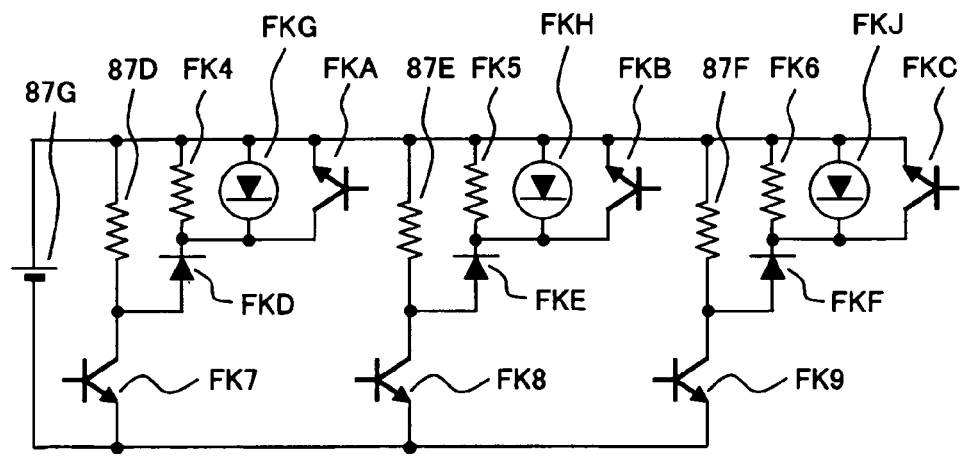
FIG. 36 exemplifies a control circuit to alleviate the drawback about the voltages.

In FIG. 36, the power conversion sections FE8, FEC and FEG that produce positive voltages as shown in FIG. 35 correspond to transistors FK7, FK8 and FK9. A-phase power conversion sections corresponding to the power conversion sections FE9, FED and FEH that produce negative voltages as shown in FIG. 35, are provided by the combinations of a diode FKD and resistor FK4, a Zener diode FKG, a transistor FKA and the like. When the transistor FK7 is turned off, the A-phase current Ia passes through an A-phase winding 87D. The A-phase current Ia is supplied to the elements FK4, FKG and FKA. Thus, the magnetic energy in the A-phase winding 87D is consumed to thereby reduce the A-phase current Ia. In this case, the resistance of the resistor FK4, the voltage of the Zener diode FKG and the like are determined, so that the voltage generated across the resistor FK4 will be smaller than the voltage of the power supply 87G.

Similarly, regarding a B-phase winding 87E as well, the power conversion sections are configured by a diode FKE and resistor FK5, a Zener diode FKH and a transistor FKB. Similarly, regarding a C-phase winding 87F as well, power conversion sections are configured by a diode FKF and resistor FK6, a Zener diode FKJ and a transistor FKC.

For example, the configuration as shown in FIG. 36 may be effective in the application to a small motor, such as a fan, which is used in a one-way rotation mode. In particular, in a configuration added with a field winding explained later, field energy in the motor is circulated in the motor via the field winding. Therefore, the energy consumed in the circuit shown in FIG. 36 is reduced and thus the configuration shown in FIG. 36 is effective.

(Eleventh Embodiment)

Hereinafter is specifically described a motor related to an eleventh embodiment.

Figure 37:
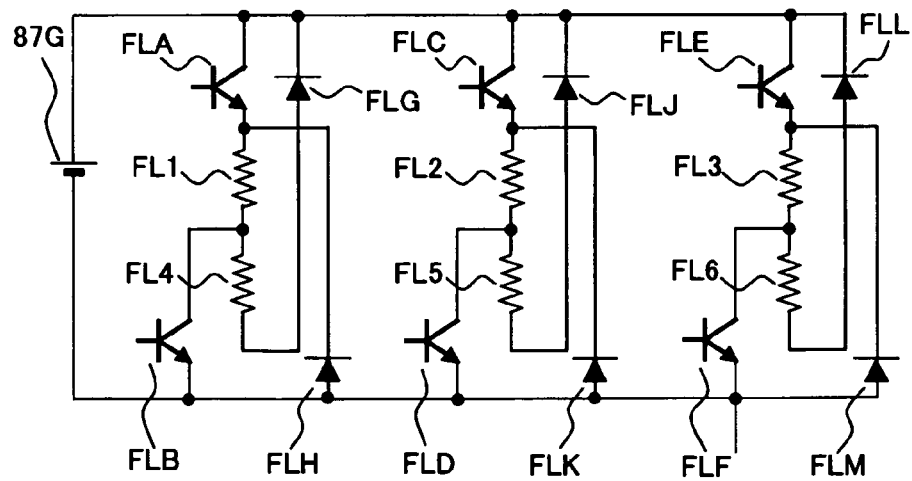
FIG. 37 exemplifies a control circuit and windings to alleviate the drawback about the voltages.

FIG. 37 shows a configuration in which two A-phase windings FL1 and FL4 are provided to the same slot and these windings are connected in series. Schematically, the windings are arranged as shown in FIG. 16. The two windings in the same slot may be may be provided as so-called bifilar windings in which two windings are wound in parallel, so that interlinked magnetic flux is shared therebetween as much as possible. In FIG. 37, the power conversion section FE8 that produces the A-phase positive voltage in FIG. 35 corresponds to transistors FLA and FLB. When these transistors are turned on, the voltage Vs of the power supply 87G is applied to the winding FL1.

The power conversion section FE9 that produces negative voltage corresponds, in FIG. 37, to the off control action of the transistors FLA and FLB and the voltage division performed by diodes FLG and FLH and the windings FL1 and FL4. When the transistors are turned off, voltages of the windings FL1 and FL4 are each limited, in the reverse direction, to the voltage Vs of the power supply 87G.

Thus, in the configuration, a change rate FBD is ensured to be lower than a change rate FFD. At the change rate FBD, the magnetic flux that interlinks the A-phase windings in turning off the transistors is decreased. At the change rate FFD, the magnetic flux that interlinks the A-phase windings in turning off the transistors is increased. The rate is expressed as follows:

*FBD/FFD*=(Number of turns of winding *FL*1)/(Total number of turns of windings *FL*1 and *FL*4)

Thus, when the current of the A-phase windings is decreased, the influence on the voltage given to other phases is ensured to be reduced.

The same applies to B-phase windings FL2 and FL5. Specifically, positive voltage is given by transistors FLC and FLD. When these transistors are turned off, the magnetic energy is regenerated to the power supply 87G via diodes FU and JLK. The same applies to C-phase windings FL3 and FL6. Specifically, positive voltage is given by transistors FLE and FLF. When these transistors are turned off, the magnetic energy is regenerated to the power supply 87G via diodes FLL and FLM.

(Twelfth Embodiment)

Hereinafter is specifically explained a motor related to a twelfth embodiment.

Figure 38:
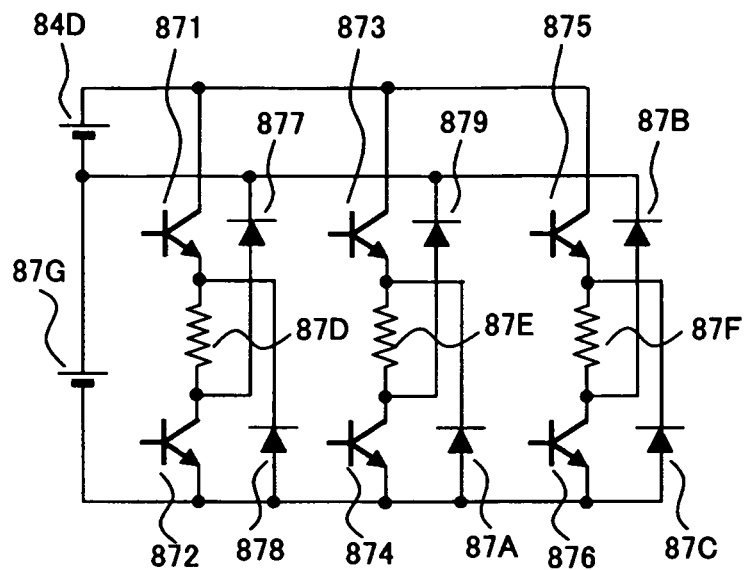
FIG. 38 exemplifies a control circuit to alleviate the drawback about the voltages.

FIG. 38 shows a configuration in which the control circuit shown in FIG. 9 is additionally provided with a power supply 84D. Further, connection destinations of the collectors of the transistors 871, 873 and 875 are changed to the positive side of the power supply 84D. With this configuration, a voltage VFD used in increasing the current of each phase winding is ensured to be larger than a voltage VBD used in decreasing the current of each phase winding. The voltage difference is equivalent to the voltage of the power supply 84D. Thus, when the current is decreased, the influence on the voltage given to other phases is ensured to be reduced.

(Thirteenth Embodiment)

Hereinafter is specifically described a motor related to a thirteenth embodiment.

Figure 39:
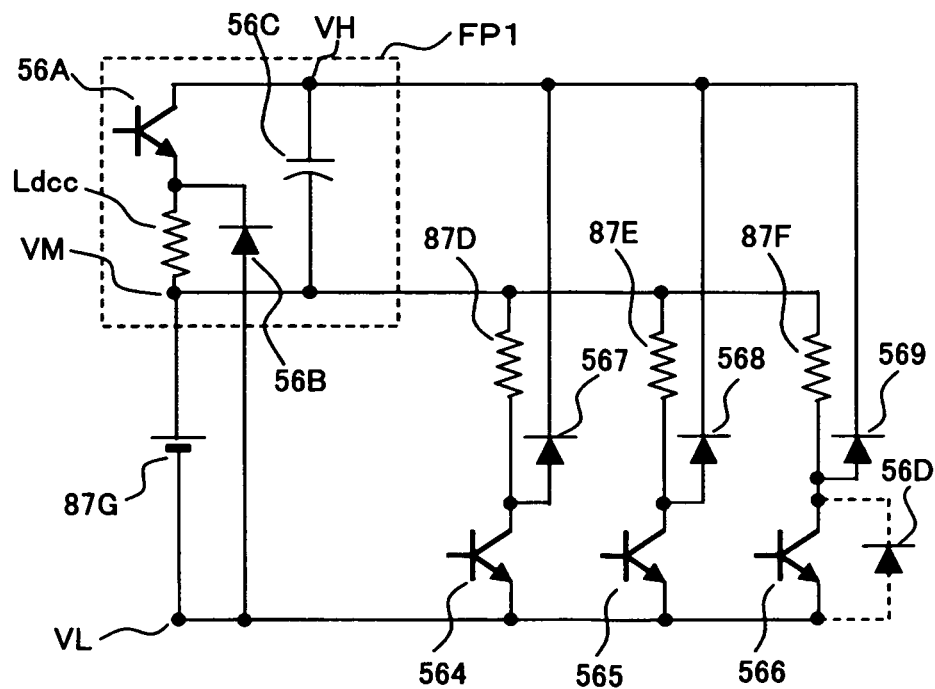
FIG. 39 exemplifies a control circuit in which the respective phase currents are controlled using one transistor.

FIG. 39 shows a configuration in which the voltage and current of three-phase windings are controlled using three transistors 564, 565 and 566 and three diodes 567, 568 and 569. Reference 56 shows a capacitor that charges and collects regenerated magnetic energy. A transistor 56A, a choke coil LDcc and a diode 56B transfer the electric charges of the capacitor 56C to the power supply 87G. A portion FP1 enclosed by a broken line has a configuration of a DC-DC converter. The portion FP1 enclosed by the broken line also has a function of a single power supply, and thus may be replaced by a power supply, such as a battery, like the power supply 84D shown in FIG. 38.

Voltage is applied to the A-phase winding shown by 87D via a transistor 564 to increase the A-phase current Ia. When the transistor 564 is turned off, negative voltage is applied to the A-phase winding via a diode 567 to decrease the A-phase current Ia.

Regarding the B-phase winding shown by 87E as well, the current Ib can be increased/decreased and controlled, similar to the current Ia, by a transistor 565 and a diode 568. Regarding the C-phase winding shown by 87F as well, the current Ib can be increased/decreased and controlled, similar to the current Ia, by a transistor 566 and a diode 569. A protective diode 56D may be additionally provided so that negative voltage will not be applied to the transistors.

Hereinafter is explained the configuration of the control circuit shown in FIG. 39 in respect of the probability, in principle, of reducing the entire current capacity, reducing the size, and enhancing the efficiency, compared to the systems based on conventional art. Let us suppose that the voltage of the DC power supply 87G shown in FIG. 39 is 200 V, and each transistor has a current capacity of 10 A. For example, let us suppose that the rotor of the motor shown in FIG. 2 is rotated with a number of rotation ωr and is about to reach a rotational position θr=30 degrees shown in FIG. 2, and that only the AC-phase magnetic flux ωac is generated. In this case, the voltages Va and Vc of the A- and C-phase windings, respectively, are calculated based on Formulas (84) and (87) as follows:

$$Va = Vc = Nw \times B\max \times R \times tc \times \omega r \quad (143)$$

Let us suppose here that the voltage expressed by Formula (143) is just 200 V. In this case, a power P1 that is an output of an inverter and an input/output of the motor is expressed as follows:

$$P1 = (200\ V) \times (10A) \times (2\ \text{windings}) \quad (144)$$
$$= 4000[W]$$

Figure 40:
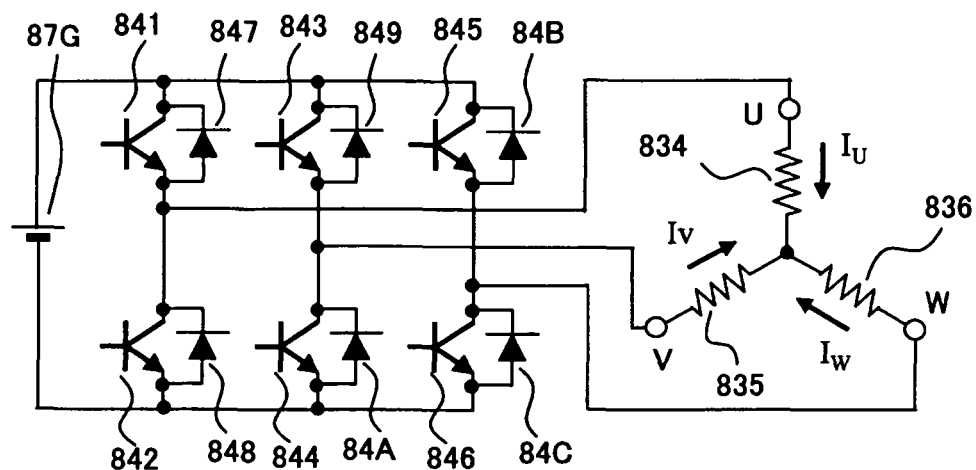
FIG. 40 is a circuit showing a control circuit for three-phase AC voltages and currents and a star connection of windings of a three-phase synchronous motor.

On the other hand, FIG. 40 shows a control circuit for three-phase AC voltage and current. In the control circuit, a three-phase AC motor, such as a brushless motor of the conventional art, includes star-connected windings 834, 835 and 836, six transistors 841, 842, 843, 844, 845 and 846, and six diodes 847, 848, 849, 84A, 84B and 84C. In this case as well, let us suppose that the voltage of the DC power supply 87G is 200 V and each transistor has a current capacity of 10 A. For example, let us supposed that the voltage of 200 V is applied to a V-phase winding 835 from a U-phase winding 834, and that the maximum current 10 A is supplied. An output P2 in this case is expressed as follows:

$$P2 = (200\ V) \times (10A) \qquad (145)$$
$$= 2000[W]$$

When current is supplied from the U-phase winding 834 to the V-phase winding 835 and a W-phase winding 836 half and half, as well, power of substantially the same level is supplied. Specifically, let us suppose that, in the system shown in FIG. 40, three-phase sinusoidal current is supplied to an extent that a maximum current of the transistor in use equals a peak current of the three-phase sinusoidal current, in a period when the induced voltage of the motor windings is approximate to the voltage of the DC power supply 87G. In this case, irrespective of the phase of the three-phase current, motor output of substantially the same level is obtained.

Let us compare the combination of the motor shown in FIG. 2 and the control circuit shown in FIG. 39 with the normally used three-phase AC motor and the control circuit shown in FIG. 40. An output of 4000 W is achieved with three transistors in the former, while an output 2000 W is achieved with six transistors in the latter. When an output per transistor is compared, the former is larger than the latter by a factor of four. When comparison is made on the same output basis, the motor of FIG. 2 and the control circuit of FIG. 39 require only three transistors and a current capacity of 5 A, i.e. both being a half of the latter, to achieve the same output of 2000 W.

It should be noted that the configuration of FIG. 39 is required to be provided with a DC-DC converter composed such as of the transistor 56A and that the withstand voltage of the transistors 564, 565 and 566 is required to be larger than 200 V.

As explained above, in each phase of the motor shown such as in FIG. 39, one-way current is passed. Accordingly, in each phase, current can be increased/decreased with a simple configuration of one transistor and one diode. Thus, a large feature resides in that the stator poles of the motor shown such as in FIG. 39 are concurrently excited by two windings located adjacent to each of the stator poles. Two windings are ensured to supply power. Further, each winding is shared between the circumferentially adjacently located stator poles for the excitation thereof. Thus, three windings can excite three sets of stator poles. As a result, comparing with the total current capacity of the transistors in a control circuit for a three-phase AC, the total current capacity of the motor of FIG. 2 and the transistors in the control circuit of FIG. 39 has a probability of being reduced by a factor of ¼.

In the configuration of the control circuit shown in FIG. 39, the number of elements, or transistors, is small, but compared with FIGS. 40 and 9, the burden of voltage of each transistor is large. However, as a general trend of IGBTs, for example, cost increase due to the increase of withstand voltage tends to be small, and thus the financial burden due to the increase of the burden of voltage is small. Further, there is a trend of enhancing the technology of providing high voltage. On the other hand, it is becoming difficult to freely change the voltage level of batteries in electric cars and hybrid cars, in light of the productivity, safety, standardization, and the like, of the batteries. Such a background provides a good reason for configuring the control circuit as shown in FIG. 39.

When similarly compared and calculated, there is a probability that the total current capacity of the transistors shown in FIG. 9 can be reduced to ½ compared to that of the transistors of conventional art. Further, the burden of voltage of each transistor in the configuration shown in FIG. 9 is about ½ of the burden of voltage in the configuration shown in FIG. 39.

In addition, in the configuration of FIG. 39, the voltage of the DC-DC converter FP1 shown by the broken line may be made smaller than the voltage of the power supply 87. Thus, when current is reduced, the influence on the voltage of other phases is ensured to be reduced.

(Fourteenth Embodiment)

Hereinafter is specifically explained a motor related to a fourteenth embodiment.

Figure 41:
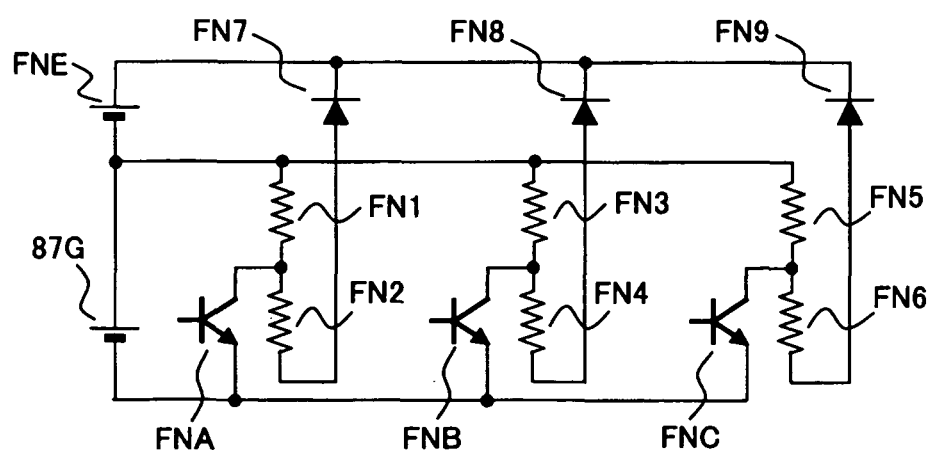
FIG. 41 is a diagram exemplifying windings to reduce drawbacks about voltage and a control circuit.

FIG. 41 shows an example of a configuration including two power supplies 87G and FNE, in which voltage VSS2 of the power supply FNE cannot be made smaller than voltage VSS1 of the power supply 87G. In FIG. 41, similar to the case of FIG. 37, two A-phase windings FN1 and FN2 are provided to the same slot and these windings are connected in series.

When a transistor FNA is turned on the voltage Vs of the power supply 87G is applied to the winding FN1. When the transistor FNA is turned off, voltages of the windings FN1 and FN2 are each limited, in the reverse direction, to the voltage SS2 of the power supply FNE via a diode FN7.

Thus, in the configuration, a change rate FBD is ensured to be lower than a change rate FFD. At the change rate FBD, the magnetic flux that interlinks the A-phase windings in turning off the transistor FNA is decreased. At the change rate FFD, the magnetic flux that interlinks the A-phase windings in turning off the transistor FNA is increased. To this end, the following relation may be used:

$$VSS1 > VSS2 \times (\text{Number of turns of } FN1)/(\text{Total number of turns of } FN1 \text{ and } FN2) \qquad (146)$$

The same applies to B-phase windings FN3 and FN4. Positive voltage is applied by a transistor FNB. When the transistor FNB is turned off, the magnetic energy is regenerated to the power supply FNE via a diode FN8. The same applies to C-phase windings FN5 and FN6. Positive voltage is applied by a transistor FNC. When the transistor FNC is turned off, the magnetic energy is regenerated to the power supply FNE via a diode FN9. Thus, in the configuration shown in FIG. 41, when current is reduced, the influence on the voltage of other phases is ensured to be reduced.

(Fifteenth Embodiment)

Hereinafter is specifically described a motor related to a fifteenth embodiment.

FIG. 42 shows a configuration including a more simplified control circuit. Specifically, in the configuration of the motor shown in FIG. 1, the A-phase winding Wa is separated into two and parallelly wound in the same slot. The same applies to other phases. Schematically, the configuration of the A-phase windings FD1 and FD2 shown in FIG. 16 is provided. As explained referring to FIG. 16, the windings have been expressed as virtual windings for expressing current components. However, when combined with the control circuit shown in FIG. 42, these windings are substantial windings wound in parallel. The two windings in the same slot may be provided as so-called bifilar windings in which two windings are wound in parallel, so that interlinked magnetic flux is shared therebetween as much as possible.

In FIG. 42, references 531 and 532 show A-phase windings which are arranged so that the direction of magnetic flux interlinkage is reversed as shown by symbols indicative of winding start points.

When a transistor 537 is turned on, voltage of the power supply 87G is applied to the winding 531 to increase the A-phase current. When the transistor 537 is turned off, the current Ia is shut out. At the same time with the shut out, the magnetic energy of magnetic flux φz interlinking the windings 531 and 532 causes a current I2a to flow to the power supply 87G via a diode 53B. In this case, if the current interlinking the magnetic flux φz is only the current I2, the following formula is provided:

$$Vs = -Nw \times d\phi z - VDz - Ia \times R2a \quad (147)$$

Reference Vs shows a voltage of the power supply 87G, reference VDz shows a forward voltage drop of the diode 53B, and reference R2a shows a resistance of the winding 532.

Similarly, references 533 and 534 show B-phase windings, reference 538 shows a transistor used for driving, and reference 53C shows a diode used for regeneration. References 535 and 536 show C-phase windings, reference 539 shows a transistor used for driving, and reference 53D shows a diode used for regeneration.

Compared to the control circuit configuration shown in FIG. 9, the control circuit configuration shown in FIG. 42 includes transistors and diodes, the number of which is drastically reduced to half of FIG. 9. Further, similar to the case of FIG. 39, power can be parallelly supplied from two sets of windings. Thus, there is a probability of reducing the total current capacity of the transistors in the control circuit by a factor of ¼. Further, when each phase current is supplied, the number of semiconductors connected in series to each winding is one. Thus, semiconductor loss is small and hence the efficiency of the control circuit is enhanced, or moreover, the efficiency of the motor system as a whole is enhanced, compared to the case of FIG. 40 or 9 where the number of semiconductors connected in series to each winding is two. Thus, when compared to the motor system for three-phase AC voltage and current as shown in FIG. 40, the present control circuit is able to realize simplification, high efficiency, low cost and size reduction.

The motor shown such as in FIG. 1 or 16 is a reluctance motor and thus the excitation current components have a burden of exciting field magnetic flux. As a measure against this, a method of mitigating the burden of the field magnetic flux is provided, using field windings, permanent magnets or the like which will be explained later. In FIG. 42, since the winding in each slot is separated into two, a problem of increasing resistance of each winding is raised. In addition, the voltage applied to each transistor of FIG. 42 is problematically large compared to the case of FIG. 9 or 40. Furthermore, there is also a problem that, in the control of each phase current, the phase current cannot be separated, as flywheel current, from the power supply 87G. However, methods of mitigating these problems are available.

In FIG. 42, the number of turns of each of secondary-side windings 532, 534 and 536 may be smaller than the number of turns of each of primary-side windings 531, 533 and 535 in each phase. Thus, when current is reduced, the influence on voltage in other phases is ensured to be reduced.

In each pair of windings of FIG. 42, it is not that the magnetic flux completely interlinks both of the windings, but a small amount of leaked magnetic flux components are generated separately in each of the windings. Accordingly, each transistor, when it is turned off, may be instantaneously applied with overvoltage. For the purpose of absorbing the instantaneous overvoltage applied to each transistor, diodes 541, 542 and 543 and Zener diodes 544, for example, may be additionally provided. These elements that pass only small current function as a noise filter. The control circuit explained so far shown in FIG. 42 includes three pairs of windings. Alternatively, for a multiphase motor such as of four or five phases, the control circuit shown in FIG. 42 may be extended in conformity with the number of phases and may be similarly realized.

(Sixteenth Embodiment)

Hereinafter is specifically explained a motor related to a sixteenth embodiment.

Figure 43:
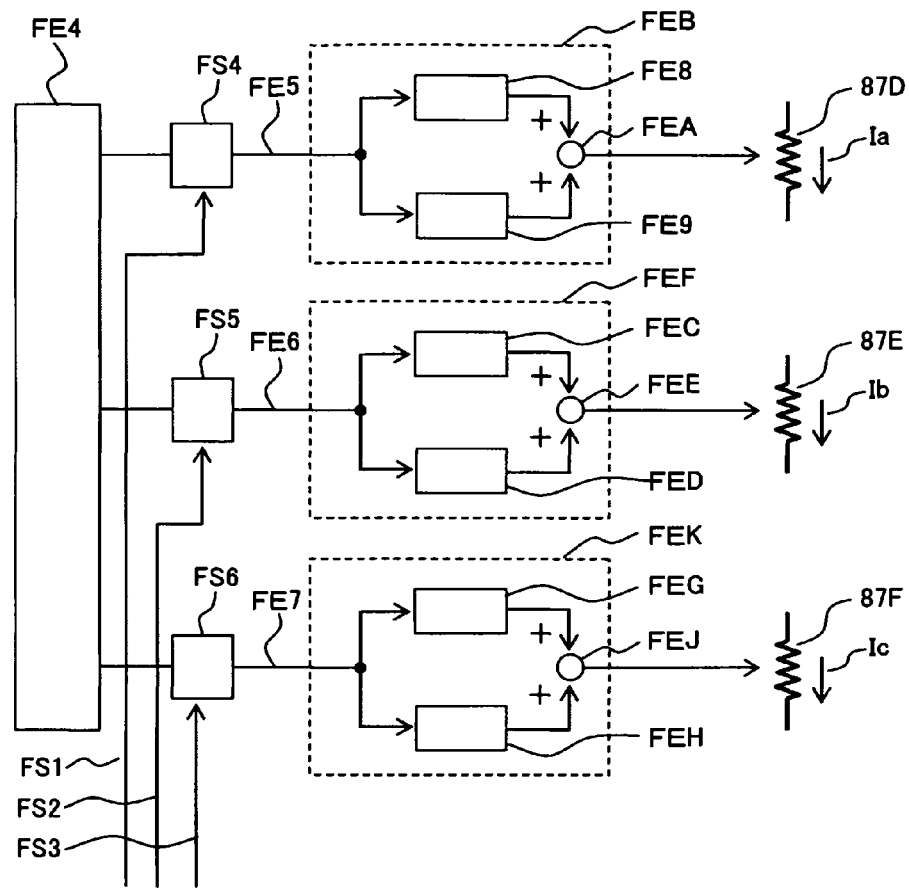
FIG. 43 is a diagram showing a configuration where a function of limiting the voltage and current of each phase is added to the configuration shown in FIG. 35.

FIG. 43 shows a configuration additionally including a part of the functions of the configuration shown in FIG. 35. Reference FS1 shows an A-phase voltage-limiting signal VAL1 that limits the A-phase voltage, and reference FS4 shows an A-phase voltage-limiting means for limiting the A-phase voltage command Vao of FE5.

Reference FS2 shows a B-phase voltage-limiting signal VBL1 that limits the B-phase voltage, and reference FS5 shows a B-phase voltage-limiting means for limiting the B-phase voltage command Vbo of FE6. Reference FS3 shows a C-phase voltage-limiting signal VCL1 that limits the C-phase voltage, and reference FS6 shows a C-phase voltage-limiting means for limiting the C-phase voltage command Vco of FE7. Thus, the configuration has a function of limiting the voltage that excites the winding of each phase, in accordance with the state of change of each phase current, the state of voltage application on each phase winding, the rotational position θr of the rotor, the rotational angular speed ωr of the rotor and the like. Thus, voltages of individual phases are controlled without being mutually adversely affected by the problem of voltage saturation.

For example, let us discuss the case where, in the motor shown in FIG. 6, large average torque is generated in the counterclockwise direction CCW and the motor is in operation in a high-speed range. At the rotational position θr, torque is generated by the B- and A-phase currents Ib and Ia. Subsequently, it is required to prepare for torque generation by reducing the BA-phase magnetic flux φba shown by F21 in the vicinity of the rotational position θr, and starting excitation of the CB-phase stator poles A02 and A05 to supply the CB-phase current component Icb.

Specifically, if these two operations overlap with each other, it is required to decrease the A-phase current Ia shown by A0D and at the same time to increase the C-phase current Ic shown by A0H. When the BA-phase magnetic flux φba is decreased, positive induced voltage Vc is generated in the C-phase winding shown by A0H.

Figure 44:
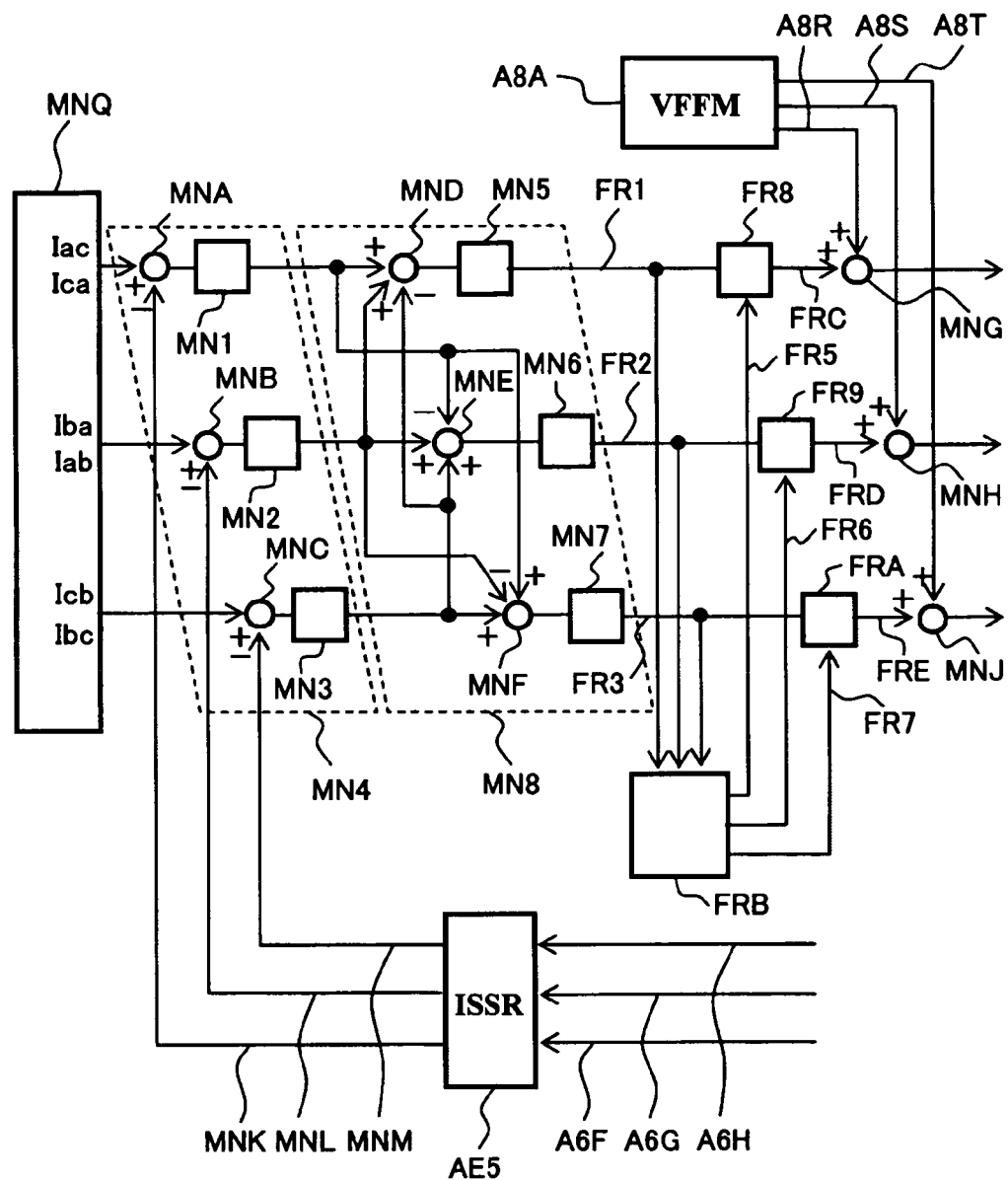
FIG. 44 is a diagram showing a configuration where a function of limiting the voltage and current of other phases, mutually among the phases, depending on an error of current of each phase is added to the configuration shown in FIG. 27.

If the decrease of the BA-phase magnetic flux φba is drastic, the positive Induced voltage Vc is increased, creating a problem of difficulty in increasing the C-phase current Ic. One approach for preventing the problem of the voltage saturation is to permit the decrease of the BA-phase magnetic flux φba to occur in a time zone different from that of the increase of the C-phase current Ic. Another approach to be taken in the overlap of the two operations is to well balance the decrease of the BA-phase magnetic flux φba and the increase of the C-phase current Ic. FIGS. 43 and 44 each show the latter approach of keeping a good balance.

(Seventeenth Embodiment)

Hereinafter is specifically explained a motor related to a seventeenth embodiment.

FIG. 44 shows a configuration including an additional function of keeping a good balance in the voltages of the individual phases, in a voltage command section of each phase shown such as in FIG. 27, 28 or 29. Reference FR1 shows an A-phase voltage command component which is produced based on the control error of the A-phase current Ia. Reference FR2 shows a B-phase voltage command component which is produced based on the control error of the B-phase current Ib. Reference FR3 shows a C-phase voltage command component which is produced based on the control error of the C-phase current Ic. These pieces of information, the rotational position θr and the rotational angular speed ωr are inputted to a voltage-limiting logic section to output an A-phase voltage-limiting signal VAL2 shown by FR5, a B-phase voltage-limiting signal VBL2 shown by FR6 and a C-phase voltage-limiting signal VCL2 shown by FR7.

Reference FR8 shows an A-phase voltage-limiting means for adding a voltage constraint to the A-phase voltage command component FR1.

Reference FR9 shows a B-phase voltage-limiting means for adding a voltage constraint to the B-phase voltage command component FR2.

Reference FRA shows a C-phase voltage-limiting means for adding a voltage constraint to the C-phase voltage command component FR3.

Reference FRC shows a new A-phase voltage command, reference FRD shows a new B-phase voltage command and FRE shows a new C-phase voltage command.

With the configuration shown in FIG. 44, the decrease of the magnetic flux φba of one phase is well balanced with the increase of the current Ic in a different phase, without causing bias. Such a voltage-limiting function is applicable to various control circuit configurations as shown such as in FIGS. 27, 28 and 29. Further, magnetic flux data of a motor obtained such as by a finite element method may be applied to Formulas (121) to (125) to more accurately estimate and calculate a voltage. Specifically, for example, the dφac/dt in the formulas may be substituted by (Minute change of magnetic flux φac)/(minute time).

Current of each phase is repeatedly supplied with the rotation of the rotor. Therefore, when there is a problem of voltage saturation, the current supply phase of the current component of each phase may be changed in the subsequent current cycle, for the control of the motor with a modified current cycle that enables easier current supply.

(Eighteenth Embodiment)

Hereinafter is specifically described a motor related to an eighteenth embodiment.

Figure 45:
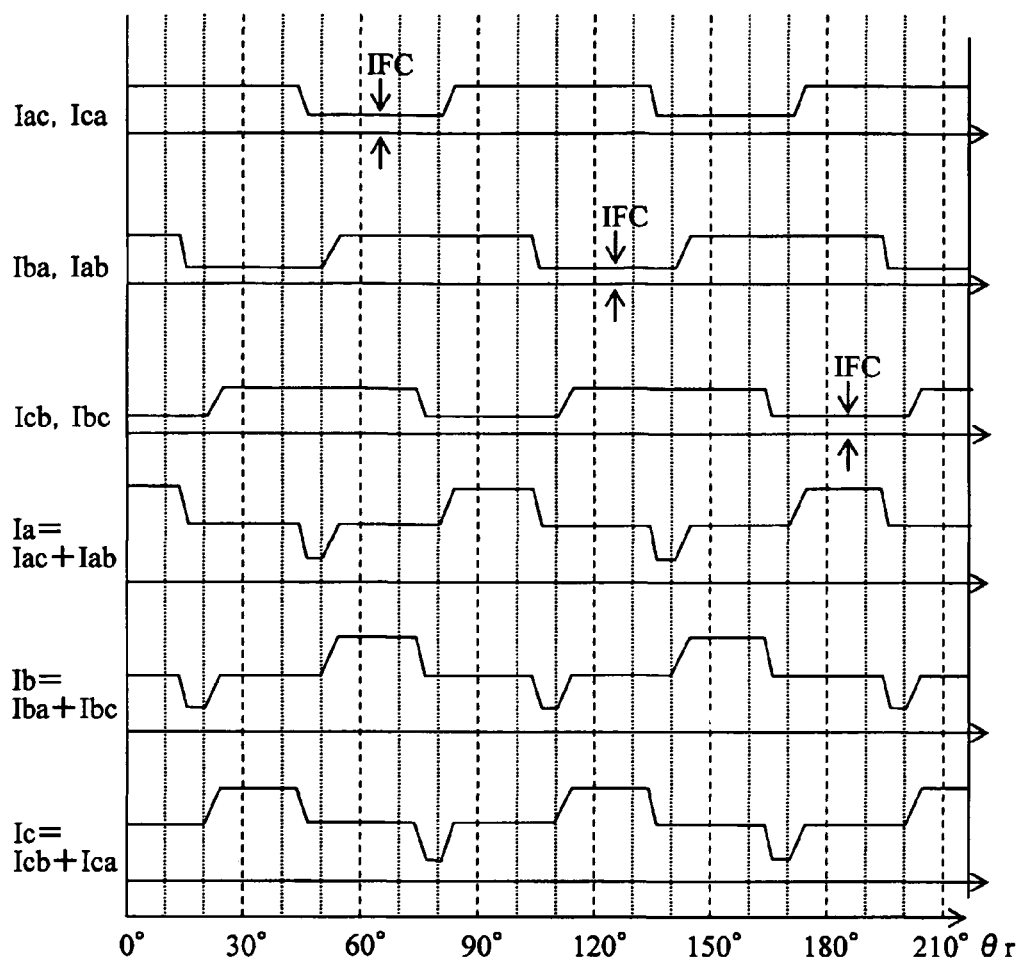
FIG. 45 is a timing chart showing the currents of respective phases to which field current components are added.

FIG. 45 shows a time diagram in which field excitation current components IFC for exciting magnetic flux of each stator pole are added to the current components Iac, Iba and Icb of the phases shown in FIG. 30. The field excitation current components of (IFC×2) are also added to the phase currents Ia, Ib and Ic, accordingly.

Generally, the relationship between the magnitude of a magnetic field and the magnetic flux density in a soft-magnetic material has characteristics as shown in FIG. 14. Accordingly, for example, in a state where the rotor is stopped, a comparatively small voltage is generated accompanying the increase of current after supplying the field excitation current components.

In motors other than small mortars, the amount of the field excitation current components is small relative to the continuously supplied rated current. Therefore, constant supply of the field excitation current components will not involve a large burden. Thus, as shown in FIG. 14, the field excitation current components are constantly supplied to thereby mitigate the burden of voltage in increasing current for the generation of torque. The voltage of each winding as shown in Formulas (38), (52) and (59), for example, mainly includes voltage components accompanying rotation, and thus is not influenced by the increase/decrease of current as shown in Formulas (87), (94) and (100), for example. These formulas are only simple formulas as models. In practice, the voltage components induced such as by the magnetic flux leakage at the slot openings will be involved to an extent that cannot be neglected. A measure against these components is required to be separately provided according to the status of the motor.

(Nineteenth Embodiment)

Hereinafter is specifically described a motor related to a nineteenth embodiment.

Figure 46:
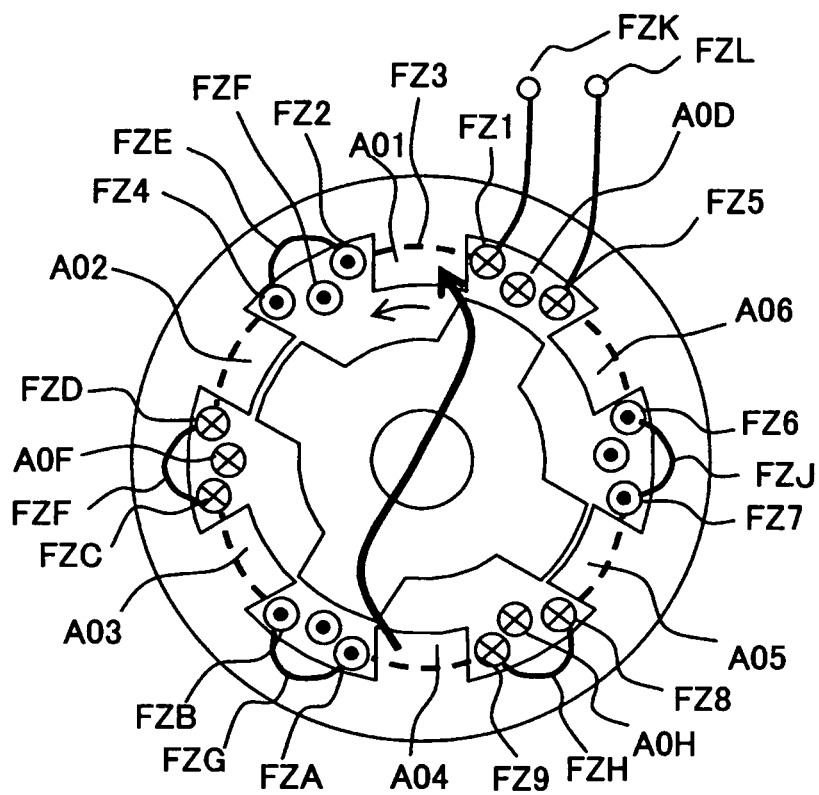
FIG. 46 is a diagram showing a configuration where field windings are added to the configuration of the motor shown in FIG. 1.

FIG. 46 shows a motor configuration obtained by adding windings to the motor configuration shown in FIG. 1 to supply field current Iff for exciting field magnetic flux. The A-, B- and C-phase windings A0D, A0F and A0H are each full-pitch winding. The field windings are each wound about each stator pole in a concentrated manner to provide a so-called concentrated winding.

The AC-phase stator pole as shown by A01 is provided with concentrated winding as shown by windings FZ1 and FZ2 and a broken line FZ3. The direction of currents, as shown by symbols of current, is the same between the A- and C-phase currents Ia and Ic. Similarly, the AC-phase stator pole as shown by A04 is provided with concentrated winding as shown by windings FZ9 and FZA.

The BA-phase stator pole shown by A03 is provided with concentrated winding as shown by windings FZC and FZB. The BA-phase stator pole is provided with concentrated winding as shown by windings FZ5 and FZ6.

The CB-phase stator pole as shown by A05 is provided with concentrated winding as shown by windings FZ8 and FZ7. The BA-phase stator pole as shown by A02 is provided with concentrated winding as shown by windings FZD and FZ4.

References FZE, FZF, FZG, FZH and FZJ are connecting lines for connecting between the concentrated windings. The connecting lines are connected in series, with the direction of current being matched. References FZK and FZL show terminals of the field windings.

The field windings are wound about all of the stator poles and connected in series so that the phase currents Ia, Ib and Ic are all directed to the same direction. Accordingly, the manner of winding is not particularly limited but may be full-pitch winding or may be concentrated winding. Further, the manner of winding is not limited to any of annular full-pitch winding, wave-formed winding, drum-shaped winding and the like, but any of them may be used.

Regarding the phase windings Wa, Wb and Wc, the direction and magnitude of the supplied currents are limited. However, field windings have less limitation. In particular, in the configuration shown in FIG. 46 in which each stator pole is provided with concentrated winding, the total length of the windings is reduced and thus the length of each projection of a coil end in the axial direction of the rotor is small. Accordingly, the concentrated windings can be easily connected to each other and provide good productivity.

Figure 47:
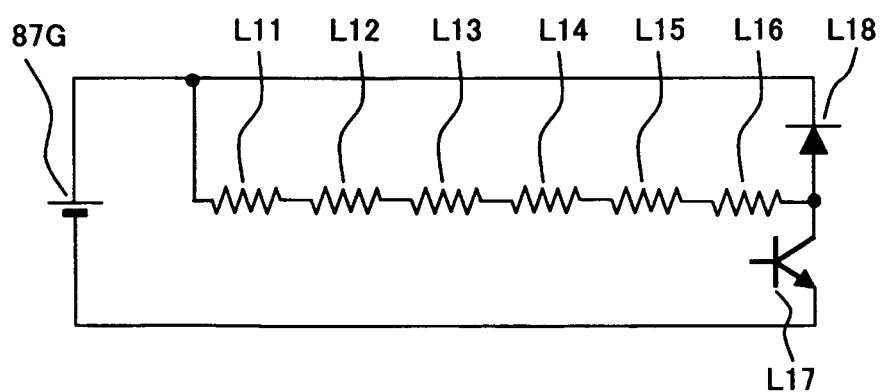
FIG. 47 is a diagram showing field windings and a circuit to supply current thereto.

FIG. 47 shows a specific example of a circuit for passing the field current Iff. References L11 and L14 show AC-phase field windings. References L13 and L16 show BA-phase field windings. References L15 and L12 show CB-phase field windings. The field current Iff is controlled under the control of a transistor L17. Reference L18 shows a flywheel diode.

Figure 48:
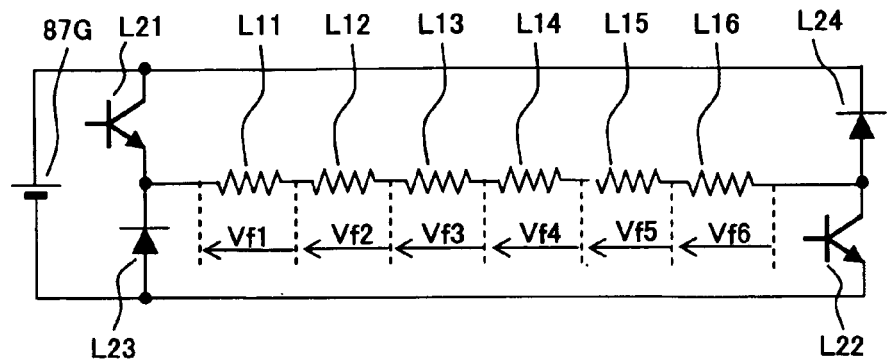
FIG. 48 is a diagram showing field windings and a circuit to supply current thereto.

FIG. 48 shows another control circuit for field current. When transistors L21 and L22 are both turned on, voltage is applied the field windings. When either one of the transistors is turned on, the circuit operates in flywheel mode. Both of the operations are similar to those of the control circuit shown in FIG. 47. When both of the transistors are turned off, reverse voltage, i.e. negative voltage, is applied via diodes L23 and L24. Thus, the field current Iff can be drastically decreased. When the field current Iff is required to be drastically decreased in controlling the motor, the circuit shown in FIG. 48 is more suitable for the use.

Figure 49:
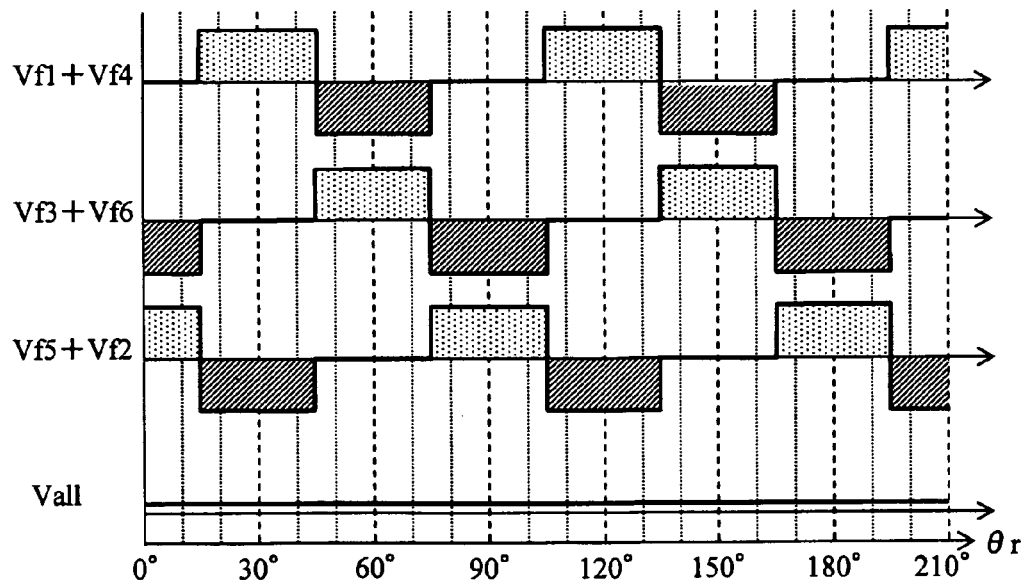
FIG. 49 is a timing chart showing voltage across each field winding shown in FIG. 48.

The electromagnetic actions of the field windings are explained. FIG. 49 shows a voltage relationship between the field windings when constant field current is supplied to the serially connected field windings and the currents of the phase windings A0D, A0F and A0H are rendered to be zero in the motor shown in FIG. 46. With the magnetic flux leakage being zero around the stator poles, the voltage relationship is of an ideal model.

In FIG. 49, (Vf1+Vf4) shows a sum of voltages Vf1 and Vf4 of the two field windings L11 and L14, respectively, of the AC-phase stator pole shown in FIG. 48.

In FIG. 49, (Vf3+Vf6) shows a sum of voltages Vf3 and Vf6 of the two field windings L13 and L16, respectively, of the BA-phase stator pole shown in FIG. 48.

In FIG. 49, (Vf5+Vf2) shows a sum of voltages Vf5 and Vf2 of the two field windings L15 and L12, respectively, of the CB-phase stator pole shown in FIG. 48.

Being supplied with a constant field current, power of any one of the field windings is negative and any one of them is positive at all times, in the power inputs/outputs of the field windings. This means that the field energy is circulated through the field windings. The voltage across all of the windings is shown by Vail in FIG. 49, which is a product of the resistance of all the windings and the field current, and thus corresponds to a resistance voltage drop. Thus, when the field energy is circulated in the motor, in controlling the currents Ia, Ib and Ic of the phase windings A0D, A0F and A0H, respectively, of the control circuit shown such as in FIG. 9, reactive current components in the currents can be reduced. As a result, current in the control circuit shown such as in FIG. 9 can be reduced and thus the burden of voltage can be reduced. Further, the cost is also reduced.

The field current Iff may be set to various values depending on the method of control. As will be explained later, the magnetomotive force applied to each stator pole corresponds to the combination of the phase currents Ia, Ib and Ic and the field current Iff.

For example, when output torque is large in a low-speed range, the burdens of the phase currents Ia, Ib and Ic are effectively mitigated by the field current Iff. In a middle-speed range, the field current Iff may raise a problem of causing unbalance in the induced voltages of the three-phase windings. In a high-speed range, the field current Iff effectively reduces the reactive current components in the phase currents Ia, Ib and Ic. Depending on the situations, the magnitude of the field current Iff is variably controlled by the number of rotations ωr and the magnitude of the load torque.

(Twentieth Embodiment)

Hereinafter is specifically explained a motor related to a twentieth embodiment.

Figure 50:
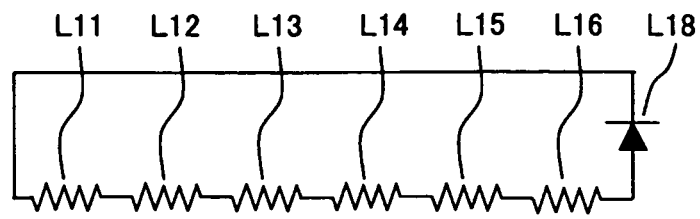
FIG. 50 is a diagram showing field windings and a circuit to supply current thereto.

FIG. 50 shows a configuration of a closed circuit in which all of the field windings shown in FIG. 48 are closed via a diode L18. Each field winding is parallelly wound with the winding of each phase. Thus, field energy can be supplied from the side of the winding of each phase. With this configuration, field current components can be detected using some kind of method, such as detecting the field current using a shunt resistor. Alternatively, magnitude of magnetic flux may be detected using a hole element or the like. Alternatively, magnetic flux may be recognized by detecting the induced voltage of each winding. Depending on the amount of the field current components, field energy can be supplied to the field windings using the phase currents Ia, Ib and Ic. In this way, field energy can be indirectly supplied to the field windings. In this case, as shown in FIG. 50, no transistor is required for driving the field current. Thus, a simplified configuration can be realized at low cost.

(Twenty-first Embodiment)

Hereinafter is specifically described a motor related to a twenty-first embodiment.

A configuration of the present embodiment is provided by adding the field windings shown in FIG. 46 to the switched reluctance motor shown in FIG. 85. With this configuration, the burden of the field current in the motor can be taken over by the field windings. Thus, similar to the above, the burdens of current and voltage of the phase windings can be mitigated.

(Twenty-second Embodiment)

Hereinafter is specifically explained a motor related to a twenty-second embodiment.

Figure 51:
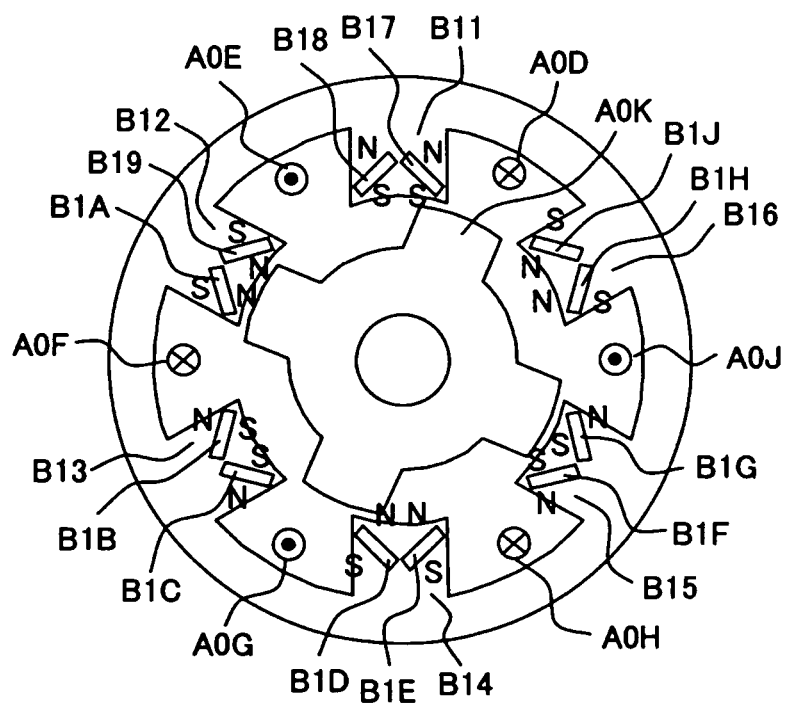
FIG. 51 is a diagram showing a configuration where permanent magnets are added to the configuration of the motor shown in FIG. 1.

FIG. 51 shows a configuration obtained by adding permanent magnets having the same polarity to the respective stator poles shown in FIG. 1. The polarity coincides with the direction of the magnetomotive force caused by the field windings shown in FIG. 46. Permanent magnets B17, B18, B19, B1A, B1B, B1C, B1D, B1E, B1F, B1G, B1H and B1J are arranged in the respective stator poles. With this configuration, magnetic flux is generated when the rotor salient poles come close to the stator poles. Thus, the action of the field windings explained above is exerted.

The burden of the field current in the phase currents Ia, Ib and Ic of the motor shown in FIG. 1 can be taken over by the permanent magnets. Thus, similar to the above, the burden of current and the burden of voltage in each phase of the phase windings can be mitigated. Further, by controlling the phase current components Iac, Iba and Icb, the magnitude of the magnetic fluxes φca, φba and φcb of the stator poles can be controlled.

As exemplified in FIG. 52 by (a), (b), (c), (d), (e) and (f), various ways of arranging the permanent magnets can be provided to realize various configurations. In each of the examples shown in FIG. 52, a portion near the tip end of a stator pole B11 is enlarged. References L41, L42, L43, L44, L45, L46, L47, L48, L49 and L4A show permanent magnets. The permanent magnets may each be applied to the surface of the stator pole. The configuration shown in FIG. 51 is able to generate comparatively large magnetic flux. Depending on the arrangement of the permanent magnets, a proportion of the permanent magnet characteristics to the reluctance characteristics can be selected. Characteristics not applicable to torque in the counterclockwise direction CCW or torque in the clockwise direction CW may be used.

When each phase current is zero, the torque generated in each rotor salient pole by the action of the permanent magnets keeps a balance between the directions CCW and CW and thus the torque is substantially zero. Further, the configuration is able to cancel the force acting in the radial direction, similar to the motors of the conventional art. In addition, various types of permanent magnets can be used, including neodymium-based permanent magnets, samarium-based permanent magnets, ferrite magnets and cast magnets.

In the motor shown in FIG. 1 or 51, attraction force is used in generating torque. Thus, while N poles of permanent magnets repel one from the other, motor torque can be generated without using such a repulsive force. This means that, when the currents of a motor are properly controlled, the magnetomotive force that would demagnetize the permanent magnets is not imposed. In a brushless motor based on conventional art, the motor structure, the thickness of each magnet and the like are designed so that the permanent magnets are not demagnetized.

In the motor shown in FIG. 51, there is no concern of demagnetization. Accordingly, the thickness of each permanent magnet can be reduced to the utmost limit. In order to enhance the coercive force of magnets, dysprosium, terbium or the like is used and exposing the problems of resource. However, such problems can be mitigated. In this way, the amount of permanent magnets to be used can be reduced, which is advantageous from the viewpoint of cost.

Owing the thickness reduction of the permanent magnets, should the permanent magnets are demagnetized, they can be can be comparatively easily magnetized. The permanent magnets can be magnetized by supplying normally used current using the control device of the motor. Further, as will be explained later, the magnetic characteristics of the permanent magnets can be variably controlled to variably control the magnitude of the magnetic flux of the stator poles.

In a low-speed area, the magnitude of the permanent magnets can be increased, while in a high-speed region, decreased. Thus, the motor is easily operated exhibiting constant output characteristics. In addition, permanent magnets may be combined with field windings to exert both of the characteristics.

(Twenty-third Embodiment)

Hereinafter is specifically described a motor related to a twenty-third embodiment.

Figure 53:
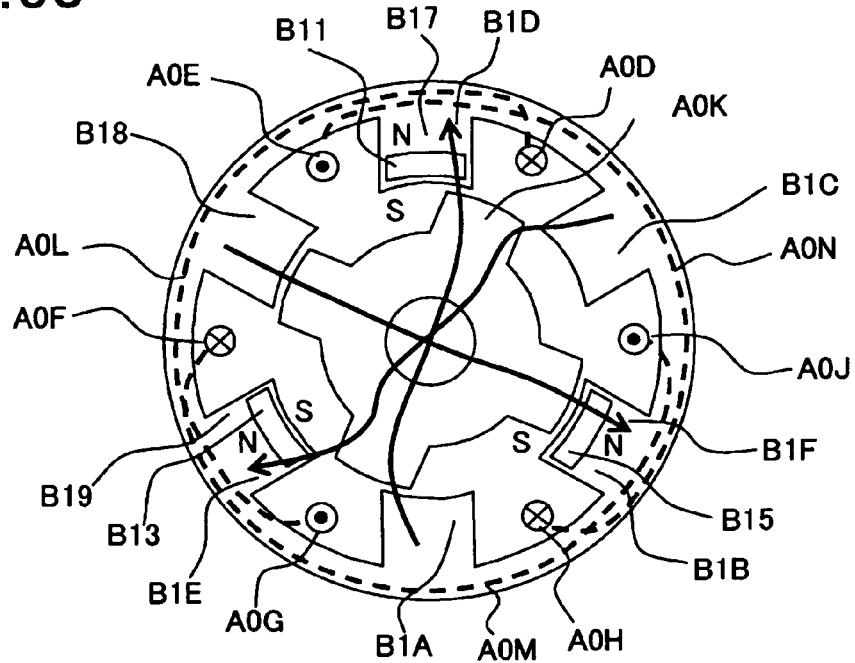
FIG. 53 is a diagram exemplifying a configuration where a permanent magnet is arranged at one of two stator poles having the same phase.

FIG. 53 shows a configuration in which, of the AC-phase stator poles B17 and B1A, the stator pole B17 alone is provided with the permanent magnet B11. The magnetic flux generated by the permanent magnet B11 will eventually pass through the stator poles shown by B18 and B1B, but the number of magnets may be reduced. The same applies to the BA-phase stator poles B19 and B1C. Also, the same applies to the CB-phase stator poles B1B and B18.

(Twenty-fourth Embodiment)

Hereinafter is specifically explained a motor related to a twenty-fourth embodiment.

Figure 54:
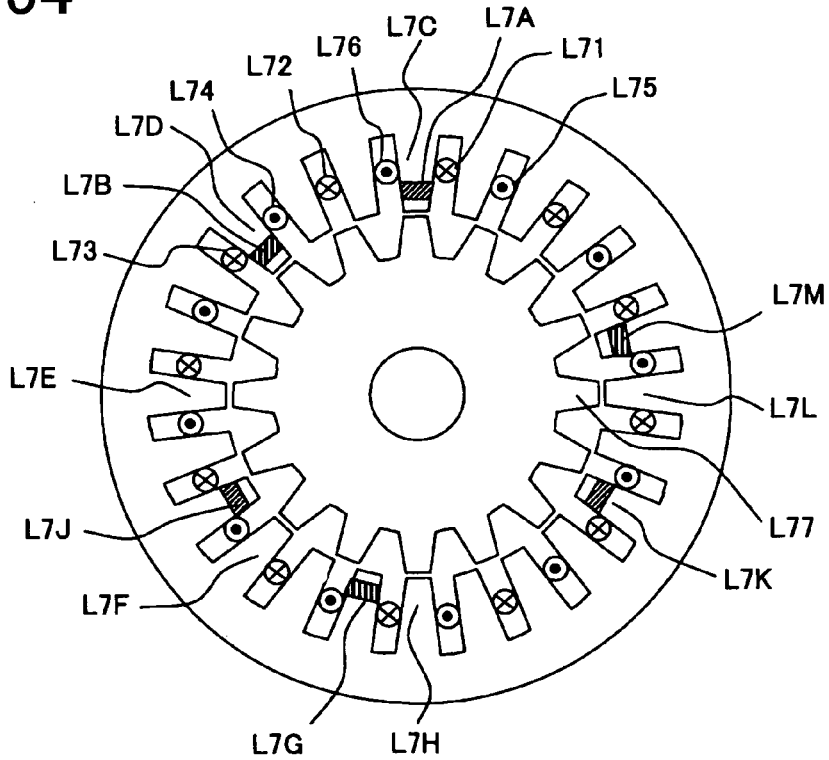
FIG. 54 is a diagram showing a configuration where the motor shown in FIG. 1 is multi-polarized to have eight poles and permanent magnets are arranged at part of the stator poles of the motor.

FIG. 54 shows a configuration obtained by rendering the motor shown in FIG. 8 to have eight poles and adding an S-pole permanent magnet and an N-pole permanent magnet to a part of the stator poles. The whole circumference corresponds to 360 degrees×4=1440 degrees in electrical angle. the number of stator poles is 24 and the number of salient rotor poles L77 is 16. References L7C, L7E, L7H and L7L show AC-phase stator poles provided at a pitch of 360 degrees in electrical angle. Reference L7A shows an S-pole magnet provided on an inner diameter side and reference L7B shows an N-pole magnet provided on an inner diameter side. These magnets are mounted on the AC-phase stator poles L7C and L7D, respectively. Similarly, an S-pole magnet L73 and an N-pole magnet L7G are mounted on the BA-phase stator poles. Similarly, an S-pole magnet L7K and an N-pole magnet L7M are mounted on the CB-phase stator poles.

In this way, in designing a motor, permanent magnet can be mounted on part of the stator poles to thereby select the proportion of the permanent magnet characteristics to the reluctance characteristics. Since the number of magnets is reduced, the cost is effectively reduced. In the motor shown in FIG. 54, the arrangement is balanced so that the rotor is located magnetically the center of the motor, for both of the stator poles mounted with the permanent magnets and the stator poles not mounted with the permanent magnets. With this configuration of partial arrangement of magnets, the motor exerts the characteristics of barely causing interference between phases of the stator poles.

(Twenty-fifth Embodiment)

Hereinafter is specifically described a motor related to a twenty-fifth embodiment.

FIG. 85 shows a motor having a configuration in which each stator pole is provided with concentrated winding. The permanent magnets as shown in FIGS. 51 and 52 may be added to the motor shown in FIG. 85. Being provided the permanent magnets, the burden of the field current in the motor can be taken over by the field windings. Thus, similar to the above, the burden of current and the burden of voltage in each phase winding can be mitigated.

(Twenty-sixth Embodiment)

Hereinafter is described a motor related to a twenty-sixth embodiment.

Figure 55:
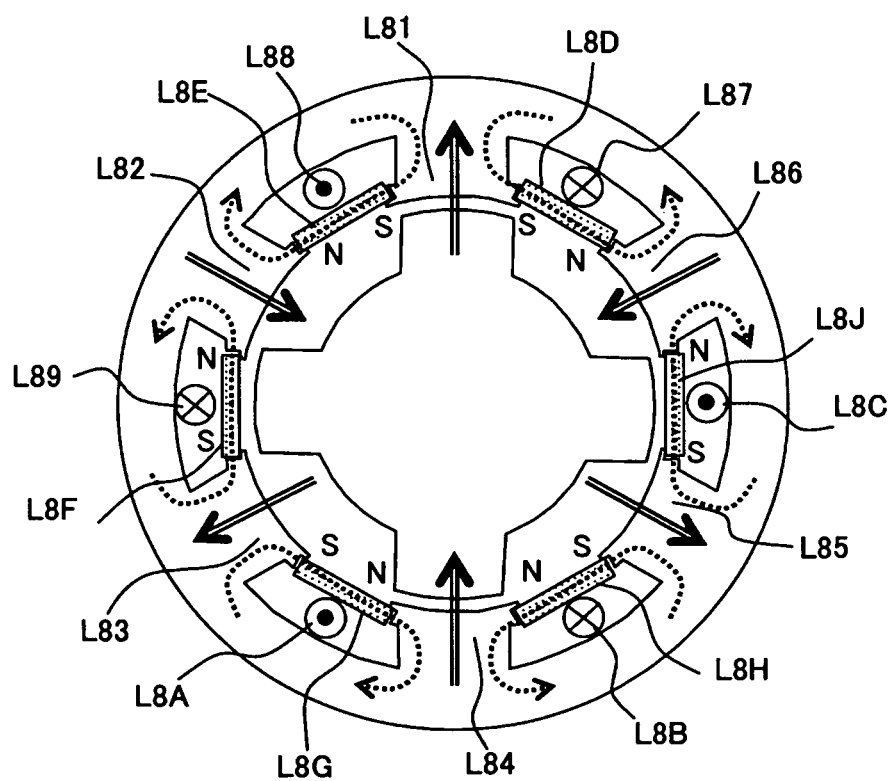
FIG. 55 is a diagram showing a configuration where the motor shown in FIG. 1 is modified such that a permanent magnet is arranged at the opening of each slot of the motor so as to generate magnetic flux in the opposite direction to that of each stator pole.

FIG. 55 shows a motor according to the present embodiment, in which permanent magnets L8D, L8E, L8F, L8G, L8H and L8J are additionally arranged at the openings of the respective slots in the configuration shown in FIG. 1. The direction of a magnetic flux of each stator pole is shown by each double-line arrow. Each permanent magnet is arranged such that such direction is opposite to the dashed-line direction of a magnetic flux from each permanent magnet at each stator pole. Accordingly, with no currents passing in the motor, the magnetic flux density at each stator pole is biased in the reverse direction, in which a larger amount of the magnetic flux shown by the double line can be passed therethrough.

The torque characteristic of the motor is shown in FIG. 15, in which the stator poles have the magnetic saturation at the operating point Tnb or thereabouts, and the percentage of rise reduces from that operating point. When the permanent magnets are additionally arranged as shown in FIG. 55, the magnetic flux, shown by the double-line arrows, which is able to pass each stator pole can be increased as shown by a chain line in the torque characteristic in FIG. 15. That is, the characteristic is expanded to obtain a new operating point Tnd, whereby the torque can be generated up to this point. In this way, the peak torque of the motor can be raised, which allows the motor to be compact in size and to be less weight. Incidentally the shape of each permanent magnet shown in FIG. 55 is elongated in the direction bridging over between two adjacent stator poles. However, motors with multiple poles such as eight poles have narrower slot openings, so that, in such cases, the shapes of the permanent magnets become closer to a square more than the shapes in FIG. 55. Furthermore, there occurs flux leakage at the slot openings and parts close thereto when the currents are supplied. However, the direction of the magnetic flux from each permanent magnet is opposed to the direction of such leakage flux, with the result that the flux leakage can be reduced.

(Twenty-seventh Embodiment)

Hereinafter is described a motor related to a twenty-seventh embodiment.

Figure 56:
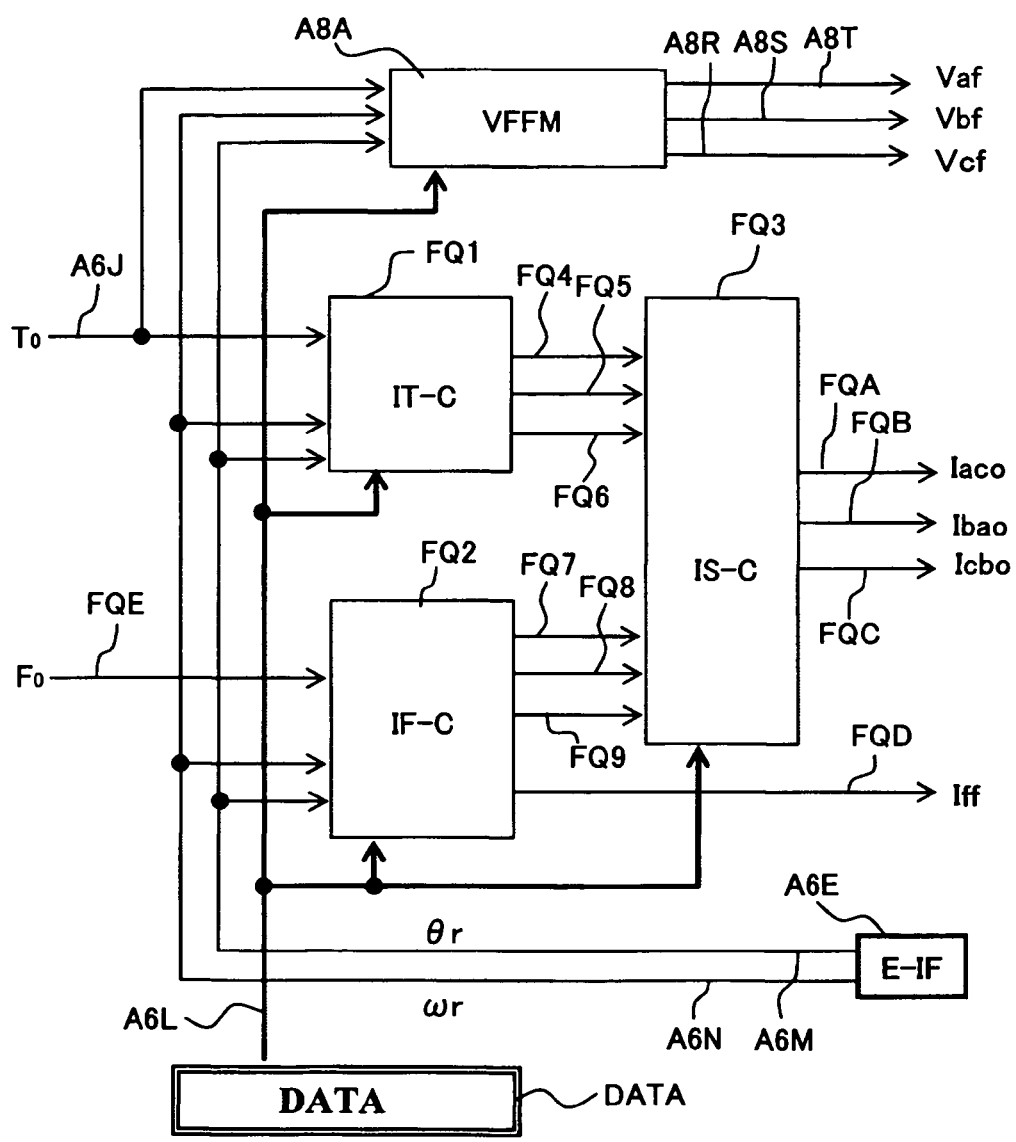
FIG. 56 is a block diagram explaining calculation of current components for the respective phases of the motor, field current components and voltages across the respective windings.

FIG. 56 shows a practical configuration of the example of the current control means A63 shown in FIG. 26. The voltage feedforward means A8A shown in FIG. 27 can also be provided. In the configuration shown in FIG. 56, values of both the speed command ωo shown by A60 and the rotor speed ωr shown in FIG. 26 are used by the torque control means A62 to produce the torque command information To, which is shown by the reference A6J, the torque command information To is treated as an input. And the current control means A63 outputs practical commands Iaco, Ibao, and Icbo of current components for the respective phases. In this practical configuration, control of field current components and feedforward values of voltages in the respective phases are shown.

A reference FQ1 shows torque conversion means, and uses a rotor rotational position θr, shown by a reference A6M, to recognize current control regions for the respective phases. A reference A6J shows torque command information To. Based on this information To, the current control means select formulas (42), (54), (61), (68), (75), (82), (90), (96), (102), (108), (114) and (120) to decide amounts of currents to be supplied. For driving the motor, there are a technique of supplying only one current component and a technique of supplying a plurality of currents to be supplied in parallel. The current(s) to be supplied is also changed depending on the rotor rotational angle position θr. It is also necessary to consider the rotor rotational angular speed ωr, because the currents have response characteristics and delay time in the response. The torque conversion means FQ1 provide an output FQ4 composed of AC-phase current components Iacj, BA-phase current components Ibaj, and CB-phase current components Icbj.

Practically, for example, at the rotational position of θr=60 degrees shown in FIG. 5, assume that the rotor rotates in the CCW direction at ωr and the torque command To in the CCW direction is relatively smaller such that a torque value is in a magnetic production range provided by a soft-magnetic material. Currents are expressed by the current components Iac, Iba, and Icb for the respective phases shown in FIG. 16.

Since the magnetic flux f21 in FIG. 5 can produce the torque in the CCW direction, it is enough that the current component Iba flows. The formula (54) shows the relationship between the torque Tba and the current component Iba, so that the value of the current component Iba can be calculated. If the AC-phase current component Iac also flows, the magnetic flux A22 generates a negative torque (=−Tnac). In this case, in order to cancel this negative torque, the torque Tnac is added to a BA-phase torque Tba, before the calculation based on the formula (54).

Additionally, in cases where the rotor rotational angular speed ωr is larger, the current component Icb, is supplied in advance at this rotational position of θr=60 degrees, because it is required to make the CB-phase stator poles A02 and A05 generate torque during the next cycle. At this rotational position, the CB-phase stator poles A02 and A05 do not face the rotor salient poles, whereby no torque is generated by the current component Icb. The amplitude of the current component Icb at this time is decided based on estimated values of torque, for instance.

As described, the current components Iacj, Ibaj, and Icbj for the respective phases are set and outputted. The values of these currents are exemplified at the rotational angle position of θr=60 degrees in FIG. 30. Actual currents supplied from the power converter A65, that is, currents supplied to the motor windings, are the phase currents Ia, Ib, and Ic shown in FIG. 30, as described.

In this way, the current command values for the respective phases can be set in accordance with the torque command information To. Depending on the rotational angle position θr, the calculation changes in its contents. In the motor shown in FIG. 1, the control cycle is 90 degrees in terms of the electrical angle. Although the AC-, BA- and CB-phases are set to have, in this order, a phase difference of 30 degrees in the electrical angle, the same actions as the above can be realized by each phase.

As will be described later, current information for the respective phases can be calculated depending on the torque command information To and the rotational angle position θr using the foregoing technique and stored in a memory. This information in the memory may be used to output current commands for the respective phases whenever they are necessary. Bits of information stored in the memory are discrete due to limitation to an amount of data which can be stored therein, but this discrete data can be corrected by interpolation so that approximately continuous data can be produced for use in the motor.

(Twenty-eight Embodiment)

Hereinafter is described a motor related to a twenty-eighth embodiment.

In FIG. 56, a reference shows field control information Fo and a reference FQ2 shows field control means. The outputs of the field control means FQ2 indicate current components related to exiting the fields for the respective phases. Practically, a reference FQ7 shows an AC-phase field current component Iack, a reference FQ8 shows a BA-phase field current component Ibak, and a reference FQ9 shows a CB-phase field current component Icbk. A reference FQD shows a field current command.

For example, in the motor shown in FIG. 1, when a constant field current component IFC is supplied to all the stator poles, Iack=Ibak=Icbk=IFC is realized, and these current components are outputted to a current combining means FQ3.

The current combining means FQ3 combine the foregoing current components Iacj, Ibaj, and Icbj with the field current components by mutual addition, and produce current component commands Iaco, Ibao, and Icbo, shown by references FQA, FQB, and FQC, and output such produced commands as follows.

$$Iaco = Iacj + Iack \tag{148}$$

$$Ibao = Ibaj + Ibak \tag{149}$$

$$Icbo = Icbj + Icbk \tag{150}$$

In cases where a field current component is supplied to only any phase of the stator poles, the value of the field current component is given to any of the formulas (148), (149) and (150). For example, in FIG. 5, the CB-phase stator poles A02 and A05 starts to face the rotor salient poles at the rotation position θr=75 degrees. Hence, when the field current component for the CB-phase is desired to be supplied in advance at the rotation position θr=60 degrees, the value of Icbk is given to the formula (150).

Such an earlier supply of the field current component is important in light of the formulas (38) and others showing the voltage components in the respective phases and the formulas (121) to (125) showing the voltage across each of the windings. For example, in the formula (59) of voltage for the CB-phase, it is advantageous that the voltages resulting from the first and second terms in the differential terms do not overlap on one the other in terms of alleviating the voltage burden in a control circuit. The first term in the differential terms, "dIcb/dt", which is differential of current, physically expresses a change rate over time "dϕcb/dt" of magnetic flux in association with changes in the current. Accordingly, in terms of the non-linear magnetic saturation shown in FIG. 14, it is effective to early supply, at least, the field current component in alleviating the voltage burden.

The amplitudes and supply timings of the field current components can be changed depending on values of both the torque and the rotation speed of a motor. For example, a motor is driven at lower rotation speeds and higher torque values, a larger amount of a field current component is supplied to only a phase which currently needs the field excitation, whilst no field currents are supplied to the other phases, thus reducing loss due to Joule heat. In the medium-speeds of rotation of a motor, it is required to supply a field current component at earlier phases by the foregoing earlier filed current supply. In higher rotation speeds of a motor, by way of example, field current components of appropriate amplitudes are always supplied to all the phases.

In the motor where the field windings are wound as shown in FIG. 46, a field current component command Iff, shown by a reference FQD is outputted depending on the torque and the rotation speed of the motor. This command can be controlled by the control circuit which is shown in FIGS. 47, 48, 50, 77, and others.

(Twenty-ninth Embodiment)

Hereinafter is described a motor related to a twenty-ninth embodiment.

In the configurations where the field windings are wound around the stator poles as shown in FIG. 46 or permanent magnets are arranged in the stator poles as shown in FIGS. 51 and 52, magnetomotive forces to generate the field magnetic fluxes can be generated effectively. Meanwhile, such configurations have an inconvenience, which is a bias of voltage.

For example, in the motor shown in FIG. 46, assumption can be made such that at the rotor rotational position θr=60 degrees in FIG. 5, a specific amount of torque is generated to have the rotor rotated at a specific rotation speed in the CCW direction.

Additional assumption can be made such that, at portions where the AC-phase stator poles face the rotor salient poles, which is shown in FIG. 5, the field current Iff is given an amplitude which can provide the soft-magnetic member at the portion with a magnetic flux density corresponding to an approximately 50% of the maximum magnetic flux density Bmax. Additional assumption can be made such that currents pass through the A-phase windings A0D, A0G and the B-phase windings A0F, A0J, and such currents are set to an extent which provide the maximum magnetic flux density Bmax of the soft-magnetic member to portions where the BA-phase stator poles and the rotor salient poles are faced to each other.

It is also assumed that the CB-phase magnetic flux φcb shown by a dashed line MR1 in FIG. 5 is zero. Based on the foregoing assumptions, the formulas (122) and (124) will provide the A-phase voltage Va and B-phase voltage Vb, which are:

$$Va=(V2ac+V2ba)/2 \qquad (151)$$

$$Vb=(-V2ac+V2ba)/2 \qquad (152)$$

If the field current Iff is zero, the magnetic flux A22 in FIG. 5 is also zero and the voltage V2ac is also zero, resulting in that the A-phase voltage Va and the B-phase voltage Vb are equal to each other. Now assume that such a voltage is for example 100 V. In cases where the magnetic flux density of the magnetic flux A22 at the portions where the stator poles and the rotor poles are opposed to each other is "Bmax/2" due to the field current Iff, the formulas (151) and (152) provides the A-phase voltage Va with 150 V and the B-phase voltage Vb with 50V. In this way, the A-phase voltage Va increases by 50 V, while the B-phase voltage Vb decreases by 50 V, which means that both voltages are biased. This bias phenomenon can be understood from a viewpoint of energy balance such that the A-phase winding Wa provides the AC-phase magnetic flux φac with power Pacx defined by the following formula, in association with the AC-phase magnetic flux φac shown by the magnetic flux A22, while the B-phase winding Wb regenerates the power Pacx to the AC-phase magnetic flux φac:

$$Pacx=d\phi ac/dt \times Nw \times Iba \qquad (153)$$

This phenomenon will cause almost no problem if the field current Iff provides a magnetic flux density smaller compared with a maximum magnetic flux density Bmax. However, if such a magnetic flux density cannot be ignored in amount compared with the maximum magnetic flux density Bmax of the soft-magnetic material, a balanced and parallel power supply of power from both the A-phase winding Wa and the B-phase winding Wb to the motor depends on the voltage and current capacity of a control apparatus, which becomes an important issue.

This issue can be overcome by eliminating or decreasing the AC-phase magnetic flux φac shown by A22 in the state shown in FIG. 5. That is, the issue can be overcome by eliminating or decreasing a magnetic flux which is an obstacle and which does not contribute to torque generation. Practically, in the state shown in FIG. 5, a negative value is given to the field current component Ibak of the BA-phase in FIG. 56, which can eliminate or decrease the AC-phase magnetic flux φac shown by A22 which is caused by the field current Iff.

As described, when the motor shown in FIG. 5 has the field windings shown in FIG. 46 and the field current Iff is supplied, there also occurs a bias in the voltage values between two windings. In this case, a specific field magnetic flux is unnecessary. In the state shown in FIG. 5, the AC-phase magnetic flux φac shown by A22 is unnecessary. In contrast, the AB-phase magnetic flux φab shown by the magnetic flux F21 is necessary for generating torque in the CCW direction. There are two techniques of reducing unnecessary magnetic fluxes at designated stator poles.

The first field decreasing technique at designated stator poles is to produce a negative current component by the respective phase one-way currents Ia, Ib and Ic. In the state shown in FIG. 5, supplying the B-phase current Ib trough the winding A0F weakens the AC-phase magnetic flux φac shown by A22. Incidentally, in this case, it should be noted that the BA-phase magnetic flux φba shown by F21 and the CB-phase magnetic flux shown by an MR1 are strengthened.

Now let us think of an example in which the field windings give each stator pole a field magnetomotive force of 5 A (5 amperes) in terms of current components. This is equivalent to the fact that the field currents Iac and Ica both are 5 A. Thus setting Ib=10 A makes it possible to cancel a magnetomotive force at the AC-phase stator poles. This state, that is:

Ia=0 A

Ib=10 A $$Ic=0 \text{ A} \qquad (154)$$

can be forward-converted to current components using the formulas (19), (20) and (21), so that there can be provided:

Iac=−5 A

Iba=5 A $$Icb=5 \text{ A} \qquad (155)$$

From this, it can be confirmed that the magnetic flux in the AC phase is weakened and that in the BA and CB phases are strengthened.

In this case, canceling is carried out such that the magnetic flux shown by A22 becomes zero, whereby torque from the AC-phase stator poles is zero. The CB-phase magnetic flux φcb shown by MR1 is given a larger space, resulting in that torque from the CB-phase stator poles is also approximately zero. The magnetic flux φab shown by F21 is generated in response to an addition of the field exciting component of 5 A and the calculated Iba=5 A, whereby the BA-phase stator poles generate an amount of toque corresponding to an Iba=10 A. Since the magnetic flux φac is zero, the bias in voltages shown by the formulas (151) and (152) is canceled with each other.

Further, an increase in the torque in the CCW direction can be achieved by increasing the BA-phase current component Iba. For example, when it is desired to add 10 A to the Iba, the formulas can be converted to:

Iac=−5 A

Iba=5+10=15 A

Icb=5 A     (156)

, before inverse-conversion to the respective phase currents using the formula (4), (5) and (6). Hence, the following values can be obtained:

Ia=10 A

Ib=20 A

Ic=0 A     (157)

Incidentally, it is true that the foregoing setting can be performed using the respective phase currents Ia, Ib and Ic calculated as shown by formulas (157) or using the current components Iac, Iba and Icb calculated as shown by formulas (156), because these two types of currents can be converted with each other. In performing the setting using the respective phase currents components, it can be considered that "such setting is to "a current component at the stator poles corresponding to a decreased magnetic field has a negative value and using this current component, the field magnetic fluxes is decreased at the stator poles." In contrast, in performing the setting using the respective phase currents Ia, Ib and Ic shown in FIG. 5, it can be understood that "a current is supplied to windings which can generate a magnetic flux used to weakening the magnetic fluxes in inversed directions." These two expressions are the same in its contexts. The torque can be increased by increasing corresponding ones among the current components Iac, Iba and Icb.

Then, described is the case where a current component at the stator poles corresponding to a decreased magnetic field has a negative value. For example, when the AC-phase stator poles are subjected to decreasing the field, the following setting is performed:

Iac=−10 A

Iba=0 A

Icb=0 A     (158)

Using the formulas (4), (5) and (6), an inverse conversion to the respective phase currents is performed, which are as follows:

Ia=−10 A

Ib=0 A

Ic=−10 A     (159)

As described, the A- and C-phase currents Ia and Ic are negative, which contradicts the concept of using the one-way current. The negative current cannot be supplied. In this way, at part of a region where the motor torque is small, it is difficult to meet both of the requirements that a smaller amount of torque is generated and the bias in the voltage is suppressed. However, in such a region, the motor rotation speed changes from a medium speed to a higher speed, with the torque being lower. Hence, by supplying currents with a certain amount of torque ripples allowed to be caused, the motor torque can be averaged, substantially providing no inconvenience.

In cases where the torque ripples become inconvenient, there are some countermeasures such as adding an inertial member to the rotor shaft.

The second field decreasing technique for designated stator poles is to adopt a current supply method, by which a circuit for a negative phase current is added, based on formulas (159) etc., as will be described with FIGS. 80, 81 etc. The added circuit is in charge of canceling field current components, so that production cost and size enlargement for the control circuit are avoided from increasing considerably, because a current capacity required for the added circuit is smaller.

As described, as to adding the field windings to the motor shown in FIG. 5, how to reduce the bias in the voltages across the two windings through which currents for torque are supplied has been described. This reduction technique is true of the configuration where the permanent magnets are arranged in the stator poles as shown in FIGS. 51, 52 etc. In addition, both the first and second field decreasing techniques can be adopted in parallel.

(Thirtieth Embodiment)

Hereinafter is described a motor related to a thirtieth embodiment.

The foregoing bias in the voltages across the tow windings becomes a problem when the respective phase voltages Va, Vb and Vc in the formulas (121) to (125) increase up to values closely to the power supply voltage. In this respect, this problem relates to what kind of characteristics the voltages V2$ac$, V2$ba$ and V2$cb$ for the respective current components shown in formulas such as (38) have. In formula (38), the first term of "dIac/dt" in the differential terms be of a problem. In response to values of "dIac/dt", there occur leakage fluxes at the opening of each slot, with the result that changes in voltage components due to increase and decrease in the phase currents, which are not rendered in formula (38), can be ignored. In order to reduce such a voltage-related issue, the techniques for reducing the bias in the voltages, which have been described with formulas (154), (155), etc., are still practical and effective to reducing the increase and decrease in the phase currents. Using such reducing techniques, it is possible to alleviate burden on the power supply voltage.

(Thirty-first Embodiment)

Hereinafter is described a motor related to a thirty-first embodiment.

First, going back to the basics, let us consider the current, voltage, magnetic flux, and rotation speed of a motor. In the case of a simple magnetic circuit MK1 as shown in FIG. 11, the voltage V, the current I, and the number of turns Nw of a winding of the motor and the magnetic flux φ are connected by the following formulas:

$$V=L\times(dI/dt)=Nw\times(d\phi/dt) \quad (160)$$

$$L\times I=Nw\times\phi=\psi \quad (161),$$

where ψ denotes the number of interlinkage magnetic fluxes.

Figure 57:
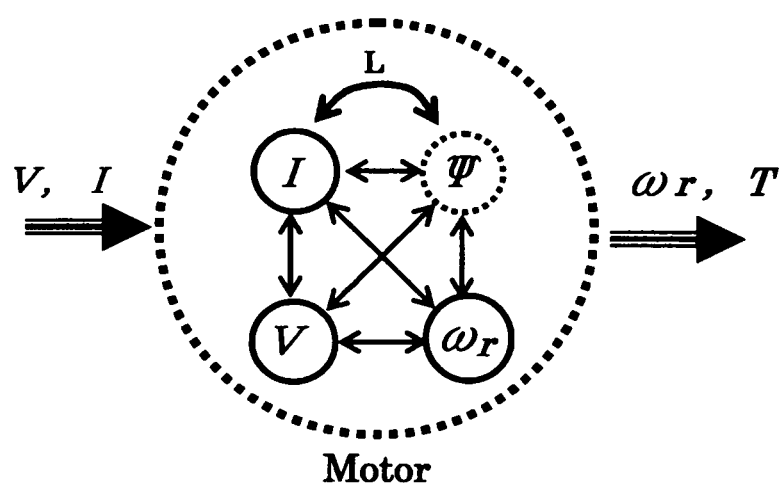
FIG. 57 is an illustration pictorially showing the voltage, current, number of interlinkage magnetic fluxes, inductance, rotational angular speed, and relationship between input and output of torque of the motor.

In this case, the motor can be expressed as a model shown in FIG. 57. Inputs to the motor are voltage V and current I, internal parameters of the motor are the voltage V, the current I, the number of interlinkage magnetic fluxes, ψ, and the rotation number ωr, and outputs from the motor are torque T and the rotation number ωr. In the formula (161), an inductance L is used as a coefficient to the current I and the number of interlinkage magnetic fluxes, ψ. As long as magnetic linearity is kept, such a proportional constant is almost meaningless.

When the torque of a motor is calculated by a magnetic field analysis such as a non-linear finite element method (FEM), the number of interlinkage magnetic fluxes, ψ, can be obtained relatively easily as information internally in a computer. In recent years, it is usual to estimate the motor characteristics by analysis techniques such as FEM.

Practical examples of the number of interlinkage magnetic fluxes computed by a computer is shown in a table in FIG. 58. The row of the table shows rotational angle positions θr of a rotor and is given a finite number of positions. The column of the table shows current information and, for example, current I2 is composed of a combination of currents Ia, Ib and Ic for the respective phases of the motor. For example, when a condition of θr=θ2 and I=I2 is designated, data ψ22 is given, of which contents are the number of interlinkage magnetic fluxes ψa, ψb and ψc of the windings Wa, Wb and Wc for the respective phases and related information XABC such as torque values thereof. Then number of combinations among those variables θr, Ia, Ib and Ic is, for example, 1000 provided that each variable consists of 10 discrete numbers. If the number of data such as ψ22 is 5 and each data has a length of 2 bytes, the total amount of data shown in FIG. 58 is 100 kilobytes. Actually the number of combinations of such variables can be reduced down to a smaller amount of the original combination numbers, such as ½, ⅓ etc. Meanwhile, the data amount is even 100 kilobytes, computers with recent highly integrated electronic techniques can process such data without any problems.

It can thus be understood that it is rational to express the motor using the voltage V, current I, the number of interlinkage magnetic fluxes, ψ, and rotation number ωr, as shown in FIG. 57, without using the non-linear inductance L shown in formula (161). In addition the data shown in FIG. 58 can be obtained by the non-linear finite element method, and then can be converted to the data shown in the table of FIG. 59. Hence, it is possible to coherently develop motors from their design to their control.

In addition, appropriateness for the motor control using the number of interlinkage magnetic fluxes ψ, which is according to the present invention, has already been reported by the present inventors in the paper: IEEJIAS: Vol. 127 (2007), No. 2 pp-158-166, titled as "Inductance Calculation and New Modeling of a Synchronous Reluctance Motor Using Flux Linkages". This paper shows that, although being a conventional synchronous motor, it is possible to accurately calculate torque based on the number of interlinkage magnetic fluxes in even a non-liner range of the magnetic saturation range; it is possible to accurately calculate using the number of interlinkage magnetic fluxes without being conscious about permanent magnets embedded in the rotor of the motor; it is possible to calculate voltage across each winding based on the number of interlinkage magnetic fluxes; and others.

The table shown in FIG. 58 can be reproduced into a table shown in FIG. 59, that is, reproduced from the variables θr, Ia, Ib and Ic to the number of interlinkage magnetic fluxes and torque. The columns of the table of FIG. 59 are the same as those of FIG. 58, to which a finite number of rotational angle positions θr of the rotor. The rows of the table in FIG. 59 show values of the torque of the motor, and for example, correspond to the torque command To shown by A6J in FIGS. 26, 56 and others. By way of example, a bit of information P22 in the matrix expresses bits of information including current values Ia, Ib and Ic passing through the windings Wa, Wb and Wc for the respective phases and the numbers of magnetic fluxes ψa, ψb and ψc interlinking those windings. The table in FIG. 59 is made by replacing the current information in FIG. 58 by the torque information. Additional use of the table in FIG. 59 provides current values for the respective phases, which should be supplied in response to the value of the torque command To.

The descriptions for FIG. 56 etc. have been made about how to decide the phase currents based on the torque and currents, using the formula (42) etc. The control method is simplified by using the table in FIG. 59, where control information which is the same as the control contents described already is mapped in a memory of a block DATA shown in FIG. 56. For controlling a motor, without the foregoing calculation, only calculated results or only actually measured results are stored in the memory of the block DATA. As shown in FIG. 59, phase current values are stored in the memory corresponding to values of the torque command To and the rotational angle position θr of the rotor. Interpolation calculation provides these phase currents with more fine values for less-erroneous control, even though the phase currents are composed of a finite number of discrete values. Further, information showing voltages corresponding to the torque command T0, the rotational angle position θr of the rotor, and the rotational angular frequency ωr of the rotor can be added to the table.

Corresponding to the rotational angular frequency ωr of the rotor, it is possible to additionally have phase-lead control in view of delay in actions of control elements. In this way, results of the control explained with FIGS. 27, 56 and other figures can be memorized for the control, which is still included in the gist of the present invention.

As information of the magnetic flux, data showing a rate of changes in the rotation of the interlinkage magnetic flux φ (dφ/φθ) may be stored in the memory. As the voltage V across the winding is given by the following formula, such change rate "dφ/dθ" can be used instead of using the interlinkage magnetic flux φ.

$$V = Nw \times d\varphi/dt$$
$$= Nw \times d\varphi/d\theta \times d\theta/dt$$
$$= Nw \times d\varphi/d\theta \times \omega r$$

Similarly, information like "Nw×dφ/dθ", which is proportional to the voltage may be stored as data in the memory. As will be described later, such data can be used in a voltage feedforward manner. These methods which utilize information indicative of the magnetic flux are also part of the gist of the present invention.

Alternatively, the interlinkage magnetic flux ψ explained with FIGS. 58 and 59 maintains the relationship defined by formula (161), so that the interlinkage magnetic flux may be used in place of using the interlinkage magnetic flux φ. Another alternative is to use the inductance L. Practically, the inductance L has a non-linear characteristic, but an average value of the inductance L is ψ/I at an operating point decide by a specified current value I. Therefore, instated of using the interlinkage manganic flux ψ, the averaged inductance value can be used equivalently to data in FIGS. 58 and 59. These variations also fall into the gist of the present invention.

(Thirty-second Embodiment)

Hereinafter is described a motor related to a thirty-second embodiment.

Figure 60:
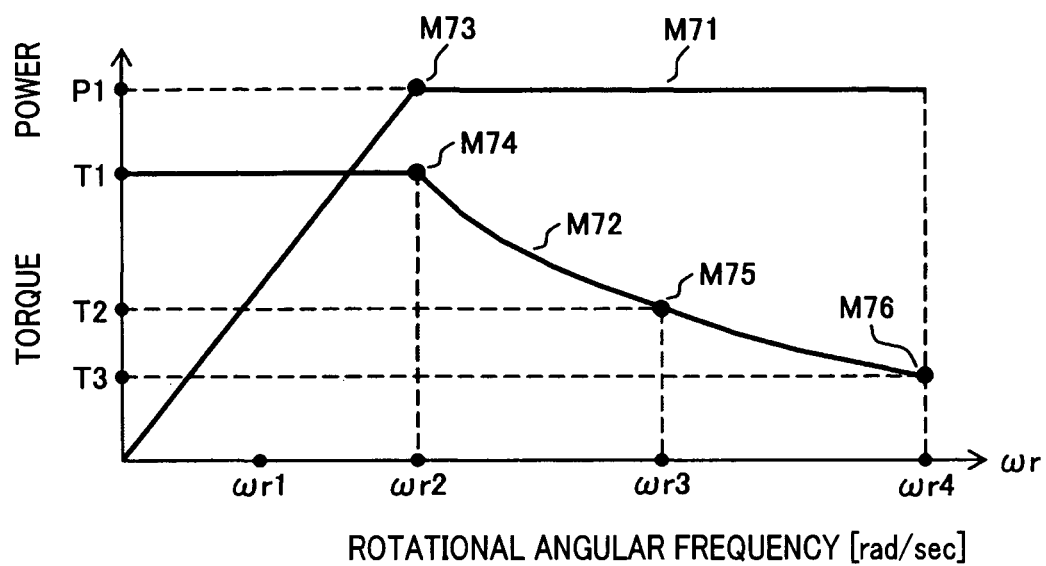
FIG. 60 is a graph showing relationships among the rotation speed, the maximum torque, and the maximum power of a motor with generally-used constant output characteristics.

FIG. 60 is a graph showing an example of a maximum torque M72 and a maximum power M71 at rotation speeds of a motor. The lateral axis presents rotational angular frequencies ωr of the rotor and the longitudinal axis presents power and torque amounts. FIG. 60 shows a typical rated output characteristic, where the torque decreases gradually as the rotation speed becomes larger than a basic rotation speed ωr2. In such a case, the control described with FIGS. 26 and 56 calculates the torque command To shown by A6J, based on an error in speeds. However, the maximum torque is limited at higher speeds as shown in FIG. 60, which means that it is required to check whether or not currents are controllable.

In order to solve the foregoing issue, the torque conversion means FQ1 and the field control means, both shown in FIG. 56, are configured to compare the torque command To with the maximum torque characteristic shown in FIG. 60. When the comparison shows that the torque command To is over the maximum torque value, it is required to replace the command by the maximum torque value, with the control performed based on the replaced command. This replacement allows the control of currents and voltages to be performed with almost no errors of the command. The characteristics of FIG. 60 can be stored in a memory in the form of formulas incorporated in control programs or in the form of a table, like FIG. 59.

(Thirty-third Embodiment)

Hereinafter is described a motor related to a thirty-third embodiment.

When attention is paid to the A-phase winding Wa, the table of FIG. 59 gives the A-phase current Ia which corresponds to the torque command, but does not provide the A-phase voltage Va. This voltage Va changes to various values as shown by formulas (38), (122), and other formulas. Especially, the soft-magnetic members of the reluctance motor have magnetic densities which change depending on current values, thus being easier to giving various complex values to the voltage. When the currents are controlled in response to only feedback control of current values, there frequently occurs a delay in current response. In particular, as the rotation speed becomes larger, the delay time of the current response influences largely on the motor torque characteristics, thus being difficult to output as expected.

To solve this drawback efficiently, there is provided a voltage feedforward means A8A as shown in drawings including FIGS. 27 and 56. As described in FIG. 59, the number of interlinkage magnetic fluxes ψa, ψb and ψc of the phase windings Wa, Wb and Wc, which correspond to the rotational angel positions θr and the torque values, can be stored. Using such number of interlinkage magnetic fluxes, the voltages Va, Vb and Vc across the phase windings can be obtained. Assume that a computer controls currents and voltages of the windings at sampling intervals of Δt. When it is assumed that the number of interlinkage magnetic fluxes of the phase windings Wa, Wb and Wc are ψa1, ψb1 and ψc1 at the last sampling time t1 and those numbers are ψa2, ψb2 and ψc2 at the current sampling time, the voltages across the phase windings are given by the following formulas:

$$Va = Nw \times d\varphi a / dt \approx (\psi a2 - \psi a1)/\Delta t \quad (162)$$

$$Vb \approx (\psi b2 - \psi b1)/\Delta t$$

$$Vc \approx (\psi c2 - \psi c1)\Delta t$$

The current control can use these values as the voltage feedforward values Vaf, Vbf and Vcf for the phases, shown in figures such as FIGS. 27 and 56, so that the current control can be accurate and quicker response. Hence the motor can output torque in a more accurate and quicker manner.

Incidentally, the mutual conversion can be realized between the phase currents Ia, Ib and Ic and the current components Iac, Iba and Icb, so that the torque conversion means FQ1 and the field control means FQ2 can perform the calculation using any ones of such two types of currents. The voltages across the phase windings can be calculated as the voltages V2ac, V2ba and V2cb relating to the current components. Further, the formulas (162) etc. can additionally include terms showing a voltage drop due to resistance and a voltage component due to flux leakage, whereby such formulas are more accurate.

(Thirty-fourth Embodiment)

Hereinafter is described a motor related to a thirty-fourth embodiment.

Figure 61:
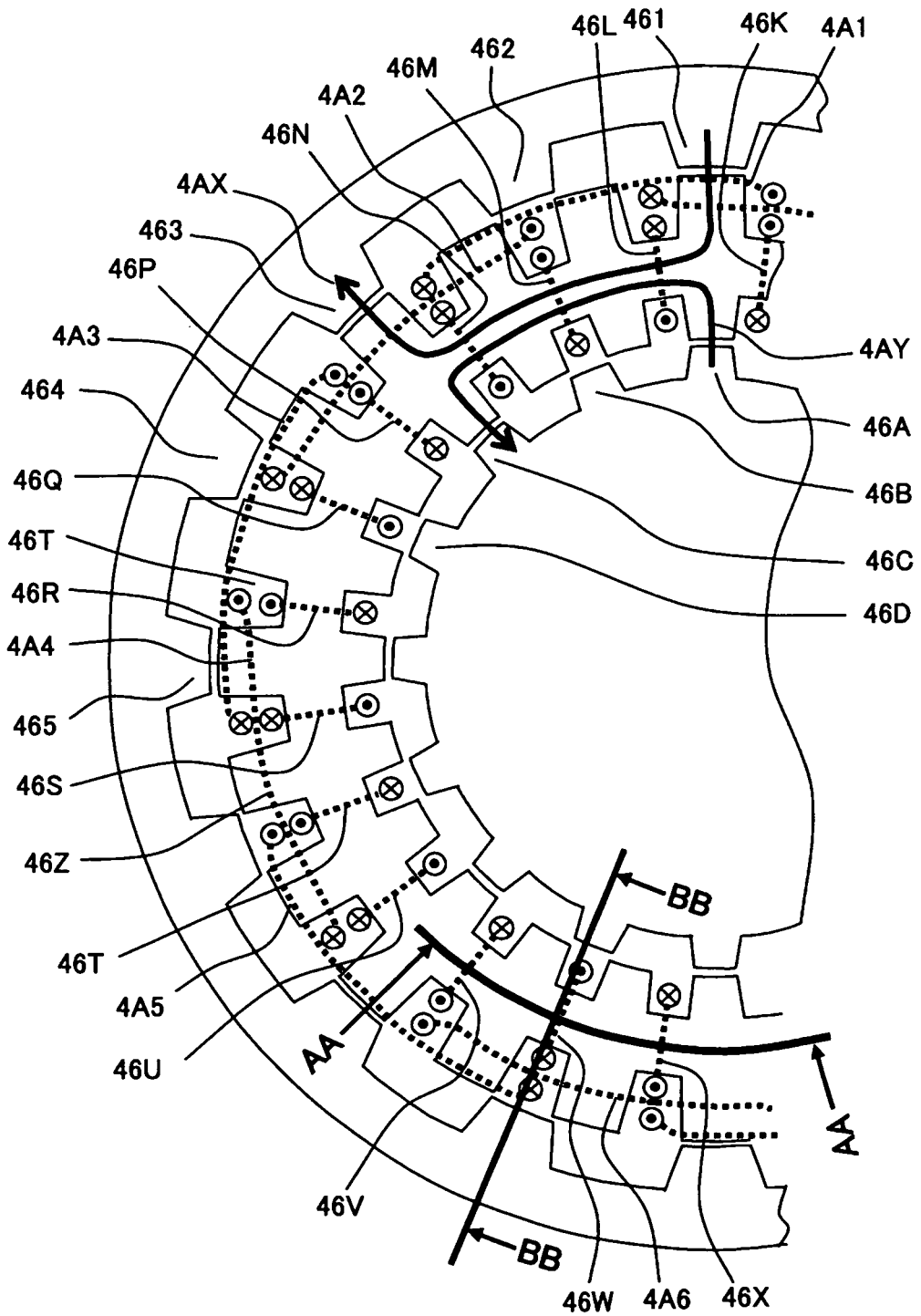
FIG. 61 is a partial lateral section showing the configuration of a motor in which the two motors according to the present invention are combined and arranged on the radially outer and inner sides of the motor.

FIG. 61 show a combined type of motor provided with two motors arranged outside and inside in the radial direction thereof. The motor shown in FIG. 61 has 8 poles, which has a structure produced by developing the motor shown in FIG. 1 into one with 8 poles. In this combined type of motor, a rotor R1 is arranged at a radially outermost position, a stator S1 is arranged radially inward so as to face the rotor R1, a stator S2 is arranged radially inward more than the stator S1, and a rotor R2 is arranged radially inward so as to face the stator S2. In other words, the motor shown in FIG. 1 is developed into multi-pole types of 8 poles and the two motors are arranged radially outer and inner positions to be combined as one motor system. The windings are similar to those incorporated in the motor in FIG. 1 or other motors described already.

In the configuration shown in FIG. 61, the radially outer stator S1 and the radially inner stator S2 are arranged back-to-back with a stator back yoke therebetween and formed as one block, in which radially outer slots and radially inner slots are also formed to be back-to-back. The positive and negative directions of currents passing windings in the radially outer and inner back-to-back paired slots are designed to be opposite to each other, thus making it possible that the phase windings can be wound through the back-to-back paired slots. Hence, the winding structure can be simpler and the coil end lengths can be shortened. Both stators S1 and S2 each have stator poles which are also radially back-to-back for every one of the phases of the motor system. The windings are toroidal windings, overcoming the fifth drawback about the full-pitch winding SRM already described.

References 461, 462, 463, 464, 465, etc. show the salient poles of the rotor R1, and references 46A, 46B, 46C, 46D, etc. show the salient poles of the rotor R2.

The windings 46K, 46N, 46R, 46U and 46X are the A-phase windings, through which one-way current is made to flow in the directions shown by the winding symbols. The respective A-phase windings are arranged at pitches of an electrical angle of 180 degrees in the circumferential direction. The respective A-phase windings can be mutually connected in serial and wound to provide matched current directions.

Alternatively, each of the windings may be independent on others, where current is supplied independently. In this case, though the number of transistors increases, the number of windings is optimized in accordance with the power supply voltage such that the total current capacity of the transistors is kept unchanged.

Reference 46M, 46Q, 46T and 46W are the B-phase windings, and are the same in structure as the A-phase windings, although being different in the phase. Reference 46L, 46P, 465 and 46V are the C-phase windings, and are the same in structure as the A-phase windings, although being different in the phase. Parts of the AC-phase magnetic fluxes are shown by references 4AX and 4AY. As illustrated, the magnetic fluxes for the same phase of the radially outer and inner motors pass mutually parallely through the stator back yoke.

By the way, there is a difference between the diameters of the radially outer and inner motors, leading to a difference of electromagnetic conditions between the motors. This means that, if electromagnetically optimizing both motors, the currents in both motors should take different values. Practically the section of each slot of the radially outer stator S1 results in being larger relatively to the inner one. Hence, the foregoing windings need to be improved in this respect. With consideration for this issue, full-pitch windings shown by AOL, A0M and A0N may be added to the structure of FIG. 61 to keep an electromagnetic balance. In FIG. 61, references 4A2 and 46Z show such added windings for the A phase, references 4A3 and 4A5 show such added windings for the B phase, and references 4A4 and 4A6 show such added windings for the C-phase. These added windings are arranged to electromagnetically contribute to the actions of the radially outer motor, thus electromagnetically optimizing both motors, thus providing a higher-output, compact-size, and lower-cost motor system.

(Thirty-fifth Embodiment)

Hereinafter is described a motor related to a thirty-fifth embodiment.

FIG. 62 shows a motor similar to the motor shown in FIG. 61 but differs from that motor in that the radially outer and inner stator poles, which are still back-to-back with the back yoke therebetween, have a phase difference of 180 degrees in the electoral angle in the circumferential direction.

References LAB, LA5 show the A-phase windings, references LA3, LA6 show the B-phase windings, and references IA1, LA4 and LA7 show the C-phase windings. The windings for the respective phases are full-pitch windings arranged at pitches of 180 degrees in the electrical angle.

References LAA, LAD show AC-phase stator poles, LAC, LAF show BA-phase stator poles, and references LAB, LAE show CB-phase stator poles. In FIG. 62, parts of the AC-phase magnetic fluxes are shown by arrows LAX and LAY. Since the radially outer stator poles are opposite in the phase to the radially inner stator poles, the magnetic fluxes return from the outer motor to the inner motor, as illustrated. Accordingly, the back yoke for both stators is not required to be arranged. The magnetic flux paths in the stators are shown in FIG. 62. However, the stator poles should be held by a non-magnetic member.

The motor configuration shown in FIG. 62 does not need arrangement of the back yoke of the stator, whereby a difference between the inner diameter DR1 of the radially outer rotor R1 and the outer diameter DR2 of the radially inner rotor R2 can be made smaller than that of the configuration shown in FIG. 61. In this respect, the motor torque can be made larger. However, the coil end portion of the windings become longer, thereby increasing the resistance of the windings, compared to that of the configuration shown in FIG. 61.

On account of the difference between the diameters DR1 and DR2, a difference between amounts of magnetic fluxes is likely to be caused between the outer and inner motors. To overcome this issue, as shown by dashed lines LAU, LAV, LAW etc., back yokes of limited sizes are disposed at both stators, thus eliminating the issue resulting from the difference of the magnetic flux amounts. Hence, the motor can be optimized magnetically as a whole, thus increasing motor torque. Additionally, the respective stator poles can be linked by a soft-magnetic member, thus facilitating production of motor and improving the rigidity of the stator.

(Thirty-sixth Embodiment)

Hereinafter is described a motor related to a thirty-sixth embodiment.

Figure 63:
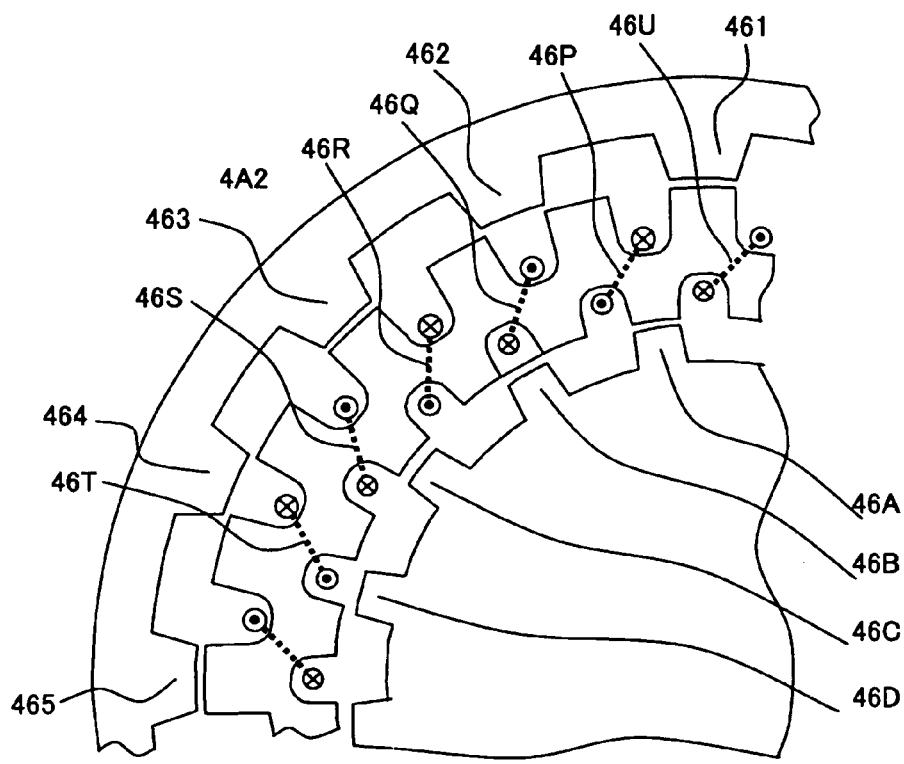
FIG. 63 is a partial lateral section showing the configuration of a motor produced similarly to the combined moor shown in FIG. 61, but the radially-inner motor have slots whose positions are shifted by an amount corresponding to ½ slot in the counterclockwise direction.

FIG. 63 show a motor, in which, compared with the motor shown in FIG. 61, the radially inner stator S2 is shifted by ½ of a slot pitch in the CCW circumferential direction. An additional change is that each slot is given an approximately round bottom shape. References 46U, 46R show A-phase windings, references 46Q, 46T show B-phase windings, and references 46S, 46P show C-phase windings. This formation allows both stators to have wider back-yoke magnetic paths. As a result, the outer diameter of the inner rotor R2 can be made larger. The torque of the motor can be improved accordingly. The shapes of the slots may be changed to other shapes such as trapezoid in section, provided that it is possible to provide the back yoke with larger sectional areas through which magnetic fluxes pass.

Figure 64:
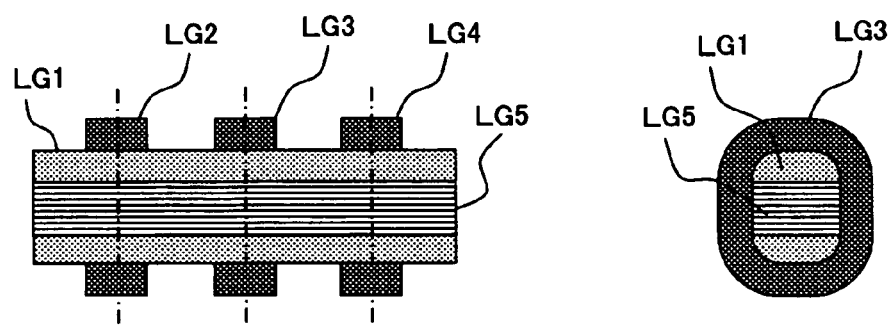
FIG. 64 shows views showing a soft-magnetic member added to a back yoke portion along the rotor shaft direction thereof in the combined motor shown in FIG. 61.

Further, (a) of FIG. 64 shows a section taken along a line AA-AA in FIG. 61, and (b) of FIG. 64 shows a section taken along a line BB-BB in FIG. 61. A soft-magnetic member LG1 is added to a side surface of the stator in the rotor shaft direction, which corresponds to a circumferential side surface of a coil end portion of the windings. This gives the stator back yoke a larger section for flux passage. References LG2, LG3 and LG4 show windings, and a reference shows soft-magnetic members of the stator, which are stacked magnetic steel sheets. As a result, the size of the back yoke of both stators can be shortened in the radial direction, while the outer size of the radially inner rotor R2 can be made larger. This will also contributes to improvement of torque of the motor.

(Thirty-seventh Embodiment)

Hereinafter is described a motor related to a thirty-seventh embodiment.

Figure 65:
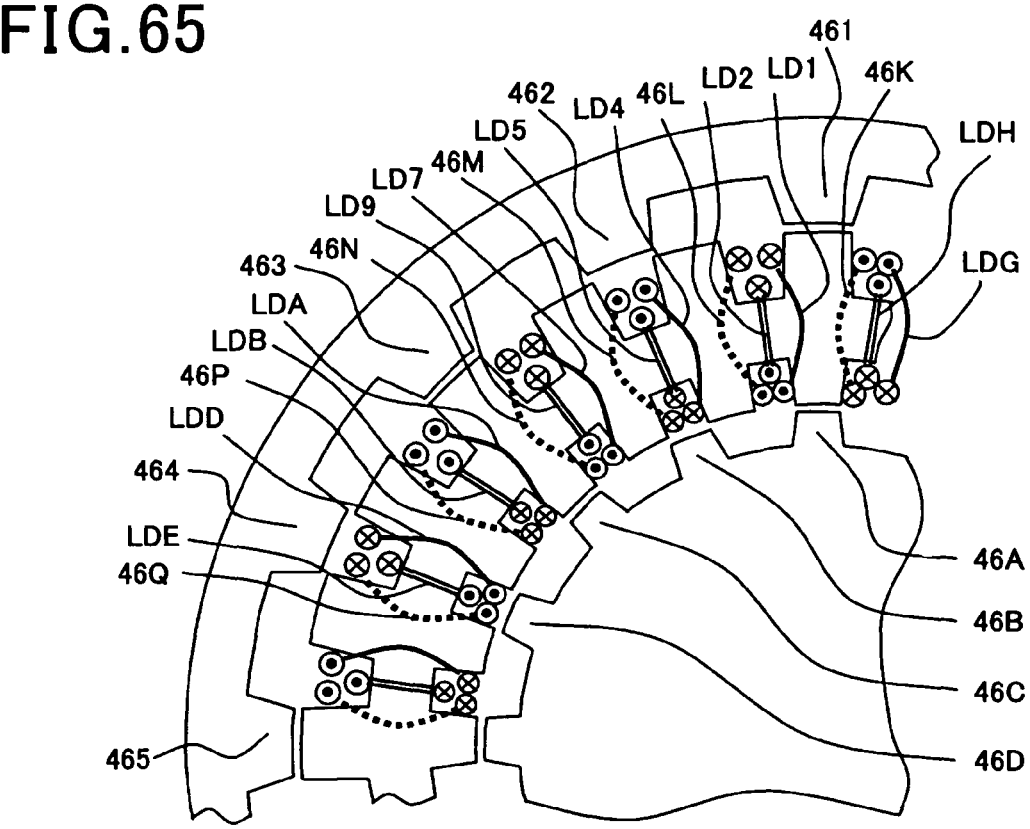
FIG. 65 is a partial lateral section showing the configuration of a motor produced similarly to the combined moor shown in FIG. 61, in which field windings and windings for regenerating currents are added to the windings for the respective phases of the motor.

FIG. 65 shows a motor, in which compared with the configuration shown in FIG. 61, field windings LDH, LD2, LD5, LD9, LDB and LDE are added. These field windings are connected in series to each other and wound to provide the current directions shown by current direction symbols. The same actions as those described with the field windings shown in FIG. 46 are obtained. The currents passing through the field windings can be supplied by the circuits shown by various figures including FIGS. 47, 48 and 50.

Additionally to the above, regeneration windings LDG, LD1, LD4, LD7, LDA, LDD etc. can also be added. These regeneration windings correspond to the regeneration windings 532, 534 and 536 in FIG. 42. Hence, the control circuit shown in FIG. 42 can be used to supply the currents to those regeneration windings.

Of course, either ones of the above field windings or the regeneration windings can be arranged. Alternatively both types of windings can be arranged concurrently. In a viewpoint of a simplified model, a filed winding composed of serially connected phase windings can act for regeneration of power. However, the respective windings have leakage inductance components etc., which causes self-inductance components as well as mutual inductance components. Hence, it is considered that the field and regeneration windings act differently from each other when regeneration is performed.

(Thirty-eighth Embodiment)

Hereinafter is described a motor related to a thirty-eighth embodiment.

Figure 66:
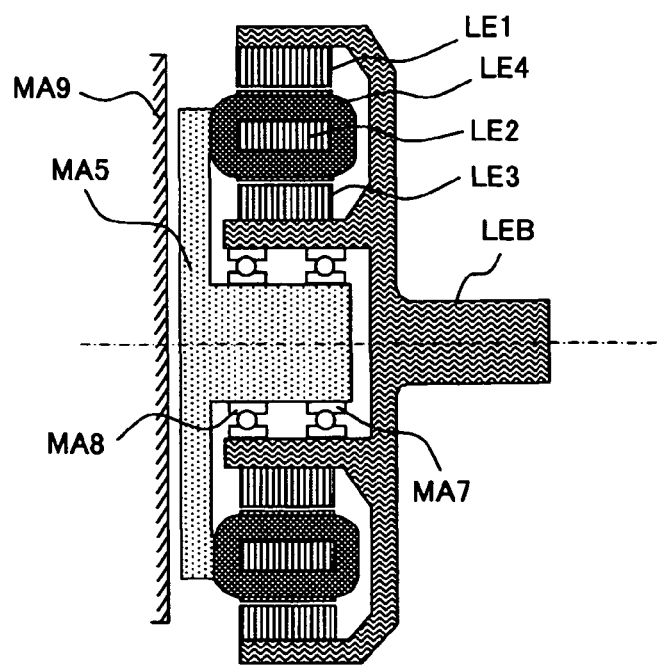
FIG. 66 is a longitudinal section exemplifying the combined motor shown in FIG. 61.

FIG. 66 exemplifies a longitudinal section of the combined motor shown in FIG. 61. A reference LE2 shows a soft-magnetic member composing the radially outer and inner stators S1 and S2. A reference LE4 shows stator windings. A reference MA5 shows a stator fixing member which fixedly supports both stators. A reference MA9 shows a fixed portion which is part of a machine for instance. The stator fixing member MA5 is fixed to the fixed portion MA9 using bolts or other fixing means. A reference LE1 shows a radially outer rotor R1, while a reference LE3 shows a radially inner rotor R2. Both rotors R1 and R2 are supported by a rotation member integrated with the rotor output shaft LEB. The stator fixing member MA5 supports the rotation member using bearings MA7 and MA8.

When it is desired to provide a flat motor, such a motor can be realized by the configuration shown in FIG. 66 in a relatively simpler manner. In contrast, if an application requires that the rotor output shaft have a higher rigidity or the rotor shaft rotate at higher speeds, the configuration shown in FIG. 66 may be short of rotor rigidity, which may result in generation of vibration and/or noise. As the combined motor in FIG. 66 should be structured in a complex manner, the rotor should be supported by a cantilever member. This is attributable to a structure in which the stators and the rotors are required to be supported on mutually opposite sides.

Figure 67:
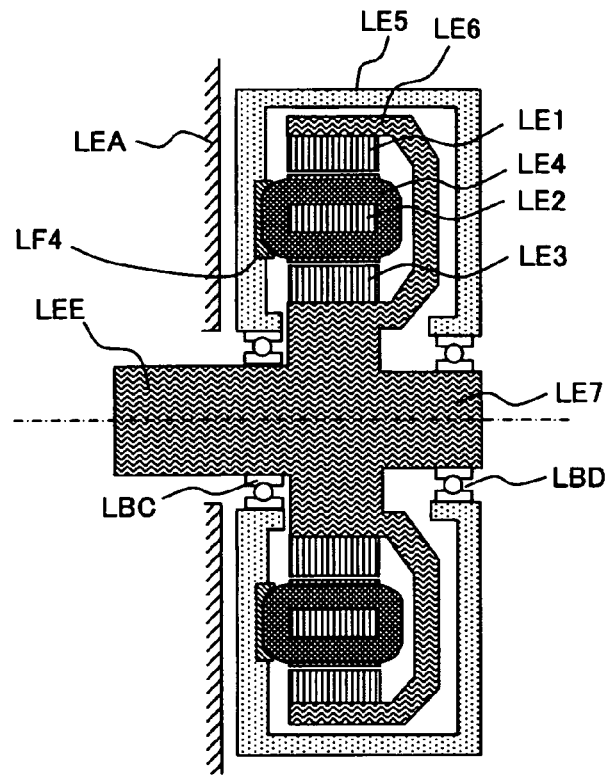
FIG. 67 is a longitudinal section exemplifying the combined motor shown in FIG. 61, in which the rotor shaft is given a higher rigidity.

In order to solve this drawback, there is proved a configuration shown in FIG. 67. A reference LEA shows a fixed portion of a machine body and other devices. A reference LE5 shows a motor case which supports a stator core LE2 and which is secured to the fixed portion LEA. A rotor output shaft LEE, and, the rear end LE7 of a rotor shaft are supported on the motor case LE5 using bearings LBC and LBD.

According to this configuration, the rotor shaft can be supported at both ends in its axial direction, thus raising the supporting rigidity for the motor and reducing vibration of the rotor. The supporting portion of the motor and the rotor output shaft are present on the same side. Though this combined motor has a complex internal structure compared with a motor system equipped with a single motor, this combined motor can be used for applications which require precision and lower noise.

(Thirty-ninth Embodiment)

Hereinafter is described a motor related to a thirty-ninth embodiment.

Figure 68:
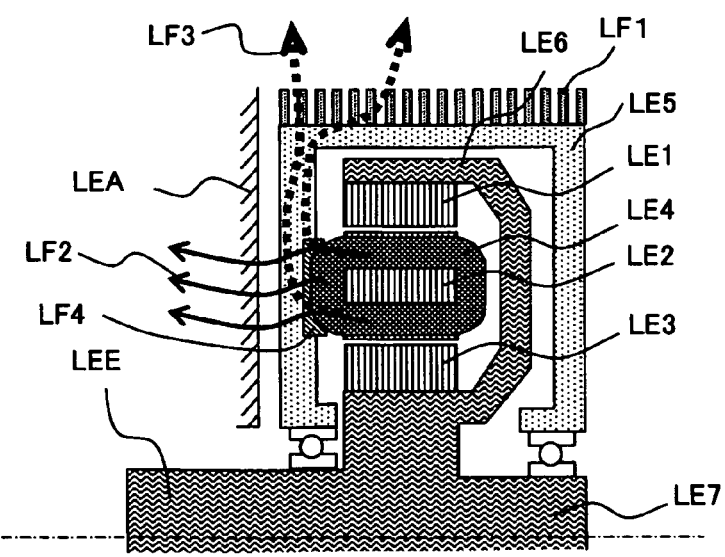
FIG. 68 is a view exemplifying the combined motor shown in FIG. 67, in which heat is effectively dissipated from the motor.

FIG. 68 enlarges part of the configuration in FIG. 67. Heat QW from the windings LE4 is large, so that it is important how to dissipate this heat outside.

The windings LE4 is made of copper or, in rare cases, made of aluminum, so that these materials are higher in thermal conductivity.

The windings LE4 is wound to adhere tightly to a thermal conducting member LF4 of which thermal resistance is lower. This terminal conducting member LF4 is arranged to adhere to the motor case LE5. The terminal conducting member LF4 is made of, for example, clay-like material, varnish, or thin electrical insulating material. Heat from the motor case is transmitted toward the fixed portion LEA as shown by arrows LF2.

The heat QW from the windings and heat QF such as iron loss of the soft-magnetic member can be dissipated effectively by positively adopting windings having high thermal conductivity. Particularly, in a flat motor whose stator is thinner in its rotor axial direction, it is useful to produce the windings made of thermal conductive material. Alternatively, the fixed portion LEA can be made of materials having higher cooling capability and the motor case LE5 has partially opened holes. The fixed portion LEA and the thermal conducting member LF4 are arranged to be touched directly with each other, thus improving the thermal conductive characteristic for the heat dissipation.

Materials and shapes of the fixed portion LEA and the motor case LE5 are not limited to specified ones, but both members are desired to have higher thermal conductive efficiency. Liquid cooling techniques and heat pipes can be used as well. As illustrated, a heatsink member LF1 is added to produce a heat dissipation path shown by LF3.

(Fortieth Embodiment)

Hereinafter is described a motor related to a fortieth embodiment.

FIG. 21 shows a motor provided with 6 stator poles arranged in an electrical angle of 360 degrees and 2 rotor salient poles. This motor configuration has some inconveniences; a drop in toque when the rotor salient poles are about to reach the openings, i.e., slots, of the stator, and leakage flux from the stator openings increases when the stator openings are made larger. The torque drop and the leakage flux increase are conflicting to each other in a viewpoint of the sizes of the stator openings. When the openings are larger, the leakage flux therefrom decreases, but the torque results in a decrease thereat.

Figure 69:
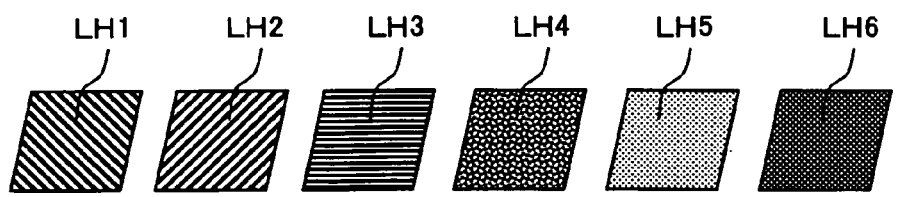
FIG. 69 is a development view showing a linear development of the circumferential shape of the surfaces of the stator poles to the rotor in the configuration of FIG. 1.

FIG. 69 shows a lineally expanded view of an inner circumferential surface of the stator shown in FIG. 21. In FIG. 69, the lateral direction corresponds to a rotor circumferential direction and the longitudinal direction corresponds to a rotor shaft direction. References LH1, LH4 show an AC-phase stator poles, references LH3, LH6 show a BA-phase stator poles, and references LH5, LH2 show a CB-phase stator poles. As shown, the respective stator poles are given a skew to reduce ripples in the torque. Stepped skews may be given to such poles. Addition of the skew is useful for reducing torque ripples, while still preventing leakage flux from increasing.

Figure 70:
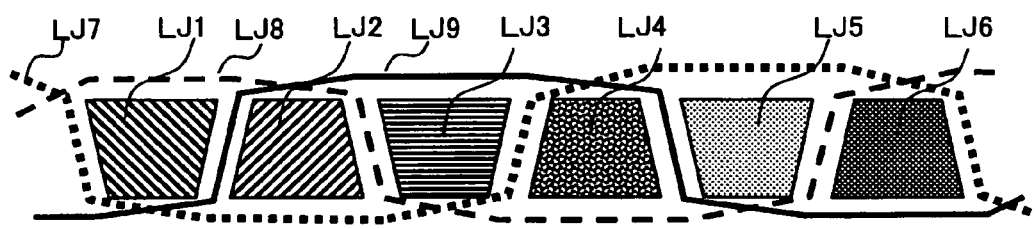
FIG. 70 is a view showing a configuration in which the shapes of the stator poles shown in FIG. 69 are trapezoidal and the stator poles are arranged such that the trapezoidal shapes are upside down one by one in the circumferential direction.

FIG. 70 shows the stator poles each shaped into a trapezoid. References LJ1, LJ4 show the AC-phase stator poles, references LJ3, LJ6 show the BA-phase stator poles, and references LJ5, LJ2 show the CB-phase stator poles. A reference LJ7 shows an A-phase winding Wa, a reference LJ8 shows a B-phase winding, and a reference LJ9 shows a C-phase winding. Soft-magnetic members having the above shapes may be produced by methods of some kind, and the stator poles shown in FIG. 70 are also effective for reducing torque ripples, like the configuration shown in FIG. 69. The configuration in FIG. 70 is superior to that shown in FIG. 69 in that the windings can be arranged more easily. The windings can be wound along the trapezoidal shape, thus shortening the length of the windings.

(Forty-first Embodiment)

Hereinafter is specifically explained a motor related to a forty-first embodiment.

Figure 71:
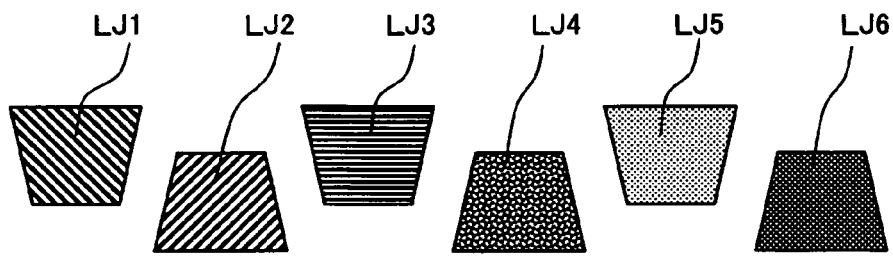
FIG. 71 is a view showing a configuration in which the stator poles shown in FIG. 70 are shifted alternately in the rotor shaft direction.

FIG. 71 shows a configuration in which stator poles are alternately shifted in the direction of the rotor shaft, i.e. in a direction each stator opening becomes large, with respect to the arrangement of the stator poles shown in FIG. 70. As will be understood from this configuration, the magnetic flux leakage at each opening can be reduced without changing the magnitude of the torque in principle.

Figure 72:
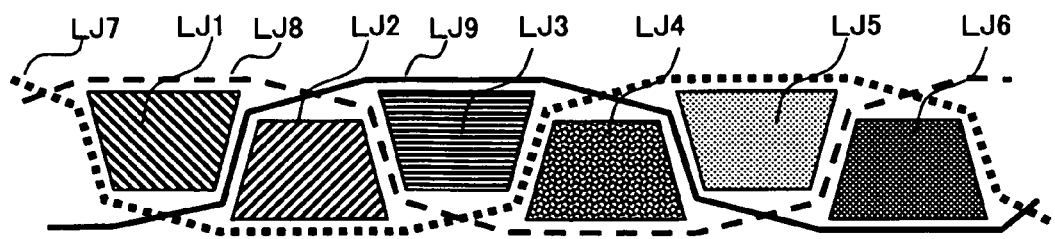
FIG. 72 is a view showing a configuration in which the widths of the shapes of the stator poles shown in FIG. 71 are widened in the circumferential direction and the respective phase windings are arranged to show arrangement relationships between the stator poles and the windings.

FIG. 72 shows a configuration in which the width of each stator pole in the circumferential direction is increased so that the size of each stator opening will be approximately the same with that in FIG. 70. Accordingly, while the magnetic flux leakage at each slot opening is of the same level as in the configuration of FIG. 69 or 70, torque ripple is reduced. This configuration is able to eliminate the contradictory relationship mentioned above. At the same time, owing to the increase of the circumferential width of each stator pole, average torque is increased. Further, since AC-phase stator poles LJ1 and LJ4 are symmetrically arranged with respect to the direction of the rotor shaft, force in the direction of the rotor shaft is cancelled.

The portion where a phase winding intersects another phase winding needs a space from the view point of the process of providing winding. This portion conveniently coincides with the short side of the trapezoidal shape of each stator pole, ensuring the space for the intersection. Thus, productivity is enhanced and the length of each coil end in the direction of the rotor shaft is reduced.

The motor having the configuration shown in FIG. 21 may use the arrangement and the configuration of the stator and the windings shown in FIG. 70. In this case, torque ripple is reduced and magnetic flux leakage at each slot opening does not become excessively large. Accordingly, the problem of magnetic saturation of the stator poles is mitigated. In addition, since the length of the winding is reduced, winding resistance is reduced. In this way, a motor with good productivity of the winding is realized.

(Forty-second Embodiment)

Hereinafter is specifically described a motor related to a forth-second embodiment.

Figure 73:
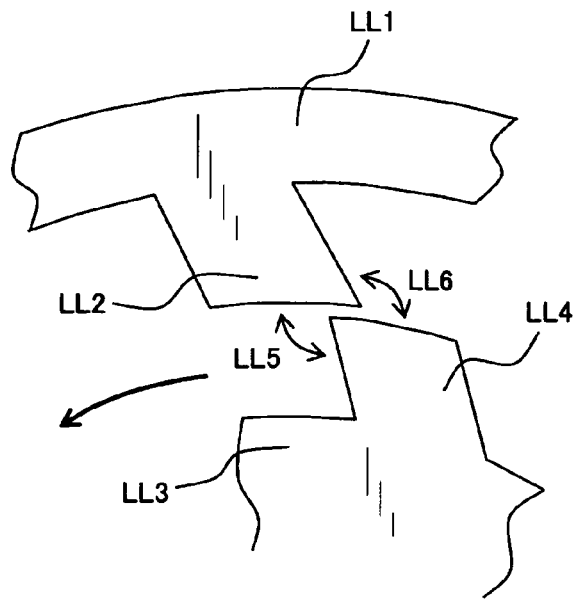
FIG. 73 is a view showing a configuration in which the stator poles and the rotor salient poles of the motor shown in FIG. 1 are tilted to the circumferential direction in mutually opposite directions.

FIG. 73 is a diagram illustrating a partially enlarged view of a stator pole LL2 and a rotor salient pole LL4, which are circumferentially inclined in the reverse direction. Reference LL1 shows a back yoke of the stator and reference LL3 shows a back yoke of the rotor. With this configuration, magnetic flux leakage at portions indicated by arrows LL5 and LL6 is reduced.

The magnetic flux leakage at these portions contributes to the generation of torque to some extent. However, in the absence of the magnetic flux leakage at these portions, torque will not be reduced. When the magnetic flux leakage is reduced, magnetic saturation in the stator poles and the rotor salient poles is mitigated. As a result, peak torque is increased, while torque ripple is decreased when torque is large. However, this effect is exerted only for the torque in the counterclockwise direction CCW. An adverse effect will be exerted for the torque in the clockwise direction CW. The motor configuration gives higher priority to one-way torque. One-way rotation however finds several applications such as to blowers, compressors and generators, and furthermore, to the motors for driving electric cars. All of these applications, in which efficiency is sought for, are important.

(Forth-third Embodiment)

Hereinafter is specifically explained a motor related to a forty-third embodiment.

Figure 74:
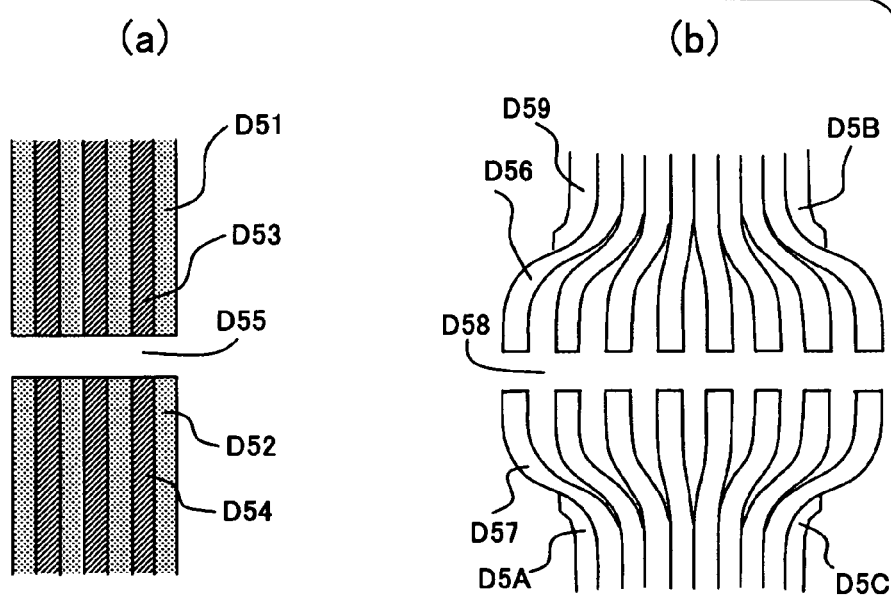
FIG. 74 is a view showing how to equivalently reduce an air gap between the stator poles and the rotor salient poles.

FIG. 74 shows by (a) a diagram that is a partially enlarged view of a portion where the stator faces the rotor. Reference D51 shows a soft-magnetic material, such as electromagnetic steel plates, of stator poles. Reference D53 shows a non-magnetic material, such as resin or space. Reference D52 shows a soft-magnetic material, such as electromagnetic steel plates of rotor salient poles. Reference D54 shows a non-magnetic material, such as resin or space. Reference D55 shows an air gap portion.

As shown in Formulas (29), (30), (31) and (42), for example, torque of a reluctance motor is able to increase torque when the air gap length Lgap is reduced. In other words, when magnetic resistance of the air gap portion D55 is decreased, torque is increased. In the configuration shown in FIG. 74 by (a), magnetic resistance is reduced by increasing the cross section of a magnetic path through which the stator pole faces the rotor salient pole. In other words, the air gap length Lgap is equivalently reduced. This effect corresponds to the effect exerted by reducing the current component Ag in the torque characteristics shown in FIG. 15.

On the other hand, the technique of reducing the air gap length Lgap such as to 0.2 mm may raise a problem of the strength of the rotor, a problem in taking a measure against the entry of foreign matters, such as dust, a problem involved in achieving accuracy in processing and assembling parts, and the like. Owing to the configuration explained above, equivalently reducing the air gap length Lgap is effective. However, this increases the volume of the magnetic materials of the stator and the rotor. Therefore, overall arrangement is required to be made.

FIG. 74 shows by (b) the shape of a tip end of the stator pole and the shape of a tip end of the rotor salient pole, both of which are deformed compared to the shapes shown by (a). Gaps excepting an air gap portion D58 may be filled with a resin. References D56, D59 and D5B show the soft-magnetic material of the stator pole. References D57, D5A and D5C show the soft-magnetic material of the rotor salient pole. FIG. 74 shows by both (a) and (b) configurational examples of attaining similar effect.

(Forty-fourth Embodiment)

Hereinafter is specifically explained a motor related to a forty-fourth embodiment.

Figure 75:
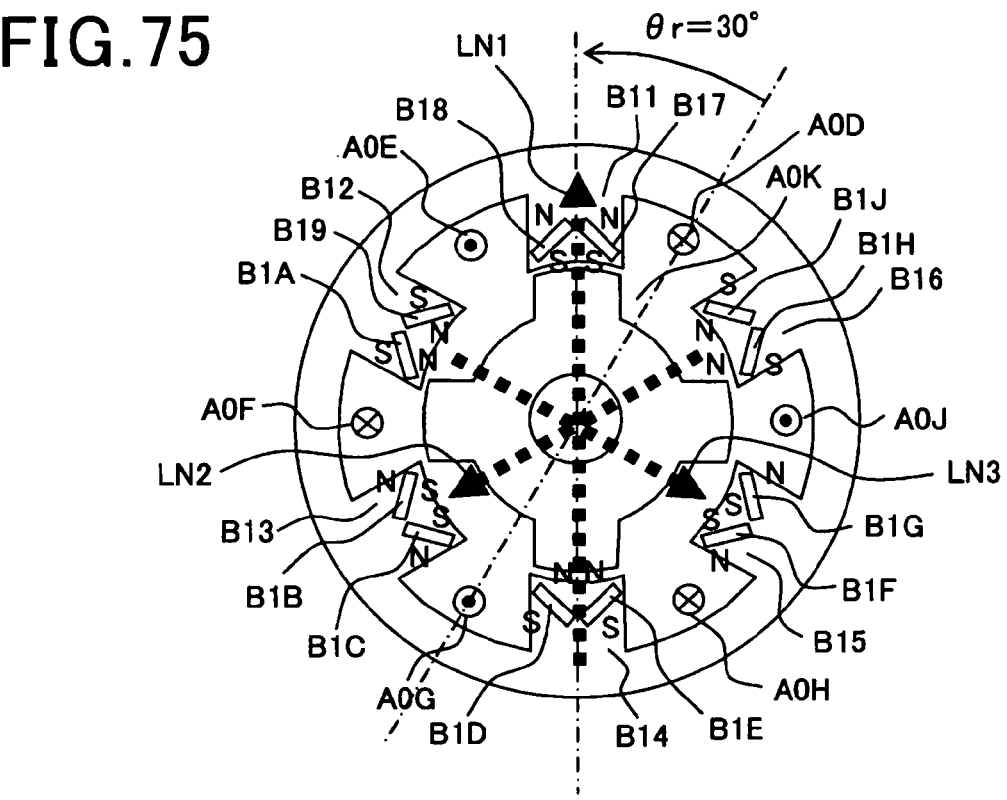
FIG. 75 is a view exemplifying how to magnetize the permanent magnets or increase magnetism of the permanent magnets, which are shown in FIG. 51.

FIG. 75 shows a motor having the same configuration as the motor shown in FIG. 51 and shows a method of magnetizing or increasingly magnetizing the permanent magnets B17, B18, B1D and B1E of the AC-phase stator poles. Current of the same value is imparted to the A-phase current Ia of A0D and the C-phase current Ic of A0H at a rotational angle position θr=30 degrees of the rotor to generate magnetomotive force shown by an arrowed broken line as LN1. Thus, the permanent magnets of the AC-phase stator poles are magnetized or increasingly magnetized. When increasingly magnetized, the magnitude of current is required to be made suitable for the degree of the increase. The value of current of the suitable magnitude generally depends on the type of the permanent magnets and the history of magnetization.

In the magnetization, magnetomotive force LN2 in the direction of the BA phase and magnetomotive force LN3 in the direction of the CB phase are zero and thus no magnetic influence is caused on the permanent magnets by them. Further, the relationship in magnetizing or increasingly magnetizing the permanent magnets of the AC-stator poles is the same as the relationship established at rotor positions θr=120 degrees, θr=210 degrees and θr=300 degrees. Thus, similar operation may be performed.

As explained above, the magnets of the motor related to the present invention are not demagnetized when torque is generated. Therefore, magnets whose thickness is reduced to utmost limit of generating required magnetic flux may be used. Accordingly, magnets are comparatively easily magnetized or demagnetized and thus magnetization or demagnetization can be performed using the control device for generating torque of the motor.

Similar to the AC phase, permanent magnets B1B, B1C, B1H and B1J of the BA-phase stator poles can be magnetized or increasingly magnetized by imparting the same value to the A-phase current Ia and the B-phase current Ib at a rotational position θr=45 degrees. Also, similar to the AC phase, permanent magnets B1F, B1G, B19 and B1A of the CB-phase stator poles can be magnetized or increasingly magnetized by imparting the same value to the C-phase current Ica and the B-phase current Ib at a rotational position θr=90 degrees.

Further, magnetization or increase of magnetization may be performed by continuing supplying currents Ia, Ib and Ic of all phases during the rotation of the rotor. With this method, field magnetic flux is effectively changed in the case where motor is operated in the range of ωr2 to ωr4 of the rotational angle frequency, in the characteristics of the relationship between the number of rotations and torque shown in FIG. 60. In this case, however, magnetomotive force is reduced to ½ compared to the case where stator poles are excited by two windings at a specific position of the rotor, and this reduced magnetomotive force acts on the permanent magnets.

(Forty-fifth Embodiment)

Hereinafter is specifically explained a motor related to a forty-fifth embodiment.

Figure 76:
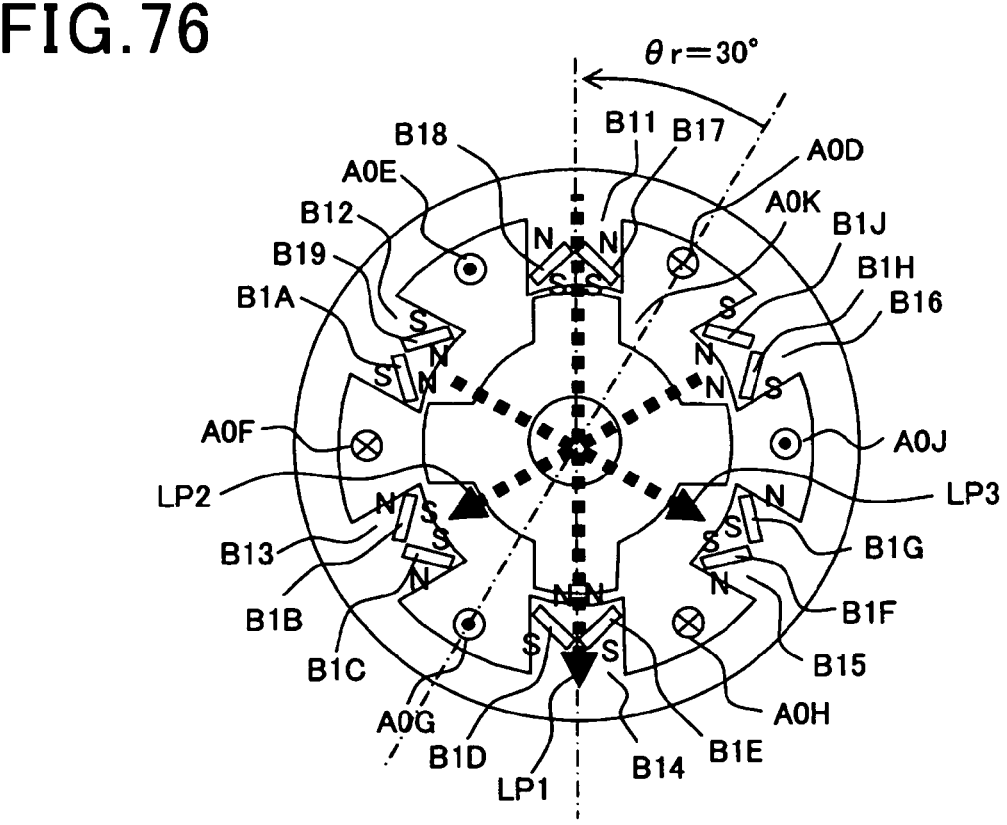
FIG. 76 is a view exemplifying how to demagnetize the permanent magnets or decrease magnetism of the permanent magnets, which are shown in FIG. 51.

FIG. 76 shows a motor having a configuration similar to that of the motor shown in FIG. 75. FIG. 76 shows a method of degaussing or demagnetizing permanent magnets B17, B18, B1D and B1E of the AC-phase stator poles. When the B-phase current Ib of A0F is supplied at a rotational position θr=30 degrees, a magnetomotive force as shown by a broken-line arrow of LP1 is generated to degauss or demagnetize the permanent magnets of the AC-phase stator poles. When demagnetized, the magnitude of the current is required to be adjusted to a magnitude suitable for the extent of the demagnetization. In this case, magnetomotive forces shown by LP2 and LP3 are rendered to have the same values. However, since the rotor salient poles are directed to neither the VA-phase stator poles nor the CB-phase stator poles, the magnitude of the magnetic field that acts on these permanent magnets is small. Thus, neither the BA- nor the CB-phase stator poles are ensured not to be increasingly magnetized.

Similar to the AC phase, permanent magnets B1B, B1C, B1H and B1J of the BA-phase stator poles are degaussed or demagnetized at a position θr=45 degrees by supply the C-phase current Ic. Also, similar to the AC phase, permanent magnets B1F, B1G, B19 and B1A of the CB-phase stator poles are demagnetized or increasingly magnetized at a position θr=90 degrees by supply the A-phase current Ia.

As explained above, the permanent magnets of the stator poles are degaussed or demagnetized using the control device and the windings that generate torque of the motor. However, it should be noted that these actions are required to be taken at specific positions of the rotor.

Figure 77:
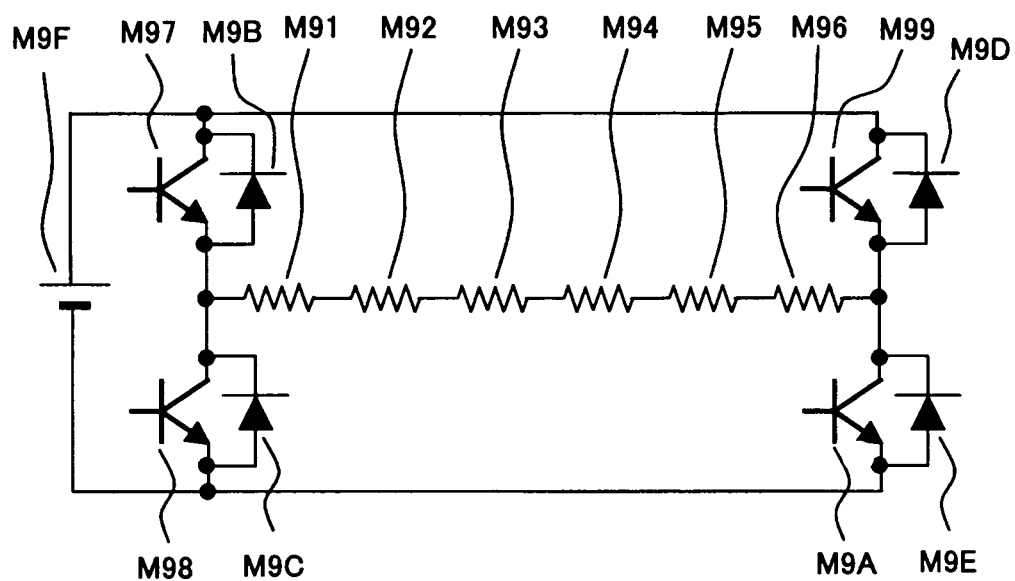
FIG. 77 is a diagram showing a relationship between a control diagram to demagnetize of the permanent magnets or decrease magnetism of the permanent magnets.
Figure 78:
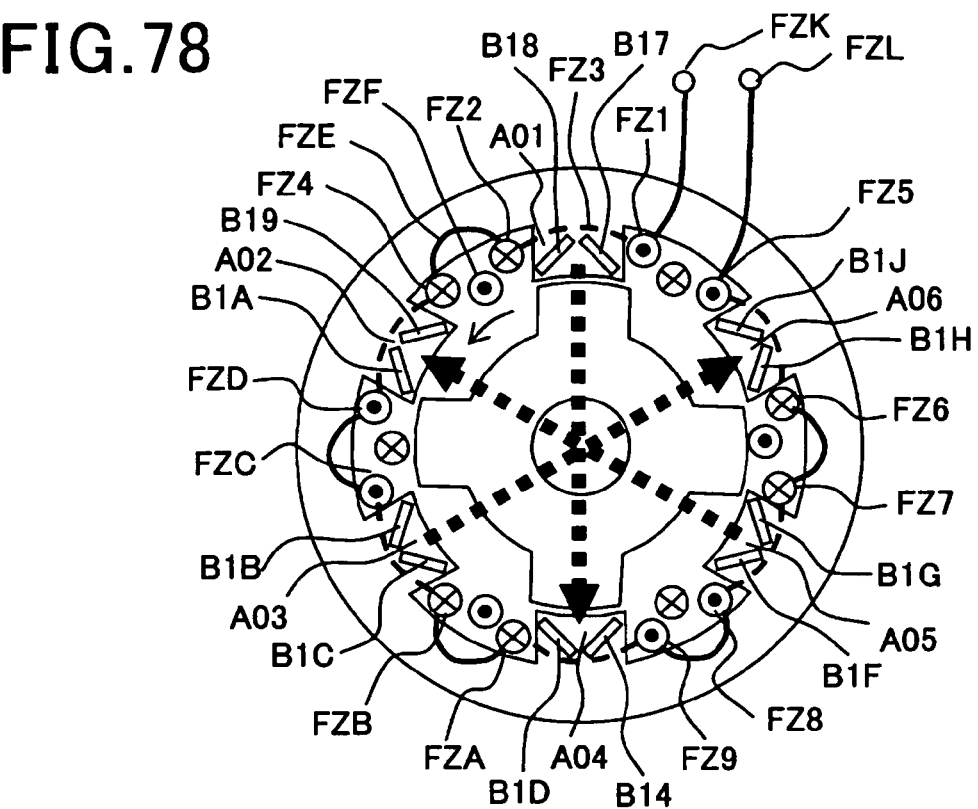
FIG. 78 is a view exemplifying how to perform the demagnetization and decrease the magnetism using a configuration in which the windings at the respective stator poles are connect in series to each other and currents are supplied thereto.

As shown in FIG. 76, degaussing or demagnetization of permanent magnets can be carried out by additionally providing excitation windings. FIG. 77 shows excitation windings M91, M92, M93, M94, M95 and M96 which are arranged in the same manner as the field windings shown such as in FIG. 48. When transistors M99 and M98 are turned on, an excitation current directed in a direction of demagnetizing the permanent magnets of each stator pole is supplied to degauss or demagnetize the permanent magnets of each stator pole. When the excitation current is supplied while the rotor is rotated, the permanent magnets are degaussed or demagnetized all together. FIG. 78 is a cross-sectional view of a motor provided with the permanent magnets of FIG. 51 and mounted with the excitation windings of FIG. 77 together with the field windings of FIG. 46.

As shown by a current symbol in the figure, the excitation current directed to the direction of demagnetizing the permanent magnets is directed opposite to the direction of the phase currents Ia, Ib and Ic. The directions of the magnetomotive force caused by the excitation current are shown by three thick arrowed broken lines in the vicinity of the center portion of FIG. 78.

When the permanent magnets of each stator pole are magnetized or increasingly magnetized during rotation, the phase currents Ia, Ib and Ic are supplied as explained referring to FIG. 75. Thus, the magnitude of the permanent magnets can also be changed in a high-speed region.

In the characteristics of the relationship between the number of rotations and torque shown in FIG. 60, change of the field magnetic flux is effective when the motor is operated in a range of ωr2 to ωr4 of the rotational angle frequency. The variable function of the permanent magnets is distinguished when the amount of magnetic flux of the permanent magnets is changed in the high-speed range of the motor.

In general, in controlling field magnetic flux using field current, for example, a current of intensifying or weakening the magnitude of the field is required to be continuously supplied because the loss of field cannot be ignored. In this regard, the variable function of the permanent magnets contributes to drastically reducing the loss of field.

Since magnetization or demagnetization is performed in a short time, the windings can be configured using fine windings. Also, burden is lessened in providing a thermal design for the discharge of the transistors, and thus the size of a cooling portion or the like can be reduced. In addition, when the magnetic flux of the permanent magnets of each stator pole is desired to be reduced during operation, the excitation current explained above may be supplied.

Figure 79:
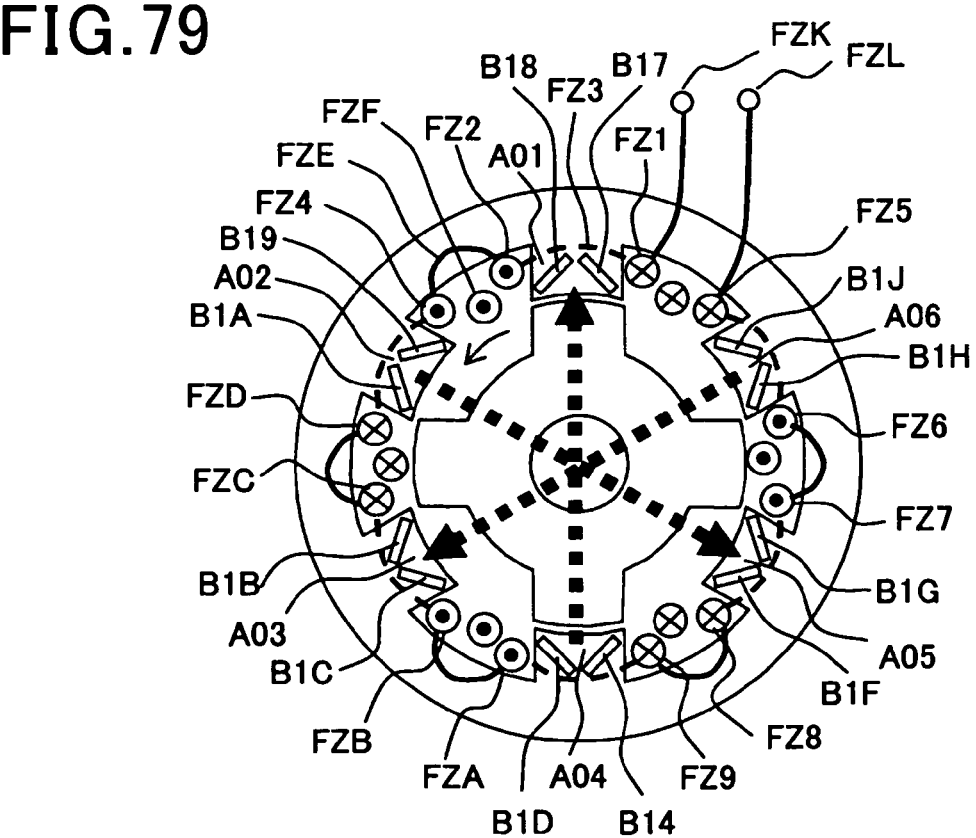
FIG. 79 is a view exemplifying how to perform the magnetization and increase the magnetism using a configuration in which the windings at the respective stator poles are connect in series to each other and currents are supplied thereto.

Alternatively, transistors M97 and M9E (see FIG. 7) having a small capacity equivalent to the level of the field current may be added. In this case, when both of the transistors are turned on, current is supplied in the direction of the magnetic flux of the permanent magnets, i.e. the direction of the magnetic flux of each stator pole, to increase the magnitude of the field magnetic flux. Alternatively, the current capacity of the transistors M97 and M9E may be increased to magnetize or increasingly magnetize the permanent magnets. In this case, the circuit and the windings of FIG. 77 can be used not only for degaussing or demagnetization, but also for magnetization or demagnetization. In particular, when the current for degaussing or magnetizing the permanent magnets becomes larger than the phase currents Ia, Ib and Ic, the circuit and the windings of FIG. 77 may be used as a variable circuit for the permanent magnets of the magnetic fields. The directions of the magnetomotive force caused by the excitation current are indicated by the three thick arrowed broken lines in the vicinity of the center portion of FIG. 79.

(Forty-sixth Embodiment)

Hereinafter is specifically described a motor related to a forty-sixth embodiment.

Figure 80:
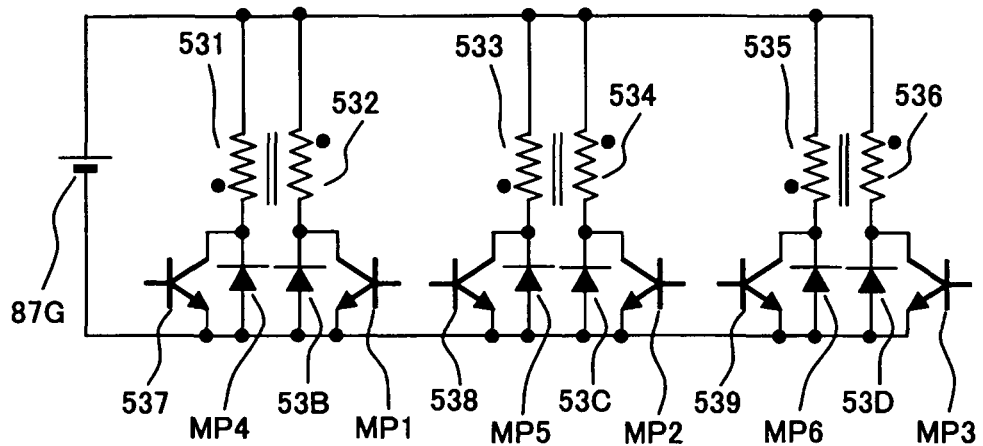
FIG. 80 is a diagram showing a configuration in which two windings are wound parallely with each other in each slot of the motor shown in FIG. 1, transistors are connected to the two windings in mutually opposite directions to each other, and the transistors control supply of one-way currents passing therethrough.

FIG. 80 shows a configuration obtained by adding transistors MP1, MP2 and MP3 and diodes MP4, MP5 and MP6 to the configuration shown in FIG. 42. The diodes 541, 542 and 543 and the Zener diode 544 for absorbing instantaneous overvoltage are omitted.

References 531 and 531 in FIG. 80 show A-phase windings. As shown by the symbols of winding start points, these windings are arranged so that the magnetic flux interlinkage is reversely directed. When the transistor 537 is turned on, voltage of the power supply 87G is applied to the winding 531 to increase the A-phase current Ia. When the transistor 537 is turned off, the current Ia is shut out. At the same time with the shut out, the magnetic energy of the magnetic flux ωz interlinking the windings 531 and 532 allows current I2a to flow toward the power supply 87G via the diode 53B. This action is similar to the action in FIG. 42.

The configuration shown in FIG. 80 is additionally and symmetrically provided with a transistor MP1 and a diode MP4 to enable supply of a negative current component Ina to the slots of the A-phase windings. The negative current component Ina is permitted to exert functions such as of weakening magnetic field as will be explained subsequently, enhancing torque and rendering the permanent magnets to be variable. In FIG. 80 as well, the currents positively supplied by the transistors are each directed in one-way.

The function of weakening magnetic field exerted by the negative current component Ina is to reduce unnecessary and harmful magnetic flux in a motor which is additionally provided with field windings as shown in FIG. 46, or in a motor which is additionally provided with permanent magnets in the stator poles as shown in FIG. 51. The term field weakening action refers to the method of reducing the problem of unbalanced voltage explained referring to Formulas (151) and (152). In the configuration shown in FIG. 80, the negative current of each phase can be freely supplied using the additionally provided transistor to realize the field weakening action.

For example, let us suppose the case where the motor shown in FIG. 5 is at a rotational position θr=60 degrees, rotated in the clockwise direction CW generating torque in the clockwise direction CW. Let us suppose further that the BA-phase magnetic flux is necessary for generating torque in the clockwise direction CW and the BA-phase current component Iba is 20 A. Further, the AC-phase magnetic flux is produced by the permanent magnets as shown in FIG. 51, but since its magnetic flux component is unnecessary, the AC-phase current component Iac is rendered to be −5 A. Furthermore, since the CB-phase magnetic flux is used in the subsequent torque generation cycle, the magnetomotive force of the field windings remains as it is. The current components will have values as follows:

$$Iac = -5 \text{ A}$$

$$Iba = 20 \text{ A}$$

$$Icb = 0 \quad (163)$$

When the phase currents are calculated based on the reverse conversion formulas of Formula (4), (5) and (6), the values are as follows:

$$Ia = 15 \text{ A}$$

$$Ib = 20 \text{ A}$$

$$Ic = -5 \text{ A} \quad (164)$$

When the current derived such as from Formula (164) is supplied in the control circuit shown in FIG. 80, the problem of unbalanced voltage is mitigated. Similar to the A phase, the B-phase negative current component can be supplied via a transistor MP2. Also, similar to the A phase, the C-phase negative current component can be supplied via a transistor MP3.

Generally, the field current Iff is very often of a level of about ⅓ of the continuous torque current. When the peak torque is about three times as large as the continuous torque, the field current components will be reduced to ⅑ of the torque current components. In the case of such a configuration, the current capacity of the added transistors MP1, MP2 and MP3 will be about ⅑ of that of the transistors 537, 538 and 539 for torque current. Thus, since these transistors are relatively small, the rate of increase of cost is small.

Assuming that the continuous current torque is about 3/2 of the field current Iff, and the peak torque is about 3/2 of the continuous torque, ⅔×⅔=4/9 is established. Thus, even when the burden of magnetic field is large in a motor, the current capacity of the additional circuit that supplies the negative field current components will be ½ or less of the phase currents Ia, Ib and Ic.

A method of enhancing torque in the circuit configuration of FIG. 80 will now be explained. For example, in the state as shown in FIG. 5, torque in the clockwise direction CW can be obtained by the A- and B-phase currents Ia and Ib. When the C-phase current is supplied in this state, torque can be enhanced. In this state, all of the three windings contribute to the generation of torque and thus the efficiency of the motor is enhanced.

Change in the magnitude of the permanent magnets, i.e. magnetization or degaussing, in the circuit configuration of FIG. 80 is explained. Since negative current can be supplied to the slots of each phase, magnetomotive force is generated, as shown in FIGS. 77 and 78, in each stator pole in a direction reverse of the direction of the magnetic flux in the stator poles of each phase to thereby degauss or demagnetize the permanent magnets. The negative current components are supplied via the transistors MP1, MP2 and MP3.

Further, the permanent magnets can be magnetized or increasingly magnetized by supplying positive currents to the individual phases via the transistors 537, 538 and 539. The magnitude of the permanent magnets can be changed by parallelly controlling the currents of all of the three phases. Thus, the magnitude can also be changed in a high-speed range.

(Forty-seventh Embodiment)

Hereinafter is specifically explained a motor related to a forty-seventh embodiment.

Figure 81:
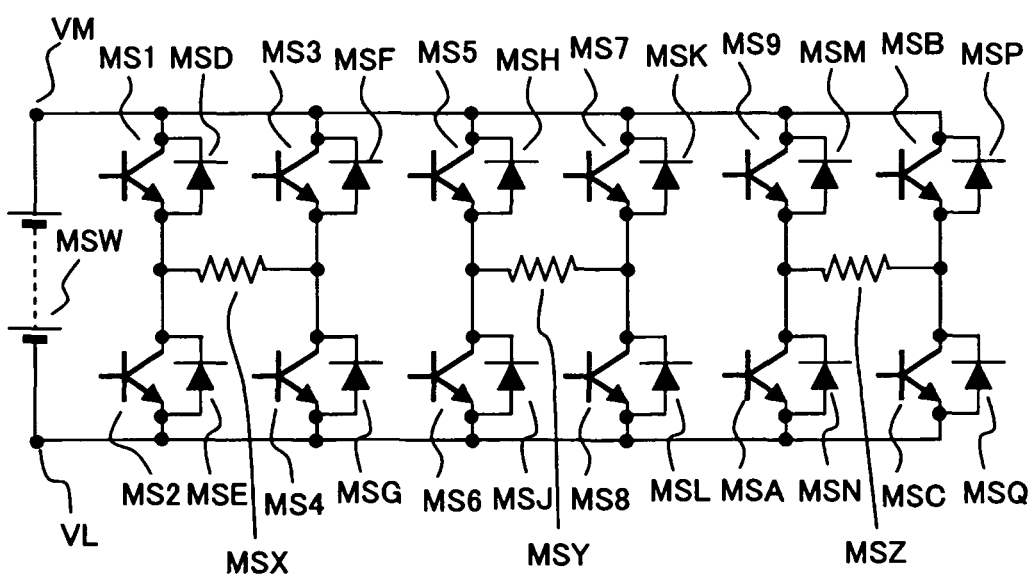
FIG. 81 is a diagram exemplifying a control circuit capable of supplying phase currents to the respective phase windings of the motor shown in FIG. 1 and also supplying negative field current components thereto.

FIG. 81 shows a configuration of a control circuit in which twelve transistors are used to control currents of three windings. In the figure, reference MSX shows an A-phase winding. When transistors MS1 and MS4 are turned on, the A-phase current Ia is supplied.

When negative A-phase current is supplied, transistors MS3 and MS2 are turned on. Reference MSY shows a B-phase winding. When transistors MS5 and MS8 are turned on, the B-phase current Ib is supplied. When positive B-phase current is supplied, transistors MS7 and MS6 are turned on. Reference MSZ shows a C-phase winding. When transistors MS9 and MSC are turned on, the C-phase current Ic is supplied. When negative C-phase current is supplied, transistors MSB and MSA are turned on.

The control circuit shown in FIG. 81 is able to supply positive current and negative current to each phase winding, and thus, quantitatively, able to behave in a manner similar to the configuration of FIG. 80. In other words, the control circuit of FIG. 81 is able to enhance torque and change magnitude of the permanent magnets. In the configuration of the control circuit shown in FIG. 81, unlike the one shown in FIG. 81, the winding wound about the slots of each phase is not required to be divided into two. Accordingly, compared to the configuration of FIG. 80, the configuration of FIG. 81 is able to reduce the resistance of each phase winding. Thus, the efficiency of the motor is enhanced.

When the field weakening action is taken in the configuration of FIG. 81, the current capacity of the transistors MS3, MS2, MS7, MS6, MSP and MSA is reduced, similar to the control circuit of FIG. 80. The control circuit configuration is able to reduce the load imposed on the current to about 1/10 to ½ compared to the control circuit configuration shown in FIG. 9. However, there is no denying that the control circuit will be complicated.

(Forty-eighth Embodiment)

Herein after is specifically explained a forty-eighth embodiment.

Figure 82:
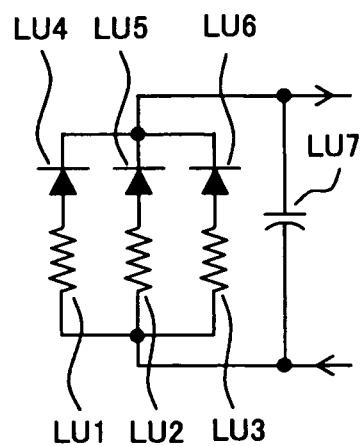
FIG. 82 is a circuit diagram exemplifying a connection between rectifying circuits and the respective phase windings in cases where the motors shown in FIGS. 46, 51, and others are used as generators.

FIG. 82 shows a circuit configuration used for the case where electric generation is performed using the motor having the field windings as shown such as in FIG. 46, or the motor having permanent magnets as shown such as in FIG. 51. Reference LU1 shows the A-phase winding Wa, reference LU2 shows the B-phase winding Wb and reference LU3 shows the C-phase winding Wc. Diodes LU4, LU5 and LU6 are mounted on the respective windings, for DC rectification. Reference LU7 shows a capacitor for stabilizing output voltage. Alternative to this, a DC-DC converter, for example, may be mounted on an output side of a rectifier to thereby stabilize voltage, without mounting the capacitor LU7.

When the configuration includes field windings as shown such as in FIG. 46, a field circuit as shown such as in FIG. 47 or 48 may be used to control the field current. The field circuit controls the field current according to the number of rotations and the load current to thereby stabilize the output voltage. In the case of an electric generator, if only field current is supplied for a short time to the field windings such as by a battery at the first startup, operation can be continued thereafter based on self-excitation through the use of the generated power.

When a motor including permanent magnets as shown such as in FIG. 51 is used, the motor is free from the burden of field current and thus efficiently operated. In generation operation, the field magnetic flux is intensified with the flow of load current. Thus, only a small amount of permanent magnets enables power generation.

Further, when the field circuit shown in FIG. 50 is additionally provided, more reliable stabilization and higher output are ensured. In the field circuit of FIG. 50, field energy circulates in the motor to stabilize the voltage and output current.

Alternatively, the field windings Wa, Wb and Wc shown in FIGS. 46 and 51 may be provided with concentrated winding as shown in FIG. 85. In both of the configurations, measures against vibration and noise are required to be taken. In the case of a motor having a multiple configuration, the stator poles or the rotor salient poles may be partially shifted in the circumferential direction to change phase of power generation and to thereby disperse force acting on the motor. In this case, a rectifier circuit may be provided for the voltage of each phase to perform averaging.

Figure 83:
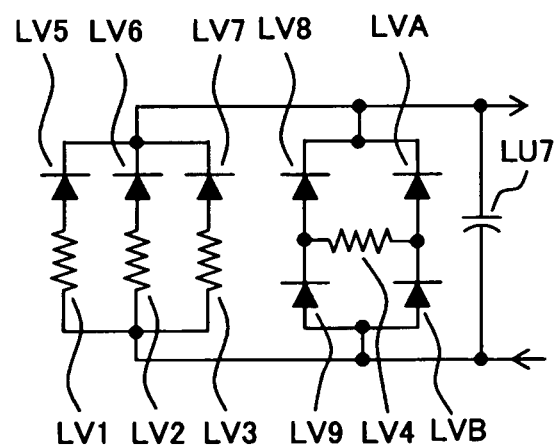
FIG. 83 is a circuit diagram exemplifying a connection between rectifying circuits and the respective phase windings in cases where the motor shown in FIG. 24 additionally provided with field windings or permanent magnets is used as a generator.

FIG. 83 shows an example of a rectifier circuit provided on an output side of a motor obtained by adding field windings or permanent magnets to the motor shown in FIG. 24. Reference LV1 shows an A-phase winding, reference LV2 shows a B-phase winding, reference LV3 shows a C-phase winding, and reference LV4 shows a D-phase winding. References LV5, LV6, LV7, LV8, LV9, LVA and LVB are diodes for rectification.

Figure 84:
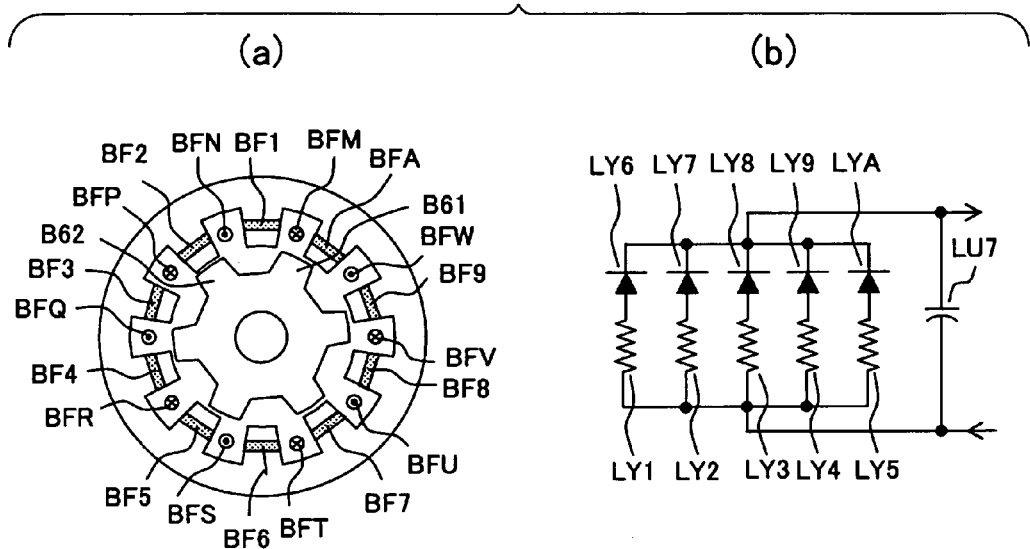
FIG. 84 is a view exemplifying a connection between rectifying circuits and the respective phase windings in cases where the motor shown in FIG. 19 additionally provided with field windings or permanent magnets is used as a generator.

FIG. 84 shows an example of a motor obtained by adding permanent magnets to the motor shown in FIG. 19, and a rectifier circuit provided on an output side. FIG. 84 shows by (a) the motor in which references BF1, BF2, BF3, BF4, BF5, BF6, BF7, BF8, BF9 and BFA show permanent magnets. FIG. 84 shows by (b) the rectifier in which reference LY1 shows an A-phase winding, reference LY2 shows a B-phase winding, reference LY3 shows a C-phase winding, reference LY4 shows a D-phase winding and reference LY5 shows an E-phase winding. References LY6, LY7, LY8, LY9 and LYA show diodes used for rectification. The motor configuration shown in FIG. 83 or 84 has large prime numbers in the operating frequency and thus, when multi-polarized, is advantageous for reducing vibration and noise.

Various embodiments of the present invention have been described so far. First to sixth problems have been raised first as the problems of full-pitch winding switched reluctance motors. Regarding the first and third problems of complicated relationship in interlinked magnetic flux and mutual inductance, a new method has been suggested based on current components. Regarding the second problem of non-linearity of a soft-magnetic material, a control method has been suggested, which uses magnetic flux information obtained such as by a finite element method. Regarding the fourth problem of magnetic flux leakage and magnetic saturation, a method of arranging stator poles shown such as in FIG. 72, the shape of each stator pole and each rotor salient pole for reducing magnetic flux leakage as shown in FIG. 73, and the like, have been suggested. Regarding the fifth problem of winding resistance, a configuration of a combined motor for reducing the length of a winding as shown such as in FIG. 61 has been suggested. Regarding the sixth problem of the length of an air gap between stator poles and rotor salient poles, a method of equivalently reducing the air gap shown in FIG. 74, a method of providing field windings, a method of using permanent magnets, and the like, have been suggested.

The descriptions of the motor related to the present invention have been provided focusing on a configuration, as shown in a cross-sectional view of the motor shown in FIG. 1, in which six stator poles are circumferentially arranged at even intervals in an electrical angle of 360 degrees and four rotor salient poles are circumferentially arranged at even intervals. These motors can be multi-polarized. Motors of different number of phases can be manufactured based on the same construction technique. Further, an example has been shown in which the circumferential width of a tip end portion of a stator pole facing the rotor is 30 degrees in electrical angle. Alternative to this, the width of a magnetic pole may be 30 degrees or less or may be 30 degrees or more. The circumferential width of a rotor salient pole may also be 30 degrees or less, or may be 30 degrees or more. In the case of a multipolar motor, in particular, the circumferential arrangement of the stator poles may be uneven in order to mitigate torque ripple.

The above description has shown that the motor model of the present invention having the current components as shown in FIG. 16 can be schematically expressed as shown in FIG. 13 from the aspect of the relationship with magnetic flux. For example, the relationship between the current component Iac shown by MF2 and the AC-phase magnetic flux φac on the right side portion of FIG. 13 is substantially analogous to the relationship between the current Iu shown by MK4 and the U-phase magnetic flux φu in FIG. 11 which schematically shows the concentrated winding motor shown in FIG. 85. The connection relationship of windings is different between the motors shown in FIGS. 1 and 85 because the motor of FIG. 1 is of full-pitch winding and the motor of FIG. 85 is of concentrated winding.

In these motors, equivalently, the currents Iu, Iv, Iw of the motor shown in FIG. 85 may be substituted by the following formulas which are based on Formulas (1), (2) and (3):

$$Iu=Iac=Ica \tag{165}$$

$$Iv=Iba=Iab \tag{166}$$

$$Iw=Icb=Ibc \tag{167}$$

In the U-phase winding shown in FIG. 85, the windings 867 and 868 are connected in series with the windings 86E and 86D, with the directions of the magnetic flux being matched, to provide its current Iu. The same applies to V- and W-phase windings.

When the winding voltages are Uv, Vv and Vw, these may be substituted by the following voltage formulas which are based on Formulas (22), (23) and (24):

$$Vu=V2ac \tag{168}$$

$$Vv=V2ba \tag{169}$$

$$Vw=V2cb \tag{170}$$

In this way, with the substitutions as shown in Formulas (165), (166), (167), (168), (169) and (170), the motor shown such as in FIG. 1 may be controlled in respect of the voltages Va, Vb and Vc and the currents Ia, Ib and Ic. Such methods also fall within the technical scope of the present invention and thus should be encompassed by the present invention.

Various techniques have been described above regarding full-pitch switched reluctance motor, which techniques are based on current components for exciting individual stator poles. Specific means for embodying these techniques include various methods. The methods include a method of faithfully configuring in software the theoretical formulas shown in the present invention, a method of configuring the same in hardware, a method of configuring the same using both software and hardware, a method of storing data unique to the motor to be used in a memory map, and a method of substituting equivalent functions with control algorithms and data on a memory. These variously modified motors should be encompassed in the present invention, as far as the techniques for the modifications fall within the spirit of the present invention.

The motor related to the present invention tends to provide intermittent torque, unlike the motors for three-phase AC voltage and current based on conventional art. This feature enables control by piecing a control method in a low-speed range, a control method in a middle-speed range and an intermittent control method in a high-speed range. Alternatively, the motor may be controlled by changing control parameters according to the status of the motor, because winding inductance drastically changes depending on the rotational position θr and because control frequency increases in conformity with the number of rotations.

Alternatively, a stator pole may have a multi-toothed tip end to enhance torque, or a rotor salient pole may have a multi-toothed tip end to enhance torque. The motor of the present invention may be applied to outer-rotor motors, axial-gap motors, linear motors, motors obtained by combining these various motors, and the like. These variously modified motors should be encompassed in the present invention, as far as the techniques for the modifications fall within the spirit of the present invention.

INDUSTRIAL APPLICABILITY

According to the present invention, problems such as of full-pitch winding switched reluctance motors in which one-way currents are supplied can be resolved. As a result, such motor can be operated in a high-speed range with high torque, which has been difficult in the conventional art. Further, according to the present invention, winding resistance of motor can be reduced compared to the switching reluctance motors of the conventional art. Owing to the reduction of the winding resistance, the efficiency of the motor is enhanced and the size and cost of the motor are reduced. Further, the motor of the present invention can be driven using a control circuit having a small current capacity. Therefore, the size and cost of the motor can be reduced. In addition, the motor of the present invention does not have to use permanent magnets, or the amount of use of permanent magnets can be reduced. Accordingly, the resource problem involving rare-earth metal is mitigated.

With the features as provided above, a high-competitive motor technique can be provided by the present invention, which technique can be extensively used for the motors for driving electric cars, industrial motors, the motors for home electric appliances, and the like.

What is claimed is:

1. A full-pitch winding switched reluctance motor, comprising:
   "8×NN2" pieces of stator poles arranged in a range of an electrical angle of 360degrees, wherein the NN2 is an integer equal to or larger than 1;
   a back yoke magnetically connecting the stator poles;
   full-pitch windings for respective phases of the motor, each of the full-pitch windings being arranged between two of the stator poles;
   two or more rotor salient poles arranged in the range of an electrical angle of 360 degrees;
   a power converter PA2 that supplies positive and negative bidirectional currents to at least one of the full-pitch windings; and
   a power converter PA3 that supplies one-way currents to other full-pitch windings other than the one full-pitch winding among all the full-pitch windings,
   wherein commands IFo are obtained to control the windings, the commands commanding two current components to be supplied to two full-pitch windings positioned adjacently to each of the stator poles from both sides thereof in a circumferential direction of the motor.

2. The motor of claim 1, comprising:
   torque detecting means TS for producing a torque detected value Ts of the motor from current detected values Is in the respective phases and a rotational position θr of a rotor of the motor; and
   a torque correcting means TCO for producing a torque correcting command TCo from a torque command To and a torque signal Ts.

3. The motor of claim 1, wherein when each of the stator poles has a circumferential width Ht defined by an electrical angle, each of the rotor poles has a circumferential width Hm defined by the electrical angle, and one of the angles Ht and Hm which is smaller than the other is expressed by Hn, an angular width of current supplied to each of the windings of the respective phases as a rotor of the motor rotates is larger than "2×Hn" in the electrical angle.

4. The motor of claim 1, comprising:
   a power converter PA4 that applies a positive voltage VPA4 to the respective full-pitch windings so that one-way currents flow therethrough;
   a power converter PA5 that applies a negative voltage −VPA5 to the respective full-pitch windings so that one-way currents flow therethrough, the voltage VPA4 being larger than the voltage VPA5 in absolute values, the power converter PA4 and the power converter PA5 supplying the positive and negative voltages to each of the full-pitch windings to control the one-way currents passing therethrough:
   two windings WW2, WW3 for the same phase of the motor, which are wound at through the same slot;
   a power supply VS1 that supplies power;
   a transistor TR1 having one end connected to a positive terminal of a power supply VS1 and a further end connected to the winding WW2;
   a transistor TR2 having one end connected to a negative terminal of the power supply VS1 and a further end connected to the winding WW2;
   a diode DD1 having a cathode connected to a connecting point connecting the transistor TR1 and the winding WW2 and an anode connected to the negative terminal of the power supply VS1;
   a winding WW3 having one end connected to the connecting point connecting the transistor TR2 and the winding WW2; and
   a diode DD2 having an anode connected to the other end of the winding WW3 and a cathode connected to the positive terminal of the power supply VS1,
   wherein the same configuration as the above is applied to other phase windings for control voltage and current in each of the phases.

5. The motor of claim 1, comprising:
   a power converter PA4 that applies a positive voltage VPA4 to the respective full-pitch windings so that one-way currents flow therethrough;

a power converter PA5 that applies a negative voltage −VPA5 to the respective full-pitch windings so that one-way currents flow therethrough, the voltage VPA4 being larger than the voltage VPA5 in absolute values, the power converter PA4 and the power converter PA5 supplying the positive and negative voltages to each of the full pitch windings to control the one- way currents passing therethrough:

a winding WW4 for one phase of the motor;
a power supply VS3 that supplies power;
a power supply VS4 connected in series to the power supply VS3;
a transistor TR3 having one end connected to a positive terminal of a power supply VS4 and a further end connected to the winding WW4;
a transistor TR4 having one end connected to a negative terminal of the power supply VS3 and a further end connected to the winding WW4;
a diode DD3 having a cathode connected to a connecting point connecting the transistor TR3 and the winding WW4 and an anode connected to the negative terminal of the power supply VS3; and
a diode DD4 having a cathode connected to a connecting point connecting the transistor TR4and the winding WW4 and an anode connected to a positive terminal of the power supply VS3,
wherein the same configuration as the above is applied to other phase windings for control voltage and current in each of the phases.

6. The motor of claim 1, comprising:
a winding WW5 for one of the phases of the motor;
a power supply VS5 that supplies power;
a power supply VS6 connected in series to the power supply VS5;
a transistor TR5 having one end connected to a negative terminal of the power supply VS5 and a further end connected to the winding WW5; and
a diode DD5 having an anode connected to a connecting point connecting the transistor TR5 and the winding WW5 and a cathode connected to a positive terminal of a positive terminal of the power supply VS6,
wherein the same configuration as the above is applied to other phase windings for control voltage and current in each of the phases.

7. The motor of claim 1, comprising:
two windings WW7, WW8 for the same phase of the motor, which are wound at through the same slot;
a power supply VS7 that supplies power;
a power supply VS8 connected in series to the power supply VS7;
a transistor TR7 having one end connected to a negative terminal of the power supply VS7 and a further end connected to the winding WW7;
a winding WW8 having one end connected to a connecting point connecting the transistor TR7 and the winding WW7; and
a diode DD7 having an anode connected to the other end of the winding WW8 and cathode connected to a positive terminal of the power supply VS8,
wherein the same configuration as the above is applied to other phase windings for control voltage and current in each of the phases.

8. The motor of claim 1, wherein the control is performed using torque information To and magnetic flux information φda indicating magnetic flux interlinking the respective phase windings and corresponding to rotor rotational position information θs.

9. The motor of claim 8, wherein the control is performed using maximum torque information Tmax changing depending on each rotor rotation speed ωr.

10. The motor of claim 8, wherein the control is performed using a predictive value VFF of voltage across each of the phase windings, which is obtained based on magnetic flux information φda and an angular speed ωr of rotation.

11. The motor of claim 1, comprising:
current component commanding means IFO for producing the commands IFo for the respective phases;
current detecting means IS for detecting currents of the respective phases;
current component detecting means IFS for producing current component detected values IFs for the respective stator poles from current detected values Is which are outputs of the current detecting means IS for the respective phases; and
voltage component combining means VRO for producing a voltage command Vo from the commands IFo and the current component detected values IFs in the respective phases.

12. The motor of claim 1, comprising:
current component commanding means IFO for producing the commands IFo for the respective phases;
current component combining means IRO for producing current commands Io for the respective phases by combining the respective-phase commands IFo;
current detecting means IS for detecting current detected values Is of the respective phases; and
voltage commanding means VO producing a voltage command Vo from the current commands Io and the current detected values Is in the respective phases.

13. The motor of claim 1, comprising:
current component commanding means IFO for producing the commands IFo for the respective phases;
current detecting means IS for detecting currents of the respective phases;
current component detecting means IFS for producing current component detected values IFs for the respective stator poles from current detected values Is outputted by the current detecting means IS for the respective phases;
voltage commanding means V1O for producing a voltage command V1o from the current component commands IFo and the current component detected values IFs in the respective phases;
current component combining means IRO for producing current commands Io by combining the respective-phase commands IFo in the respective phases;
voltage commanding means V2O for producing a voltage command V2o from the current commands Io and the current detected values Is in the respective phases; and
combined voltage commanding means for producing a combined voltage command V12o by combing the voltage command V1o and the voltage command V2o in the respective phases.

14. A full-pitch winding switched reluctance motor, comprising:
"4×NN1+1" pieces of stator poles arranged in a range of an electrical angle of 360 degrees, wherein the NN1 is an integer equal to or larger than 1;
a back yoke magnetically connecting the stator poles;
full-pitch windings for respective phases of the motor, each of the full-pitch windings being arranged between two of the stator poles, wherein commands IFo are used to control the windings, the commands commanding two current components to be supplied to two full-pitch windings positioned adjacently to each of the stator poles from both sides thereof in a circumferential direction of the motor;

an even number of rotor salient poles arranged in the range of an electrical angle of 360 degrees, the even number being equal to or larger than 2;

a power converter PA1 that supplies one-way currents to the respective full-pitch windings;

current component commanding means IFO for producing the commands IFo for the respective phases;

current detecting means IS for detecting currents of the respective phases;

current component detecting means IFS for producing current component detected values IFs for the respective stator poles from current detected values Is which are outputs of the current detecting means IS for the respective phases; and voltage component combining means VRO for producing a voltage command Vo from the commands IFo and the current component detected values IFs in the respective phases.

15. A full-pitch winding switched reluctance motor, comprising:

"4×NN1+1" pieces of stator poles arranged in a range of an electrical angle of 360 degrees, wherein the NN1 is an integer equal to or larger than 1;

a back yoke magnetically connecting the stator poles;

full-pitch windings for respective phases of the motor, each of the full-pitch windings being arranged between two of the stator poles, wherein commands IFo are used to control the windings, the commands commanding two current components to be supplied to two full-pitch windings positioned adjacently to each of the stator poles from both sides thereof in a circumferential direction of the motor;

an even number of rotor salient poles arranged in the range of an electrical angle of 360 degrees, the even number being equal to or larger than 2;

a power converter PA1 that supplies one-way currents to the respective full-pitch windings;

current component commanding means IFO for producing the commands IFo for the respective phases;

current component combining means IRO for producing current commands Io for the respective phases by combining the respective-phase commands IFo;

current detecting means IS for detecting current detected values Is of the respective phases; and voltage commanding means VO producing a voltage command Vo from the current commands Io and the current detected values Is in the respective phases.

16. A full-pitch winding switched reluctance motor, comprising:

"4×NN1+1" pieces of stator poles arranged in a range of an electrical angle of 360 degrees, wherein the NN1 is an integer equal to or larger than 1;

a back yoke magnetically connecting the stator poles:

full-pitch windings for respective phases of the motor, each of the full-pitch windings being arranged between two of the stator poles, wherein commands IFo are used to control the windings, the commands commanding two current components to be supplied to two full-pitch windings positioned adjacently to each of the stator poles from both sides thereof in a circumferential direction of the motor;

an even number of rotor salient poles arranged in the range of an electrical angle of 360 degrees, the even number being equal to or larger than 2;

a power converter PA1 that supplies one-way currents to the respective full-pitch windings;

current component commanding means IFO for producing the commands IFo for the respective phases;

current detecting means IS for detecting currents of the respective phases;

current component detecting means IFS for producing current component detected values IFs for the respective stator poles from current detected values Is outputted by the current detecting means IS for the respective phases;

voltage commanding means V1O for producing a voltage command V1$o$ from the current component commands IFo and the current component detected values IFs in the respective phases;

current component combining means IRO for producing current commands Io by combining the respective-phase commands IFo in the respective phases;

voltage commanding means V2O for producing a voltage command V2$o$ from the current commands Io and the current detected values Is in the respective phases; and combined voltage commanding means for producing a combined voltage command V12$o$ by combing the voltage command V1$o$ and the voltage command V2$o$ in the respective phases.

* * * * *